US012719970B2

(12) United States Patent
Bora et al.

(10) Patent No.: US 12,719,970 B2
(45) Date of Patent: Aug. 25, 2026

(54) ELECTRONIC CONTROL DEVICE

(71) Applicant: iLumi Solutions, Inc., Plano, TX (US)

(72) Inventors: Swapnil Bora, Dallas, TX (US); Corey Egan, Austin, TX (US); Qinghui Tang, Plano, TX (US)

(73) Assignee: iLumi Solutions, Inc., Dallas, TX (US)

( * ) Notice: Subject to any disclaimer, the term of this patent is extended or adjusted under 35 U.S.C. 154(b) by 136 days.

(21) Appl. No.: 17/944,308

(22) Filed: Sep. 14, 2022

(65) Prior Publication Data

US 2023/0019044 A1 Jan. 19, 2023

Related U.S. Application Data

(63) Continuation of application No. 16/853,599, filed on Apr. 20, 2020, which is a continuation of application (Continued)

(51) Int. Cl.
*G06F 9/44* (2018.01)
*G06F 8/654* (2018.01)

(Continued)

(52) U.S. Cl.
CPC .............. *H04L 69/40* (2013.01); *G06F 8/654* (2018.02); *H04B 17/27* (2015.01); *H04L 67/125* (2013.01);

(Continued)

(58) Field of Classification Search
CPC ....... H04L 69/40; H04L 67/125; H04L 69/18; H04B 17/27; H04B 17/318; G06F 8/654;

(Continued)

(56) References Cited

U.S. PATENT DOCUMENTS 543,280 A 7/1895 Westinghouse, Jr.
5,146,614 A 9/1992 Furuno (Continued)

FOREIGN PATENT DOCUMENTS

CN 102136934 A * 7/2011 ........... H04L 41/082
JP 2003-241714 A 8/2003

(Continued)

OTHER PUBLICATIONS

English translation, Zhang et al. (CN 102136934 A), 2011, pp. 1-27. (Year: 2011).*

(Continued)

*Primary Examiner* — Mongbao Nguyen
(74) *Attorney, Agent, or Firm* — Daniel J. Chalker; Edwin S. Flores; Chalker Flores, LLP

(57) ABSTRACT

Various wireless communication methods are provided for controlling two or more wireless devices. In one embodiment, various processes optimize the wireless communication, especially when multiple devices are present in a system or a network. In another embodiment, various controlling devices are accommodated in a network of devices at different points in time. The speed at which the new controlling device comes into a range of the networked devices is improved with existing signatures of different wireless protocols or devices present in the network. In another embodiment, a change in the signal strength of a wireless device can be used to detect an object or person, such as an intruder.

22 Claims, 89 Drawing Sheets

Related U.S. Application Data

No. 15/204,901, filed on Jul. 7, 2016, now Pat. No. 10,630,820.

(60) Provisional application No. 62/189,637, filed on Jul. 7, 2015.

(51) Int. Cl.

| | |
|---|---|
| ***G06F 9/445*** | (2018.01) |
| ***G06F 9/45*** | (2006.01) |
| ***G06F 9/455*** | (2018.01) |
| ***H04B 17/27*** | (2015.01) |
| ***H04L 67/125*** | (2022.01) |
| ***H04L 69/18*** | (2022.01) |
| ***H04L 69/40*** | (2022.01) |
| ***H04W 4/06*** | (2009.01) |
| ***H04W 12/08*** | (2021.01) |
| ***H04W 12/108*** | (2021.01) |
| ***H04W 52/24*** | (2009.01) |
| ***H04W 52/38*** | (2009.01) |
| *H04W 24/02* | (2009.01) |
| *H04W 40/20* | (2009.01) |
| *H04W 52/28* | (2009.01) |
| *H04W 52/36* | (2009.01) |
| *H04W 76/14* | (2018.01) |
| *H04W 84/20* | (2009.01) |
| *H04W 88/04* | (2009.01) |

(52) U.S. Cl.

CPC ............... *H04L 69/18* (2013.01); *H04W 4/06* (2013.01); *H04W 12/08* (2013.01); *H04W 12/108* (2021.01); *H04W 52/245* (2013.01); *H04W 52/383* (2013.01); *H04W 24/02* (2013.01); *H04W 40/20* (2013.01); *H04W 52/283* (2013.01); *H04W 52/367* (2013.01); *H04W 76/14* (2018.02); *H04W 84/20* (2013.01); *H04W 88/04* (2013.01); *Y02D 30/70* (2020.08)

(58) Field of Classification Search

CPC ............ H04W 12/108; H04W 52/245; H04W 52/383

See application file for complete search history.

(56) References Cited

U.S. PATENT DOCUMENTS

| | | | |
|---|---|---|---|
| 5,193,208 | A | 3/1993 | Yokota et al. |
| 6,016,038 | A | 1/2000 | Mueller et al. |
| 6,028,871 | A | 2/2000 | Vaughan et al. |
| 6,069,465 | A | 5/2000 | De Boois et al. |
| 6,150,774 | A | 11/2000 | Mueller et al. |
| 6,166,496 | A | 12/2000 | Lys et al. |
| 6,211,626 | B1 | 4/2001 | Lys et al. |
| 6,292,901 | B1 | 9/2001 | Lys et al. |
| 6,459,919 | B1 | 10/2002 | Lys et al. |
| 6,528,954 | B1 | 3/2003 | Lys et al. |
| 6,548,967 | B1 | 4/2003 | Dowling et al. |
| 6,577,080 | B2 | 6/2003 | Lys et al. |
| 6,608,453 | B2 | 8/2003 | Morgan et al. |
| 6,655,817 | B2 | 12/2003 | Devlin et al. |
| 6,720,745 | B2 | 4/2004 | Lys et al. |
| 6,746,139 | B2 | 6/2004 | Sinzawa et al. |
| 6,777,891 | B2 | 8/2004 | Lys et al. |
| 6,788,011 | B2 | 9/2004 | Mueller et al. |
| 6,806,659 | B1 | 10/2004 | Mueller et al. |
| 6,950,656 | B1 | 9/2005 | Bahk et al. |
| 6,965,205 | B2 | 11/2005 | Piepgras et al. |
| 6,967,448 | B2 | 11/2005 | Morgan et al. |
| 7,014,336 | B1 | 3/2006 | Ducharme et al. |
| 7,038,398 | B1 | 5/2006 | Lys et al. |
| 7,038,399 | B2 | 5/2006 | Lys et al. |
| 7,079,808 | B2 | 7/2006 | Striemer |
| 7,113,541 | B1 | 9/2006 | Lys et al. |
| 7,126,291 | B2 | 10/2006 | Kruse et al. |
| 7,167,777 | B2 | 1/2007 | Budike, Jr. |
| 7,186,003 | B2 | 3/2007 | Dowling |
| 7,202,613 | B2 | 4/2007 | Morgan et al. |
| 7,228,190 | B2 | 6/2007 | Dowling et al. |
| 7,231,060 | B2 | 6/2007 | Dowling et al. |
| 7,303,300 | B2 | 12/2007 | Dowling et al. |
| 7,308,296 | B2 | 12/2007 | Rys et al. |
| 7,332,878 | B1 | 2/2008 | Smith |
| 7,348,736 | B2 | 3/2008 | Piepgras et al. |
| 7,348,949 | B2 | 3/2008 | Lys et al. |
| 7,352,339 | B2 | 4/2008 | Morgan et al. |
| 7,353,071 | B2 | 4/2008 | Blackwell et al. |
| 7,358,679 | B2 | 4/2008 | Lys et al. |
| 7,378,805 | B2 | 5/2008 | Oh et al. |
| 7,384,150 | B2 | 6/2008 | Prince |
| 7,385,359 | B2 | 6/2008 | Dowling et al. |
| 7,401,934 | B2 | 7/2008 | Hunt |
| 7,436,132 | B1 | 10/2008 | Null |
| 7,462,103 | B2 | 12/2008 | Mattice et al. |
| 7,462,997 | B2 | 12/2008 | Mueller et al. |
| 7,471,051 | B1 | 12/2008 | Wacknov et al. |
| 7,476,002 | B2 | 1/2009 | Wolf et al. |
| 7,482,763 | B2 | 1/2009 | Rodriguez et al. |
| 7,490,957 | B2 | 2/2009 | Leong et al. |
| 7,508,141 | B2 | 3/2009 | Wong |
| 7,511,695 | B2 | 3/2009 | Furukawa et al. |
| 7,518,319 | B2 | 4/2009 | Konno et al. |
| 7,550,931 | B2 | 6/2009 | Lys et al. |
| 7,597,455 | B2 | 10/2009 | Smith et al. |
| 7,612,843 | B2 | 11/2009 | Chou |
| 7,619,538 | B1 | 11/2009 | Zarian |
| 7,623,042 | B2 | 11/2009 | Huizenga |
| 7,652,236 | B2 | 1/2010 | Cortenraad et al. |
| 7,658,506 | B2 | 2/2010 | Dowling |
| 7,659,674 | B2 | 2/2010 | Mueller et al. |
| 7,675,238 | B2 | 3/2010 | Cortenraad et al. |
| 7,701,078 | B1 | 4/2010 | Johnson et al. |
| 7,712,914 | B2 | 5/2010 | Levy et al. |
| 7,719,208 | B2 | 5/2010 | Li et al. |
| 7,731,371 | B2 | 6/2010 | Prince |
| 7,731,383 | B2 | 6/2010 | Myer |
| 7,745,769 | B2 | 6/2010 | Tracy et al. |
| 7,764,026 | B2 | 7/2010 | Dowling et al. |
| 7,777,427 | B2 | 8/2010 | Stalker, III |
| 7,777,430 | B2 | 8/2010 | Catalano et al. |
| 7,781,713 | B2 | 8/2010 | Papamichael et al. |
| 7,781,979 | B2 | 8/2010 | Lys |
| 7,809,448 | B2 | 10/2010 | Lys et al. |
| 7,812,297 | B2 | 10/2010 | Blaut et al. |
| 7,818,029 | B2 | 10/2010 | Sanguinetti |
| 7,845,823 | B2 | 12/2010 | Mueller et al. |
| 7,856,152 | B2 | 12/2010 | Diederiks et al. |
| 7,861,298 | B1 | 12/2010 | Gaiallorenzi et al. |
| 7,863,829 | B2 | 1/2011 | Sayers et al. |
| 7,863,831 | B2 | 1/2011 | Vos |
| 7,878,671 | B2 | 2/2011 | Hunt |
| 7,893,633 | B2 | 2/2011 | Pedersen |
| 7,914,172 | B2 | 3/2011 | Nagara et al. |
| 7,919,937 | B2 | 4/2011 | Tracy et al. |
| 7,920,053 | B2 | 4/2011 | Pattok et al. |
| 7,926,975 | B2 | 4/2011 | Siemiet et al. |
| 7,936,562 | B2 | 5/2011 | Nagamura et al. |
| 7,936,904 | B2 | 5/2011 | Furuasawa |
| 7,946,729 | B2 | 5/2011 | Ivey et al. |
| 7,961,113 | B2 | 6/2011 | Rabiner et al. |
| 7,972,022 | B2 | 7/2011 | Pohlert et al. |
| 7,972,028 | B2 | 7/2011 | Durand et al. |
| 7,976,196 | B2 | 7/2011 | Ivey et al. |
| 7,990,080 | B2 | 8/2011 | Chang et al. |
| 7,999,491 | B2 | 8/2011 | Peng et al. |
| 8,004,211 | B2 | 8/2011 | Van Erp |
| 8,008,871 | B2 | 8/2011 | Wang et al. |
| 8,013,545 | B2 | 9/2011 | Jonsson |
| 8,016,470 | B2 | 9/2011 | Li et al. |
| 8,021,021 | B2 | 9/2011 | Paolini |

(56) References Cited

U.S. PATENT DOCUMENTS 8,025,417 B2 9/2011 Pohlert et al.
8,026,673 B2 9/2011 Lys
8,029,154 B2 10/2011 Myer
8,035,320 B2 10/2011 Sibert
8,035,609 B2 10/2011 Kerr et al.
8,049,434 B2 11/2011 Crouse et al.
8,049,437 B2 11/2011 Chang et al.
8,070,325 B2 12/2011 Zampini et al.
8,093,823 B1 1/2012 Ivey et al.
8,100,552 B2 1/2012 Spero
8,143,811 B2 3/2012 Shloush et al.
8,169,163 B2 5/2012 Kang et al.
8,203,260 B2 6/2012 Li et al.
8,299,716 B2 10/2012 Melzner et al.
8,324,832 B2 12/2012 Yan et al.
8,326,136 B1 12/2012 Clark
8,344,659 B2 1/2013 Shimomura et al.
8,362,707 B2 1/2013 Draper et al.
8,378,588 B2 2/2013 Kuo et al.
8,402,109 B2 * 3/2013 Marino .................. G06Q 10/00 709/212
8,410,717 B2 4/2013 Shyteynberg et al.
8,421,376 B2 4/2013 Jonsson
8,427,063 B2 4/2013 Hulett
8,430,402 B2 4/2013 Diehl et al.
8,441,210 B2 5/2013 Shteynberg et al.
8,482,223 B2 7/2013 Draper et al.
8,531,137 B2 9/2013 Jonsson
8,581,521 B2 11/2013 Welten et al.
8,638,045 B2 1/2014 Kunst et al.
8,669,716 B2 3/2014 Recker et al.
8,729,826 B2 5/2014 Jonsson
8,742,694 B2 6/2014 Bora et al.
8,764,242 B2 7/2014 Recker et al.
8,770,771 B2 7/2014 Preta et al.
8,845,116 B2 9/2014 Kim et al.
8,890,435 B2 11/2014 Bora et al.
8,892,699 B2 * 11/2014 Mann ........................ G06F 8/65 709/224
8,896,218 B2 11/2014 Bora et al.
8,896,232 B2 11/2014 Bora et al.
8,921,751 B2 12/2014 Vuerfuerth
8,922,126 B2 12/2014 Bora et al.
8,981,646 B2 3/2015 Kim
9,021,462 B2 * 4/2015 Gupta .................... G05B 15/02 717/172
9,092,299 B2 * 7/2015 Coolidge ........... G07C 9/00571
9,107,047 B1 8/2015 Malreddy
9,113,528 B2 8/2015 Bora et al.
9,161,419 B2 10/2015 Anderson et al.
9,204,523 B2 12/2015 Reed et al.
9,252,595 B2 2/2016 Recker et al.
9,295,144 B2 3/2016 Bora et al.
9,325,827 B2 * 4/2016 Mirza ................... H04L 12/282
9,351,193 B2 * 5/2016 Raleigh ................... H04L 12/14
9,386,659 B2 7/2016 Sinai et al.
9,615,371 B1 4/2017 de Barros Chapiewski
9,642,100 B2 5/2017 Yamamoto et al.
10,133,549 B1 11/2018 Do et al.
10,178,723 B2 1/2019 Van De Ven
10,382,282 B1 8/2019 Levy-Yurista et al.
10,818,164 B2 10/2020 Bora et al.
10,848,533 B2 11/2020 Wallace
11,468,764 B2 10/2022 Bora et al.
2002/0093492 A1 7/2002 Baron
2004/0042234 A1 3/2004 Otake
2005/0043907 A1 2/2005 Eckel et al.
2005/0170788 A1 8/2005 Tanaka et al.
2005/0204505 A1 9/2005 Kashiwagi
2007/0004349 A1 1/2007 Ranganathan et al.
2007/0075965 A1 4/2007 Huppi et al.
2007/0133469 A1 6/2007 Shin et al.
2008/0082997 A1 4/2008 Um
2009/0111499 A1 4/2009 Bosch et al.
2009/0129341 A1 5/2009 Balasubramanian et al.
2009/0251545 A1 10/2009 Shekarri
2009/0286534 A1 11/2009 Garg et al.
2009/0291690 A1 11/2009 Guvenc et al.
2010/0001648 A1 1/2010 De Clercq et al.
2010/0054219 A1 3/2010 Humblet
2010/0077390 A1 3/2010 Nicoulin
2010/0169876 A1 * 7/2010 Mann ........................ G06F 8/65 717/173
2010/0188197 A1 7/2010 Ackley
2010/0191951 A1 * 7/2010 Malone ..................... G06F 8/65 717/172
2010/0237711 A1 9/2010 Parsons
2010/0244709 A1 9/2010 Steiner et al.
2010/0285807 A1 11/2010 Miller-Smith
2011/0062888 A1 3/2011 Bondy et al.
2011/0179853 A1 7/2011 Fugiel et al.
2012/0093492 A1 4/2012 Kato et al.
2012/0155317 A1 6/2012 Shepard et al.
2012/0166783 A1 6/2012 Kamdar et al.
2012/0286676 A1 11/2012 Saveri, III et al.
2013/0026947 A1 1/2013 Economy et al.
2013/0074061 A1 * 3/2013 Averbuch ................ G06F 8/654 717/171
2013/0125107 A1 * 5/2013 Bandakka ............... H04L 67/10 717/171
2013/0247117 A1 9/2013 Yamada et al.
2013/0315038 A1 11/2013 Ferren et al.
2014/0001846 A1 1/2014 Mosebrook et al.
2014/0003418 A1 1/2014 Khait et al.
2014/0021385 A1 1/2014 Lynch
2014/0149973 A1 * 5/2014 Walter .................... G06F 8/654 717/170
2014/0169795 A1 6/2014 Clough
2014/0194109 A1 7/2014 Nunzi et al.
2014/0196024 A1 * 7/2014 Hanon .................... G06F 8/654 717/178
2014/0197960 A1 7/2014 Taylor, Jr. et al.
2014/0206297 A1 7/2014 Schlub et al.
2014/0239817 A1 8/2014 Leinen et al.
2014/0265568 A1 9/2014 Crafts
2014/0325287 A1 10/2014 Nair et al.
2014/0340630 A1 11/2014 Pugh et al.
2015/0008831 A1 1/2015 Carrigan et al.
2015/0044975 A1 * 2/2015 Lamb ...................... H04W 4/80 455/67.14
2015/0091472 A1 4/2015 Kadotani et al.
2015/0092547 A1 4/2015 Wu
2015/0099555 A1 4/2015 Krishnaswamy
2015/0115809 A1 4/2015 Siessegger
2015/0116811 A1 4/2015 Shrivastava et al.
2015/0120000 A1 4/2015 Coffey et al.
2015/0130359 A1 5/2015 Bosua et al.
2015/0147067 A1 * 5/2015 Ryan .................... H04B 10/116 398/118
2015/0189724 A1 7/2015 Karc et al.
2015/0356289 A1 12/2015 Brown et al.
2015/0371534 A1 12/2015 Dimberg et al.
2015/0373749 A1 12/2015 Palin et al.
2016/0026832 A1 1/2016 Wadman et al.
2016/0036594 A1 2/2016 Conrad et al.
2016/0036956 A1 * 2/2016 Debates ............ H04M 1/72406 455/419
2016/0095192 A1 * 3/2016 Vangeel ................. G05B 15/02 315/153
2016/0103670 A1 * 4/2016 Chen ....................... G06F 8/654 717/168
2016/0131733 A1 5/2016 Do et al.
2016/0232010 A1 * 8/2016 Dicks ..................... G16H 40/67
2016/0300480 A1 10/2016 Mitra
2017/0013663 A1 1/2017 Bora et al.
2017/0111086 A1 4/2017 Choi et al.
2017/0134382 A1 5/2017 Darnell et al.
2017/0156039 A1 6/2017 Zhao et al.
2017/0177367 A1 6/2017 DeHon
2017/0254518 A1 9/2017 Vasylyev
2017/0286094 A1 10/2017 Westerkowsky

(56) References Cited

U.S. PATENT DOCUMENTS

| | | | |
|---|---|---|---|
| 2018/0046807 | A1 | 2/2018 | Patil et al. |
| 2020/0004453 | A1 | 1/2020 | Rori et al. |

FOREIGN PATENT DOCUMENTS

| | | | |
|---|---|---|---|
| JP | 2004-093761 | A | 3/2004 |
| JP | 2005-233982 | A | 9/2005 |
| KR | 10-0466042 | A | 1/2005 |
| KR | 10-2008-0009140 | A | 1/2008 |
| KR | 10-2008-0020608 | A | 3/2008 |
| KR | 10-1184698 | B1 | 9/2012 |
| WO | 2006/114725 | A1 | 11/2006 |
| WO | 2012/145766 | A2 | 10/2012 |
| WO | 2014027730 | A1 | 2/2014 |
| WO | 2017007963 | A1 | 1/2017 |
| WO | 2017007976 | A1 | 1/2017 |

OTHER PUBLICATIONS

Mr. Pravin G. Zaware, Wireless Monitoring, Controlling and Firmware upgradation of embedded devices using Wi-Fi, 2014, pp. 1-6. https://ieeexplore.ieee.org/stamp/stamp.jsp?tp=&arnumber=7230742 (Year: 2014).*

Wenyu Yang, Wireless Firmware Execution Control in Computational RFID Systems, 2015, pp. 1-8. https://ieeexplore.ieee.org/stamp/stamp.jsp?tp=&arnumber=7113083 (Year: 2015).*

European Patent Office, Extended European Search Report for Appl. No. EP 16821977.2, dated Mar. 6, 2019, 19 pp.

European Patent Office, Communication pursuant to Article 94(3) EPC for Appl. No. EP 16821977.2, dated Aug. 10, 2020, 10 pp.

European Patent Office, Extended European Search Report for Appl. No. EP 20209042.9, dated Feb. 9, 2021, 11 pp.

Intellectual Property India, Examination Report for Indian Patent No. 201817004612 dated Nov. 9, 2020, 6 pp.

Intellectual Property India, Examination Report for Indian Patent No. 201817004668 dated Jul. 6, 2020, 7 pp.

Marin, et al. "A Novel Technique for Low Latency Data Gathering in Wireless Sensor Networks" Digital System Design Architechtures, Methods and Tools, 2008. DSD '08. 11th Europmicro Conference on, IEEE, Piscataway, NJ, USA, Sept. 3, 2008, pp. 503-511, XP031509375, ISBN:978-0-7695-3277-6.

Offermans, et al. "User interaction with everyday lighting systems" Personal and Ubiquitous Computing. Springer Verlag. London. GB. vol. 18, No. 8, Dec. 1, 2014 (Dec. 1, 2014). pp. 2035-2055. XP058062065. ISSN: 1617-4909. DOI: 10.1007/S00779-014-0759-2.

Korea Patent Publication No. 10-2008-0009140—Abstract Only—Koninklijke Philips Electronics N.V., Jan. 24, 2008.

State Intellectual Property Office of the PRC, Examination Report dated Jul. 16, 2020 for Chinese Appl. No. 201680044070.4, (with translation) , 33 pp.

United States Patent & Trademark Office (Isa), International Search Report and Written Opinion for PCT Appl. No. PCT/US2021/029493, 12 pp.

European Patent Office, Supplementary European Search Report for Appl. No. EP 12774216, dated Sep. 9, 2015, 5 pp.

European Patent Office, Partial European Search Report for Appl. No. EP 16821977.2, dated Nov. 14, 2018, 21 pp.

Korean Intellectual Property Office (ISA) International Search Report and Written Opinion for PCT/US2012/037369 dated dated Nov. 5, 2012, 10 pp.

Korean Intellectual Property Office (ISA) International Search Report and Written Opinion for PCT/US2016/041388 dated dated Sep. 12, 2016, 17 pp.

Korean Intellectual Property Office (ISA) International Search Report and Written Opinion for PCT/US2016/041388 dated dated Oct. 18, 2016, 14 pp.

Philips Color Kinetics, "ColorBurst Powercore Product Guide," (2010-2011), 24 pages.

Philips Color Kinetics, "eColor Graze Powercore Product Guide," (2011), 12 pages.

European Patent Office, Partial European Search Report for Appl. No. EP 16821999.6, dated Dec. 17, 2018, 23 pp.

European Patent Office, Partial European Search Report for Appl. No. EP 16821999.6, dated Feb. 11, 2019, 23 pp.

* cited by examiner

Fig. 5
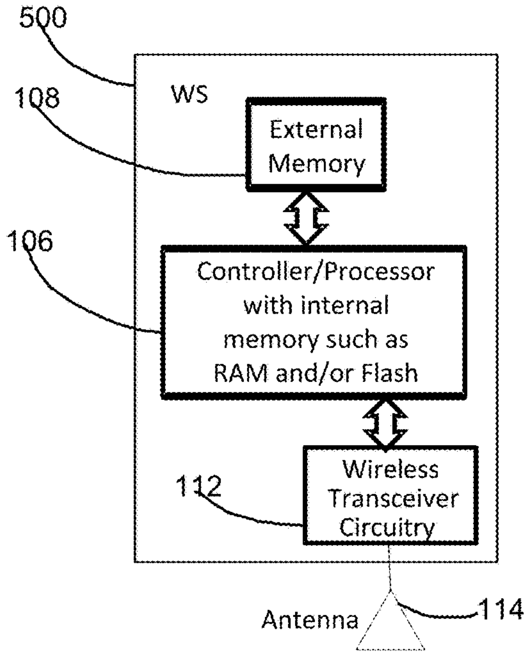
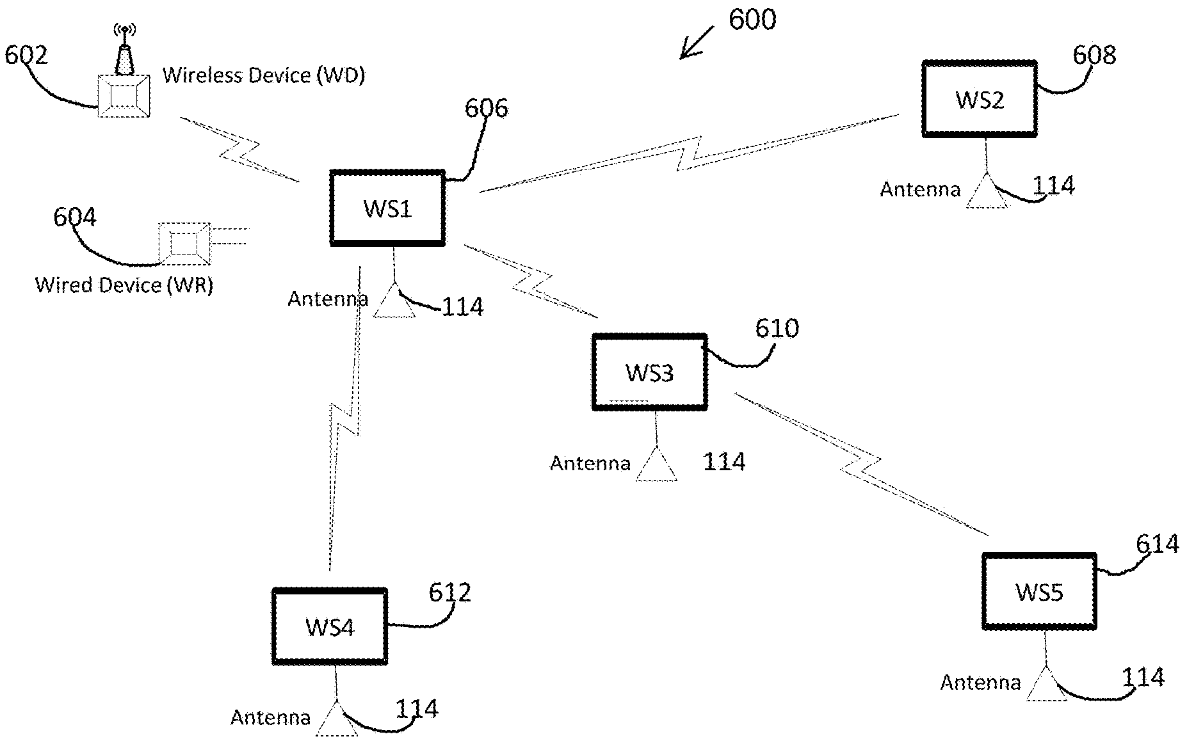
Fig. 6
500
WS
108
External Memory
106
Controller/Processor with internal memory such as RAM and/or Flash
112
Wireless Transceiver Circuitry
Antenna
114
600
602
Wireless Device (WD)
604
Wired Device (WR)
606
WS1
Antenna
114
608
WS2
610
WS3
612
WS4
614
WS5

802
Launch multi control devices process

804
A new controlling device initiates a command to the existing controlling device controlling the smart device for getting the control access. (This control access can be initiated between the two controlling devices indirectly such as through internet based service or direct communication between them through another communication protocol).

806
After the first controlling device gets the access request, it can grant it based on the user requirements or defined program.

808
The first controlling device loses the connections with all or some of the smart devices as per the user requirements or defined program.

810
The new controlling device then forms a mesh network with those smart devices and gets the ability to control them.

812
Stop

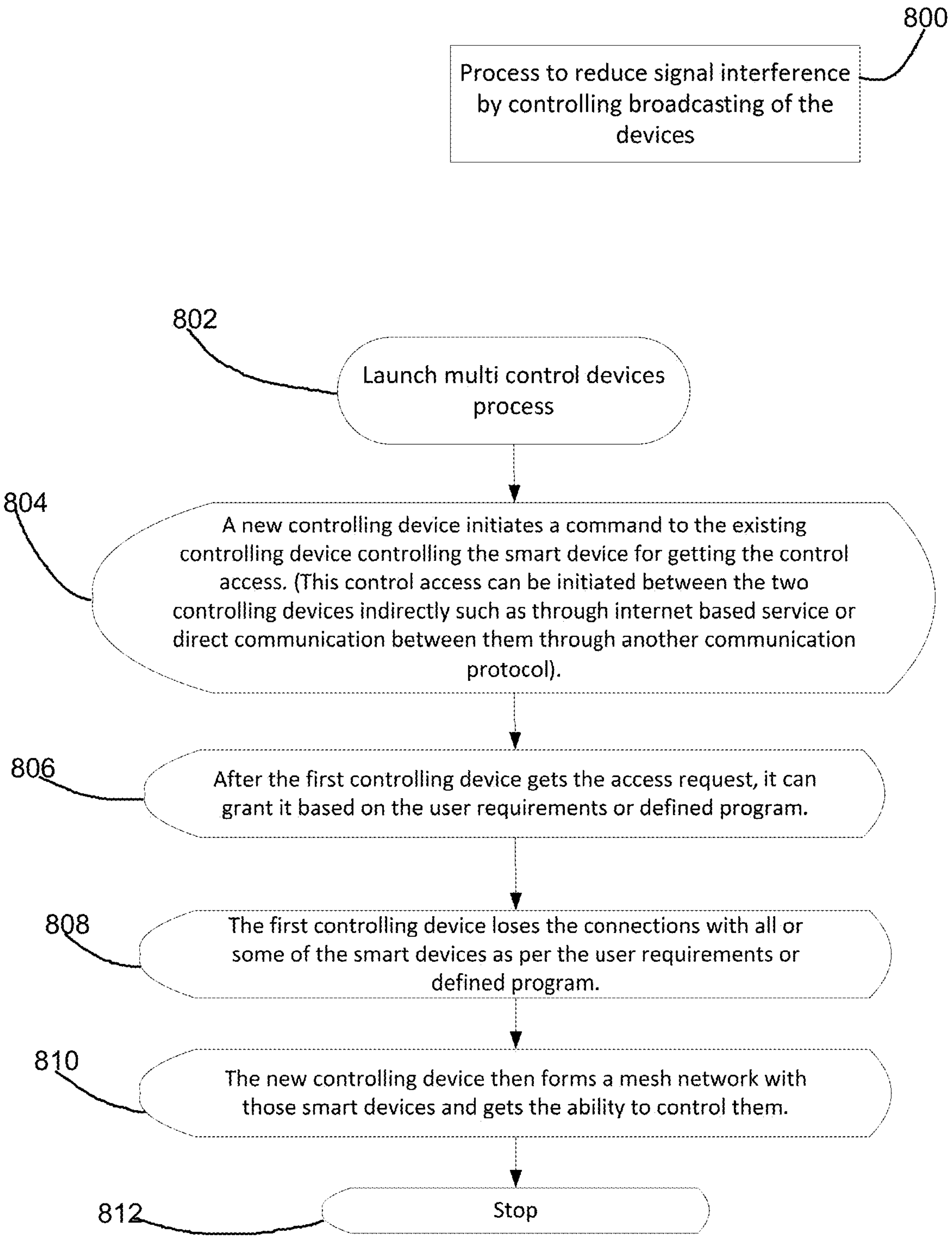

Fig. 8

FIG. 24
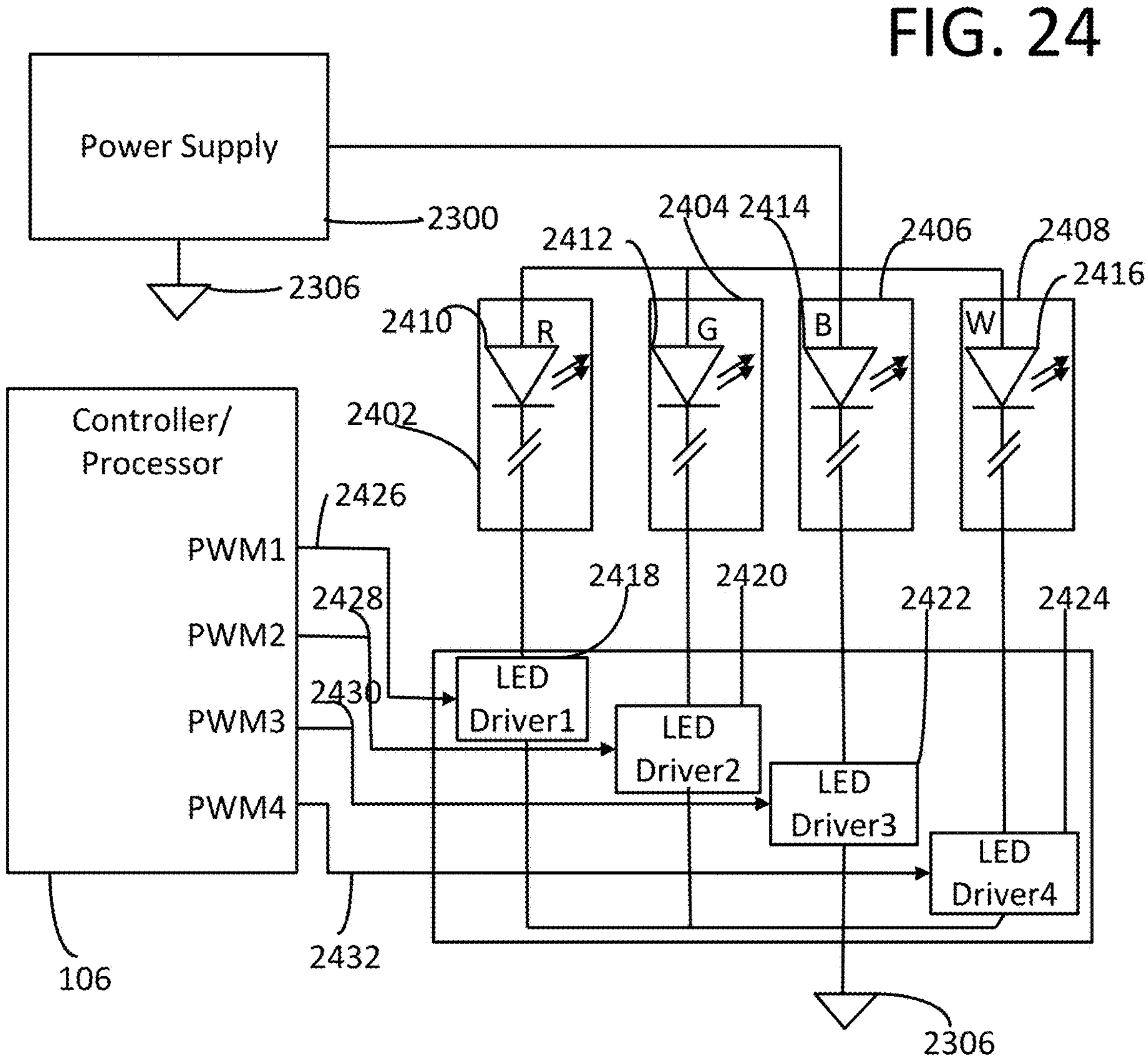
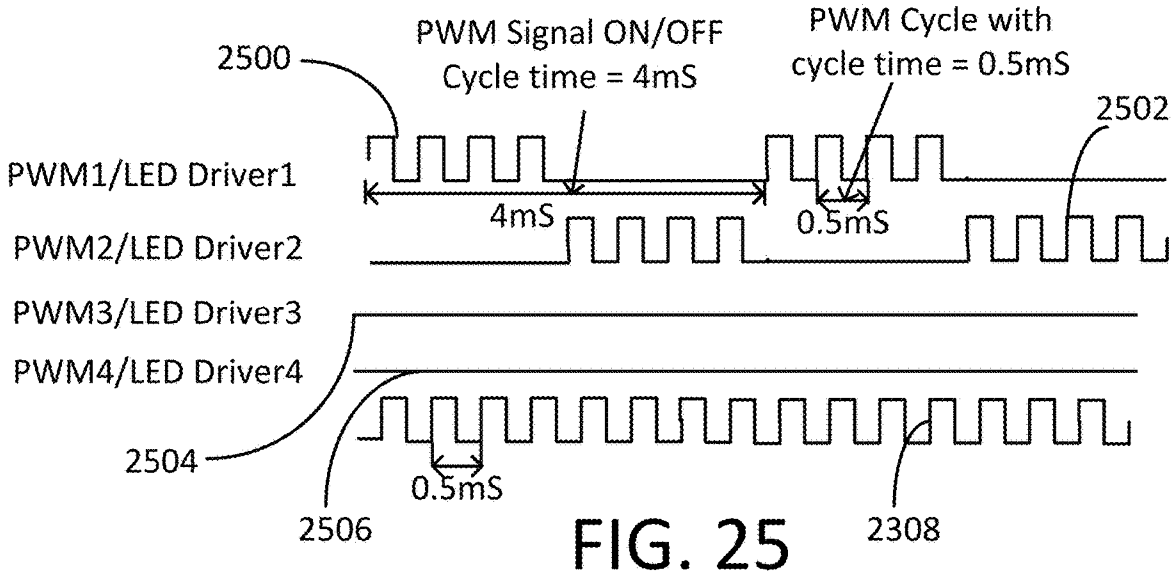
FIG. 25
Power Supply
2300
2306
2404 2414
2412
2406
2408
2416
2410
R
G
B
W
Controller/
Processor
2402
2426
PWM1
2418
2420
2422
2424
2428
PWM2
LED Driver1
2430
PWM3
LED Driver2
LED Driver3
PWM4
LED Driver4
106
2432
2306

FIG. 26
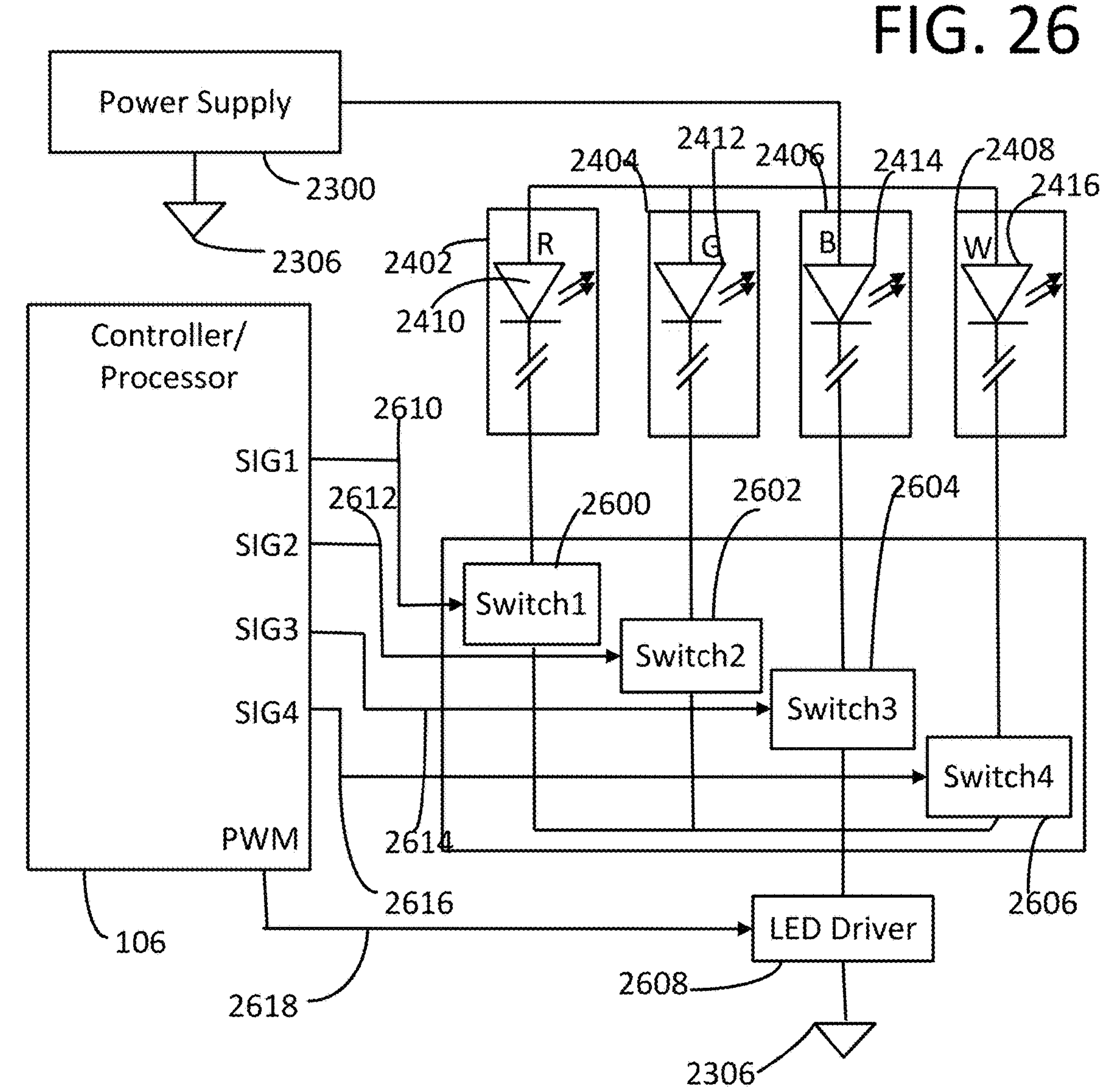
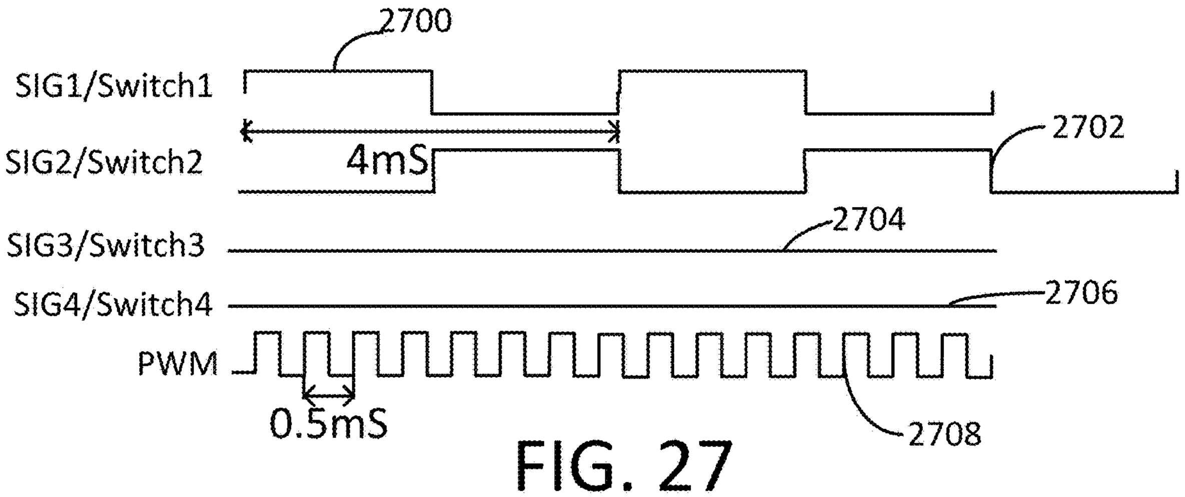
FIG. 27

Power Supply
2300
2306
Controller/
Processor
SIG1
SIG2
PWM
106
2800
Controlling
Signals
2802
Multiplexer Circuit
2804
LED Driver
2608
2618
2306
2402
2410
2404
2412
2406
2414
2408
2416
R
G
B
W 2300
Power Supply
2306
Controller/
Processor
DATA1
DATA2
DATA3
DATA4
106
CL Ckt: Current
Limiting Circuit
2908
2910
2912
2914
2900
2902
2904
2906
CL Ckt1
CL Ckt2
CL Ckt3
CL Ckt4
2402
2410
2412
2404
2414
2406
2416
2408
R
G
B
W
2306

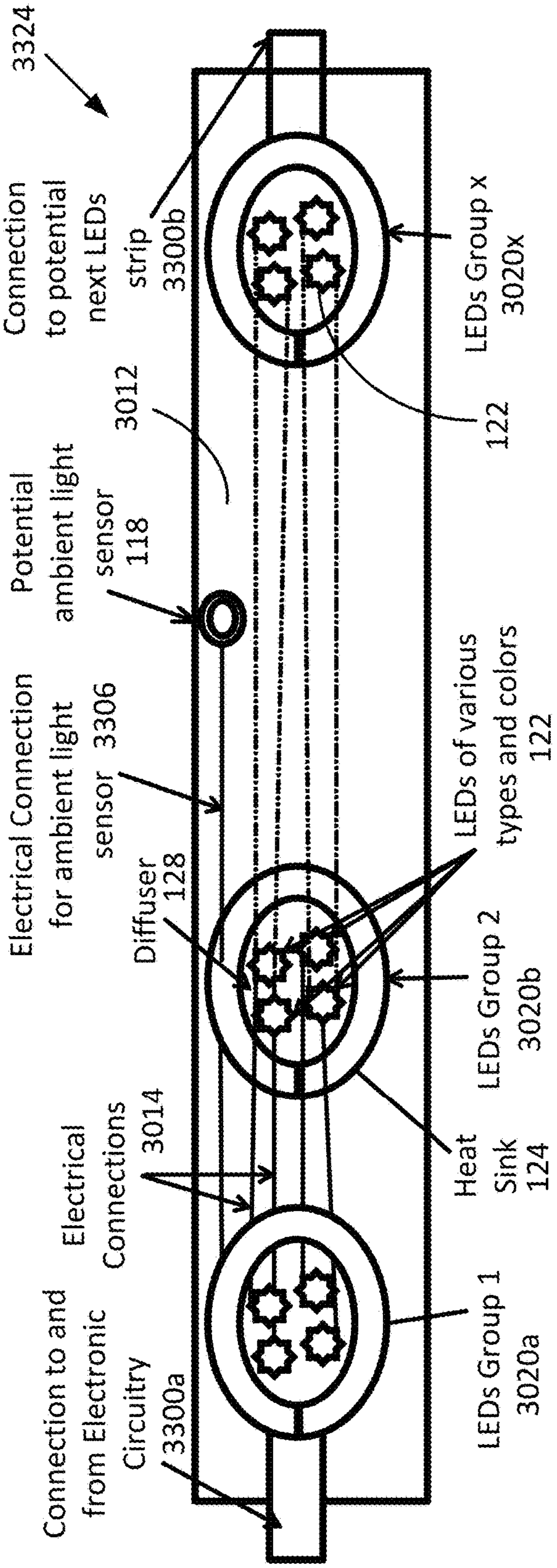
FIG. 33A-1 (front view)
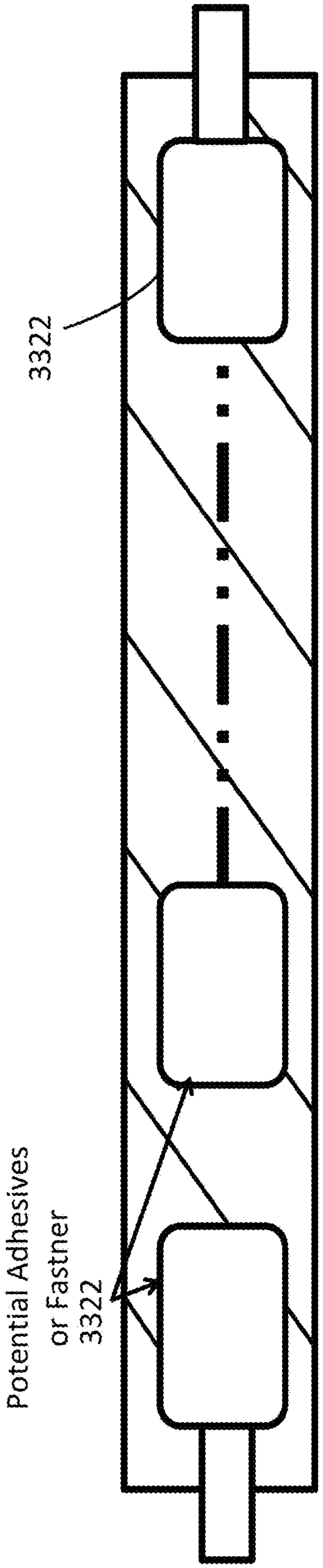
FIG. 33A-2 (back view)

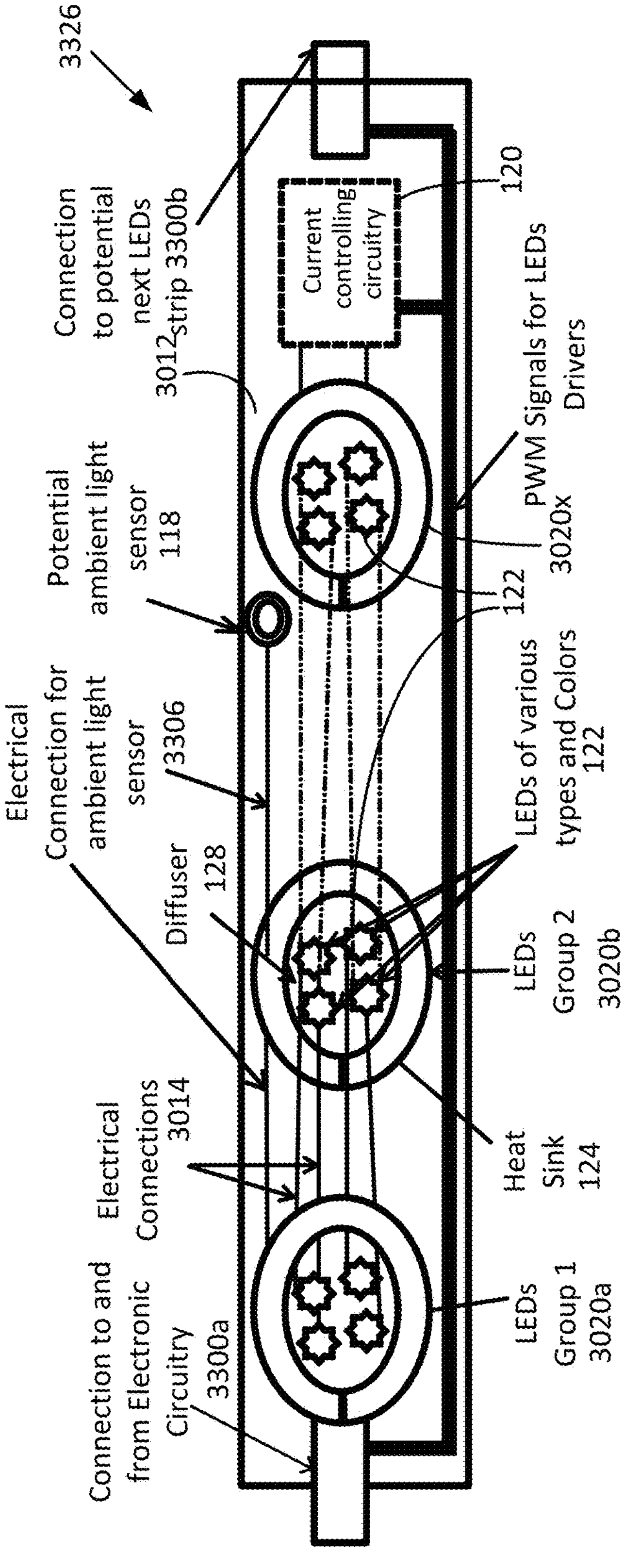
FIG. 33B-1 (front view)
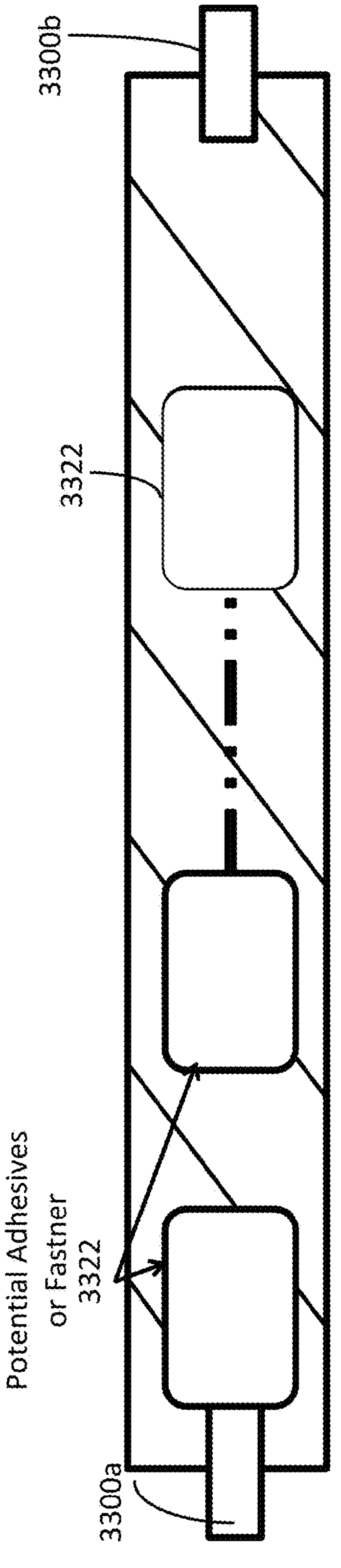
FIG. 33B-2 (back view)

FIG. 34
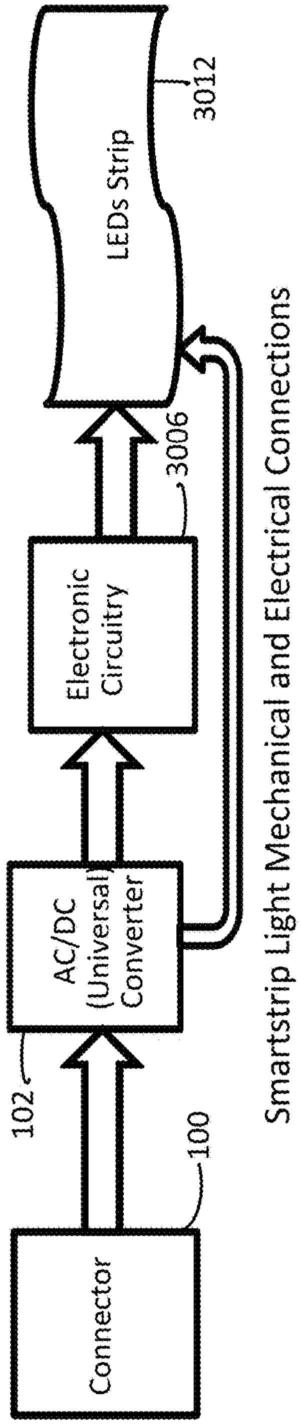
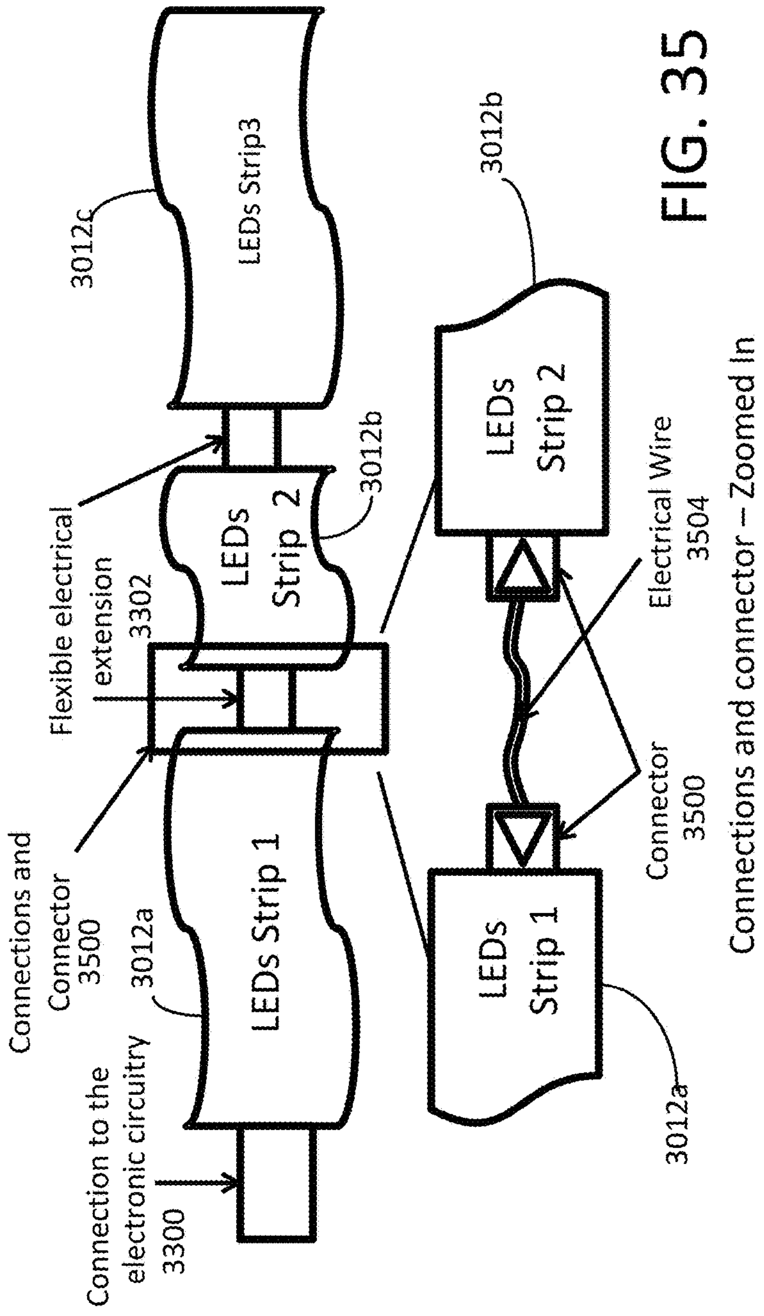
FIG. 35

FIG. 36
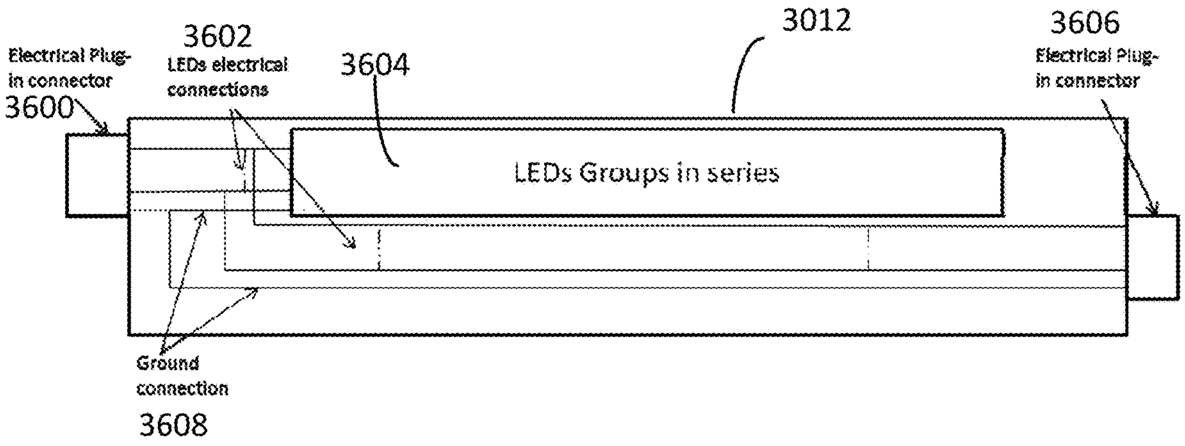
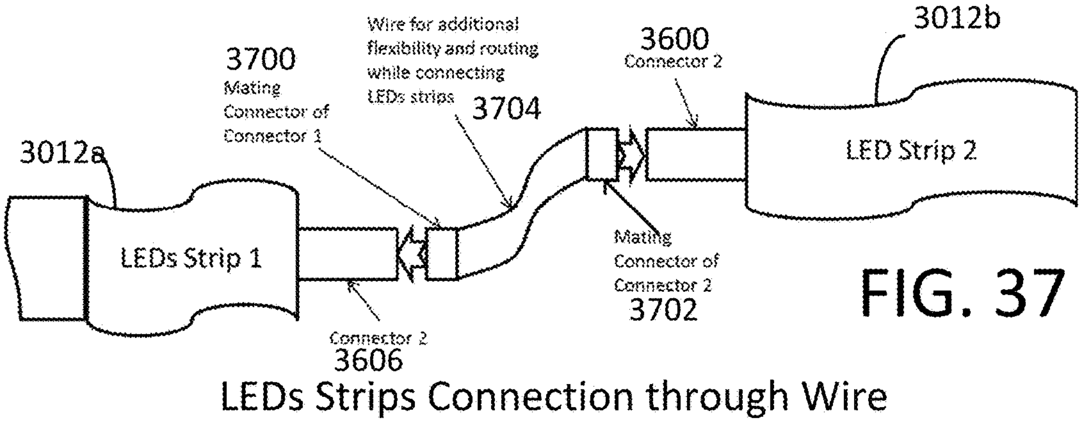
FIG. 37
LEDs Strips Connection through Wire
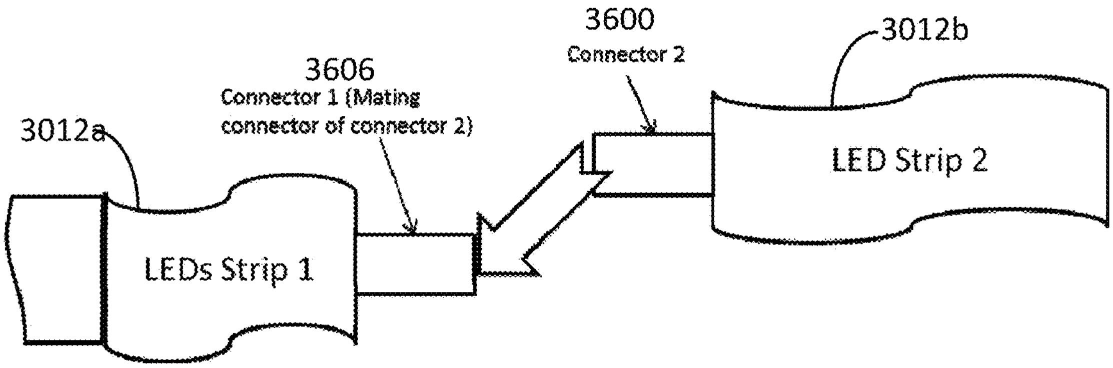
LEDs Strips Direct Connection
FIG. 38

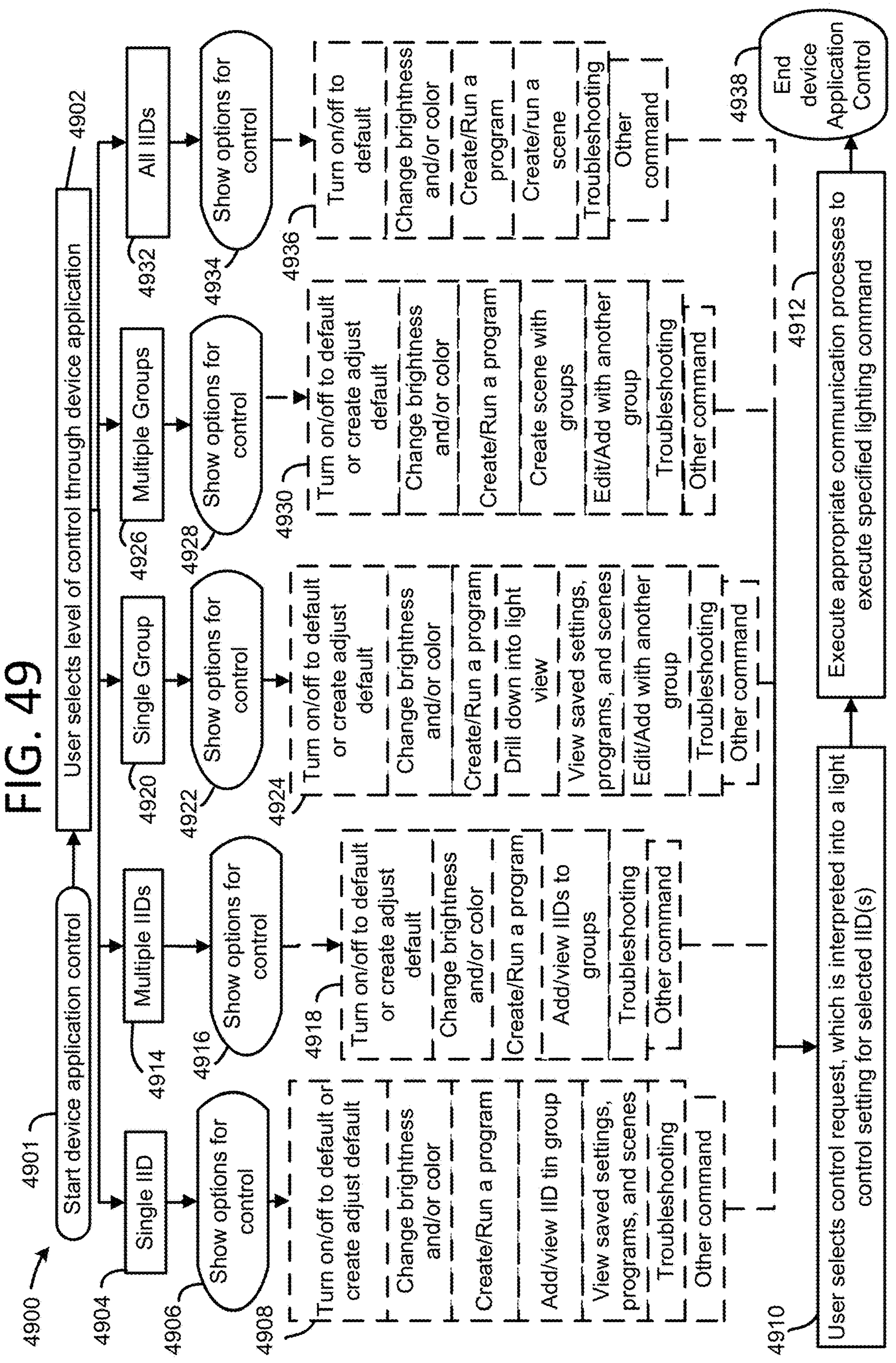

FIG. 49
4900
4901
Start device application control
User selects level of control through device application
4902
4904
Single IID
4914
Multiple IIDs
4920
Single Group
4926
Multiple Groups
4932
All IIDs
4906
Show options for control
4916
Show options for control
4922
Show options for control
4928
Show options for control
4934
Show options for control
4908
Turn on/off to default or create adjust default
Change brightness and/or color
Create/Run a program
Add/view IID tin group
View saved settings, programs, and scenes
Troubleshooting
Other command
4918
Turn on/off to default or create adjust default
Change brightness and/or color
Create/Run a program
Add/view IIDs to groups
Troubleshooting
Other command
4924
Turn on/off to default or create adjust default
Change brightness and/or color
Create/Run a program
Drill down into light view
View saved settings, programs, and scenes
Edit/Add with another group
Troubleshooting
Other command
4930
Turn on/off to default or create adjust default
Change brightness and/or color
Create/Run a program
Create scene with groups
Edit/Add with another group
Troubleshooting
Other command
4936
Turn on/off to default
Change brightness and/or color
Create/Run a program
Create/run a scene
Troubleshooting
Other command
4938
End device Application Control
4910
User selects control request, which is interpreted into a light control setting for selected IID(s)
4912
Execute appropriate communication processes to execute specified lighting command

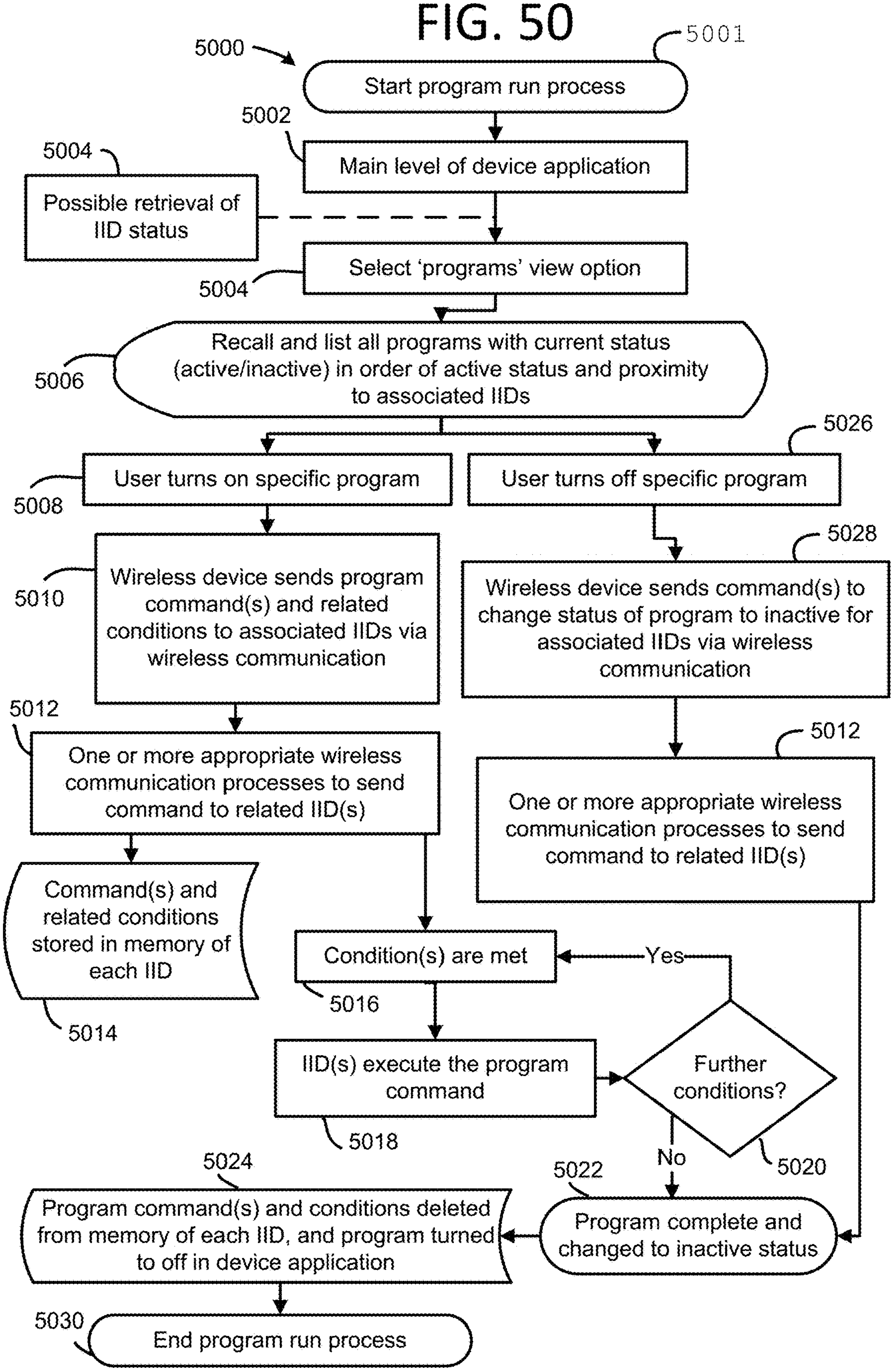

FIG. 50
5000
5001
Start program run process
5002
Main level of device application
5004
Possible retrieval of IID status
Select 'programs' view option
5004
Recall and list all programs with current status (active/inactive) in order of active status and proximity to associated IIDs
5006
5026
User turns on specific program
User turns off specific program
5008
5028
Wireless device sends program command(s) and related conditions to associated IIDs via wireless communication
5010
Wireless device sends command(s) to change status of program to inactive for associated IIDs via wireless communication
5012
One or more appropriate wireless communication processes to send command to related IID(s)
5012
One or more appropriate wireless communication processes to send command to related IID(s)
Command(s) and related conditions stored in memory of each IID
Condition(s) are met
Yes
5016
5014
IID(s) execute the program command
Further conditions?
5018
No
5024
5022
5020
Program command(s) and conditions deleted from memory of each IID, and program turned to off in device application
Program complete and changed to inactive status
5030
End program run process F: Favorites, G: Groups, S: Screens, P: Programs, M: More 5960
5950
5966
5962
5966
Various colors
Color
Various colors
Slide to select different colors
5964
5968
Dim
5972
Brightness
5972
Bright
Slide to select brightness
5970
5974
More white
5978
Saturation
5978
Less white
Slide to select saturation
5976
Group X
Group Y
Illuminating Device X
Illuminating Device n
5952
5900
5988
5982
IIDs
5984
IID1
ON
IID2
ON
IID3
OFF
5986
IIDX
ON
F
G
S
P
M
F: Favorites,
G: Groups,
S: Screens,
P: Programs,
M: More

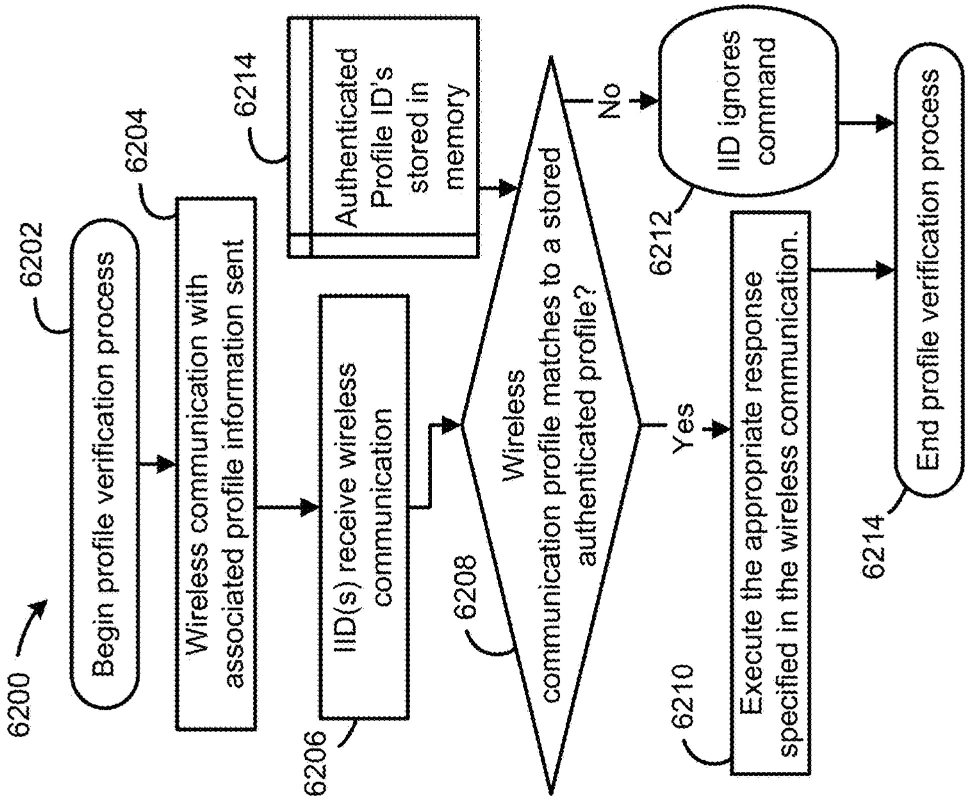

FIG. 62
6200
6202
Begin profile verification process
6204
Wireless communication with associated profile information sent
6214
6206
IID(s) receive wireless communication
Authenticated Profile ID's stored in memory
6208
Wireless communication profile matches to a stored authenticated profile?
No
6210
Yes
6212
IID ignores command
Execute the appropriate response specified in the wireless communication.
6214
End profile verification process

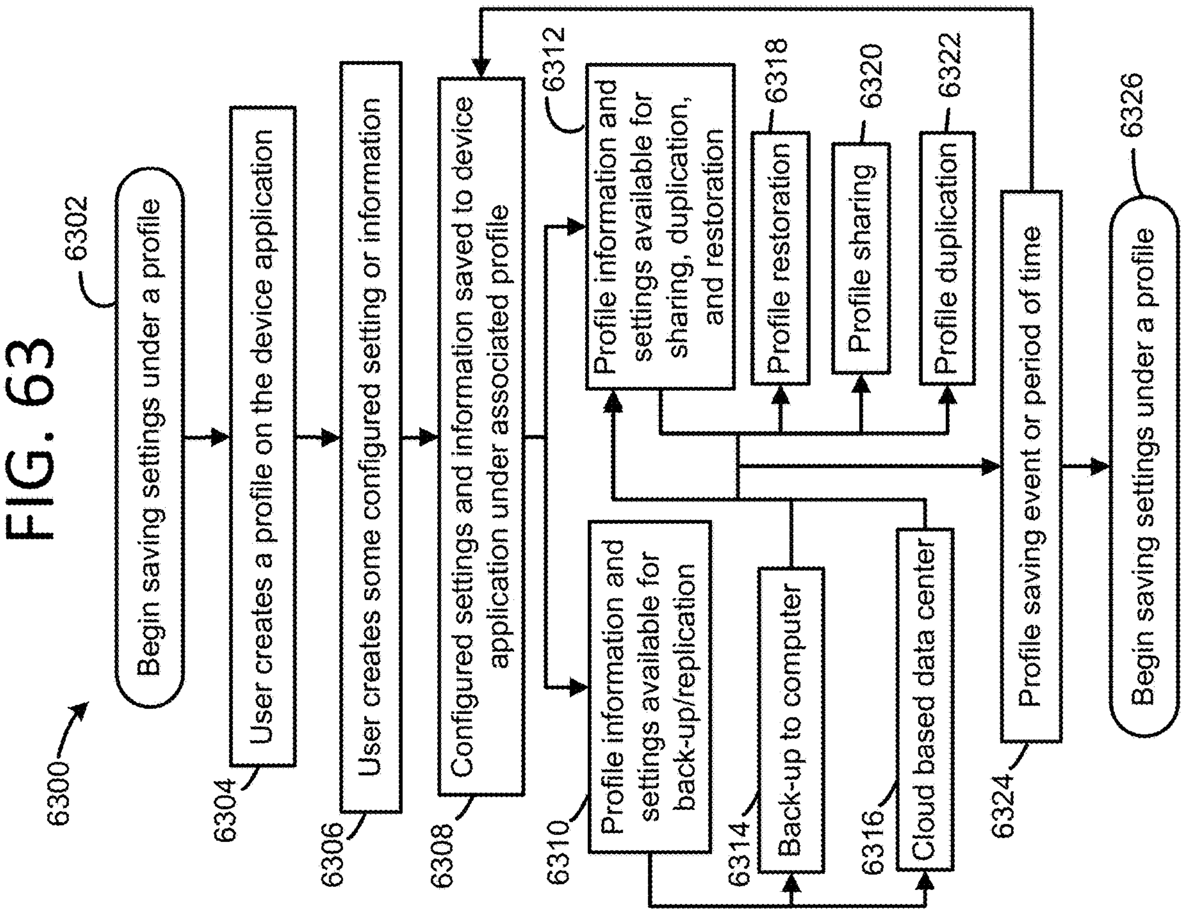

FIG. 63
6300
6302
Begin saving settings under a profile
6304
User creates a profile on the device application
6306
User creates some configured setting or information
6308
Configured settings and information saved to device application under associated profile
6310
6312
Profile information and settings available for back-up/replication
Profile information and settings available for sharing, duplication, and restoration
6314
Back-up to computer
Profile restoration
6318
Profile sharing
6320
6316
Cloud based data center
Profile duplication
6322
6324
Profile saving event or period of time
Begin saving settings under a profile
6326

6400

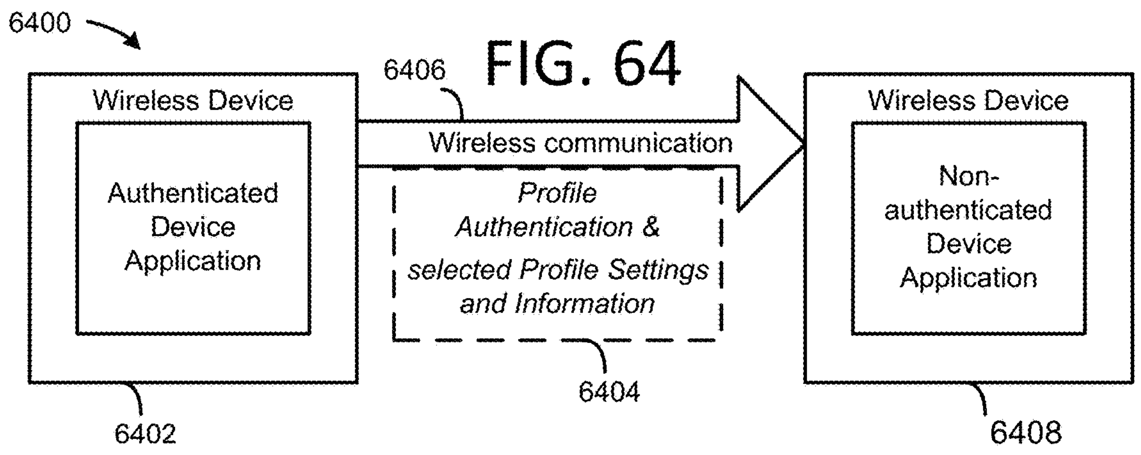

FIG. 64
6406
Wireless Device
Authenticated Device Application
Wireless communication
Profile Authentication & selected Profile Settings and Information
Wireless Device
Non-authenticated Device Application
6402
6404
6408
ILD – IID
6504
6500
Wireless Lighting System (IID Network)
6508
Store profile 2 in list of authenticated profiles in ILD 1's memory
Store profile 2 in list of authenticated profiles in ILD 2's memory
Store profile 2 in list of authenticated profiles in ILD 3's memory
6506
ILD 1
ILD 2
ILD 3
Wireless communication
Send command to add profile 2 to list of authenticated profiles
6503
6512
Once authenticated, Profile 2 can command/communicate with smartlight network
Wireless Device
Authenticated profile on Device Application
6502
6510
Non-authenticated profile 2 on device Application

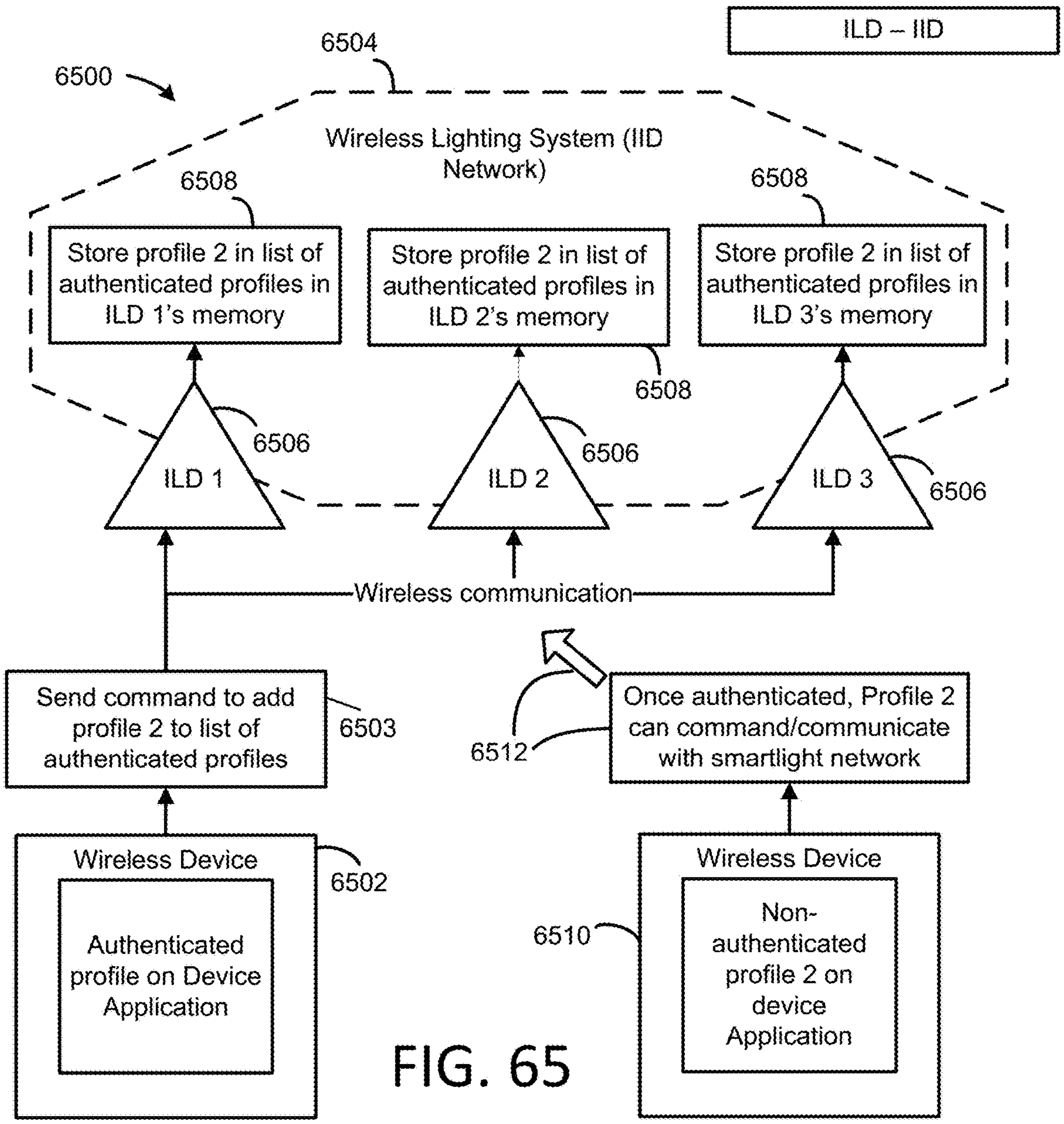

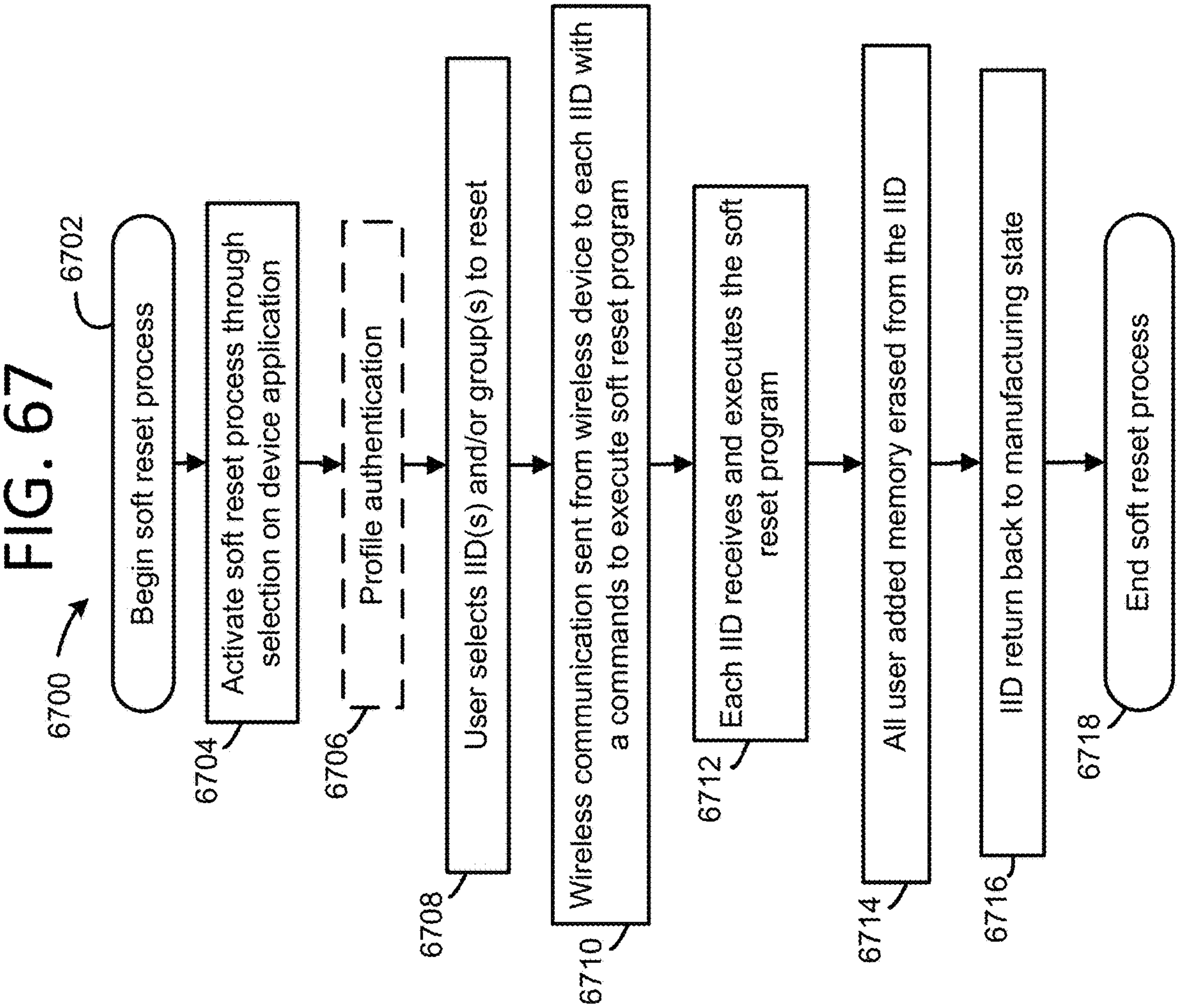

FIG. 66

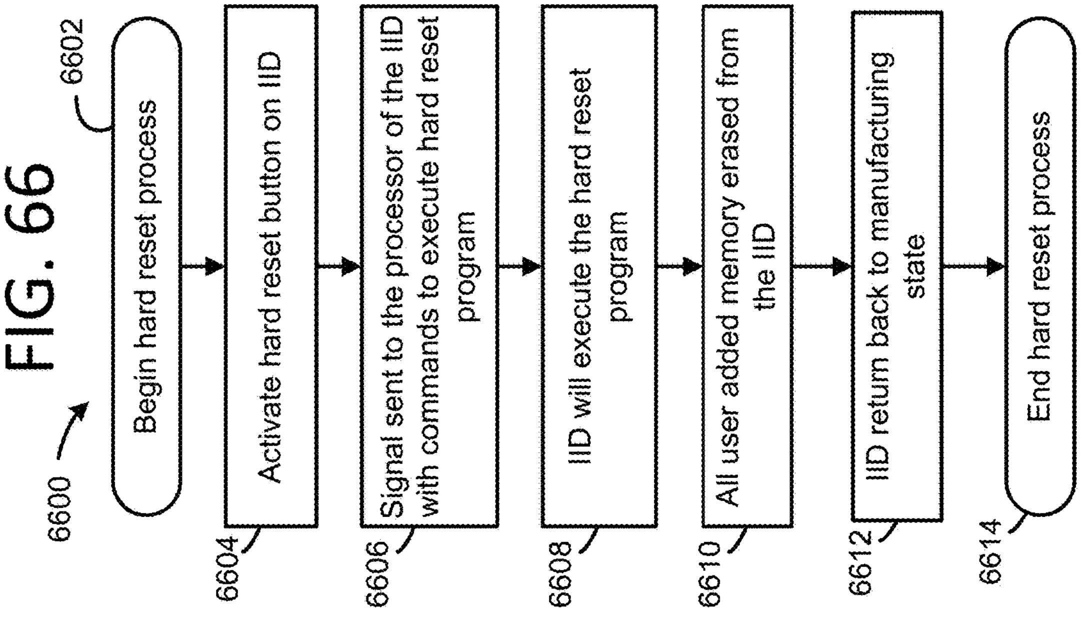

6600
6602
Begin hard reset process
6604
Activate hard reset button on IID
6606
Signal sent to the processor of the IID with commands to execute hard reset program
6608
IID will execute the hard reset program
6610
All user added memory erased from the IID
6612
IID return back to manufacturing state
6614
End hard reset process
6700
6702
Begin soft reset process
6704
Activate soft reset process through selection on device application
6706
Profile authentication
6708
User selects IID(s) and/or group(s) to reset
6710
Wireless communication sent from wireless device to each IID with a commands to execute soft reset program
6712
Each IID receives and executes the soft reset program
6714
All user added memory erased from the IID
6716
IID return back to manufacturing state
6718
End soft reset process

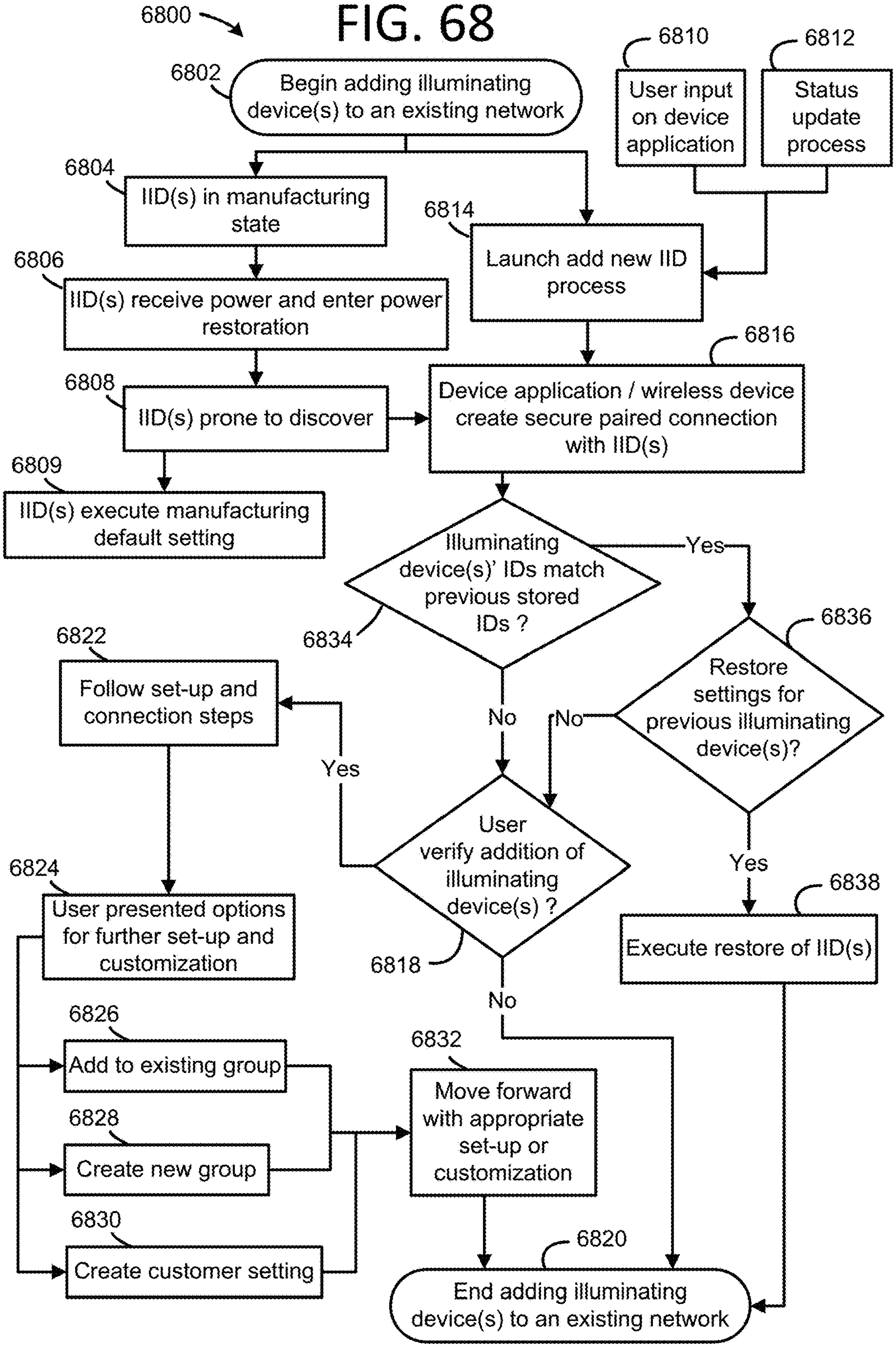

FIG. 68
6800
6802
Begin adding illuminating device(s) to an existing network
6804
IID(s) in manufacturing state
6806
IID(s) receive power and enter power restoration
6808
IID(s) prone to discover
6809
IID(s) execute manufacturing default setting
6810
User input on device application
6812
Status update process
6814
Launch add new IID process
6816
Device application / wireless device create secure paired connection with IID(s)
6834
Illuminating device(s)' IDs match previous stored IDs ?
Yes
No
6836
Restore settings for previous illuminating device(s)?
No
Yes
6838
Execute restore of IID(s)
6818
User verify addition of illuminating device(s) ?
Yes
No
6822
Follow set-up and connection steps
6824
User presented options for further set-up and customization
6826
Add to existing group
6828
Create new group
6830
Create customer setting
6832
Move forward with appropriate set-up or customization
6820
End adding illuminating device(s) to an existing network

7000

= IID
7002
Device Application
7004
Red
7006
Green
7008
Purple
7010
Yellow
7012
Blue
7014
Pink
7016
White
7018
Orange
7020
N colors 7100
7102
Device Application
Group
Signal Strength
7104
7108
Group 4
Very High
7110
Group 2
High
7112
Group 3
Med
7106
7114
Group 1
Low
7116
Group n
X 7200
7202
Device Application
7204
Group
Status
7208
Group 4
On
7210
Group 2
On
7212
Group 3
Off
7206
7214
Group 1
Off
7216
Group n
X 7300
7302
Device Application
7304
Group
Status
7308
Group 4
Available
7310
Group 2
Available
7312
Group 3
Not Available
7306
7314
Group 1
Not Available
7316
Group n
X R: Red, G: Green, B: Blue, W: White
Power Supply
2300
Power Supply Negative
2306
2404 2414
2412
2406
2408
2416
2410
R
G
B
W
2402
Micro-Controller/ Processor
7926
Pin1/Sig1
7928
Pin2/Sig2
7930
Pin3/Sig3
Pin4/Sig4
2418
2420
2422
2424
LED Driver1
LED Driver2
LED Driver3
LED Driver4
106
7932
Power Supply Negative
2306

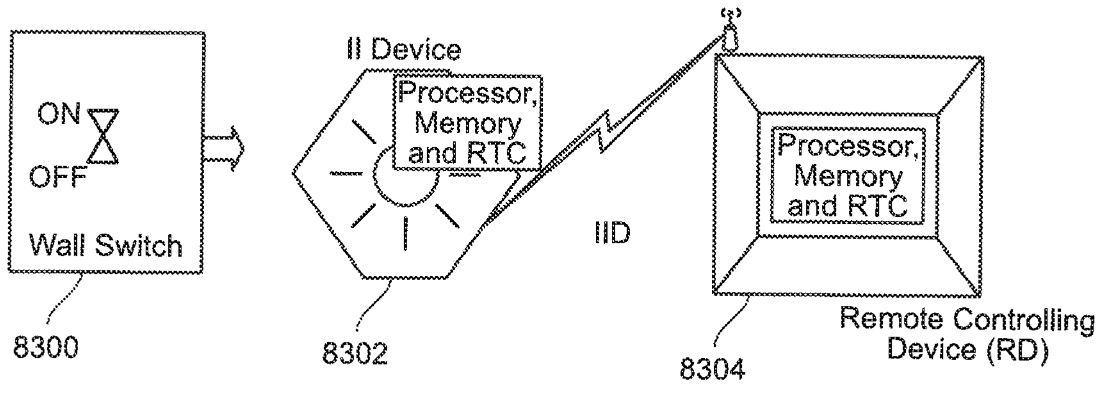
FIG. 83
FIG. 84
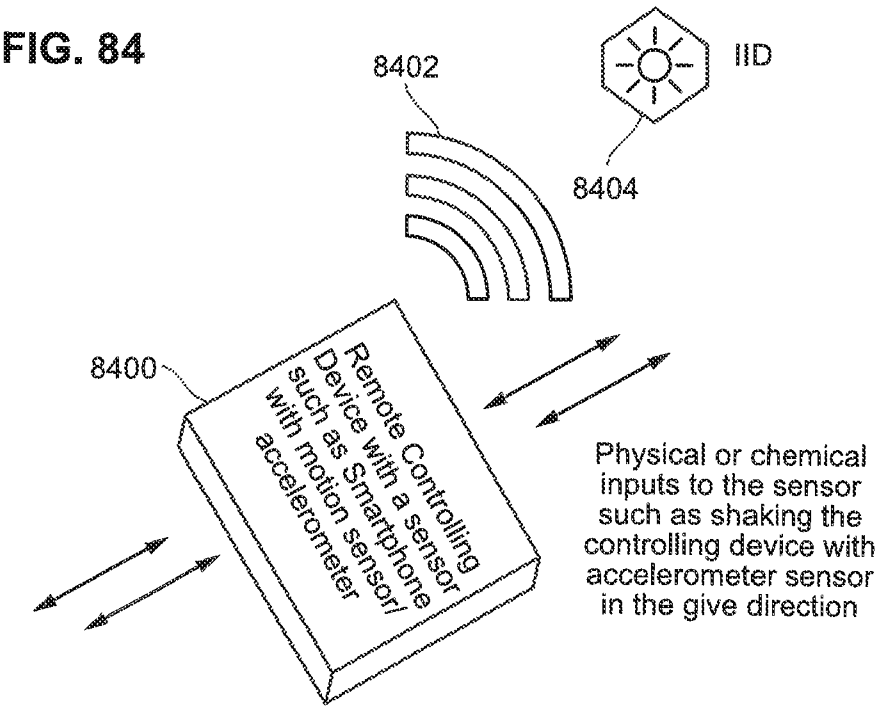

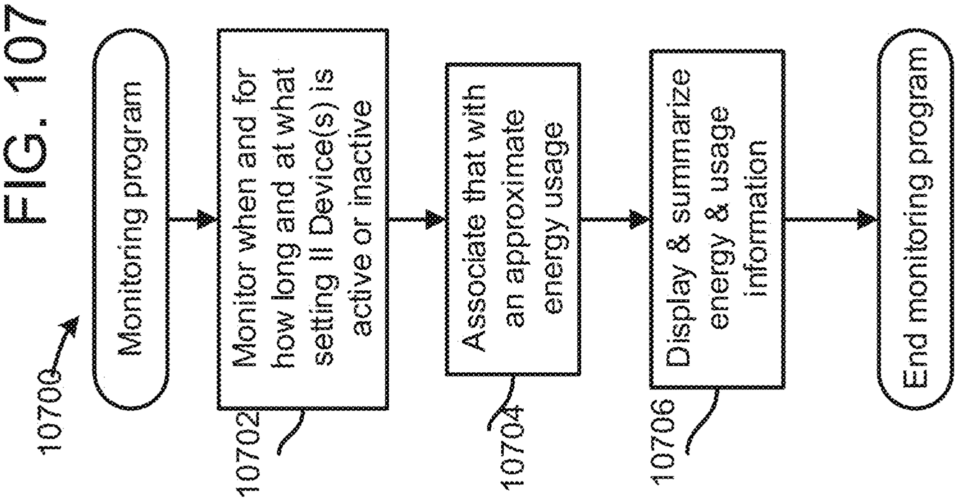

FIG. 107
10700
Monitoring program
10702
Monitor when and for how long and at what setting II Device(s) is active or inactive
10704
Associate that with an approximate energy usage
10706
Display & summarize energy & usage information
End monitoring program

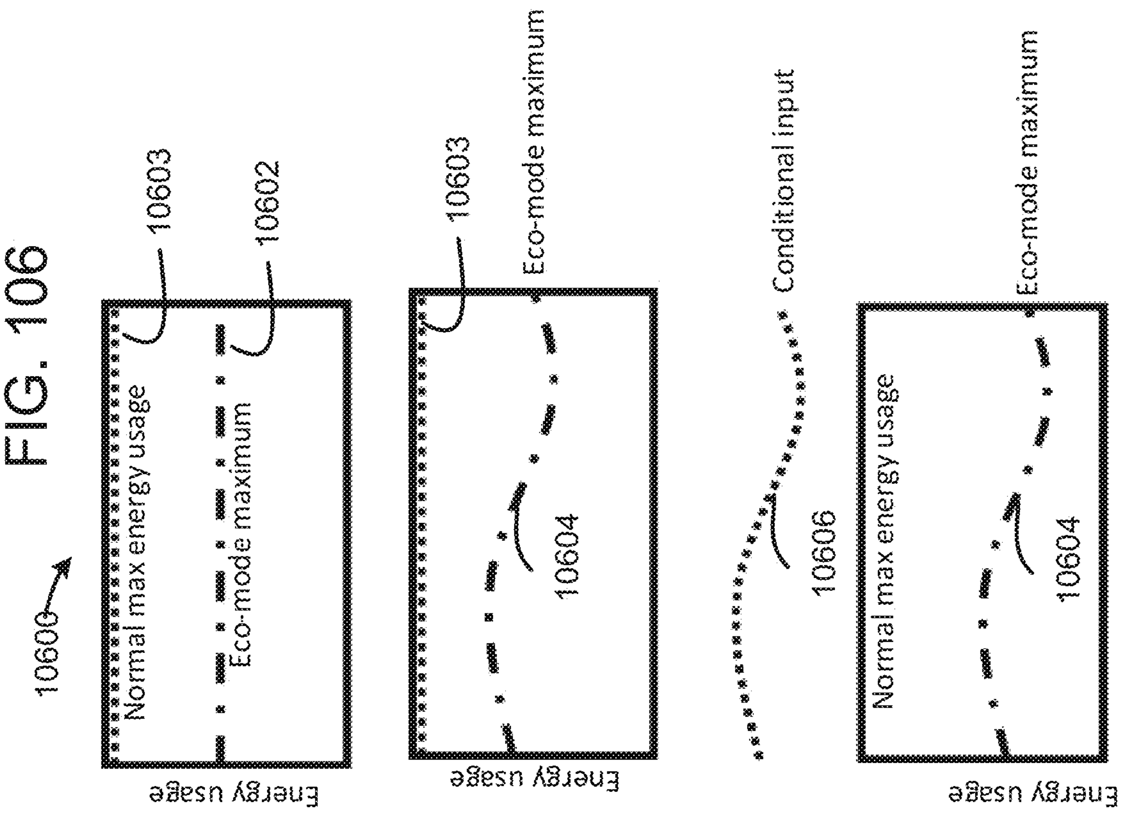

FIG. 106
10600
Normal max energy usage
Eco-mode maximum
10603
10602
Energy usage
10603
Eco-mode maximum
10604
Energy usage
Conditional input
10606
Eco-mode maximum
Normal max energy usage
10604
Energy usage

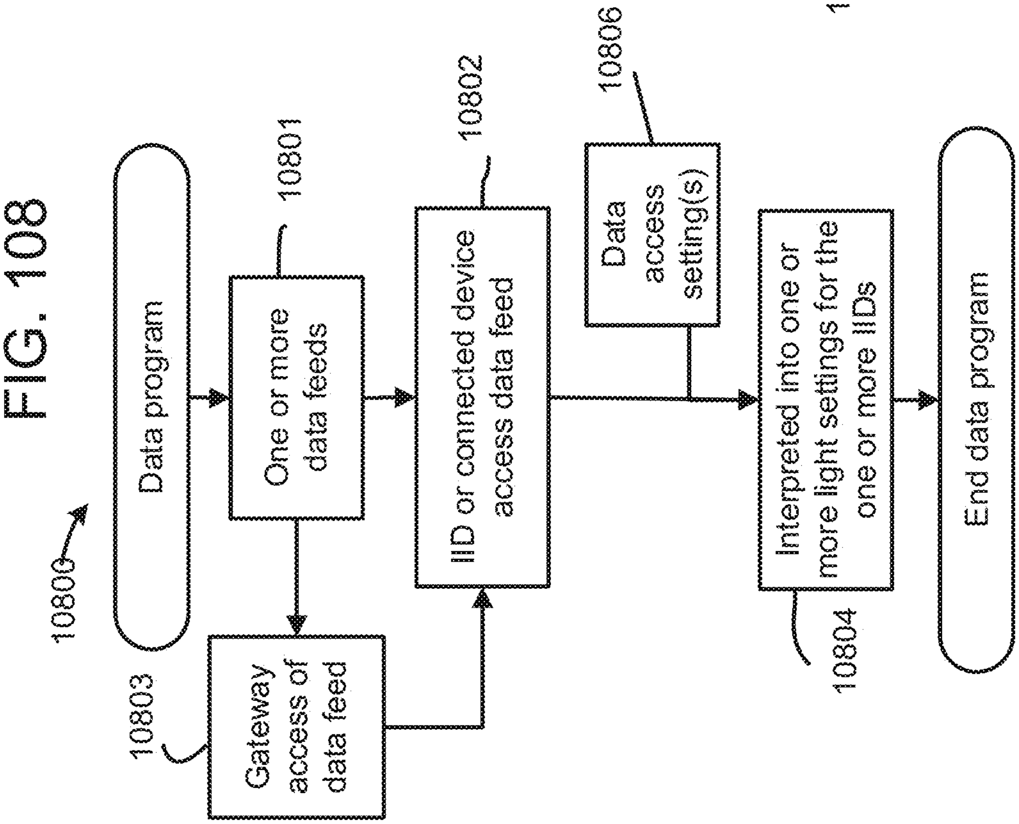

FIG. 108
10800
Data program
One or more data feeds
10801
Gateway access of data feed
10803
IID or connected device access data feed
10802
Data access setting(s)
10806
Interpreted into one or more light settings for the one or more IIDs
10804
End data program

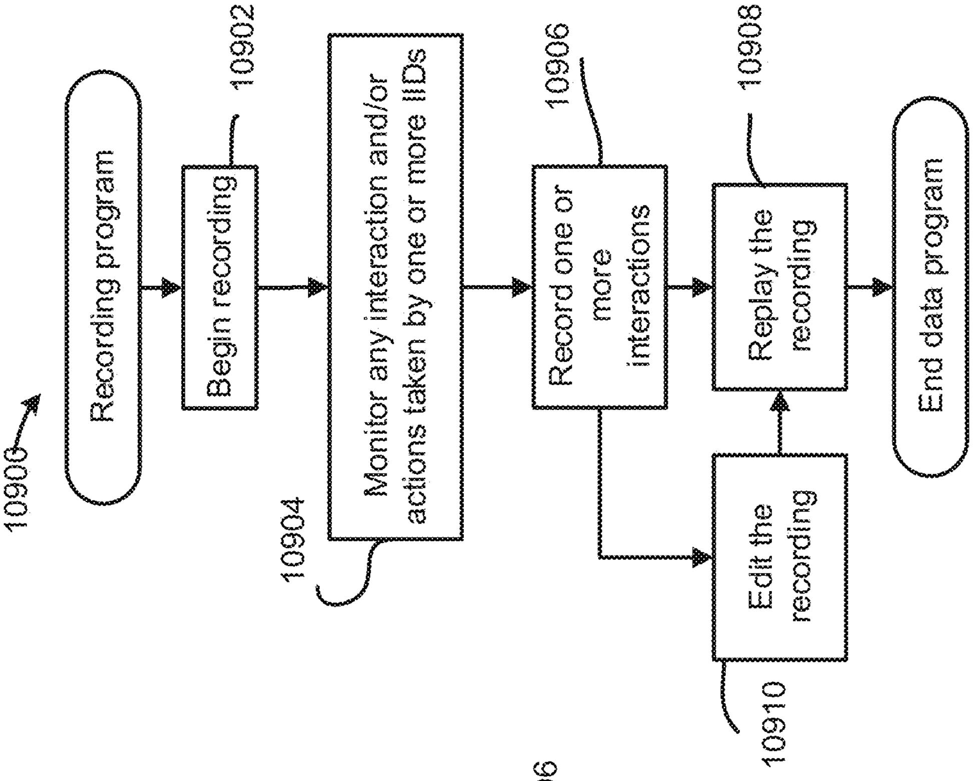

FIG. 109
10900
Recording program
Begin recording
10902
Monitor any interaction and/or actions taken by one or more IIDs
10904
Record one or more interactions
10906
Edit the recording
10910
Replay the recording
10908
End data program 11000
Image reflection program
11001
Video or photo
Content and information relating to color elements or pixels obtained
11002
Break image into one or more areas
11004
Interpret areas to one or more colors
11006
Map areas and associated colors to one or more II Devices
11008
11012
Sequence of images monitored over time
Related II Devices emit related colors
11010
End image reflection program

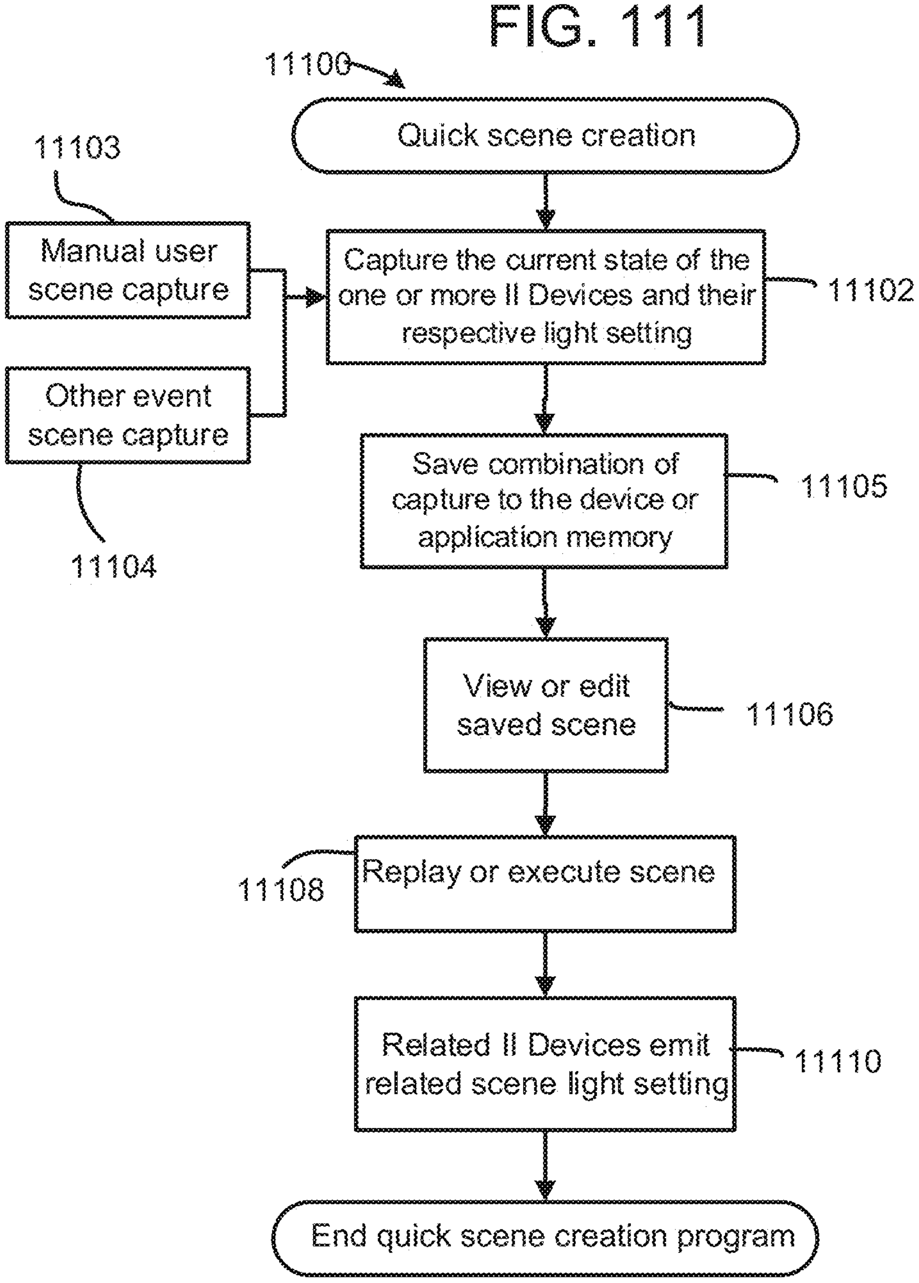

FIG. 111
11100
Quick scene creation
11103
Manual user scene capture
Other event scene capture
11104
Capture the current state of the one or more II Devices and their respective light setting
11102
Save combination of capture to the device or application memory
11105
View or edit saved scene
11106
11108
Replay or execute scene
Related II Devices emit related scene light setting
11110
End quick scene creation program

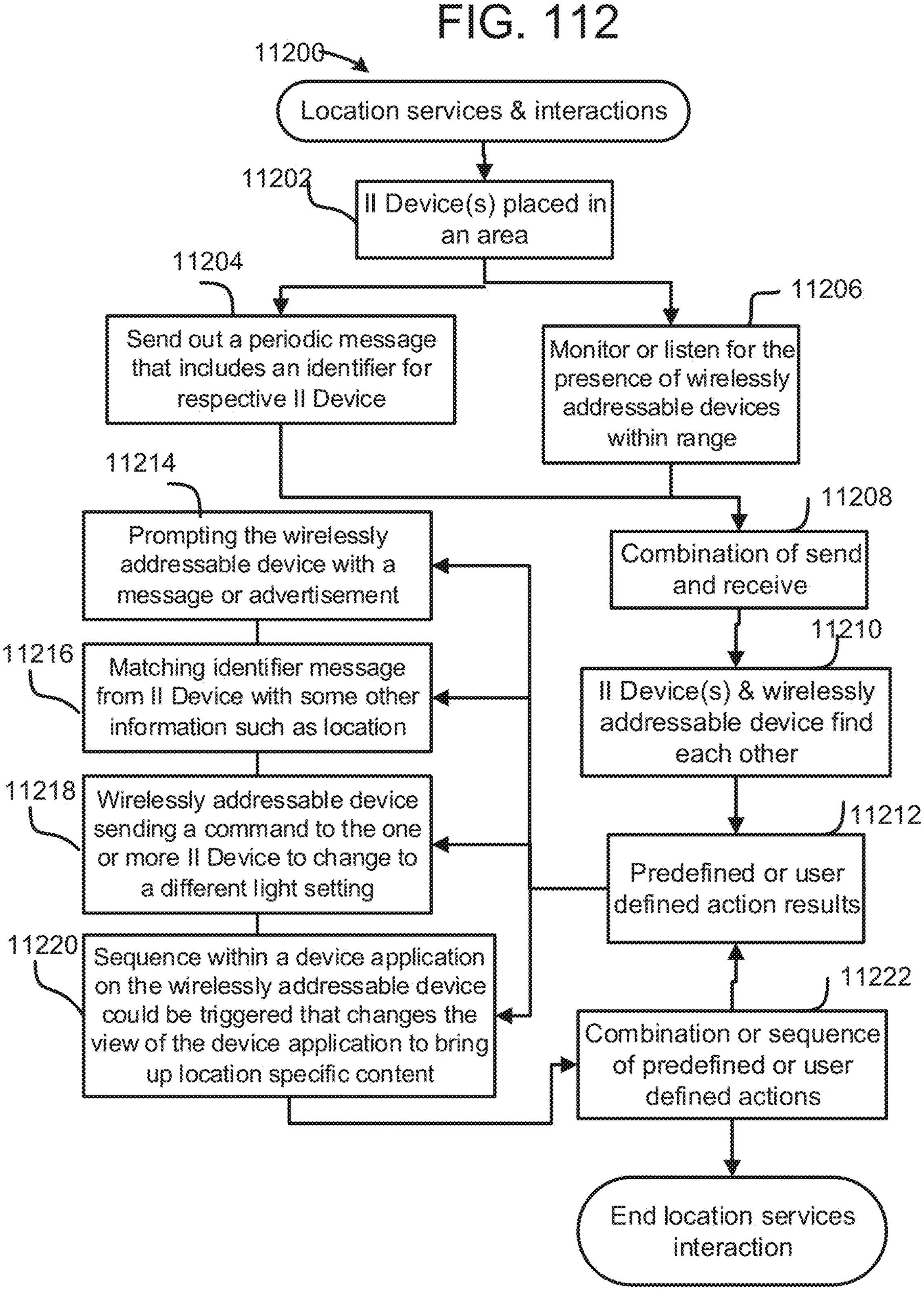

FIG. 112
11200
Location services & interactions
11202
II Device(s) placed in an area
11204
Send out a periodic message that includes an identifier for respective II Device
11206
Monitor or listen for the presence of wirelessly addressable devices within range
11208
Combination of send and receive
11210
II Device(s) & wirelessly addressable device find each other
11212
Predefined or user defined action results
11214
Prompting the wirelessly addressable device with a message or advertisement
11216
Matching identifier message from II Device with some other information such as location
11218
Wirelessly addressable device sending a command to the one or more II Device to change to a different light setting
11220
Sequence within a device application on the wirelessly addressable device could be triggered that changes the view of the device application to bring up location specific content
11222
Combination or sequence of predefined or user defined actions
End location services interaction

ELECTRONIC CONTROL DEVICE

CROSS-REFERENCE TO RELATED APPLICATIONS

This application is a continuation of U.S. Provisional patent application Ser. No. 16/853,599, filed on Apr. 20, 2020, and entitled "Electronic Control Device", which is a continuation of U.S. Provisional patent application Ser. No. 15/204,901, filed on Jul. 7, 2016, and entitled "Wireless Lighting Control Methods", now U.S. Pat. No. 10,630,820, which claims priority to U.S. Provisional Patent Application Ser. No. 62/189,637, filed on Jul. 7, 2015, and entitled "Wireless Lighting Control Methods". The foregoing applications are hereby incorporated by reference in their entirety.

This application is related to U.S. patent application Ser. No. 14/175,322, filed on Feb. 7, 2014, and entitled "Wireless Lighting Control Methods", which is a continuation patent application of U.S. patent application Ser. No. 14/077,200, filed on Nov. 11, 2013, and entitled "Wireless Lighting Control System", which is: (1) a non-provisional patent application of U.S. Provisional Patent Application Ser. No. 61/724,651, filed on Nov. 9, 2012, and entitled "Wireless Lighting Control System"; and (2) a continuation-in-part application of U.S. patent application Ser. No. 13/836,280, filed on Mar. 15, 2013, now U.S. Pat. No. 8,922,126 B2, and entitled "Wireless Lighting Control System", which (a) is a continuation application of U.S. patent application Ser. No. 13/417,322, filed Mar. 11, 2012, now U.S. Pat. No. 8,890,435 B2, and entitled "Wireless Lighting Control System", which is a non-provisional patent application of U.S. Provisional Application Ser. No. 61/464,917, filed Mar. 11, 2011, and entitled "Specialty Lighting and Control Therefor", and (b) claimed priority to PCT Patent Application Serial Number PCT/US2012/037369, filed May 10, 2012, and entitled "Wireless Lighting Control System." The foregoing applications are hereby incorporated by reference in their entirety.

This application is also related to: (1) U.S. patent application Ser. No. 13/837,232, filed on Mar. 15, 2013, now U.S. Pat. No. 8,742,694 B2, and entitled "Wireless Lighting Control System"; (2) U.S. patent application Ser. No. 13/838,648, filed on Mar. 15, 2013, now U.S. Pat. No. 8,896,232 B2, and entitled "Wireless Lighting Control System"; and (3) U.S. patent application Ser. No. 13/839,738, filed on Mar. 15, 2013, now U.S. Pat. No. 8,896,218 B2, and entitled "Wireless Lighting Control System". The foregoing applications are hereby incorporated by reference in their entirety.

BACKGROUND OF THE INVENTION

Field of the Invention

The present invention relates generally to the field of electronic devices and, more particularly, to control devices and processes.

The Internet of Things, wireless automation of residential, commercial and industrial places is on the rise. So is the use and complexity of multiple wireless protocols. The optimized use of each communication protocol ensuring reliability and speed is necessary for better user experience.

Additionally, communications protocols such as Bluetooth, ZigBee, WiFi, RF, etc. are going through advancements to accommodate larger numbers of devices in a network, higher data packets communications, reliability and throughput. Interoperability is also necessary when different protocol devices are part of a network, which makes network installation more complex. Otherwise, the devices must be confined to using the protocols supported by the existing gateways or hubs. The use of multiple protocols as well as multiple devices in a network also adds to signal interference, which needs to be minimized for reliable and faster communication. There is also a need to control and communicate with the devices directly though smartphone, tablets or computers, which mostly have limited wireless protocols such as Bluetooth and Wi-Fi installed. Each of these has different limitations, advantages and disadvantages. In addition, as the number of devices increase, the failure rate can also increase because of a device going into a non-response mode or other failure mode that requires resetting of the device, thus, a simple low cost method is required to accommodate that.

SUMMARY OF THE INVENTION

In one embodiment of the present invention, various processes optimize the wireless communication, especially when multiple devices are present in a system or a network. The processes include controlling the signal strength at various stages of network implementation and communication. For example, two or more wireless devices are controlled by providing the two or more wireless devices, a first controlling device communicably coupled to the two or more wireless devices via one or more first wireless network connections, and a second controlling device that is not communicably coupled to the two or more wireless devices via the wireless network. Each wireless device includes a controller/processor, a wireless transceiver circuit communicably coupled to the controller/processor and an antenna communicably coupled to the wireless transceiver circuit. A control access request is sent from the second controlling device to the first controlling device requesting control of at least one of the two or more wireless devices. The one or more first wireless connections between the first controlling device and the at least one of the two or more wireless devices are dropped whenever the control access request satisfies one or more parameters. One or more second wireless network connections between the second controlling device and the at least one of the two or more wireless devices are established, and thereafter the at least one of the two or more wireless devices are controlled using the second controlling device.

In addition, signal interference can be reduced between at least a first wireless device and a second wireless device by providing the first and second wireless devices, wherein each wireless device comprises a controller/processor, a wireless transceiver circuit communicably coupled to the controller/processor and an antenna communicably coupled to the wireless transceiver circuit. A signal strength between the first wireless device and the second wireless device is determined as measured by either or both of the wireless devices. A signal power of either or both of the wireless devices is reduced whenever the signal strength exceeds a threshold value.

Moreover, two or more wireless devices can be controlled by providing the two or more wireless devices, and a controlling device communicably coupled to the at least one of the two or more wireless devices via one or more wireless network connections. Each wireless device includes a controller/processor, a wireless transceiver circuit communicably coupled to the controller/processor and an antenna communicably coupled to the wireless transceiver circuit. A broadcast signal is periodically sent from each wireless device. A stop broadcast signal is sent from the controlling device to all of the two or more wireless devices except for one or more specified wireless devices. One or more communications between the controlling device and the specified wireless device are exchanged. A resume broadcast signal is sent from the controlling device to all of the two or more wireless devices after the one or more communications between the controlling device and the specified wireless device are completed.

In another embodiment of the present invention, various controlling devices are accommodated in a network of devices at different points in time. The speed at which the new controlling device comes into a range of the networked devices is improved with existing signatures of different wireless protocols or devices present in the network. For example, two or more wireless devices are controlled by providing the two or more wireless devices that communicate using a first protocol, and a controlling device that communicates using the first protocol and a second protocol. The controlling device has a stored second protocol device signature associated with a location proximate to the two or more wireless devices. Each wireless device includes a controller/processor, a wireless transceiver circuit communicably coupled to the controller/processor and an antenna communicably coupled to the wireless transceiver circuit. Any wireless routing devices or access devices that communicate using the second protocol and have a device signature that matches the stored second protocol device signature are detected. One or more network connections between the controlling device and the two or more wireless devices are established using the first protocol whenever the device signature of the detected wireless routing device or access device matches the stored second protocol device signature, and thereafter the two or more wireless devices are controlled using the controlling device.

In another embodiment of the present invention, a change in the signal strength of a wireless device can be used to detect an object or person, such as an intruder. For example, a movement or position of an object is detected between at least a first wireless device and a second wireless device by providing the first and second wireless devices, wherein each wireless device comprises a controller/processor, a wireless transceiver circuit communicably coupled to the controller/processor and an antenna communicably coupled to the wireless transceiver circuit. A signal strength between the first wireless device and the second wireless device is monitored as measured by the first wireless device, the second wireless device, or both. A signal strength fluctuation value for the signal strength is determined over a time period or a number of signal strength samples. A trigger for a defined action is generated whenever the signal strength fluctuation value exceeds a defined threshold.

These and other objects, advantages and features of this invention will be apparent from the following description taken with reference to the accompanying drawing, wherein is shown a preferred embodiment of the invention.

BRIEF DESCRIPTION OF THE DRAWINGS

The above and further advantages of the invention may be better understood by referring to the following description in conjunction with the accompanying drawings, in which:

FIG. 5 is a block diagram of a wireless device (WS) in accordance with one embodiment of the present invention;

FIG. 6 is a block diagram of a wireless network of devices in accordance with one embodiment of the present invention;

FIG. 8 is a flow chart of a process to launch a multi-control devices process in accordance with one embodiment of the present invention;

FIG. 24 is a circuit diagram of a solely LED Drivers scheme in accordance with one embodiment of the present invention;

FIG. 25 is a timing diagram for the solely LED drivers scheme of FIG. 24;

FIG. 26 is a circuit diagram of switches and LED driver scheme in accordance with one embodiment of the present invention;

FIG. 27 is a timing diagram for the switches and LED driver scheme of FIG. 5;

FIGS. 33A-1 and 33A-2 are block diagrams of a front view and a rear view, respectively, of a LED strip in accordance with one embodiment of the present invention;

FIGS. 33B-1 and 33B-2 are block diagrams of a front view and a rear view, respectively, of an extendible LED strip in accordance with one embodiment of the present invention;

FIG. 34 is a block diagram of the mechanical and electrical connections for the Smartstrip in accordance with one embodiment of the present invention;

FIG. 35 is a block diagram of an extendible LED strip in accordance with one embodiment of the present invention;

FIG. 36 is a block diagram of a LED strip extension through parallel connection in accordance with one embodiment of the present invention;

FIG. 37 is a block diagram of a LED strip direct connection in accordance with one embodiment of the present invention;

FIG. 38 is a block diagram of a LED strip connection through wire in accordance with one embodiment of the present invention;

FIG. 49 is a flow chart of basic control areas in accordance with one embodiment of the present invention;

FIG. 50 is a flow chart of a programming process in accordance with one embodiment of the present invention;

FIG. 62 is a flow chart of a profile authentication process in accordance with one embodiment of the present invention;

FIG. 63 is a flow chart of a process for saving settings under a profile in accordance with one embodiment of the present invention;

FIG. 64 is a block diagram of a device to device profile sharing process in accordance with one embodiment of the present invention;

FIG. 65 is a flow chart of a process for adding an authenticated profile directly through the Intelligent Illuminating Device in accordance with one embodiment of the present invention;

FIG. 66 is a flow chart of a hard reset process in accordance with one embodiment of the present invention;

FIG. 67 is a flow chart of a soft reset through application in accordance with one embodiment of the present invention;

FIG. 68 is a flow chart of a process for adding a new Intelligent Illuminating Device into an existing Intelligent Illuminating Device network in accordance with one embodiment of the present invention;

FIG. 83 is a block diagram of a lighting system in accordance with one embodiment of the present invention;

FIG. 84 is a block diagram of a sensor device capable of communicating with and controlling the IID(s) to control IID in accordance with one embodiment of the present invention;

FIG. 106 is a flow chart of an eco mode for a lighting device in accordance with one embodiment of the present invention;

FIG. 107 is a flow chart of monitoring program for a lighting device in accordance with one embodiment of the present invention;

FIG. 108 is a flow chart of a data program for a lighting device in accordance with one embodiment of the present invention;

FIG. 109 is a flow chart of recording program for a lighting device in accordance with one embodiment of the present invention;

FIG. 111 is a flow chart of quick scene creation program for a lighting device in accordance with one embodiment of the present invention; and FIG. 112 is a flow chart of location services and interaction program for a lighting device in accordance with one embodiment of the present invention.

DETAILED DESCRIPTION OF THE INVENTION

Figure 1:
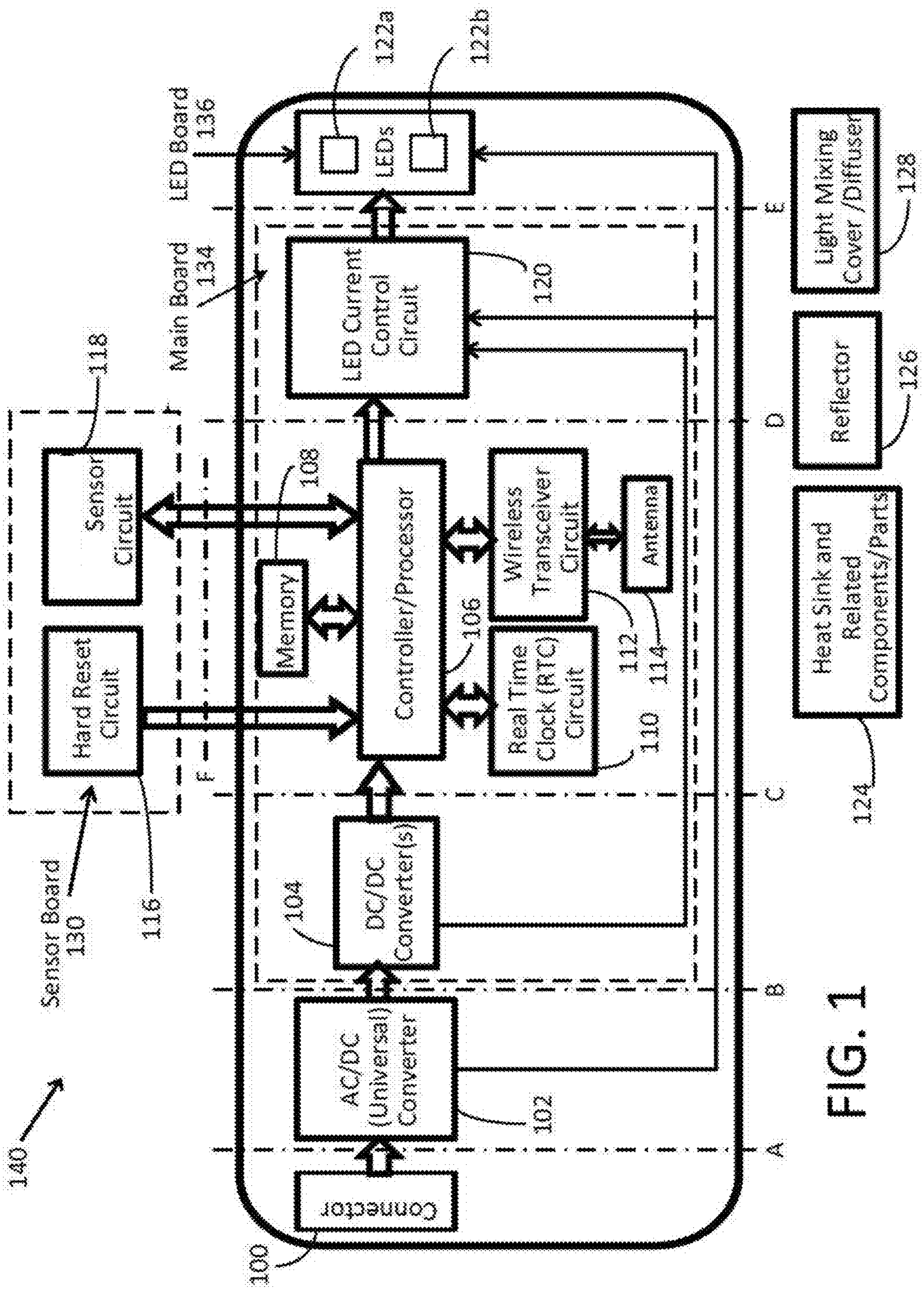
FIG. 1 is a block diagram of a lighting device in accordance with one embodiment of the present invention.

While the making and using of various embodiments of the present invention are discussed in detail below, it should be appreciated that the present invention provides many applicable inventive concepts that can be embodied in a wide variety of specific contexts. More specifically, the present invention provides control processes for individual or simultaneous communication, automation, and programming of an individual or network of such wireless devices through a wireless interface. The specific embodiments discussed herein are merely illustrative of specific ways to make and use the invention and do not delimit the scope of the invention. For example, FIGS. 1-4 describe wireless communications involving wireless enabled lighting devices; but as illustrated in FIGS. 5-22, the present invention is applicable to any kind of wireless enabled device.

With respect to FIGS. 1-4, the present invention provides an easily installed and transferable lighting and home automation solution because special or customized installation is not required. The present invention presents a solution to controlling, programming, and automating lighting devices, such that the color and brightness of any individual light or a group of lights can be manually or automatically controlled using a wireless interface. A user has the flexibility to personalize the color, atmosphere, and mood of a room to better fit ones preference, time of day, or occasion at hand. Additionally, since the present invention requires no installation, the solution is fully portable and can be removed and reused in other locations throughout the long life of the lighting device. Automation and dimming of the lighting devices save more energy than is consumed by the additional components of the lighting device. Moreover, using on/off signals having specified cycle times to produce a blended light reduce the current requirements of the lighting device.

In one embodiment of the present invention, a wireless lighting control system, consists of methods, apparatuses, and associated software (device application) for controlling, programming, and automating one and/or multiple 'Intelligent Illuminating Devices' (II Device) utilizing a wireless communication protocol executed between one or many wireless devices and one or many II Devices (II Device network). The methods and apparatuses presented here would allow one to adjust and control a single or network of II Devices with high flexibility, user control, and intuitive user interaction, with minimal installation or complexity.

For the purposes of discussing this invention the following terms will be used to describe the primary aspects of the invention. An II Device is a single wirelessly enabled lighting apparatus. A wireless device is a computing device such as a smartphone, computer, tablet, smartTV, remote, etc. A device application is a user facing software application run on the wireless device. A mesh network is a wireless communication protocol used to connect one or many II Devices and/or one or many wireless devices.

The light is a combination of a light generator, a light detector, a communicator, a power source, and a computer processor. In one embodiment these components are contained within one form factor similar to a standard light bulb. In other embodiments these elements will be separate from the other elements. For example, the light generator can be separate from the remaining components. In other embodiments, not all of the components are required. For example, one embodiment may consist solely of the lighting generator, communicator and computer processor. In other embodiments, an outside light-sensing component may be used. For example, an outside light-sensing component might be disparately connected to the remaining components.

An II Device in the context of this invention is a lighting apparatus containing additional electronic circuits and components. In one embodiment, the II Device will produce some measure or effect of luminosity dependent on commands sent wirelessly through a wireless device and associated device application. The II Device can receive wireless communications, take immediate action (in terms of a lighting output) based on the wireless communication, execute a sequence of actions, and store one or more commands to be executed at a specified time in the future or upon a specified condition being met. In addition, one embodiment of the II Device can intelligently relay/transmit wireless communication commands received from a device application (or II Device) to other II Devices within proximity. Similarly, one embodiment of the II Device would confirm receipt of the command through a wireless communication back to the wireless device and device application, possibly relaying the confirmation back through other II Devices. The communication means for to execute these processes can be seen in the mesh network section.

Now referring to FIG. 1, a block diagram of a lighting device in accordance with one embodiment of the present invention is shown. The lighting device (II Device) 140 might take numerous forms or embodiments in design, but certain components are common to the various designs while others will be used as is necessary for a specific embodiment. These components may or may not be part of II Device 140 and might be arranged in different fashion and with slight alteration to create different intelligent illuminating embodiments. For example, the II Device 140 includes a DC/DC power converter 104, a controller/processor 106 electrically connected to the DC/DC power converter 104, a light emitting diode (LED) current control circuit 120 communicably coupled to the controller/processor 106 and electrically connected to the DC/DC power converter 104, and two or more LEDs 122 electrically connected to the LED current control circuit 120. The LED current control circuit 120 can be a PWM driver, switching or multiplexer circuit, or light emitting diodes (LEDs) driver(s) circuit. The two or more LEDs 122 will include at least a first color LED **122*a* and a second color LED 122*b*. Moreover, at least one of the LEDs 122 may include a series of LEDs, a group of LEDs, an array of LEDs, two or more series-connected LEDs, two or more parallel-connected LEDs or a combination thereof. Typically, the first color LED 122*a* and the second color LED 122*b*** will be selected from a red LED, a green LED, a blue LED, a red LED, a white LED, a tri-color LED and a four-color LED.

As will be explained in more detail below, a method for controlling one or more lighting devices 140 includes the steps of providing the one or more lighting devices 140, sending one or more control signals from the controller/processor 106 to the LED current control circuit 120 corresponding to a blended light having a specified color, and sending an on/off signal having a cycle time from the LED current control circuit 120 to each LED 122 in response to the one or more control signals such that the two or more LEDs 122 produce the blended light having the specified color based on how long each LED 122 is turned ON and/or OFF during the cycle time. The LED current control circuit 120 provides an on/off signal having a cycle time to each LED 122 in response to one or more control signals received from the controller/processor 106 such that the two or more LEDs 122 produce a blended light having a specified color based on how long each LED is turned ON and/or OFF during the cycle time. These on/off signals with specified cycle times to produce a blended light can be used to reduce the current requirements of the II Device 140.

Other embodiments will include additional components. For example, the additional components may include: a power supply connector/fastener 100; an AC/DC power converter 102 electrically connected to the power supply connector/fastener 100 and the DC/DC power converter 104; a real time clock (RTC) circuit 110 communicably coupled to the controller/processor 106; a memory 108 communicably coupled to the controller/processor 106; a wireless transceiver circuit 112 communicably coupled to the controller/processor 106; an antenna 114 communicably coupled to the wireless transceiver circuit 112; a hard reset circuit 116 communicably coupled to the controller/processor 106; a sensor circuit 118 communicably coupled to the controller/processor 106; a heat sink 124; a reflector 126 disposed behind or around the two or more LEDs 122; and/or a diffuser or lens 128 disposed above the two or more LEDs 122.

The components of the II Device 140 can be modularized to provide easy enhancement, customization, modification and repair of the II Device 140. For example, a main circuit board 134 may include the DC/DC power converter 104, the controller/processor 106, the LED current control circuit 120, the memory 108, the real time clock circuit 110, and the wireless transceiver circuit 112 and antenna 114. A sensor board 130 may include the hard reset circuit 116 and the sensor circuit 118. The sensor circuit 118 can be any desired sensor type, such as an ambient light sensor, a sound detector/microphone, etc. A LED board 136 may include the two or more LEDs 122 and additional LED related circuitry (e.g., LED arms).

The connector 100 performs at least one of two functions. One, it can physically connect the II Device 140 to a surface and two, it can provide access to a power source. The connector 100 could fasten to a standard surface, light socket, or electrical socket, or combination of the like. Similarly, the connector 100 could provide a connection to a power source as an Edison base (multiple sizes), Plug in, Bi-pin, or Battery connected connection (including water activated battery), etc. The connector 100 would conduct the electrical current through to the AC to DC converter 102. In some embodiments, such as the Intelligent Illuminating Strip (II Strip or Smartstrip), the fastener and power connection means of the connector 100 might be separated. For example, an electrical plug is connected via a wire to the rest of the Smartstrip and the Smartstrip is fastened in some other manner (such as screws or adhesive) to a surface. In other embodiments, such as the Intelligent Illuminating Bulb (II Bulb), the connector 100 would be an Edison base or bi-pin for which when the connector is inserted into the appropriate light socket, the connector 100 would provide appropriate contact to extend the AC or DC power source or supply into the body of the II Bulb. In addition, the connector 100 might provide some structural stability in fastening the II Device 140 to a surface.

The AC to DC converter 102 receives power from the connector 100 and outputs the appropriate DC power to the DC/DC converter 104, the LED current controlling 120 circuit, and LED circuit 122. Note that a single AC to DC converter 102 can be used in place of the combination of the AC to DC converter 102 and the DC/DC converter 104. The exact power input might vary depending on country specific standards or power sources, but as a universal converter, the power output will always be DC voltage such as 12 VDC or 18 VDC or 24 VDC. Examples of power inputs include AC power 60V-290V/45-65 Hz or (Examples: 230 VAC/50 Hz (European/Indian Standard), 110 VAC/60 Hz (US Standard), or a range of DC power from 12 VDC to 1000 VDC. The AC to DC converter 102 might be housed within the connector 100 or separate from the connector 100, depending on the specific II Device embodiment.

The DC/DC converter(s) 104 receives a power input from the AC/DC converter 102, it then converts that power to DC power(s) required for driving the internal components/modules of the II Device 140. These components include the controller/processer 106, memory 108, the real time clock (RTC) circuit 110, the wireless transceiver circuit 112, antenna 114, and possibly components within the LED current control circuit 120. It might also supply power to other components, such as the hard reset circuit 116, the sensor circuit 118, and other potential added circuits. There might be multiple converters dependent on the output DC voltages required by different component requirements. Similarly, the power output would very dependent on the exact component requirements, for example the output might be 5 VDC, 3.3 VDC, or 1.3 VDC.

The controller/processor 106 processes signals received from the memory 108, the real time clock (RTC) circuit 110, and the wireless transceiver circuit 112. It might also process signals from other components, such as the hard reset circuit 116, the sensor circuit 118, and other potential added circuits. It also takes action and sends commands to the memory 108, the real time clock (RTC) circuit 110, and the wireless transceiver circuit 112. It might also take action and send signals to other components, such as the sensor circuit 118 and other potential added circuits. In one embodiment, the computer processor includes a real time clock, processor 106, and memory chip.

The processor 106 processes the signals received by the various other components of the embodiment, computes necessary actions, and sends signals back out to various other components of the embodiment. The processor 106 will vary in terms of power, speed, and size in different embodiments. Additionally, the processor 106 is not limited to the contents listed above and may include other components.

The memory 108 stores data from factory defined settings and from user defined settings. The controller/processer 106 will read/write data in memory 108. Data might include factory-defined settings, such as communication protocols, identification and security protocols, and other data. Data might also include user-defined settings, such as user profiles, default commands, programs, and other data. The memory 108 could be inside the processor 106 and/or external to the processer 106 as a different integrated circuit or chip(s). The controller/processor 106 and memory 108 circuits might take a number of different technical specifications. In one embodiment, the processor 106 includes a real time clock, processor, and memory chip. The memory 108 receives information from the processor 106 and stores the commands for retrieval by the processor 106.

The real time clock circuit 110 includes a battery and a date and time clock based RTC. The controller/processor 106 will set the date and time data in the RTC 110 and also read the date and time data from the RTC 110. The RTC 110 could be internal to the controller/processor 106 or it could be an external circuit with respect to the controller/processor 106. The RTC 110 will run on the DC/DC power unless no power is provided, in which case it will run on the battery included within the real time clock circuit 106. The battery could be a rechargeable battery, in which case the DC/DC power when supplied would also charge the rechargeable battery through recharging circuitry. The battery could also be a non-chargeable battery. In one embodiment, the processor 106 includes a real time clock, processor, and memory chip. The real-time clock is battery powered and could be set for any time and date.

The wireless transceiver circuit 112 allows the II Device 140 to communicate with other wireless devices and/or other II Devices. The wireless transceiver circuit 112 includes a transmitter and receiver circuit based on established wireless protocols. These protocols could differ based on different II Device embodiments and changing wireless communication standards. Example wireless protocols include but are not limited to Bluetooth, ZigBee, Wi-Fi, and their related variants. The wireless transceiver circuit 112 will be connected to the controller/processor 106 and the antenna 114. In one embodiment, the wireless transceiver circuit 112 is composed of a transmitter and receiver circuit based on Bluetooth protocols. In other embodiments, the wireless transceiver circuit 112 might utilize other protocols including but not limited to ZigBee, WiFi, infrared, WiMax, LTE, ZWave, or other protocols not listed. In other embodiments, the wireless transceiver circuit 112 might include other component parts or circuitry.

The antenna 114 captures wireless communication signals and passes them to the wireless transceiver circuit 112 to decode those signals. The antenna 114 could take multiple forms depending on the protocol and signal frequency required. The physical location of the antenna 114 and/or wireless transceiver circuit 112 could be placed in multiple physical locations related to the II Device 140. For example, it might be placed outside of the II Device 140 or inside the II Device 140. Placing it outside, might increase the range of wireless communication for the II Device 140, especially when installed in locations with poor reception. Alternatively, the antenna might be built into the physical structure of the II Device 140 or be part of the main board 134 inside the II Device 140.

In some embodiments, the hard reset circuit 116 of the II Device 140 includes a button or switch mechanism and related circuitry. The button or switch would be connected to the controller/processor 106 either directly on the same board or through a wired connection. When the button or switch is activated, it will send a specific signal to the controller/processor 106 to execute the hard reset program for that II Device 140. The actual button or switch mechanism might be different dependent on the II Device 140 and its application. As example, the reset circuit might be a simple resistant button type switch, it might be a rotational type switch, or it might be a conductive type switch, it might be a compression switch based on pushing in some part of the mechanical structure. The location of the hard reset circuit might be co-located with other external components such as the sensor circuit(s), LEDs, diffuser housing, or other II Device components or structural parts. In this sense the physical location with respect to the II Device 140 might vary. The hard reset function in most embodiments will require access to the DC/DC power, and thus the II Device 140 would need to be connected to an active power source. In some embodiments though, the hard reset circuit 116 would have access to a separate power source such as a battery to provide the controller and related circuitry enough power to execute the hard reset command.

The sensor circuit 118 may include one or more sensors on any type and supporting circuitry, such as an ambient light sensor (photosensor or similar light detecting component), sound detector/microphone or combination thereof. In the case of an ambient light sensor circuit, the ambient light sensor(s) in the sensor circuit 118 detects a level of captured ambient light, converts that level into an analog signal, and sends that data to the controller/processor via an analog to digital (A/D) converter that could be a part of the sensor circuit 118 or controller/processor 106. The sensor circuit 118 would consist of one or more ambient light sensors per one or multiple II Devices. In some embodiments, the sensor circuit 118 could be embedded in the II Device 140 itself and in others it might be a separate peripheral device to the wireless lighting control system. Additionally, the placement of the sensor(s) 118 and related circuitry need not be exactly collocated, but possibly separated by a wire.

For example, the sensor(s) 118 could be placed in multiple locations in relation to the II Device 140: (a) placement of an ambient light sensor requires external light to reach the light sensor; (b) the sensor(s) could be placed on the exterior of the light, on the housing; (c) the sensor(s) could be at the end of an extension or wire protruding; or (d) the sensor(s) could be part of an external peripheral to the light, connected via wireless communication (e.g., the sensor could be housed with other electronic components such as a processor, communication source (Bluetooth module, Zigbee, Wi-Fi, or other)). There could also be multiple types of II Device sensors used: (a) one which senses a range of overall luminosity; (b) one that senses a combination of red, green and blue components or cyan, yellow, magenta or black components, or hue, saturation and lumens components of the light on it; or (c) in different scenarios the light measured could be in absolute or respective values. The ambient light sensor can be located to detect an ambient light and a light emitted by the II Device 140 such that the controller/processor 106 adjusts one or more of the on/off signals provided to the LEDs 122.

LEDs 122 refer to a combination of LEDs or LED arms that are illuminated depending on current passed through from the LED current control circuit 120. The combination of LED arms or LEDs could be of various types and various colors dependent on the II Device embodiment. For example, the LEDs might vary in color such as red, green, blue, and/or white LEDs. The LEDs might also vary in their maximum output luminosity. The combination of illuminations of these LEDs could produce various levels of brightness and/or color.

The LED current control circuit 120 executes commands from the controller/processor 106 to control the current passed through the LEDs 122. The LED current control circuit 120 might take different forms dependent on the II Device embodiment as per the following schemes: solely LED drivers scheme, switches and LED driver scheme, multiplexer and LED driver scheme, and current limiting circuit scheme. In general, the controller/processor 106 sends commands to LED drivers, switches or multiplexer, which in turn controls the light output by controlling the average current passed through the LEDs 122. The average current would affect the overall luminosity of the II Device 140, such as that at lower average currents passed through the LED driver then the II Device would be dimmer.

For embodiments where multiple LED arms are present, unique to the presented schemes is a method to maximize the potential current passed through and subsequent luminosity of each LED arm with limited available current from the AC/DC converter 102. This is done by controlling the current passed through by the LED driver so that only one LED driver can pass through current at a time. This allows each on/off signal to provide a maximum current supplied by the DC/DC power converter to the LED 122. By varying and alternating very short lengths of time that current is passed through different LED arms using LED current control circuit 120, the schemes also allow the multiple LED arms to produce an overall blended light that is capable of various colors, saturation, and brightness. These schemes allow the II Device 140 to provide the highest level of individual luminosity emitted related to one of the LED arms, such as white, red, blue, or green, while also allowing for all combinations of color, brightness, and saturation to be achievable.

In other words, the specified color is produced by turning ON the first color LED 122*a* for a first portion of the cycle time and turning ON the second color LED 122*b* for a second portion of the cycle time. The two or more LEDs 122 are not turned ON at the same time. The cycle time is preferably short enough such that a user will not notice any flicker, which is usually around 85 Hz (about 12 ms), unless flicker is desired. The on/off signal for the first LED 122*a* includes two or more pulses during a portion of the cycle time that the first LED 122*a* is turned ON. Likewise, the on/off signal for the second LED 122*b* includes two or more pulses during a portion of the cycle time that the second LED 122*b* is turned ON. The on/off signals can be adjusted to provide a specified color, saturation and brightness or intensity. The specified brightness or intensity can be determined by a duty cycle of the on/off signals.

In one embodiment, the light generator is composed of LEDs, LED Drivers, and a light enhancement cover. The LEDs are of various types and colors. The LED Drivers are the circuitry that drives the LEDs. The LED Drivers take the commands from the processor for turning required LEDs at required brightness or intensity.

One potential scheme for the LED current control circuit 120 is the 'solely LED drivers scheme'. In this scheme the controller/processor 106 would send one or multiple Pulse Width Modulation (PWM) Signals to one or many LED drivers which would control the current flowing through an associated LED arm. There would be the same number of PWM signals sent as there would be LED drivers and LED arms. The total number of LEDs strings (arms) and LED drivers depend upon the application. LED driver circuit is designed for a particular current level to pass through it, so the LED driver circuit will regulate the flow of current through the respective LED arm to the set current level whenever the controller 106 provides a high level signal to it. PWM consists of high and low signals at a fixed frequency. One could change the duration of high and low signals in a given time frame (defined as time period=1/frequency). Considering the controller sends one PWM signal to one LED driver to control the average current through one associated LED arm. Varying the duty cycle of the PWM signal changes the average current flowing through the LED driver to the LED arm. The average current affects the overall luminosity of the II Device, such as lower average currents pass through the LED driver then the II Device would be dimmer (i.e., lowering the average currents passed through the LED driver dims the light produced by the II Device).

LEDs 122 refer to a combination of LEDs or LED arms that are illuminated depending on current passed through from the LED current control circuit 120. The combination of LED arms or LEDs could be of various types and various colors dependent on the II Device embodiment. For example, the LEDs might vary in color such as red, green, blue, and/or white LEDs. The LEDs might also vary in their maximum output luminosity. The combination of illuminations of these LEDs could produce various levels of brightness and/or color.

The heat sink and related components and parts 124 may be required in some embodiments of the II Device 140. The heat sink and related components 124 dissipate the heat generated by the LEDs 122 and LED current control circuit 120. The heat sink 124 could take multiple sizes, shapes, and materials dependent on the II Device embodiment. 'Related components' refers to the housing and outer structure of the II Device 140. These materials and arrangement might of course differ depending on the particular II Device embodiment.

The light reflector 126 is used to amplify or focus the illumination generated by the LEDs 122. The light reflector 126 could be made of different reflective materials and come in different sizes, dependent on the specific variation and application of the II Device 140. The light reflector 126 would be placed behind and/or around the LEDs 122, most likely at an arc so that the illumination of the LEDs 122 is reflected, focused, and amplified through the diffuser 128. The exact placement, angle, and arc of the light reflector 126 would vary dependent on the variation and application of different II Devices.

The diffuser 128 is a part of the II Device 140 that spreads and/or 'mixes' the illumination produced by the LEDs 122. The diffuser 128 could be made of different materials and come in different sizes, dependent on the specific variation and application of the II Device 140. Common material might be glass, plastics, or fiber. The diffuser 128 would be placed over the LEDs 122 so that the illumination passes through the diffuser 128. The exact placement, angle, and arc of the diffuser 128 related to the LEDs 122 would vary dependent on the variation and application of different II Devices.

The II Device 140 might take other common embodiments not fully described in this disclosure, but not limited to the following: (a) an II Device integrated into a lighting fixture (e.g., could be installed fixture with all II Device circuitries built in or non-installed fixture such as a plug in lamp); (b) an II Device integrated into a fan (e.g., could be installed fixture with all II Device circuitries built in); (c) an II Device that is solely battery powered and affixed to a surface; (d) an II Device utilizing OLEDs as LEDs; (e) an II Device integrated into directly into surfaces (walls, tables, and ceilings), clothing, appliances, electronics (Displays, music equipment, etc.), musical instruments (pianos, guitars, etc.) and taking power from some source either internally or externally to that integrated part; or (f) an II Device specifically designed for emergency lighting. Considering the control of the II Device, the invention herein provides processes and methods to wirelessly control and/or program one or many II Devices through one or many wireless devices. These processes and methods shown and described provide maximum utility and range with a given communication protocol and a reliable and efficient system.

As previously mentioned, the II Device 140 could be modular (i.e., different parts of the II Device 140 as separated by a dashed-dot lines A, B, C, D, E and F could be detachable from a manufacturing or consumer standpoint). Certain parts or modules of the II Device 140 could be interchangeable with other types of the same module. As example, consider an II Device 140 that has different connector modules, plug in vs. Edison base, yet the rest of the modules are the same. The modules could be connected together through connectors, that a user could separate or place back together. The modules might also be structurally fixed together so that disassembly is required to disconnect the modules. Additionally, modules within the II Device 140 could be separated physically from each other yet connected electronically in some fashion. There could be different levels of modularity or no modularity at all, depending on the specific II Device embodiment.

Given the standard parts and connections of the II Device 140, there could be numerous potential II Device embodiments with differing arrangements, combinations, or expressions of the components disclosed.

Figure 2:
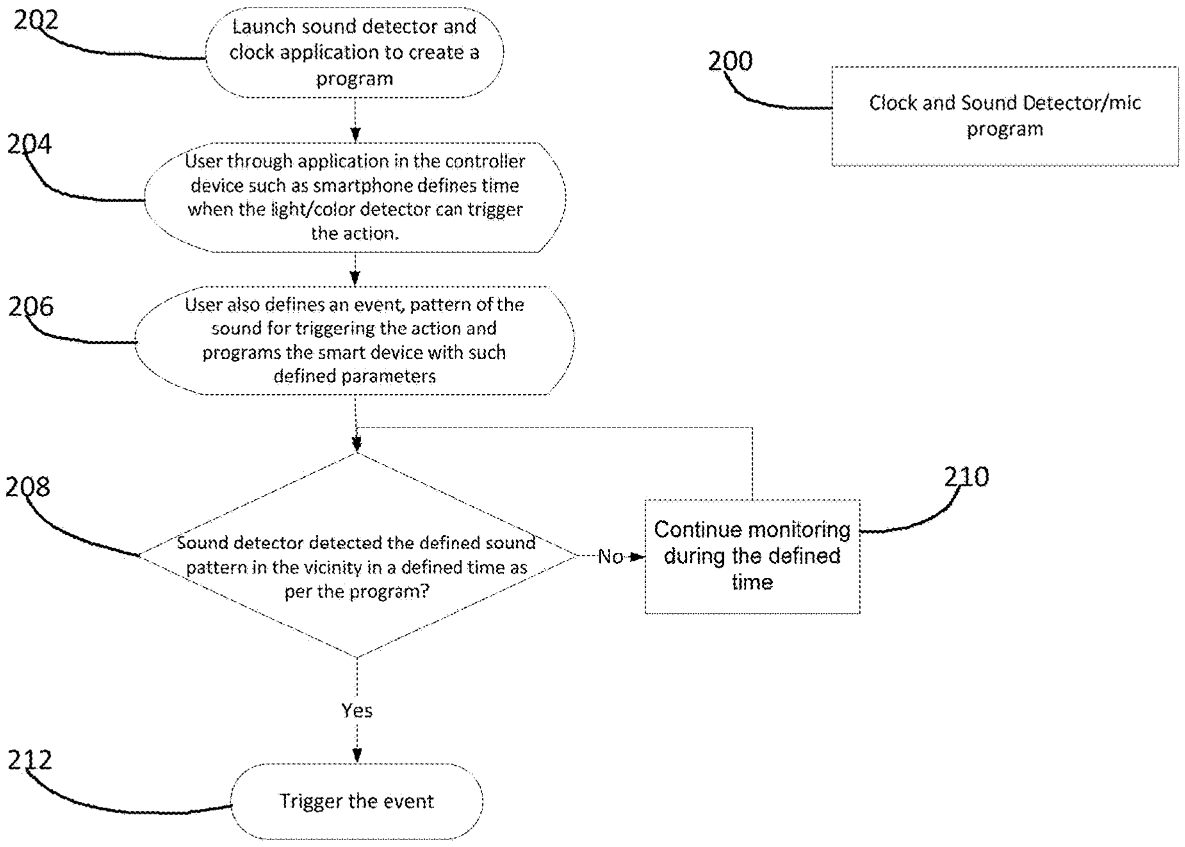
FIG. 2 is a flow chart of a sound detection process for a lighting device in accordance with one embodiment of the present invention.

Now referring also to FIG. 2, a flow chart of a sound detection process 200 for a lighting device in accordance with one embodiment of the present invention is shown. II Devices, such as smart bulbs with sensor circuits 118 containing a sound sensor/detector or microphone as well as Real Time Clock 110 or timer, can have specific applications where a user defines the time when the II Device should listen to particular defined sound and trigger an action based on that. For example, an application where a user wants to turn ON/OFF the lights between 10 μm and Sam every weekday by clapping twice within 2 seconds can be achieved by implementing sound detector and real time clock inside the II Device that is communicably coupled to the processor. In such an II Device, the user can define a program of turning the sound detector functionality of the II Device ON between 10 μm and Sam every weekday and then the II Device triggers the action of turning ON/OFF the bulb based on the clapping sound detected by the sound detector. An example of such a clock and sound detector/microphone process 200 begins when the sound detector and clock application are launched to create a program in block 202. The user defines a time when the sound detector can trigger the action using the application in the controller device, such as a smartphone, in block 204. The user defines an event or pattern of the sound for triggering the action and programs the smart device with such defined parameters in block 206. Note that the above process can be adapted to work with other sensors, such as light, color, motion or a combination thereof. When the program is running, the processor determines whether the sound detector has detected the defined sound pattern in the vicinity in the defined time in decision block 208. The defined parameters are not satisfied, as determined in decision block 208, the program continues to monitor sounds detected by the sound detector during the defined time in block 210 and loops back to decision block 208 whenever a sound is detected. If however, the defined parameters are satisfied, as determined in decision block 208, the program triggers the defined event in block 212.

Figure 3:
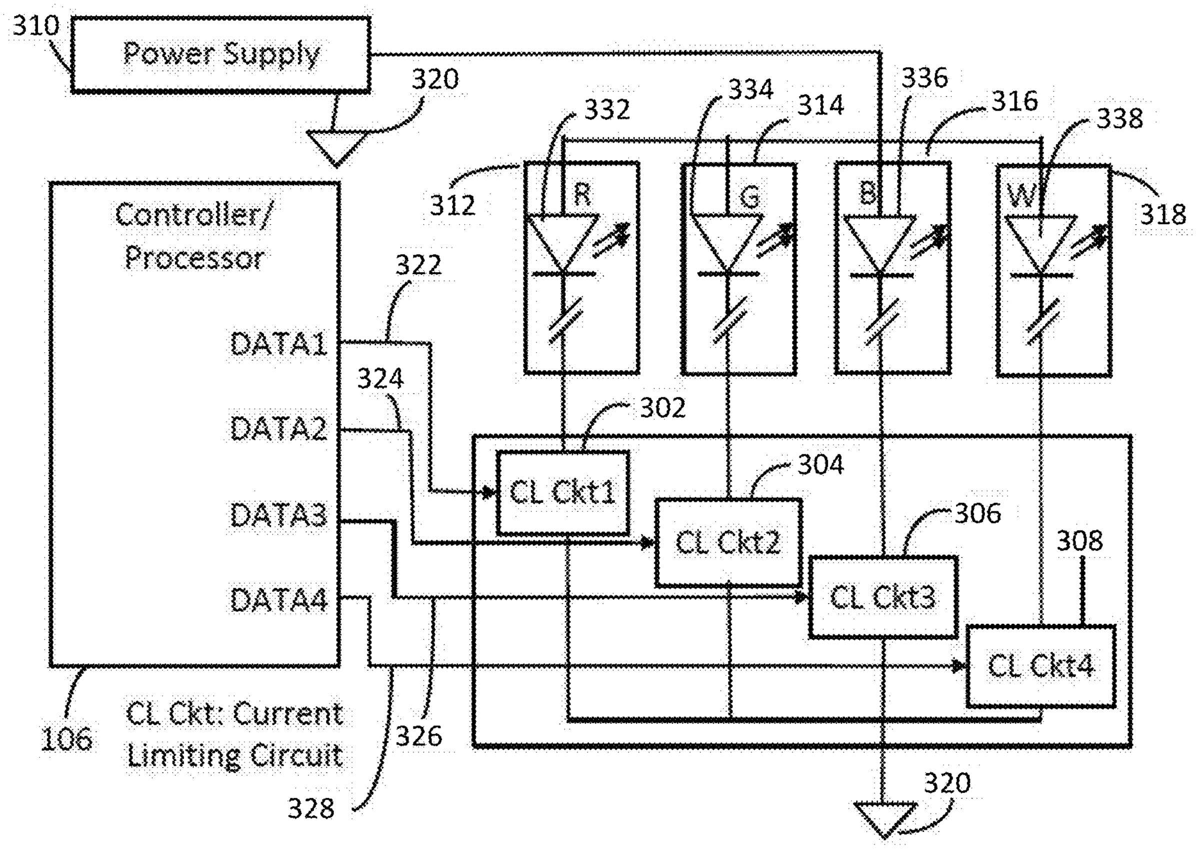
FIG. 3 is a circuit diagram of current limiting circuit scheme in accordance with one embodiment of the present invention.

Now referring to FIG. 3, a circuit diagram of current limiting circuit scheme 300 in accordance with one embodiment of the present invention is shown. In this scheme, current limiting circuits (302, 304, 306, and 308) control the current passed through to each LED arm (312, 314, 316, and 318). There would be as many current limiting circuits as LED arms that are required for the specific embodiment of the II Device. The controller/processor 106 sends data to the individual current limiting circuit (302, 304, 306, and 308) and defines the current to be passed through to the respective LED arm (312, 314, 316, and 318). A digital potentiometer could be used to form the current limiting circuit (302, 304, 306, and 308). The resistance of potentiometer is proportional to the data given to it by controller/processor 106.

For example, to produce a yellow light consisting of 50% Red and 50% Green light at 100% possible output luminosity, DATA1 322 and DATA2 324 will set the currents through current limiting ckt1 302 and ckt2 304 such that the current splits in half through two arms (DATA3 326 and DATA4 328 will be zero). For example, if power supply 310 is able to provide 1 A current, ckt1 302 and ckt2 304 will be set at 0.5 A each. Considering the embodiment contains red, green, blue, and white LED arms (312, 314, 316 and 318 respectively), based on established color mixing principals, the variation in the luminosity of these four colors could produce all color combinations. Setting assigned currents through all circuits (302, 304, 306, and 308), any color, saturation, and brightness within specified limits could be achieved. In other embodiments, the LEDs (332, 334, 336, 338) can be replaced or augmented with alternative lighting components and technologies including but not limited to CFLs, Halogen, and Incandescent. The power supply 310 and circuits (302, 304, 306, and 308) are connected to ground 320.

As shown in FIGS. 3 and 5 of U.S. Pat. No. 9,113,528, the Power supply that is AC/DC and/or DC/DC converter would have limited power or current it could provide. The signal or Data controlling the current limiting circuit of LED strings could be Analog signals either from controller or from a Digital to Analog converter controlled by controller. The current limiting circuit could be analog current control circuit, i.e. the current could be controlled in analog mode and not PWM or switching mode. For example, the signal/data would be such that the current controlling circuit would change current from 0 A to max, let's say 1 A and current remains continuous and not switching. In addition, an algorithm is required to ensure the total current or power from the power supply/LED driver doesn't exceed the limit. Consider, here each LED string can have different combined forward voltage, such as White string can have 12V, Red can have 7V, Blue and Green can have 6V each. Considering the scenario that as these strings are in series, the current through each string is same, therefore, the power drawn by each string is different when current flows through them as per their forward voltages. Consider a scenario where total power available that can be dissipated in a system is limited, because of various limitations such as that of power supply, LED driver, thermal, etc. In this scenario a special algorithm is required such that the LED current through strings are controlled to ensure in no case average power required by LED strings to turn ON doesn't exceed the total available power. For example, consider that total power available for LED string is 12 W and max current through each LED string is 1 A. In such case, when white LED string with forward voltage of 12V is ON, the power taken is 12 W, similarly, Red, Green, Blue will take 7 W, 6 W, 6 W respectively. Special algorithms for various scenarios are required to ensure power limit and also maximize the average ON time for which current is passing through LED strings to get highest possible light output. In one case consider a Cyan color is formed by passing equal current through Blue and Green, which is possible by turning Switches 3 and 4 each with equal power through them so that Blue and Green LEDs draw 6 W average power each with combined 12 W. Similarly, consider that orange color is formed by turning Red and Green at equal power, in such case, if Green is ON with 50% current, i.e. 0.5 A time, Red needs 6 W (available)/7 W (required)×50%=42.8% total current i.e. 0.428 A, thus combined 12 W. Similarly, for any color combination involving any number of colors, percentage current for each color string needs to be calculated and Signals/Data (Data 1 to Data 4) are controlled such that current of each LED strings are proportional to respective percentages calculated and total average power drawn by all LEDs is maximum, 12 W in this case. Another case, when a color is formed by keeping Red at 30% power, White 50% power, and green 20% power, then Signals/Data will be calculated as below: 30%*7/12=17.5% current for Red LED, 50%*12/12=50% current for White LED, and 20%*6/12=10% current for Green LED. This algorithm is to get maximum light output for a given color formed by a combination of various LED strings.

Figure 4:
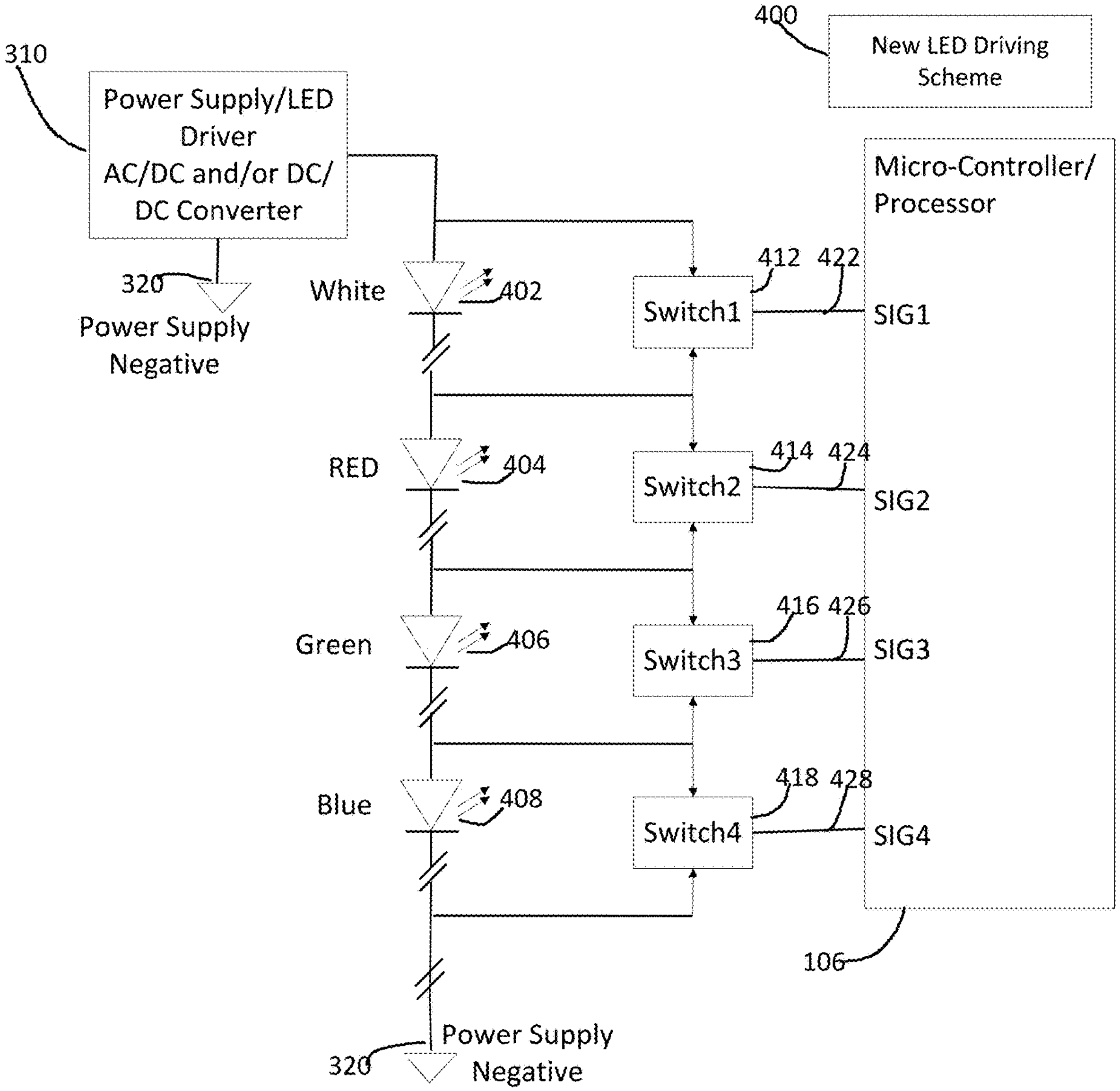
FIG. 4 is a block diagram of current limiting circuit scheme in accordance with one embodiment of the present invention.

Referring now to FIG. 4, a block diagram of current limiting circuit scheme 400 in accordance with one embodiment of the present invention is shown. Here all LEDs, different color LED strings such as White 402, Red 404, Green 406, Blue 408, etc. are in series with one another between the power supply 310 and the power supply negative 320. Each individual color string can have LEDs in series, parallel or combination of series and parallel. The switches (412, 414, 416, 418) are across (connected in parallel) each LED string (402, 404, 406, 408) so that when the switch is ON, current passes through switch and its corresponding LED string is OFF, while when Switch is OFF, current passes through its corresponding LED string turning that LED string ON. Here each LED string can have different combined forward voltage, such as White string 402 can have 12V, Red 404 can have 7V, Blue 406 and Green 408 can have 6V each. Considering the scenario that as these strings are in series, the current through each string is same, therefore, the power drawn by each string is different when current flows through them as per their forward voltages. The switches (412, 414, 416, 418) are controlled by the micro-controller/processor 106 via signal SIG1 422, SIG2 424, SIG3 426 and SIG4 428.

Consider a scenario where total power available that can be dissipated in a system is limited, because of various limitations such as that of power supply, LED driver, thermal, etc. In this scenario a special algorithm is required such that the LED strings are controlled ON/OFF to ensure that the average power required by LED strings to turn ON does not exceed the total available power. For example, consider that total power available for LED string is 12 W and current through LED string is 1 A. In such case, when white LED string 402 with forward voltage of 12V is ON, the power taken is 12 W, similarly, Red 404, Green 406, Blue 408 will take 7 W, 6 W, 6 W respectively. Special algorithms for various scenarios are required to ensure power limit and also maximize the average ON time for which current is passing through LED strings to get highest possible light output. In one case consider forming a cyan color by passing equal current through Green 406 and Blue 408, which is possible by turning Switch3 416 and Switch4 418 ON for 50% of the time so that Green 406 and Blue 408 LEDs draw 6 W average power each with combined 12 W. Similarly, consider forming an orange color by turning Red 404 and Green 406 ON at equal power, in such case, if Green 406 is ON for 50% time of a time cycle, Red 404 needs to be ON for 6 W (available)/7 W (required)×50%=42.8% time of a time cycle, thus combined 12 W. Similarly, for any color combination involving any no. of colors, percentage times for each color string need to be calculated and signals (SIG1 422, SIG2 424, SIG3 426 and SIG4 428) are controlled such that the ON time of each LED string is proportional to respective percentages calculated and total average power drawn by all LEDs is maximum, 12 W in this case. Another case, when a color is formed by keeping Red 404 at 30% power, White 402 at 50% power, and Green 406 at 20% power, then signals will be calculated as below: 30%*7/12=17.5% ON time for Red LED 404, 50%*12/12=50% ON time for White LED 402, and 20%*6/12=10% ON time for Green LED 406. This algorithm provides a maximum light output for a given color formed by a combination of various LED strings.

Now referring to FIGS. 5 and 6, block diagrams of a wireless device (WS) 500 used in a wireless system and a network of wireless devices 600, respectively, are shown in accordance with one embodiment of the present invention. The wireless device (WS) 500 includes a controller/processor with internal memory such as RAM and/or flash memory 106, an external memory 108 communicably coupled to the controller/processor 106, wireless transceiver circuitry 112 communicably coupled to the controller/processor 106, and an antenna 114 communicably coupled to the wireless transceiver circuitry 112. Note that in some embodiments, the wireless device (WS) 500 is a lighting device as previously described in reference to FIG. 1.

When there are multiple controlling devices, such as wireless device (WD) 602 (e.g., a smart phone) or wired device (WR) 604, controlling various wireless devices (WS1-WS5) 606, 608, 610, 612, 614 (e.g., smart bulbs) within the network 600 becomes a challenge. Consider a communication protocol, such as Bluetooth, which has limitation on the mesh networking, where a particular smart device can connect to one or very few other devices and can only be of master or slave configuration. It limits the number of controlling devices that can control the smart devices in a mesh. Only few smart devices can be directly or through other smart devices. In addition, the ones which are connected to one controlling devices cannot get connected to the other controlling device. In such case, seamless controlling of smart devices through multiple controlling devices is not possible. However, a process of passing the control from one controlling device to the other can help provide control from multiple controlling devices. Consider a tree based mesh network formed by multiple wireless devices, such as Bluetooth devices where first Bluetooth device can act as a master device connected to three devices. Only slave devices can get commands from the master device and vice versa may not be possible. Also, slave devices may not be able to connect to more than one master device. However, the slave device can connect to another three devices and can be master of those three devices. Given such limitations, only one controlling device can control one entire mesh network.

Figure 7:
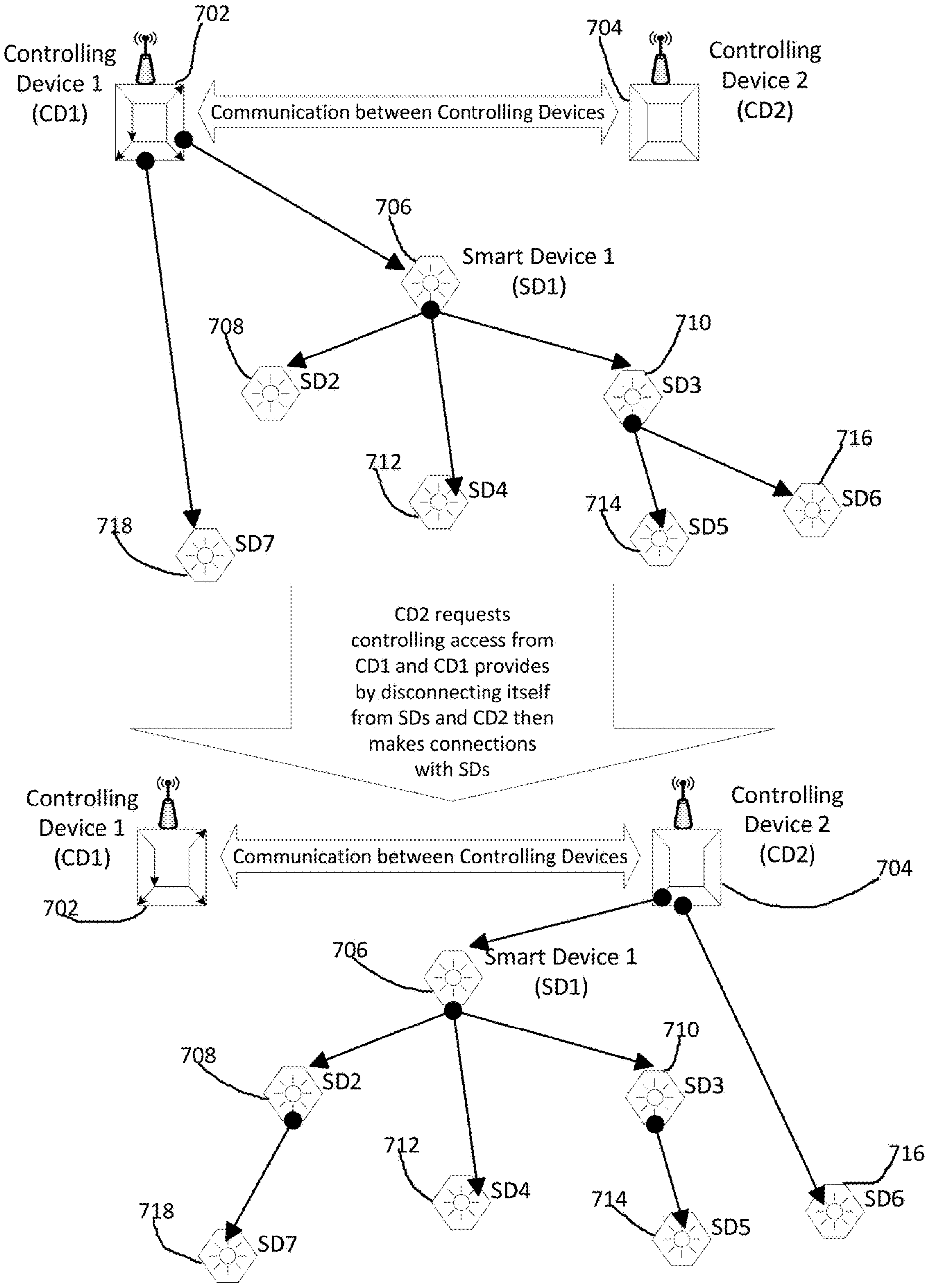
FIG. 7 is a block diagram of a wireless network of devices illustrating a process to launch a multi-control devices signal strength control process in accordance with one embodiment of the present invention.

As shown in FIGS. 7 and 8, a process 800 forms a new mesh network when another controlling device (CD2) 704 wants to control the smart devices (SD1-SD7) 706, 708, 710, 712, 714, 716, 718 that are currently controlled by controlling device (CD1) 702. With this process, the first controlling device (CD1) 702 will essentially lose the connections with smart devices (SD1-SD7) 706, 708, 710, 712, 714, 716, 718 and the new controlling device (CD2) 704 will build the connections with smart devices (SD1-SD7) 706, 708, 710, 712, 714, 716, 718. Below are the steps to achieve such control of smart devices from multiple controlling devices. Note that this process 800 reduces signal interference by controlling signal broadcasts to the smart devices. The multi-control devices process is launched in block 802.

When a controlling device wants to control the smart devices in a network being controlled by the other controlling device, it initiates a command to the existing controlling device controlling the smart devices to get control access to the smart devices in block 804. This control access can be initiated between the two controlling devices indirectly such as through Internet based service or direct communication between them through at least one communication protocol, such as Wi-Fi, BLE, etc. After the first controlling device gets the access request, it can grant it based on the user requirements or defined program in block 806. The first controlling device loses the connections with one or more of the smart devices as per the user requirements or defined program in block 808. The new controlling device then forms a mesh network with those smart devices and gets the ability to control them in block 810 and the process stops thereafter in block 812. A similar process happens when another controlling device wants to control the smart devices.

Figure 9:
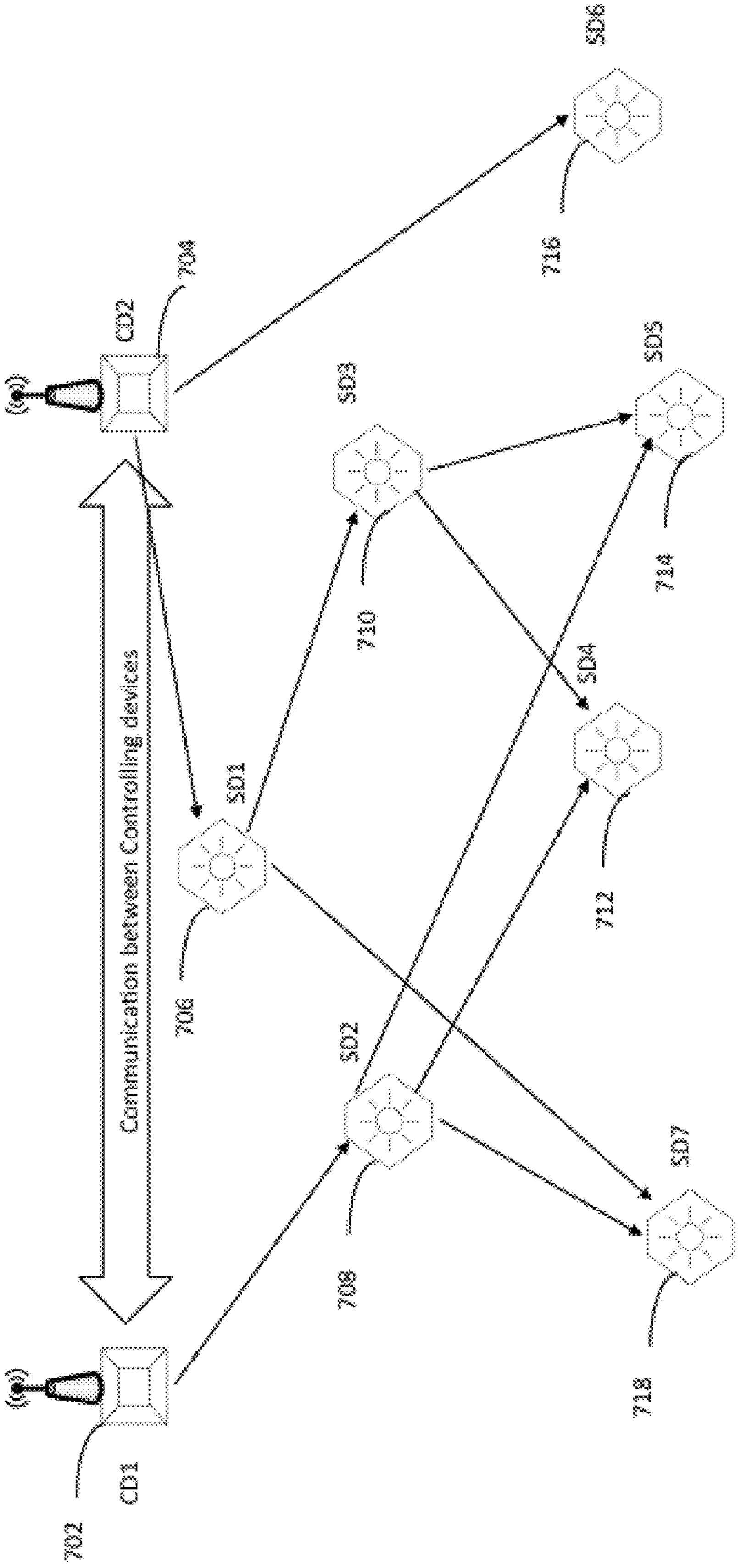
FIG. 9 is a block diagram of a wireless network of devices illustrating a multi-control devices process in accordance with one embodiment of the present invention.

Furthermore, when both the controlling devices CD1 702 and CD2 704 want to control the smart devices (SD1-SD7) 706-718 in a network, they can form a connection network as shown in FIG. 9. The controlling device CD1 702 connects to some smart devices SD2 708, SD4 712, SD5 714, SD7 718 and CD2 connects to some smart devices SD1 706, SD3 710, SD4 712, SD5 714, SD6 716, SD7 718. In this case though, the protocol used in the smart devices allows them to connect as CD1's connected smart devices and CD2's connected smart devices. Such connections would allow both the controlling devices CD1 702 and CD2 704 to control all smart devices.

Figure 10:
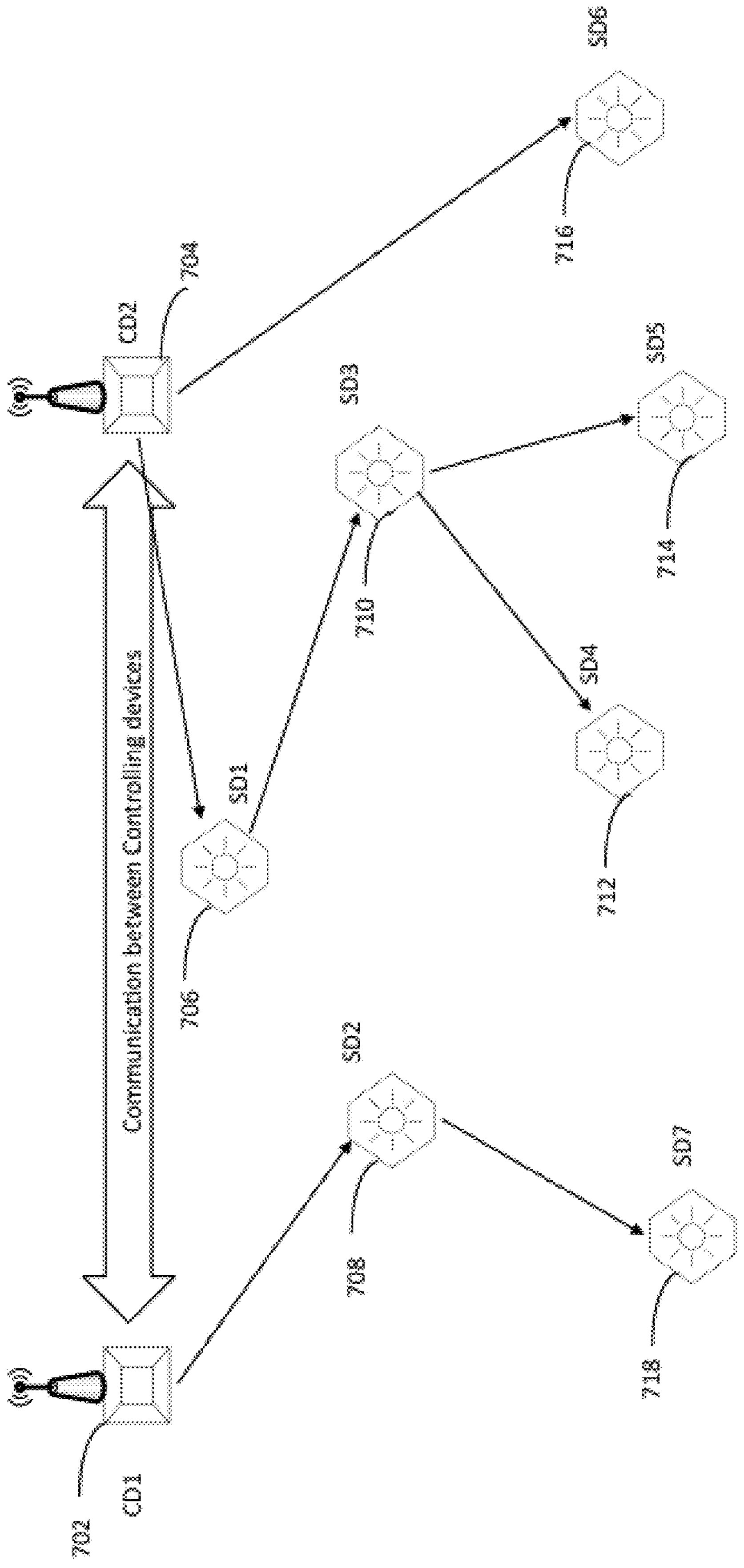
FIG. 10 is a block diagram of a wireless network of devices illustrating a multi-control devices process in accordance with one embodiment of the present invention.

Also, in some protocols such as Bluetooth Low Energy protocol, broadcast messages are allowed, which means, smart device can broadcast the commands or data to other individual or multiple smart devices irrespective of any actual communication links between them. For example and as shown in FIG. 10, SD2 708 will be able to send a command to SD6 716 even if there is no established direct or indirect communication link between them. As shown the established communication links are the controlling device CD1 702 is connected to smart devices SD2 708 and SD7 718, and CD2 is connected to smart devices SD1 706, SD3 710, SD4 712, SD5 714 and SD6 716.

For example, two or more wireless devices are controlled by providing the two or more wireless devices, a first controlling device communicably coupled to the two or more wireless devices via one or more first wireless network connections, and a second controlling device that is not communicably coupled to the two or more wireless devices via the wireless network. Each wireless device includes a controller/processor, a wireless transceiver circuit communicably coupled to the controller/processor and an antenna communicably coupled to the wireless transceiver circuit. A control access request is sent from the second controlling device to the first controlling device requesting control of at least one of the two or more wireless devices. The one or more first wireless connections between the first controlling device and the at least one of the two or more wireless devices are dropped whenever the control access request satisfies one or more parameters. One or more second wireless network connections between the second controlling device and the at least one of the two or more wireless devices are established, and thereafter the at least one of the two or more wireless devices are controlled using the second controlling device. Note that the two or more wireless devices can be part of a network, and the control access request or the control access acceptance may not apply to all the wireless devices within the network. The process may also include the steps of sending a control access acceptance or denial from the first controlling device to the second controlling device based on whether the control access request satisfies the one or more parameters, and/or defining the one or more parameters based on one or more user requirements, program requirements, device requirements, network requirements, or a combination thereof. In some cases, the first controlling device may retain control over a first group of wireless devices within the network, and the second controlling device establishes control over a second group of wireless devices within the network.

Figure 11:
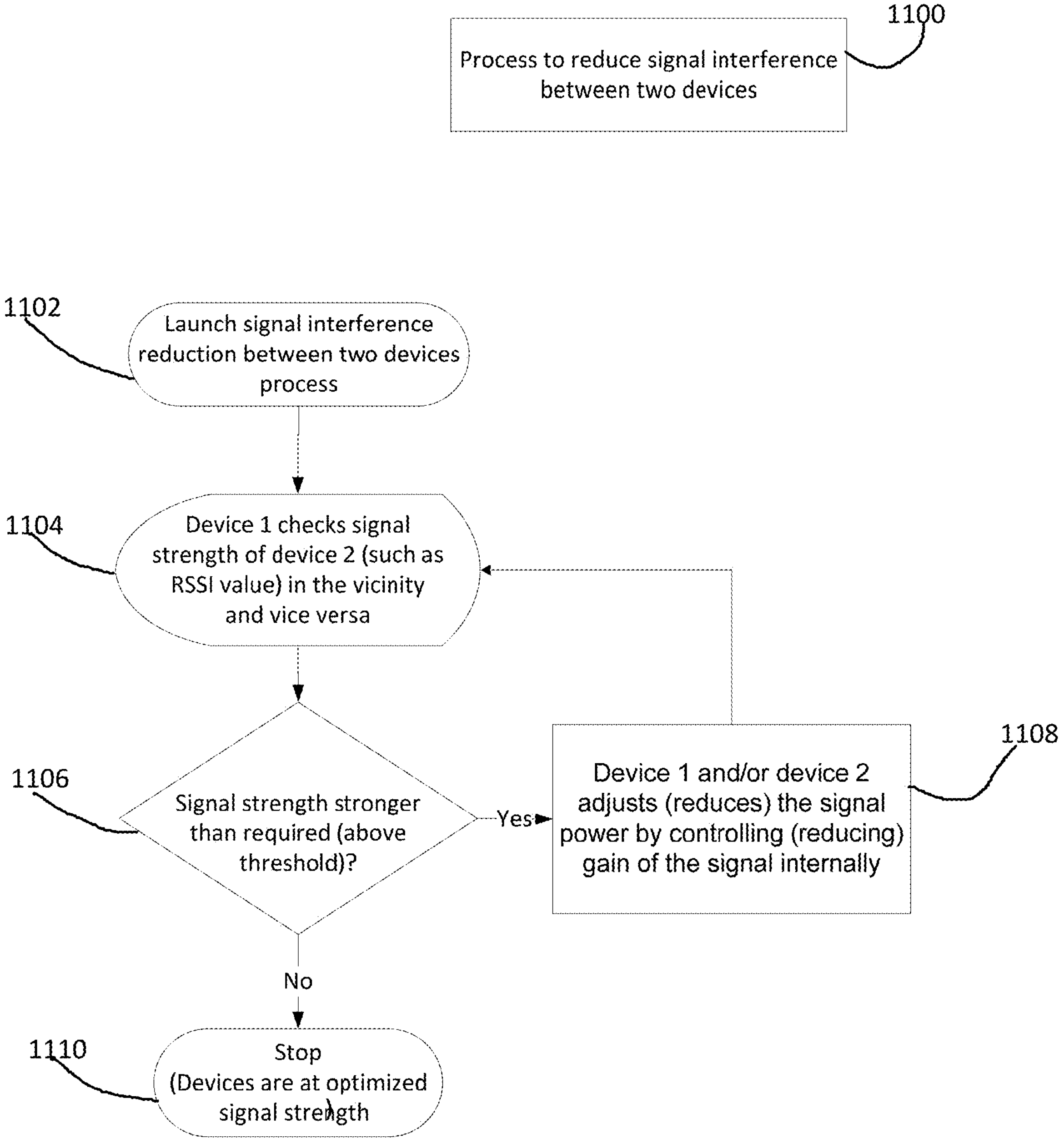
FIG. 11 is a flow chart of a process to reduce signal interference between two devices in accordance with one embodiment of the present invention.

Referring now to FIG. 11, a flow chart of a process 1100 to reduce signal interference between two devices in accordance with one embodiment of the present invention is shown. With the advancement of wireless technology, the wireless processors or wireless signal amplifiers have a feature of controlling the gain. The auto signal strength control to reduce the signal interference and increase signal to noise ratio in an environment with one or more multiple wireless devices will now be explained. The system consists of a wireless IC circuit with antenna communicably coupled to the chip. Wireless IC circuit may consist of wireless processor and wireless signal amplifier circuit electrically and communicably connected to it. Either the wireless IC or the signal amplifier or both have a function by which the signal gain or amplification gain can be set as and when required. Such gain can be set in wireless processor either when it is running, idle or turning ON. Similarly, such gain can be set in the signal amplifier when it is running or idle or turning ON. By controlling the signal strength by controlling the signal gains can help reduce the signal noise around the wireless devices improving signal to noise ration or reducing the signal interference.

The signal interference reduction process between two wireless devices begins in block 1102. Device 1 measures the device signal strength of the device 2 and in some cases vice versa in block 1104. The signal strength measurement can be RSSI (Received Signal Strength Value) or other desired metric. If the signal strength values are such that communication strength (link) between the devices is high (e.g., above a threshold value) and there is a room to reduce the signal strength as determined in decision block 1106, then one or both the devices reduces the signal strength either while they are running or by resetting themselves or by controlling (reducing) the signal amplifier gain in block 1108 and the process repeats to check the signal strength of the same device or other devices in block 1104. If, however, the communication strength (link) between the devices is not high (e.g., below a threshold value), as determined in decision block 1106, the process stops in block 1110 since the devices can be said to be operating an optimized signal strengths.

For example, signal interference can be reduced between at least a first wireless device and a second wireless device by providing the first and second wireless devices, wherein each wireless device comprises a controller/processor, a wireless transceiver circuit communicably coupled to the controller/processor and an antenna communicably coupled to the wireless transceiver circuit. A signal strength between the first wireless device and the second wireless device is determined as measured by either or both of the wireless devices. A signal power of either or both of the wireless devices is reduced whenever the signal strength exceeds a threshold value. Note that the first wireless device or the second wireless device can be a controlling device. Moreover, the signal power can be reduced or increased by adjusting a gain of a signal amplifier within the wireless transceiver circuit of either or both of the wireless devices. The step of determining the signal strength can be periodically repeated.

Figure 12:
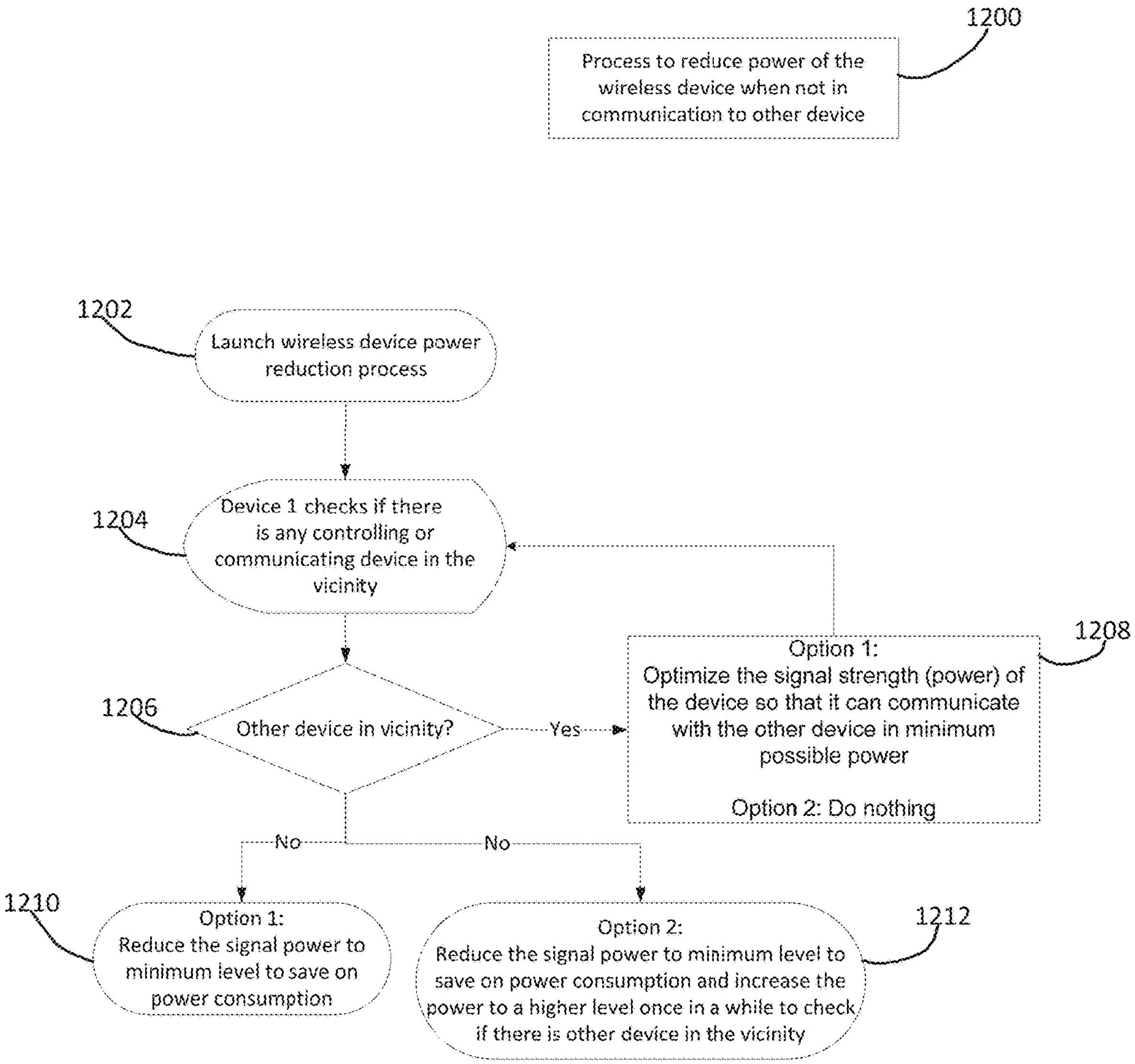
FIG. 12 is a flow chart of a process to reduce power of the wireless device when not in communication with other devices in accordance with one embodiment of the present invention.

Now referring to FIG. 12, a flow chart of a process 1200 to reduce power of the wireless device when not in communication with other devices in accordance with one embodiment of the present invention is shown. In case of a wireless device system where only two devices are present and one of them comes in the range of the other only during certain times, for example, a wireless sensor that is communicating with a remotely controlling device such as smartphone, the communication takes place only when remote controller is in the vicinity of the wireless sensor. In such cases, a wireless sensor can sense if the remote controlling device is in vicinity or not and based on that can adjust (reduce) the signal strength (power) to a lower value so that the sensor reduces overall power or energy consumption. This process is important in case of battery powered wireless device as it helps improve the battery performance and overall battery life. Higher or highest signal strength can be used in the case where no wireless device present in the vicinity. Otherwise, automatic gain control can be used.

The wireless device looks for the device in the vicinity periodically as per its defined program and controls its signal power by launching the wireless device power reduction process in block 1202. Device 1 checks if there is any controlling or communicating device within its vicinity in block 1204. If another device is detected within the vicinity, as determined in decision block 1206, the wireless device can perform two different options in block 1208. In option one, the wireless device can optimize its signal strength (power) so it communicates with the other device in a minimum possible power mode or a specified reduced power mode or range. In option two, the wireless device can do nothing and operate at its existing power level. Thereafter, the process returns to check for other devices in the vicinity. If however, another device is not detected in the vicinity, as determined in decision block 1206, the wireless device can perform one of two different power conservation modes in blocks 1210 or 1212. In option one, the wireless device reduces its signal power to a minimum level to reduce power consumption in block 1210. In option two, the wireless device reduces its signal power to a minimum level to reduce power consumption and increase power to a higher level periodically to check for other devices in the vicinity in block 1212. Note that different power modes and ranges can be used as defined by the user or manufacturer or by the operating environment, etc.

For example, the process may include, among other steps, determining whether the first wireless device and the second wireless device are within a specified range of one another, reducing the signal power of either or both of the wireless devices to an optimized level whenever the first wireless device and the second wireless device are within the specified range of one another, reducing the signal power of either or both of the wireless devices to a minimum level whenever the first wireless device and the second wireless device are outside of a specified range of one another, and/or increasing the signal power of either or both of the wireless devices to a higher level after a specified period of time has elapsed and determining whether the first wireless device and the second wireless device are within the specified range of one another.

Figure 13:
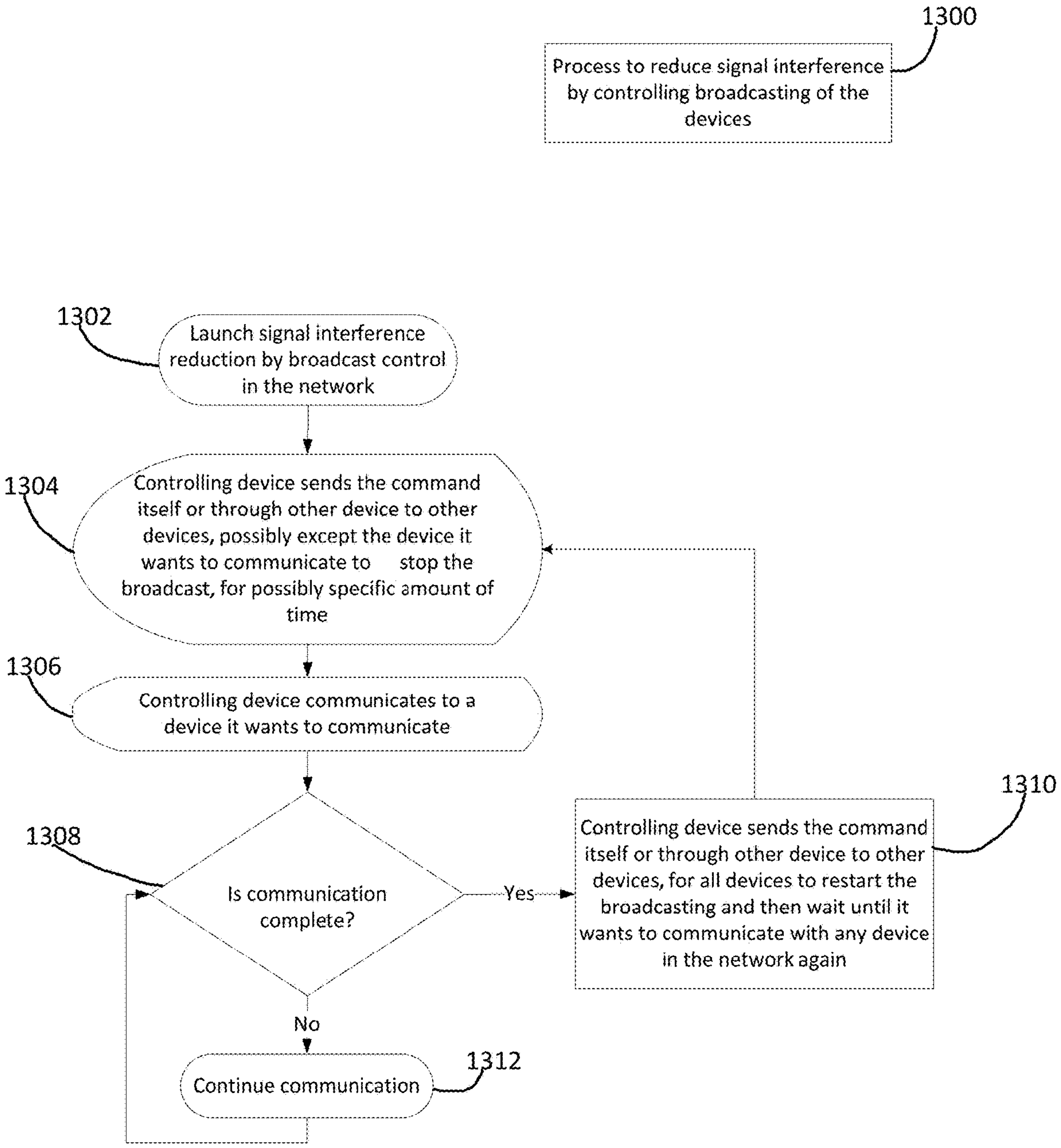
FIG. 13 is a flow chart of a process to reduce signal interference by controlling broadcasting of the wireless devices in accordance with one embodiment of the present invention.

Referring now to FIG. 13, a flow chart of a process 13 to reduce signal interference by controlling broadcast communications of the wireless devices in accordance with one embodiment of the present invention is shown. In various protocols such as Bluetooth 4.0, the devices are broadcasting to form or keep a network or be able to communicate with other devices. When the number of devices in the vicinity is large, the interference in the network is high causing weaker communication link between the devices. In such cases, controlling devices, such as smartphones, cannot efficiently communicate or control the devices. Consider a scenario, where controlling device wants to send data to a particular device in the network. In such case, it can first directly or through a connected device, broadcast a command to all the devices in the vicinity to stop broadcasting, except for any device(s) it wants to communicate with. This reduces the interference in the network and allows the controlling device to easily communicate with the device it wants to. There are two possible cases in such network. In the first case, the devices are required to broadcast to be able to connect and communicate with other devices. The stop broadcast from the controlling device could be for a specified period of time. For example, the controlling device sends command itself or through connected device(s) to stop broadcast for four seconds, an estimated time it requires to communicate with the device it wants to. In the second case, the devices can be only in listening mode and can connect to other device when other device initiates the communication. The broadcast can be initiated only when the controlling device sends a command to these devices, and also possibly for specific period of time.

The signal interference reduction process 1300 by broadcast control in the network is launched in block 1302. The controlling device sends the command itself or through another device to other devices to stop broadcasting in block 1304. The command may not be sent to devices that the controlling device wants to communicate with. Note that the stop broadcasting commence may be for a specific amount of time or some other triggering event. The controlling device then communicates to any devices that it wants to communicate with in block 1306. If the communication is complete, as determined in decision block 1308, the controlling device sends the command itself or through another device to the other devices for all the devices to restart broadcasting and then wait until it wants to communication with any device in the network again in block 1310. When the controlling device wants to communicate with another device, the process loops back to block 1304 where the stop broadcast command is sent. If, however, the communication is not complete, as determined in decision block 1308, the communication is continued in block 1312 and the process loops back to decision block 1308 to determine whether the communication is complete.

For example, two or more wireless devices can be controlled by providing the two or more wireless devices, and a controlling device communicably coupled to the at least one of the two or more wireless devices via one or more wireless network connections. Each wireless device includes a controller/processor, a wireless transceiver circuit communicably coupled to the controller/processor and an antenna communicably coupled to the wireless transceiver circuit. A broadcast signal is periodically sent from each wireless device. A stop broadcast signal is sent from the controlling device to all of the two or more wireless devices except for one or more specified wireless devices. One or more communications between the controlling device and the specified wireless device are exchanged. A resume broadcast signal is sent from the controlling device to all of the two or more wireless devices after the one or more communications between the controlling device and the specified wireless device are completed. An additional step may include selecting the one or more specified wireless devices. Note that the stop broadcast signal may have a specified duration or expiration.

Resumable firmware updates will now be described. A processor in any wireless device or system can have internal and/or external memory, such as RAM and/or flash memory, as part of the same or different Integrated Chip (IC), where software program also known as firmware can be stored or run. Consider a scenario where multiple similar types of wireless systems those can communicate with each other and another wireless or wired device having the ability to control the system as a part of a bigger wireless system. Many times, the wireless systems need to be updated with a new firmware. Here one wireless system can be updated with the wireless or wired device and now the updated wireless system can program other wireless system and in turn they can updated remaining wireless systems in a chain reaction. This can happen automatically without any user interference where two wireless systems communicate with each other find out if one of them have lower firmware version that needs to be updated and initiate the firmware update accordingly. Here the firmware update can be unsuccessful for various reasons such as the system is powered off in the middle of the update or systems get disconnected due to low wireless signal strength or signal interference because of multiple other wireless systems and devices. In such situation resumption of an update at a later stage is required that is automatic and without the requirement of any user intervention also called here as resumable firmware update now on. To achieve such implementation of resumable firmware update, a few specific programs/algorithms need to be part of the firmware as below.

Each firmware version will have a specific number based on which the systems will understand if it or the other it is communicating with has lower firmware version that needs to be updated. This firmware version may not change until the firmware update is successfully completed, i.e., one wireless system with lower firmware version gets higher firmware version from the other. Another requirement for the resumable firmware update is that the memory in which the firmware is running the processor and its applications is in a separate section of the processor memory or in a totally separate internal or external memory called as a primary memory than the other memory called as a secondary memory where programs or new firmware can be stored. This way the system ensures that the existing lower version firmware is always there to run the processor until updated with the newer version of the firmware. The firmware update can take place in two ways. In the first way, there could be two steps: (1) the new firmware gets copied first in the secondary memory first, and (2) the processor in the system replaces its lower version firmware with the new firmware internally. In the second way, where the secondary memory is limited, and/or there are two parts of the firmware, an application firmware which holds the actual application processing algorithm and the standard part such as bootloader which holds the standard algorithms of firmware update, basic protocols, etc., there could be two steps: (1) Only the part of the firmware which is application firmware is deleted. (2) The standard firmware part (also sometimes bootloader) is kept same and it updates the empty memory with the new application firmware.

When the new firmware is getting copied from one wireless device to other wireless device (also referred to as a copying process herein), there is a possibility that this process breaks for any reason, such as one of the devices is powered off, weak communication link between the devices, wireless device breaks the link to perform any higher priority task, etc. In such situation, the copying will get completed to only a certain percentage, and resumption of this copying process is required. The resumption can happen multiple times from one of the following three options: (1) same two wireless devices when establishes the communication link, they resume the firmware update from where they left before; (2) any other wireless device with the latest firmware version when establishes the communication link with the device that needs to be updated fully can start the firmware update process from the part where the previous device left the firmware update process; or (3) the controlling device when establishes the communication link with the device that needs to be updated fully can start the firmware update process automatically or based on the user inputs.

In any of the above cases, one needs to ensure that the resumption process starts at a stage where it was left before and there are important steps to achieve this. First, the firmware version is not changed until the firmware update process is complete so that whenever one wireless device can know if the other device needs firmware update or not. Second, whenever the firmware update is halted the device that is getting the update ads or changes one parameter in its memory that states to what extend the firmware update is complete or what point it needs to restart at. Third, before any other device with the latest firmware starts updating the firmware of the device with lower version it reads the parameter said above and then starts the firmware update from that point forward. Fourth, the above process can reoccur multiple times until the firmware update process is complete.

Consider scenarios where multiple and various types of wireless devices are present. When such number of wireless devices are available and especially when they are not directly connected to cloud through Internet or any other communication link, updating firmware to these devices becomes difficult task. However, if these devices are working on similar protocols, it is possible to update each other's firmware irrespective of their application or differences in their hardware structures and requirements. The wireless system that consists of different wireless devices with different functionality can be recognized with their firmware number or a parameter set as a part of the firmware residing in the memory. This parameter can also be set based on a hardware configuration difference that is connected to the processor.

Each firmware has at least one of these parts: (1) a protocol stack that can be common for various devices, which defines how one device communicates with other devices, stores in the memory and executes certain parts of the application; and/or (2) an application firmware to carry out the functionality of the device.

Many wireless devices could have limited memory so that they can store only their applications and part of the protocol stack that is required for its functionality. However, a wireless device with larger memory can store broader protocol stack and application for itself and other devices. In such cases, it will become important during the firmware update that the limited memory device gets the firmware that has updated protocol stack and/or updated application. Following steps can achieve this:

1. Higher memory wireless device (HMWD) gets updated firmware from control device as explained before.
2. When HMWD communicates with Limited Memory Wireless Device (LMWD), it confirms whether LMWD needs to be updated based on their firmware versions.
3. The HMWD understands and confirms the application (s) the LMWD needs to be updated. This can be achieved with the following implementations:
   a. The LMWD and HMWD have parameters set in their respective memories such as application ID that defines their current application version.
   b. This ID gets updated as the device gets updated firmware version.
   c. HMWD has application IDs for various LMWDs with which it can decide if it can provide the update to LMWD.
4. HMWD updates the LMWD's firmware through a firmware update process explained before if LMWD has a lower firmware version and HMWD has higher firmware version for the stack and/or application.

In many cases, the similar category wireless devices (WD) have applications pretty similar expect small change required in the application or few parameters. With this even one LMWD can update the firmware of other LMWD as long as it won't put any constraint on the memory. In such situation, different LMWDs in the same category may even have same firmware with the same protocol stack and same application. However, they use different part of the application they are running based on the differentiation of their IDs or hardware. This differentiation can be achieved as below.

1. The WD of the same category will have a different application ID than the other type WD in the same category. With this the WD can run an application that it is supposed to. In other words, it will use part of the application that is associated with that particular application ID.
2. There could be a slight variation in the hardware itself such as there could be a jumper resistor on one of the I/O pins of the processor that is connected to the ground or positive voltage signifying digital 0 or 1 respectively, which is not the case in other same category WD. When WD is powered ON, the firmware can first read the input of this I/O pin that and based on that decide what part of the application needs to be used. Reading the I/O pin input and deciding on what part of the application to be used would be a part of the firmware itself.

A process for proactive scanning in accordance with one embodiment of the present invention will now be described. For one type of wireless devices such as BLE devices/Bluetooth Scan can optimized with other wireless or wired technology such as WiFi network as well as the location awareness based on GPS or indoor navigation system. It will be explained in BLE proactive scanning of BLE devices with respect to WiFi network below.

Figure 14:
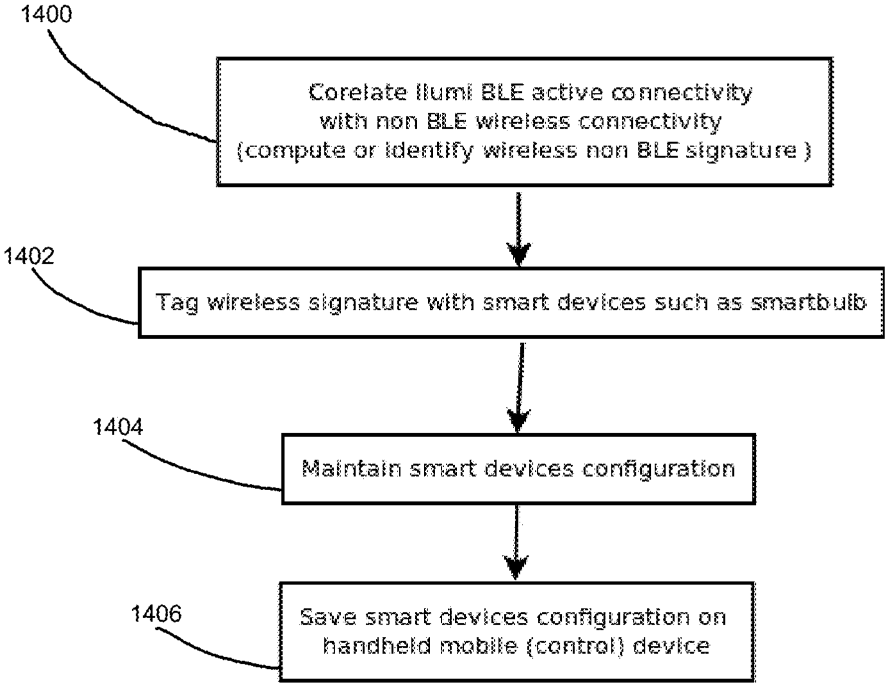
FIG. 14 is a flow chart of a tagging process in accordance with one embodiment of the present invention.

When the user is at home (or any location) where there are BLE devices such as smartbulbs available and connectible over Bluetooth, typically there is also a WiFI connection that the mobile device is connected with, which is identifiable by its SSID (unique identifier). By tagging such the WIFI SSID (unique identifier) with a set of BLE devices that are likely to become reachable over BLE as shown in FIG. 14, whenever the mobile device is reachable over WiFi, the scanning, connectivity and control can be optimized. Ilumi BLE active connectivity is correlated with non BLE wireless connectivity (compute or identify wireless non BLE signatures) in block 1400. The wireless signatures are tagged with smart devices, such as smartbulbs, in block 1402. The configuration of the smart devices is maintained in block 1404. The configuration of the smart devices is saved on the handheld mobile (control) device in block 1406.

Figure 15:
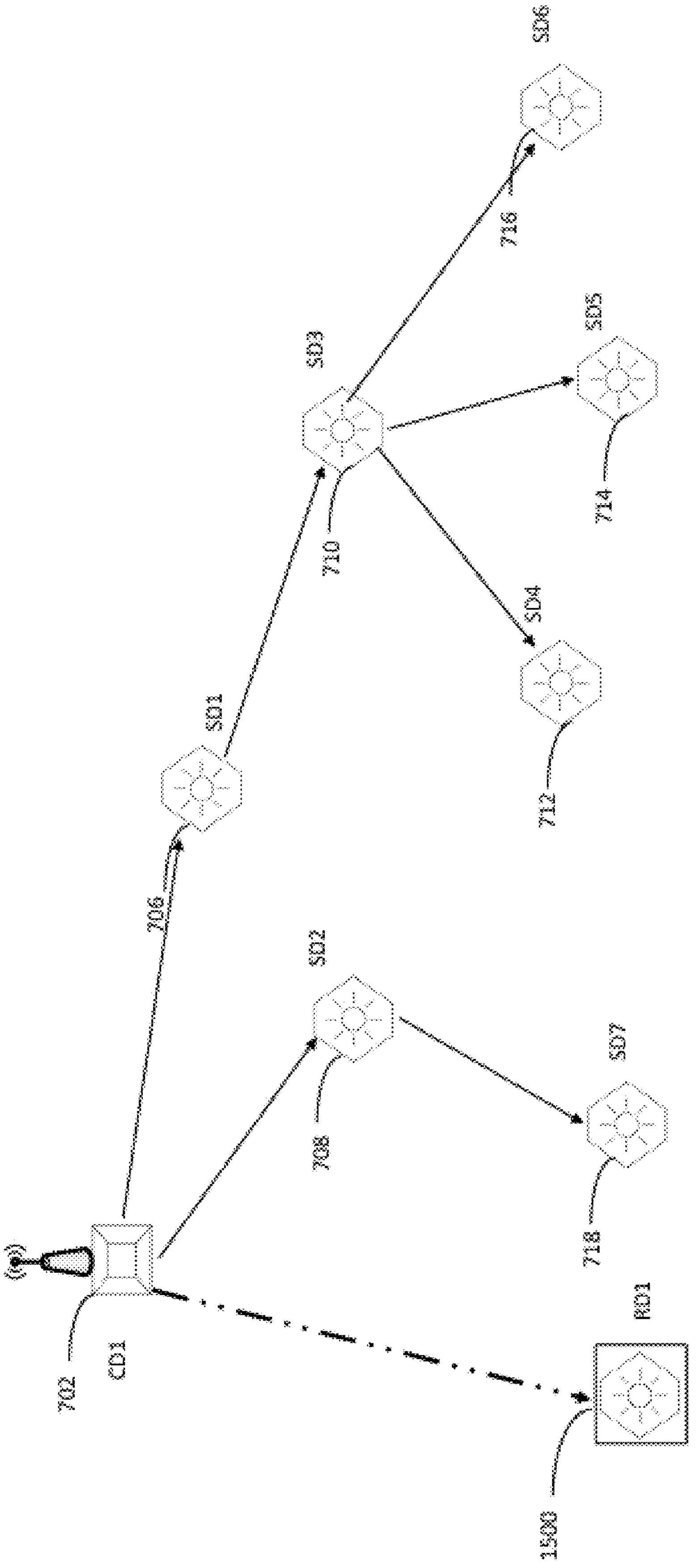
FIG. 15 is a block diagram of a wireless network of devices illustrating a multiple protocol process in accordance with one embodiment of the present invention.

For instance, the user can set a rule that the BLE devices be turned on when the user arrives home (without having to start the app on the controlling device such as smartphone). In order to optimize power consumption on the control device and avoid performing BLE scans when the control device and the BLE devices are not in BLE range, the user of the Wi-Fi connectivity status serves as a trigger. For example and as shown in FIG. 15, CD1 702 has two wireless protocols, say Wi-Fi and BLE. The Wi-Fi protocol can be kept ON continuously and when CD1 702 finds RD1 1500 (Router Device 1), in the same vicinity where other smart devices SD1 to SD7 (706-718) with BLE protocol are present, it triggers to turn the BLE turn on in itself and form a network to connect to all the smart devices from SD1 to SD7 (706-718).

Figure 16:
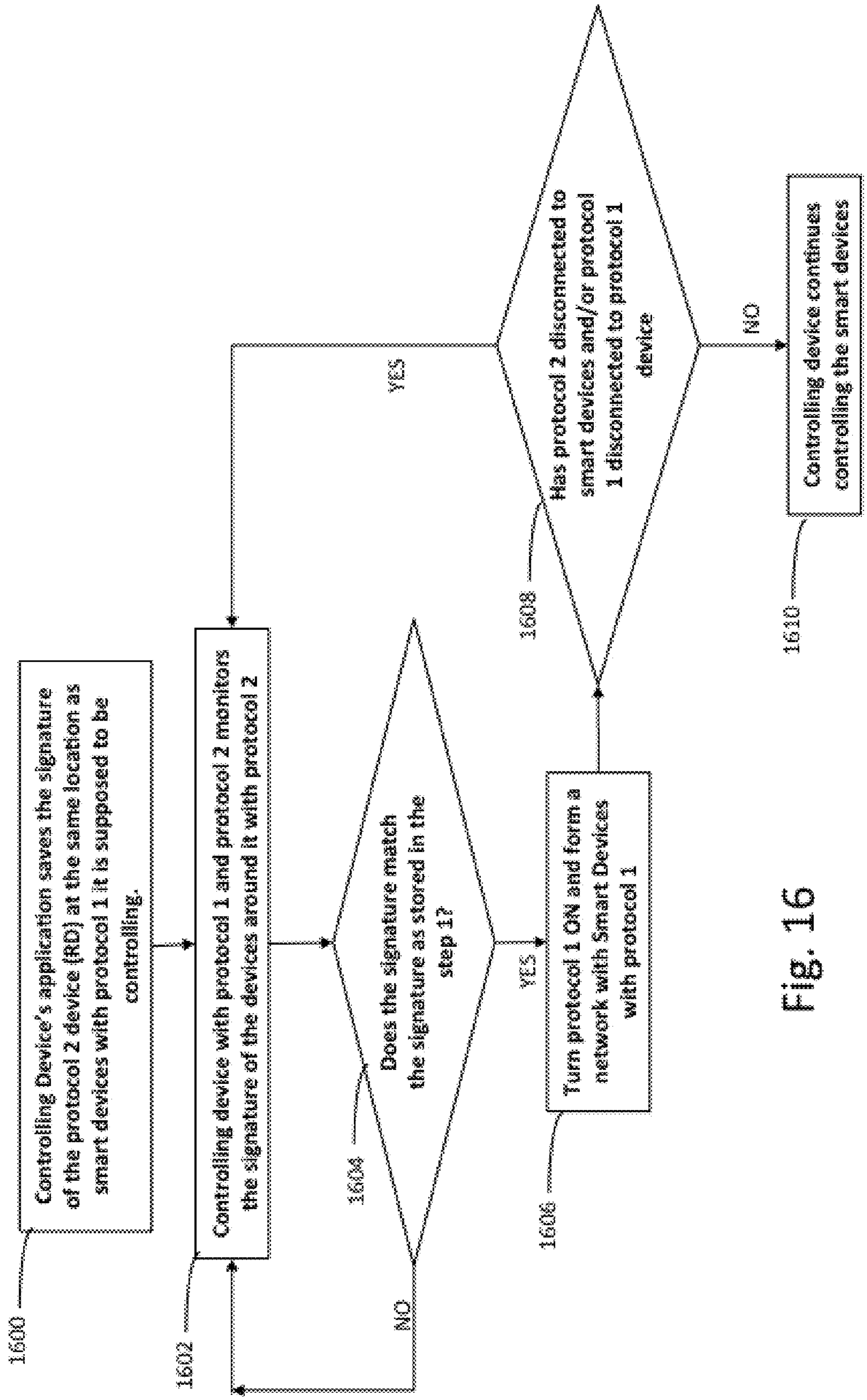
FIG. 16 is a flow chart of a multiple protocol process in accordance with one embodiment of the present invention.

The process is illustrated in FIG. 16. The application of the controlling device CD1 702, having two or more protocols, saves the signature of at least one other protocol, such as protocol 2 device RD1 1500, at the same location as the smart devices with protocol 1 that it is supposed to be controlling in block 1600. The controlling device CD1 702 having protocol 1 and protocol 2 monitors the signatures of the devices around it with protocol 2 as per the application requirement in block 1602. If the monitored signature does not match the saved signature, as determined in decision block 1604, the process loops back to block 1602 to monitor the signatures. If, however, the monitored signature matches the saved signature, as determined in decision block 1604, the controlling device CD1 702 turns protocol 1 ON and forms a network with the smart devices SD1 to SD7 (706-718) with protocol 1 in block 1606. If the controlling device CD1 702 becomes disconnected from the protocol 2 device RD1 1500 and/or the protocol 1 smart devices SD1 to SD7 (706-718), as determined in decision block 1608, the process loops back to block 1602 to monitor the signatures. If, however, the controlling device CD1 702 has not become disconnected from the protocol 2 device RD1 1500 and the protocol 1 smart devices SD1 to SD7 (706-718), as determined in decision block 1608, the controlling device CD1 702 continues controlling the smart devices SD1 to SD7 (706-718) in block 1610.

For example, two or more wireless devices are controlled by providing the two or more wireless devices that communicate using a first protocol, and a controlling device that communicates using the first protocol and a second protocol. The controlling device has a stored second protocol device signature associated with a location proximate to the two or more wireless devices. Each wireless device includes a controller/processor, a wireless transceiver circuit communicably coupled to the controller/processor and an antenna communicably coupled to the wireless transceiver circuit. Any wireless routing devices or access devices that communicate using the second protocol and have a device signature that matches the stored second protocol device signature are detected. One or more network connections between the controlling device and the two or more wireless devices are established using the first protocol whenever the device signature of the detected wireless routing device or access device matches the stored second protocol device signature, and thereafter the two or more wireless devices are controlled using the controlling device. Additional steps may include associating the two or more wireless devices with the second protocol device signature of the wireless routing device or access device proximate with the location, and storing the second protocol device signature, repeating the detection of any wireless routing devices or access devices whenever the controlling device is disconnected from the wireless routing device or access device associated with the location or the two or more wireless devices, and/or turning the first protocol communication ON whenever the device signature of the detected wireless routing device or access device matches the stored second protocol device signature.

Figure 17:
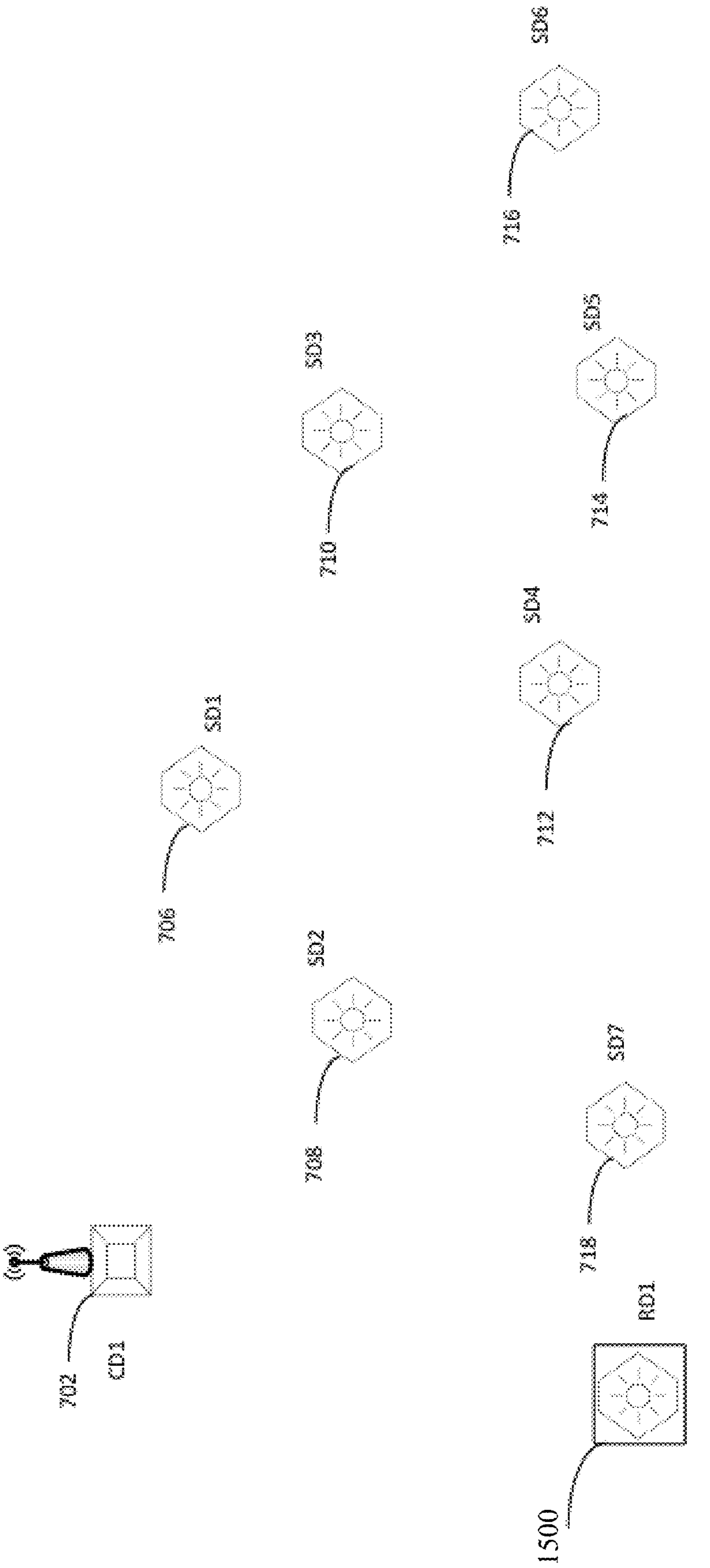
FIG. 17 is a block diagram of devices illustrating detecting an intruder in accordance with one embodiment of the present invention.

Now proximity sensing using a change in the signal strength between various wireless devices will be explained in reference to FIG. 17. There are multiple wireless devices SD1 to SD7 (706-718) in a given network at a given location. Each device SD1 to SD7 (706-718) broadcasts a wireless signal, such as its identification number, which can be picked up by another device in the network. Similarly, such a signal can also be transmitted by the later device and picked up by the earlier device. The signal strength between two wireless devices is usually measured with a parameter RSSI (Received/Radio Signal Strength Indicator). A wireless device can provide a specific number in a signal strength unit, such as decibel-milliwatts (dbm), for another wireless device that indicates the signal strength between those two devices. These devices can be any device using a wireless protocol. The signal strength changes as environmental parameters such as temperature, humidity, noise due to other living and non-living things, noise due to electronic, electrical and magnetic devices change. However, an assumption can be made that at a particular time frame and particular environmental conditions, the RSSI value between two wireless devices should be a given fluctuation range, ideally constant.

The wireless signal strength fluctuates more as the signal is either absorbed, reflected or scattered because of external phenomenon. These phenomena could be anything, such as sudden change in the temperature, sudden addition or subtraction of wireless noise of external things, etc. Even the human body entering into a vicinity of the networked devices could cause such a sudden change as the water in the body would absorb some signal strength, other chemical compositions of the body could absorb, scatter or reflect the wireless signal. This affects the RSSI between two wireless devices. This can be used as an intruder detection or motion detection application, especially in a closed vicinity of two or more wireless devices having the same protocol or ability to talk to each other or with the ability to measure the signal strength between each other.

Figure 18:
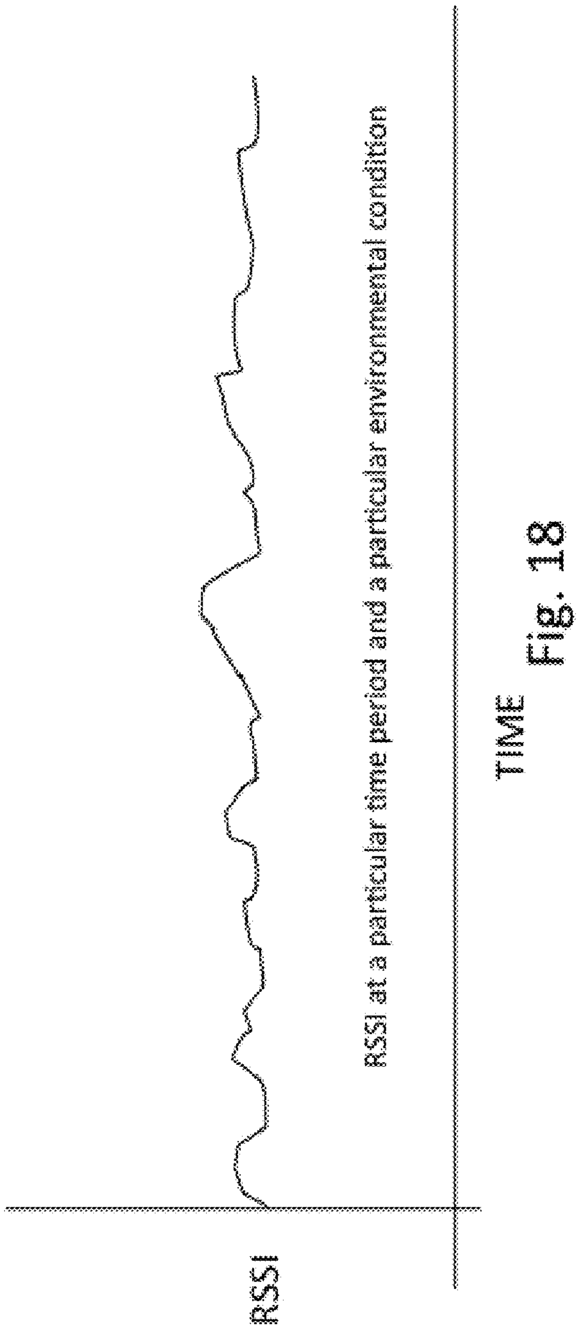
FIG. 18 is a graph illustrating RSSI values at a particular time period and environmental condition in accordance with one embodiment of the present invention.
Figure 19:
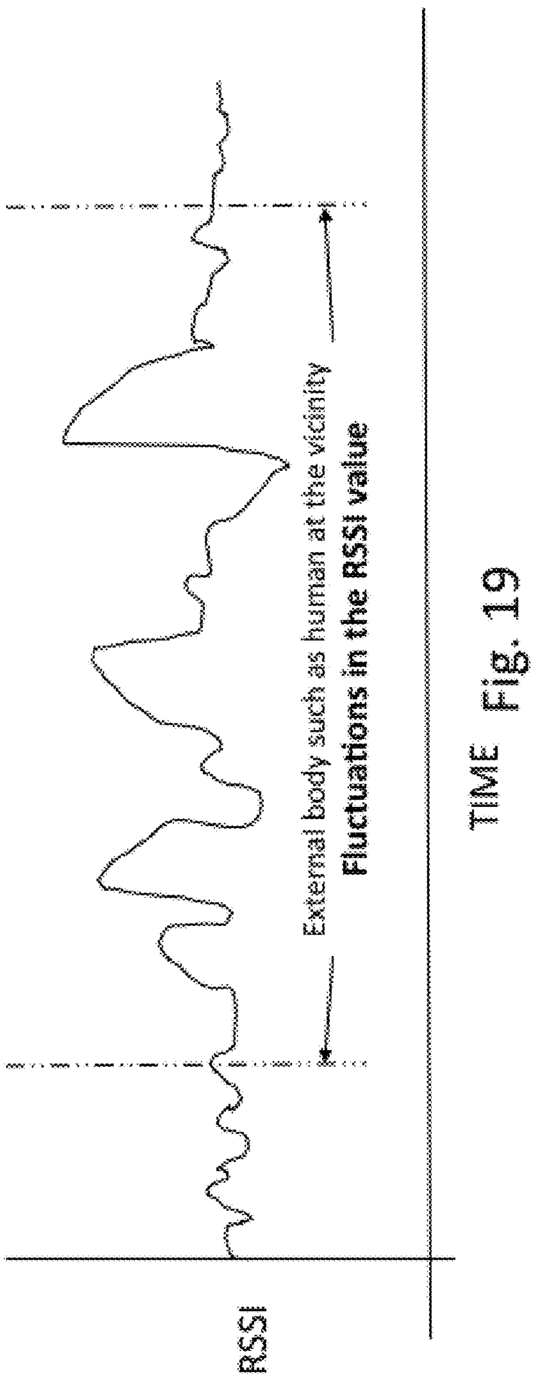
FIG. 19 is a graph illustrating RSSI values when an external body, such as a human, is in the vicinity in accordance with one embodiment of the present invention.

Consider for example smart devices SD1 706 and SD4 712. The signal strength graph between these devices is illustrated in FIG. 18 for a particular short period of time and at a particular environmental condition. A small fluctuation in the RSSI values can be seen. However, when the environment changes suddenly, such as when a human being enters between SD1 706 and SD4 712, the fluctuations in the RSSI values are much greater as shown in FIG. 19. With that we can say that the standard deviation in the RSSI values in that duration as in FIG. 19 is much higher as compared to that is FIG. 18 without human presence. This change in fluctuations can be used in presence, motion or intruder detection.

Figure 20:
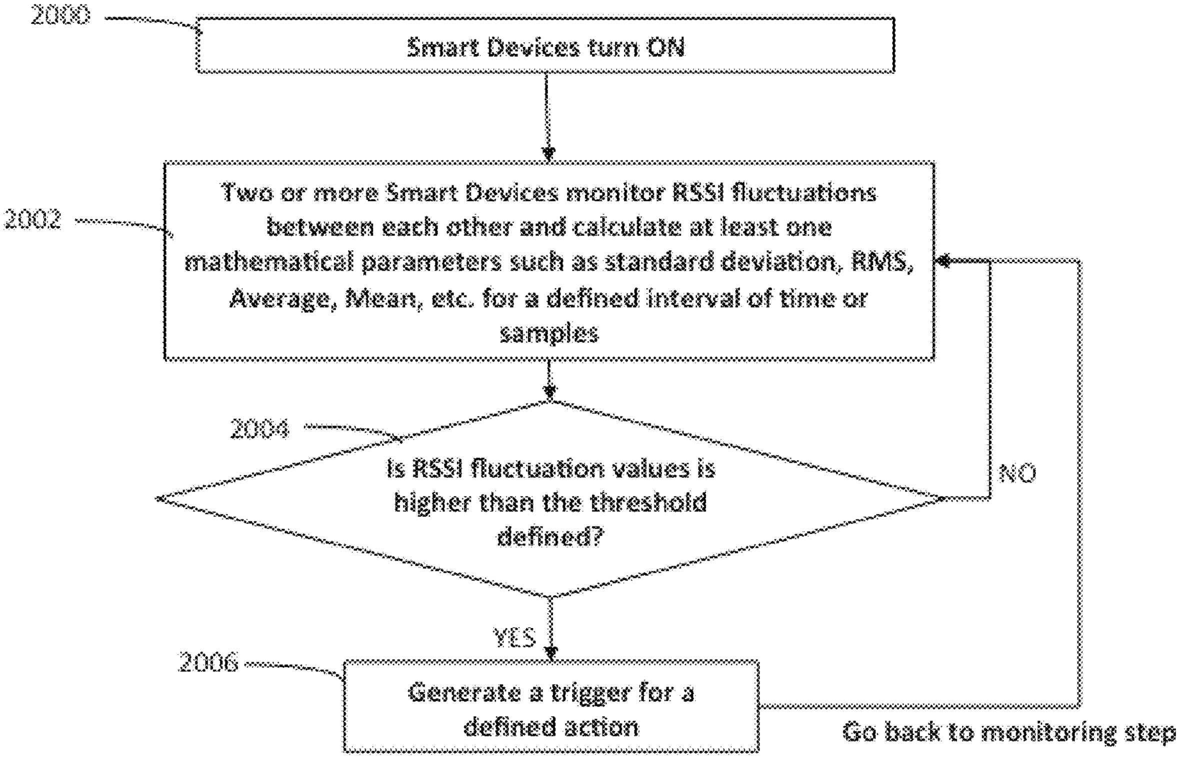
FIG. 20 is a flow chart of a process for detecting an intruder in accordance with one embodiment of the present invention.

Now referring to FIG. 20, a process for detecting a presence, motion or intruder using a network of wireless smart devices is shown. The smart devices are turned ON in block 2000. Two or more smart devices monitor RSSI or other signal strength fluctuations between each other and calculate at least one mathematical parameter, such as standard deviation, root mean square (RMS), average, mean, other such mathematical value(s), etc., for a defined interval of time or samples in block 2002. If the RSSI or other signal strength measurement fluctuation values is higher than a defined threshold value for a defined minimum time period, as determined in decision block 2004, a trigger for a defined action, such as an alarm, a message or notification is sent, an automated call is made, etc., generated in block 2006. Thereafter or if the RSSI or other signal strength measurement fluctuation values is not higher than the defined threshold value, as determined in decision block 2004, the process loops back to block 2002 to continue monitoring the RSSI or signal strength fluctuations.

Figure 21:
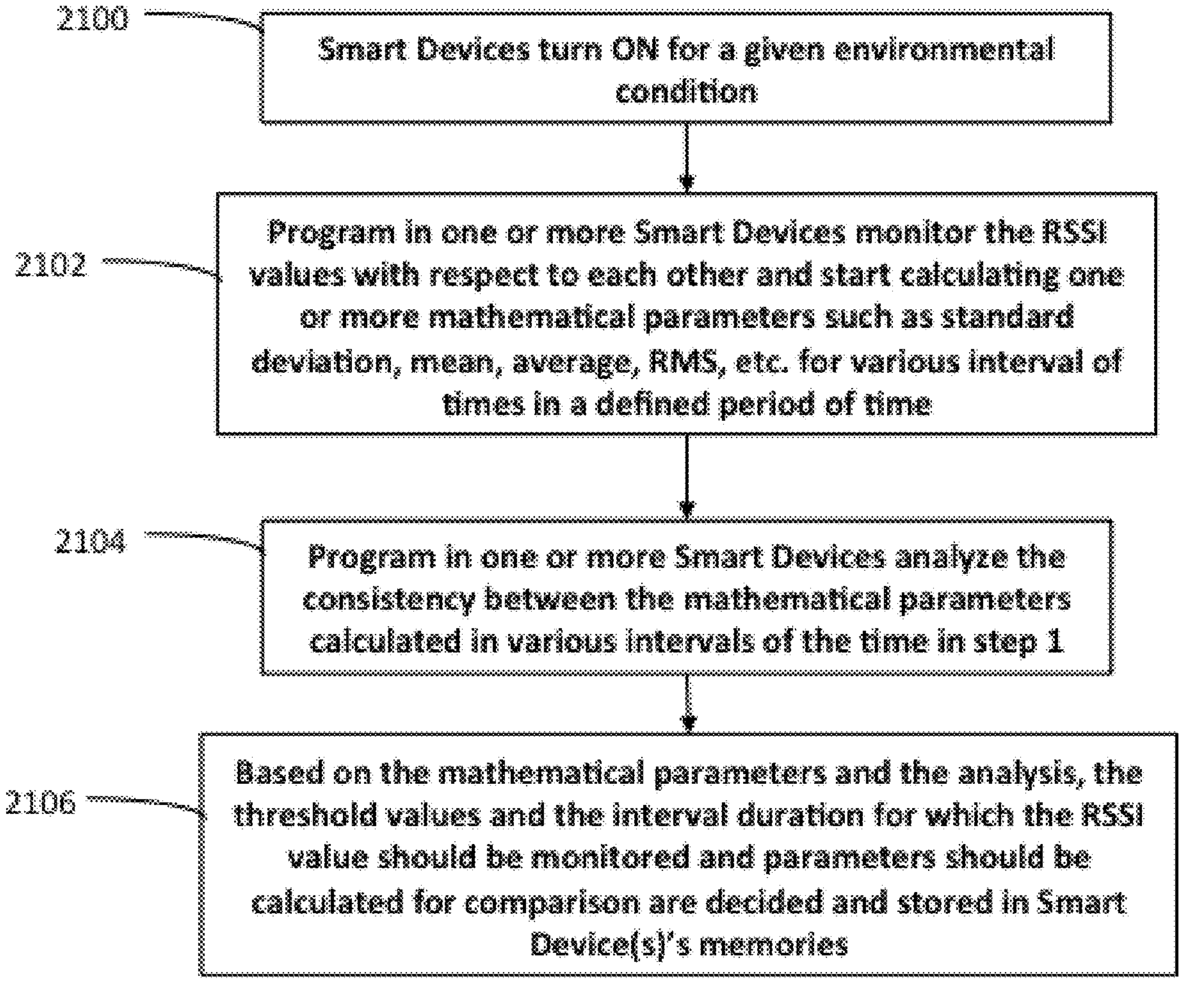
FIG. 21 is a flow chart of a process for calibrating an intruder detection process in accordance with one embodiment of the present invention.

The specified threshold and samples for calculation duration can be defined through a calibration process where smart devices when turned ON takes some time to find out threshold range of fluctuations of RSSI values and time period for which the RSSI parameters(s) such as standard deviation, average, etc. should be measured during actual monitoring to generate a trigger. The procedure to perform such a calibration is shown in FIG. 21. The smart devices are turned ON for a given environmental condition in block 2100. One or more smart devices are programed to monitor the RSSI values with respect to each other and start calculating one or more mathematical parameters, such as standard deviation, mean, average, RMS, etc. for various interval of times in a defined period of time in block 2102. One or more smart devices are programmed to analyze the consistency between the mathematical parameters calculated in various intervals of the time in block 2104. Based on the mathematical parameters and the analysis, the threshold levels and the interval duration for which the RSSI value should be monitored and parameters should be calculated for comparison are decided and stored in the smart device(s)'s memories in block 2106. Actual RSSI value monitoring starts and parameters calculations also start. When parameters exceed the threshold values for a defined duration, the trigger is generated for a defined action.

Referring back to the FIG. 17, if an intruder is between SD1 706 and SD4 712, then the RSSI values of SD1 706 and SD2 708 with respect to each other would fluctuate beyond the threshold defined for them. However, there would be a lower fluctuation in RSSI values for SD1 706 and SD7 718. Similarly, there would be a further lower fluctuation in RSSI value for SD1 706 and SD3 710 with respect to each other. However, if the intruder is at a point equidistant from SD1 706, SD3 710, and SD4 712, then the RSSI fluctuation for SD1 706, SD3 710 and SD4 712 would be similar with respect to each other as compared to RSSI value for SD1 706 and SD7 718. With such information, the intruder can be detected at a given location more precisely.

Also the re-calibration can keep happening automatically to adjust the threshold values and the interval times or samples with an analysis of a pattern of RSSI values being measured continuously. Also, the calibration can be done by a user at the actual location or by the manufacturer or installer at other location and use empirical threshold and interval values.

Figure 22:
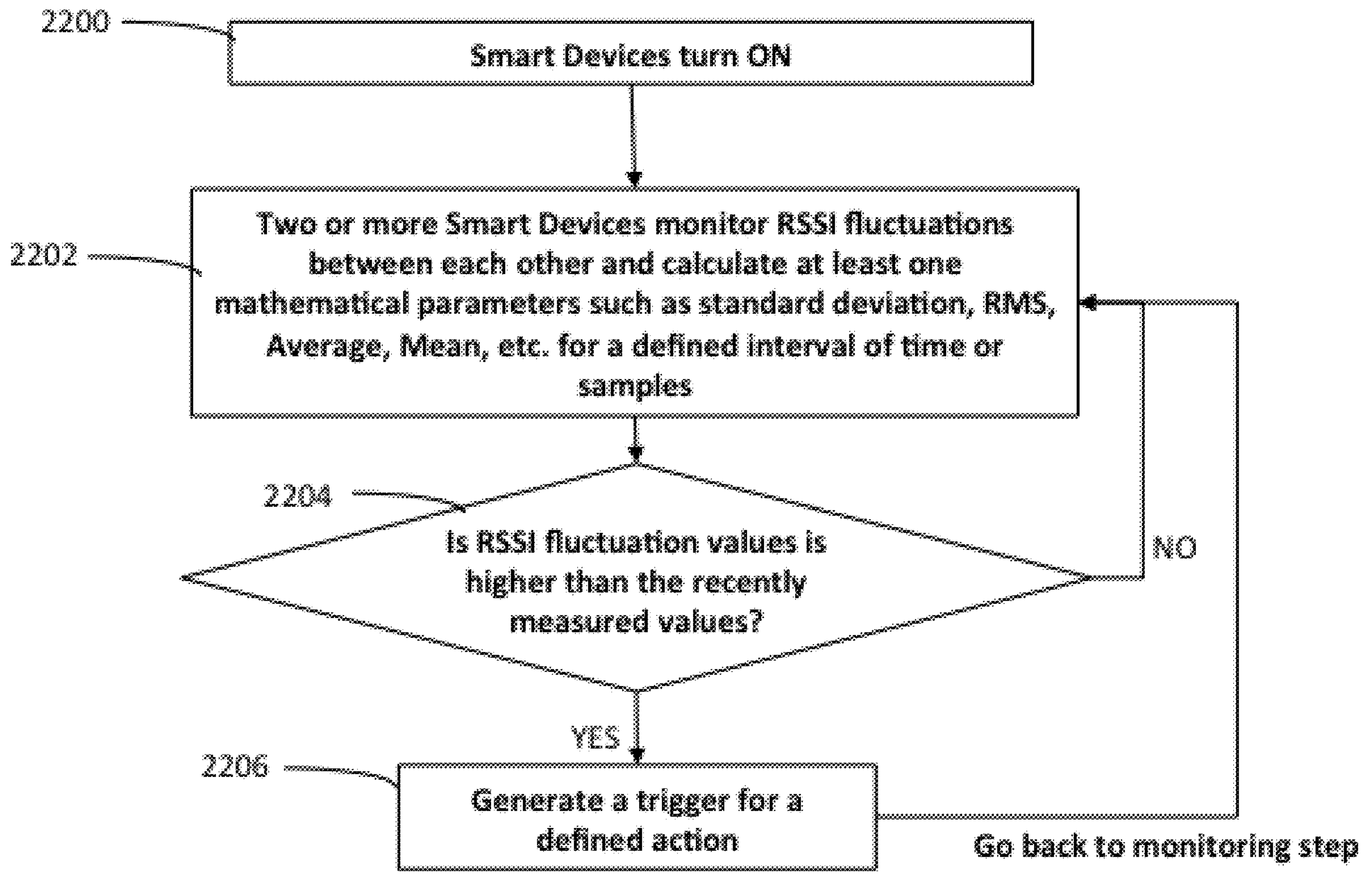
FIG. 22 is a flow chart of a process for detecting an intruder without needing calibration in accordance with one embodiment of the present invention.

Another way to find an intruder's presence without needing calibration is shown in FIGS. 21 and 22. The smart devices are turned ON for a given environmental condition in block 2100. The smart devices start measuring the signal strength parameters, such as RSSI values, and starts calculating one or more mathematical parameters, such as standard deviation, mean, average, RMS, etc., for various intervals of time within a defined time period in block 2102. The smart devices analyze the consistency between the calculated mathematical parameters in block 2104. Based on the mathematical parameters and the analysis, the threshold values and interval duration for the RSSI value should be monitored and the parameters should be calculated for comparison are decided and stored in the smart device memories in block 2106.

The smart devices are turned ON in block 2200. Two or more smart devices monitor RSSI or other signal strength fluctuations between each other and calculate at least one mathematical parameter, such as standard deviation, root mean square (RMS), average, mean, other such mathematical value(s), etc., for a defined interval of time or samples in block 2202. If the RSSI or other signal strength measurement fluctuation values is higher than the recently measured values, as determined in decision block 2204, a trigger for a defined action, such as an alarm, a message or notification is sent, an automated call is made, etc., generated in block 2206. For example, when there is a drastic change, such as 40% more in the value as compared to recently measured values, such as the previous five measured values for an example, the trigger is generated to take a predefined action. The action can also include activating wireless devices other than the wireless devices which generated a trigger to start the communication with one another. For example, if SD1 706 and SD4 714 are the only devices monitoring the RSSI values between them and generating a trigger when the fluctuation value exceeds, while other devices SD2 708, SD7 718, SD3 710, SD5 714 are idle or with wireless communication OFF or wireless communication limited with reduced signal strength or less active in terms of time duration, the trigger generated by SD1 706 or SD4 714 could be to activate the one or more of other devices SD2 708, SD7 718, SD3 710, SD5 714 to activate their communication with other devices in the vicinity. This process will help in reducing the overall power required for wireless communication of all the devices in the vicinity by having them active only when user is present. Thereafter or if the RSSI or other signal strength measurement fluctuation values is not higher than the recently measured values, as determined in decision block 2204, the process loops back to block 2202 to continue monitoring the RSSI or signal strength fluctuations. With this procedure, calibration is not required and the environmental change is automatically adjusted or filtered with such differential mathematical approach. A sensitivity value for generating the trigger can also be adjusted by the user as and when required which in turn adjusts the threshold values or percentage change as described above. In the above description, RSSI is one type of signal strength measurement unit and there could be different units or parameters that can be used for the same purpose.

For example, a movement or position of an object is detected between at least a first wireless device and a second wireless device by providing the first and second wireless devices, wherein each wireless device comprises a controller/processor, a wireless transceiver circuit communicably coupled to the controller/processor and an antenna communicably coupled to the wireless transceiver circuit. A signal strength between the first wireless device and the second wireless device is monitored as measured by the first wireless device, the second wireless device, or both. A signal strength fluctuation value for the signal strength is determined over a time period or a number of signal strength samples. A trigger for a defined action is generated whenever the signal strength fluctuation value exceeds a defined threshold. Note that the object can be a person or an animal, and the signal strength fluctuation value for the signal strength can be determined using a standard deviation, root mean square, average, mean or combination thereof. The defined threshold can be determined based on a calibration process or one or more recently measured signal strength fluctuation values. In addition, the defined action may include activating one or more other wireless devices at a location for communicating with either or both of the first and second wireless devices.

Figure 23:
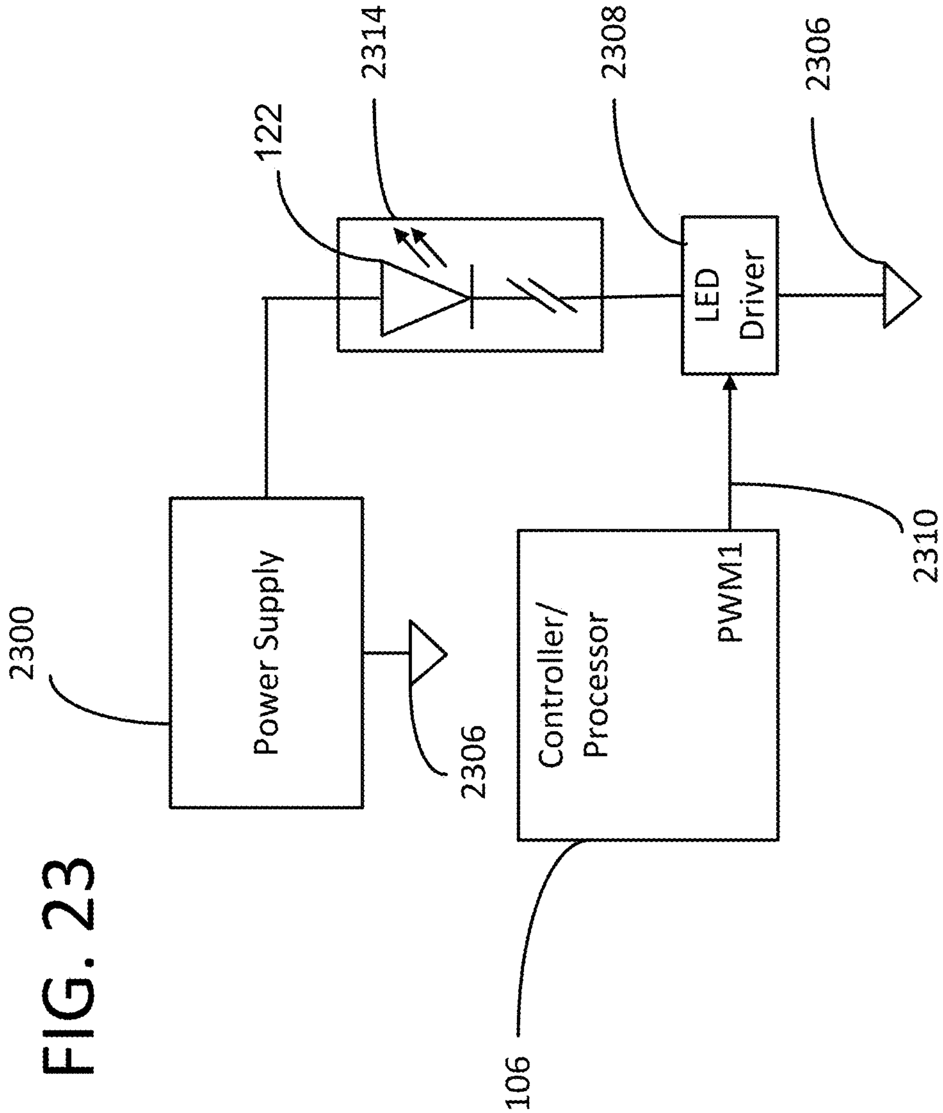
FIG. 23 is a circuit diagram of a single LED arm with single LED in accordance with one embodiment of the present invention.

Referring now to FIG. 23, a circuit diagram of a single LED arm 2314 with single LED(s) 122 in accordance with one embodiment of the present invention is shown. The LED arm 2314 is electrically connected to the power supply 2300 and the LED driver 2308. The power supply 2300 and LED driver 2308 are also connected to the ground or negative terminal 2306 of the power supply 2300. In certain embodiments, the controller/processor 106 might send multiple PWM signals 2310 to multiple LED drivers 2308 to control the current passed through to multiple LED arms 2314. In these cases, the LED current control circuit 120 would allow to similarly change the overall brightness or luminosity of the II Device 140, but also adjust the color and/or saturation of the light emitted from the II Device 140. In this latter case of controlling color and saturation the LED arms 2314 would need to be of different colors that could create different colors when mixed at different levels. The LED arm 2314 can have warm yellow or other colors/types of LEDs 122.

Now referring to FIG. 24, a circuit diagram of a solely LED Drivers scheme in accordance with one embodiment of the present invention is shown. For illustrative purposes, consider here four PWM signals (2426, 2428, 2430, 2432) sent from the controller 106 annotated as PWM1 2426, PWM2 2428, PWM3 2430 and PWM4 2432 and four associated LED drivers annotated as LED Driver1 2418, LED Driver2 2420, LED Driver3 2422 and LED Driver4 2424. In addition, consider four LED arms, LED arm1 2402 with red LEDs 2410, LED arm2 2404 with green LEDs 2412, LED arm3 2406 with blue LEDs 2414, and LED arm4 2408 with white LEDs 2416. Based on established color mixing principals, the variation in the luminosity of these four colors could produce all color combinations. To achieve this variation, the controller 106 could vary and alternate the length of time that the PWM signals (2426, 2428, 2430, 2432) are sent to the LED drivers (2402, 2404, 2406, 2408). This would create variations in lengths of time when the LED drivers (2402, 2404, 2406, 2408) would receive PWM signals (2426, 2428, 2430, 2432). The length of time would also allow for a similar control in the overall brightness of the luminosity produced by the II Device 140 in addition to the control provided by variations of the duty cycle of the PWM signal itself.

Similarly, variations in the length of time that the controller 106 would alternatively send each PWM signal (2426, 2428, 2430, 2432) to the respective LED driver (2418, 2420, 2422, 2424), which would control the current passed through to the respective LED arm (2402, 2404, 2406, 2408), would also provide for a combinatory control of the average luminosity produced by each LED arm (2402, 2404, 2406, 2408) and thus allow for control of color and saturation of the light produced. The frequency of PWM signals (2426, 2428, 2430, 2432) and the rate at which LED drivers (2418, 2420, 2422, 2424) receive the PWM signals (2426, 2428, 2430, 2432) from controller/processor 106 will be high enough (still within the LEDs' and LED Drivers' technical specifications) so that due to the persistence of vision, consumers would see a constant light output, for example a yellow light instead of fast switching alternate red and green light outputs. The scheme in alternating PWM signals (2426, 2428, 2430, 2432) does not allow for simultaneous PWM signals (2426, 2428, 2430, 2432) executed by the LED driver (2418, 2420, 2422, 2424) at the same time. This maximizes the potential average current passed through LEDs arms (2402, 2404, 2406, 308) and subsequent luminosity of each LED arm (2402, 2404, 2406, 2408) considering limited available current from the AC/DC converter 102. It allows for each LED arm (2402, 2404, 2406, 2408) to receive the full power provided by the AC/DC converter 102 and regulated by the LED driver (2418, 2420, 2422, 2424), such that when it is on all the available current could be sent through to the one LED arm.

To further illustrate these concepts, below is an example of how the solely LED driver scheme might work. Consider, the frequency of PWM signal is 2 KHz or total time period for one signal (one high and one low)=1/2 KHz=0.5 ms. Consider the duty cycle of each PWM1 2426 and PWM2 2428 is the same. The higher the duty cycle, the brighter the overall luminosity would be and vice-versa. Each LED driver (2418, 2420, 2422, 2424) is designed for a particular current level, i.e. when LED driver (2418 or 2420 or 2422 or 2424) is ON (when they get high signal from the controller 106), the current passing through the LED driver (2418, 2420, 2422, 2424) would be the lesser value of either the designed particular current level or the maximum current that power supply 2300 can provide. Assume that the luminosity created per unit of average current is the same for both the red LED arm 2402 and the green LED arm 2404. If in 4 ms cycles, the controller turns on the PWM1 and turns off PWM2 every first 2 ms and then turns off PWM1 and turns on PWM2 for the next 2 ms with PWM3 and PWM4 are off continuously, then, the overall light output would be yellow (mixture of Red and Green color light, each with same luminosity).

Referring now to FIG. 25, a timing diagram for the solely LED drivers scheme of FIG. 24 is shown. The clock signal 408 has a 0.5 ms cycle time. To produce a type of orange light which consists of 70% red and 30% Green light mixed together, PWM1/LED Driver1 400 should be ON for 70% of the cycle time (here, 70% of 4 ms=2.8 ms) and PWM2/LED Driver2 2502 should be ON for remaining 30% of the cycle time (here, 30% of 4 ms=1.2 ms). Similarly, to produce brighter shade of orange light which may consist of 50% RED, 20% Green and 20% White light together, PWM1/LED Driver1 2500 should be ON for 50% of the cycle time (here, 50% of 4 ms=2 ms), PWM2/LED Driver2 2502 should be ON for 20% of the cycle time (here, 20% of 4 ms=0.8 ms), PWM3/LED Driver3 2504 should be ON for 0% of the cycle time (here, 0% of 4 ms=0 ms), PWM4/LED Driver4 2506 should be ON for 20% of the cycle time (here, 20% of 4 ms=0.8 ms), and all PWM/LED Drivers (2500, 2502, 2504, 2506) should be OFF for the remaining 10% of cycle time (here, 10% of 4 ms=0.4 ms).

In a similar way, by varying PWM signal duty cycle for four LEDs Drivers (2418, 2420, 2422, and 2424) for a given PWM ON/OFF time cycle (4 ms in an example above), II Device 140 could produce any color with different shades. When duty cycle is 100% i.e. 100% ON and 0% OFF, the PWM/LED Driver1 2500 and PWM/LED Driver2 2502 are ON for 2 ms alternately every PWM ON/OFF cycle of 4 ms, II Device 140 will produce highest possible (100%) luminosity for the Yellow light. Thus the output luminosity can be varied by varying duty cycle of the PWM signals (2426, 2428, 2450, 2432) to LED drivers (2418, 2420, 2422, 2424), providing dimming feature to II Device 140.

The algorithm/program in the controller is such that, at a time only one LED Driver (here, 2500 or 2502 or 2504 or 2506) is given a PWM signal. This particular scheme is more useful when power supply has limited current output capability. With such algorithm one could achieve maximum luminosity for any color possible. For example, let's assume a power supply is rated at a maximum 15V/1 A output and all LEDs have rating of 1 A and LED drivers are designed for 1 A current. To achieve 100% luminosity output from RED LEDs, one has to pass 1 A current through RED LEDs Arm 2402 continuously. In this case, LED Driver1 2418 only will be given PWM signal for entire 4 ms of the PWM cycle and that too at 100% duty cycle. As against in other design if all four LED drivers are designed for ¼th of the possible supply of current i.e. ¼×1 A=0.25 A, maximum current will never exceed 0.25 A through any LED arm, and will thus limit the output luminosity of that particular LED arm.

The algorithm/Program makes sure that only one LED Driver (2418 or 2420 or 2422 or 2424) has its PWM signal ON at a time. To produce colors, program gives turns ON PWM signals to LED drivers (2418, 2420, 2422, 2424) in a serial manner i.e. alternately, fast enough so that due to persistence of vision, consumer sees the output light as a single defined color instead of flickering Red, Green, Blue or White lights.

Now referring to FIG. 26, a circuit diagram of switches (2600, 2602, 2604, and 2606) and LED driver 2608 scheme in accordance with one embodiment of the present invention is shown. In this scheme, the controller/processor 106 would send a Pulse Width Modulation (PWM) signal to one LED driver 2608 which would control the average current flowing through it. In addition, there would be a switch for every LED arm between the LED driver 2608 and each LED arm (2402, 2404, 2406, and 2408). The controller is connected to each switch (2600, 2602, 2604, and 2606) and can send an on/off signal for each. Considering an embodiment with four LED arms (2402, 2404, 2406, 2408) and subsequently four switches (2600, 2602, 2604, 2606), the controller 106 would send a signal to control Switch1 2600, Switch2 2602, Switch3 2604 and Switch4 2606, while also sending a PWM signal to the LED driver 2608 to allow current to pass through to the switches (2600, 2602, 2604, 2606). Variation in the average current passing through the LED driver 2608 controlled by variations in the PWM sent by the controller would increase or decrease the average current passing through to the subsequent LED arms (2402, 2404, 2406, 2408), thus controlling the overall brightness of the LEDs. The switches (2600, 2602, 2604, 2606) turning on or off, would be able to create different colors and saturation produced by the light. When a switch (2600, 2602, 2604, and 2606) gets high signal from the controller 106, it provides path for current to flow from LEDs in LEDs arms (2402, 2404, 2406, 2408) to LED driver 2608.

Considering the embodiment contains red, green, blue, and white LED arms (2402, 2404, 2406 and 2408 respectively), based on established color mixing principals, the variation in the luminosity of these four colors could produce all color combinations. To achieve this variation, the controller could vary and alternate the length of time that the switches are turned on. This would create variations in lengths of time when the LED driver 508 would pass through current to the LED arms and thus create variations in lengths of time when the LEDs produce light. The length of time would also allow for a similar control in the overall brightness of the luminosity produced by the II Device 140 in addition to the control provided by variations of the duty cycle of the PWM signal 2618 itself.

Similarly, variations in the length of time that the controller 106 would alternatively send each switch (2600, 2602, 2604, 2606), which would control the current passed through from the LED arms (2402, 2404, 2406, 2408) to the LED driver 2608, would also provide for a combinatory control of the average luminosity produced by each LED arm (2402, 2404, 2406, 2408) and thus allow for control of color and saturation of the light produced. The frequency of switch signals will be high enough (still within the LEDs' (2410, 2412, 2414, 2416) and LED Driver's 2608 technical specifications) so that due to the persistence of vision, consumers would see a constant light output, for example a yellow light instead of fast switching alternate red and green light outputs.

The scheme in alternating switch signals does not allow for simultaneous switches being on at the same time. This maximizes the potential average current passed through and subsequent luminosity of each LED arm (2402, 2404, 2406, and 2408) considering limited available current from the AC/DC converter 102 in the power supply 2300. It allows for each LED arm (2402 or 2404 or 2406 or 2408) to receive the full power provided by the AC/DC converter 102 and regulated by the LED driver 2608, such that when it is on all the available current could be sent through to the one LED arm (2402 or 2404 or 2406 or 2408).

To further clarify the scheme, consider the following example. A yellow light with no white light added into it can be produced by the controller turning Switch 1 2600 ON and Switch 2 2602 OFF and then Switch 1 2600 OFF and Switch 2 2602 ON continuously at the same frequency, fast enough so that due to the persistence of vision, consumer sees it as a yellow light output instead of alternate Red and Green light output. LED driver 2608 circuit can be designed for a particular current level i.e. it will regulate the flow of current through it to the set current level whenever the controller 106 provides a high signal to it. PWM (Pulse Width Modulation) 2618 consists of high and low signals at a fixed frequency. One could change the duration of high and low signals in a given particular time (defined as time period=1/frequency).

An example of how this circuitry works will now be described in reference to FIG. 27. Assumptions: (1) frequency of PWM 2618/2708 set is 2 KHz, i.e. total time period for one signal (one high and one low)=½ KHz=0.5 ms; (2) frequency at which switches (2610, 2612, 2614, 2616/2700, 2702, 2704, 2706) are turned ON and OFF=250 Hz, i.e. total time period for switch to turn ON and OFF=1/250 Hz=4 ms; and (3) LED driver 2608 is designed for 1 A current, i.e. when any switch (2600, 2602, 2604, 2606) and LED driver 2608 is ON (when they get high signal from the controller 108) current passing through it is 1 A or maximum current that power supply 2300 can provide, whichever is less. The user wants a Yellow light output at half the maximum luminosity possible, for which Red 2410 and Green 2412 LEDs should be illuminated equally by sending same amount of average current through them. Also for half the luminosity, the average current passing through RED LEDs arm 2402 and Green LEDs arm 2404 should be half the maximum average current possible. This is achievable by turning Switches (2610, 2612, 2614, 2616/2700, 2702, 2704, 2706/2600, 2602, 2604, 2606) ON/OFF and setting PWM 2618/2708 as in the timing diagram below. The power supply can provide maximum current of 1 A for any LED arm (2402, 2404, 2406, and 2408) at a time.

Switching frequency of 250 Hz (cycle of 4 ms): When Switch1 2600 is ON; Switch2 2602 is OFF letting current flow through only one arm at a time. Also, time for which Switch1 2600 is ON and time for which Switch2 2602 is ON are equal, thus producing Yellow light as required. However, to produce a type of orange light which consists of 70% Red and 30% Green light together, SIG1/Switch1 2610/2700 should be ON for 70% of the cycle time (here, 70% of 4 ms=2.8 ms) and SIG2/Switch2 2612/2702 should be ON for remaining 30% of the cycle time (here, 30% of 4 ms=1.2 ms). Similarly, to produce brighter shade of orange light which consists of 50% RED, 20% Green and 20% White light together, SIG1/Switch1 2610/2700 should be ON for 50% of the cycle time (here, 50% of 4 ms=2 ms), SIG2/Switch2 2612/2702 should be ON for 20% of the cycle time (here, 20% of 4 ms=0.8 ms), SIG4/Switch4 2616/2706 should be ON for 20% of the cycle time (here, 20% of 4 ms=0.8 ms), and all switches (2610, 2612, 2614, 2616/2700, 2702, 2704, 2706) are off for the remaining 10% of cycle time (here, 10% of 4 mA=0.4 ms). FIG. 27 is a timing diagram for the switches and LED driver scheme of FIG. 26.

In a similar way, by varying the switching combinations for a given time cycle, II Device 140 could produce any color with different shades. When duty cycle is 100% i.e. 100% ON and 0% OFF, the LED driver 2608 is always ON, thus letting current pass continuously through an LED arm (2402, 2404, 2406, 2408) which has its switch ON, in turn providing highest possible luminosity for the color produced. Thus the output luminosity can be varied by varying duty cycle of the PWM signal 2618/2708 to the LED driver 2608, providing dimming feature to II Device 140. The algorithm/program in the controller 106 is such that, at a time only one switch or limited number of switches will be turned ON. Thus, making sure that maximum possible current (mainly set by LED driver 2608 circuit) flows through the LED arm of that particular switch at that time. This particular scheme is more useful when power supply has limited current output capability. With such algorithm one could achieve maximum luminosity for any color possible.

For example, let's say a power supply 2300 (AC/DC Converter 102) is rated at a maximum 15V/1 A output. Let's assume all LEDs have rating of 1 A. To achieve 100% luminosity output from RED LEDs arm 2402, one has to pass 1 A current through RED LEDs arm 2402 continuously. In this case, SIG1/Switch1 2610/2600/2700 will be ON continuously and PWM 2708 duty cycle to LED driver will be 100% as well. However, if one designs all four LED drivers to ¼th of the maximum supply current from AC/DC converter i.e. ¼×1 A=0.25 A, maximum current will never exceed 0.25 A through any LED arm, thus limiting the output luminosity of that particular LED arm and combination of LEDs to be ON. Algorithm/Program makes sure that only one LED arm is ON at a time, and to produce colors other than Red, Green, Blue and White, program turns ON/FF the respective switches fast enough so that consumer sees the output light as a defined color due to persistence of vision.

Figure 28:
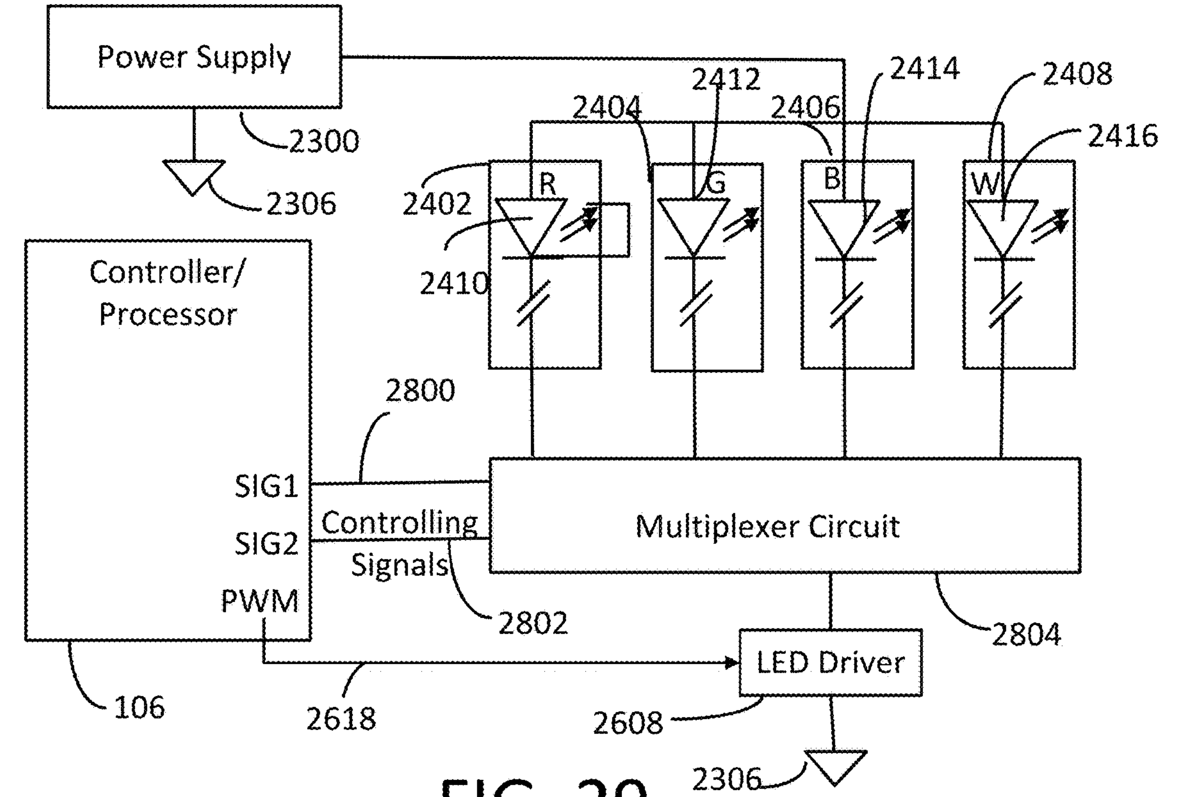
FIG. 28 is a circuit diagram of a multiplexer and a LED driver scheme in accordance with one embodiment of the present invention.

Referring now to FIG. 28, a circuit diagram of a multiplexer 2804 and a LED driver 2608 scheme in accordance with one embodiment of the present invention is shown. In this scheme, the controller/processor 106 would send a PWM 2618 signal to one LED driver 2608 which would control the average current flowing through it. In addition, there would be multiplexer 2804 between the LED driver 2608 and each LED arm (2402, 2404, 2406, and 2408). The controller 106 is connected to the multiplexer 2804 via two signals. Based on SIG1 2800 and SIG2 2802 signals, the multiplexer 2804 selects an LED arm (2402, 2404, 2406, and 2408) to connect to the LED driver 2608 at a time producing light with different colors, saturation, and brightness. Variation in the average current passing through the LED driver 2608 controlled by variations in the PWM 2618 sent by the controller would increase or decrease the average current passing through to the subsequent LED arms, thus controlling the overall brightness of the LEDs (2410, 2412, 2414, 2416).

Considering the embodiment contains red, green, blue, and white LED arms (2402, 2404, 2406 and 2408 respectively), based on established color mixing principals, the variation in the luminosity of these four colors could produce all color combinations. To achieve this variation, the controller 106 could vary and alternate the length of time that the multiplexer signals are turned on to let current pass through to each of the respective LED arms (2402, 2404, 2406, and 2408). This would create variations in lengths of time when the LED driver 2608 would pass through current to the LED arms (2402, 2404, 2406, and 2408) and thus create variations in lengths of time when the LEDs produce light. The length of time would also allow for a similar control in the overall brightness of the luminosity produced by the II Device in addition to the control provided by variations of the duty cycle of the PWM signal 2618 itself.

Similarly, variations in the length of time that the controller 106 would alternatively send signals to the multiplexer 2804, which would control the current passed through from the LED driver 2608 to the LED arm (2402, 2404, 2406, 2408), would also provide for a combinatory control of the average luminosity produced by each LED arm (2402, 2404, 2406, 2408) and thus allow for control of color and saturation of the light produced. The frequency of signals sent to the multiplexer 2804 will be high enough (still within the LEDs' and LED Drivers' technical specifications) so that due to the persistence of vision, consumers would see a constant light output, for example a yellow light instead of fast switching alternate red and green light outputs. The scheme in alternating multiplexer signals does not allow for simultaneous signals to allow current to pass to more than one LED arms at the same time. This maximizes the potential average current passed through and subsequent luminosity of each LED arm (2402, 2404, 2406, and 2408) considering limited available current from the AC/DC converter 102. It allows for each LED arm (2402, 2404, 2406, 2408) to receive the full power provided by the AC/DC converter 102 and regulated by the LED driver 2608, such that when it is on all the available current could be sent through to the one LED arm (2402, 2404, 2406 or 2408). The timing method is similar to that of the switches and LED drivers scheme (FIG. 27). The multiplexer scheme would vary dependent on the II Device 140 requirements and total number of LED arms.

Figure 29:
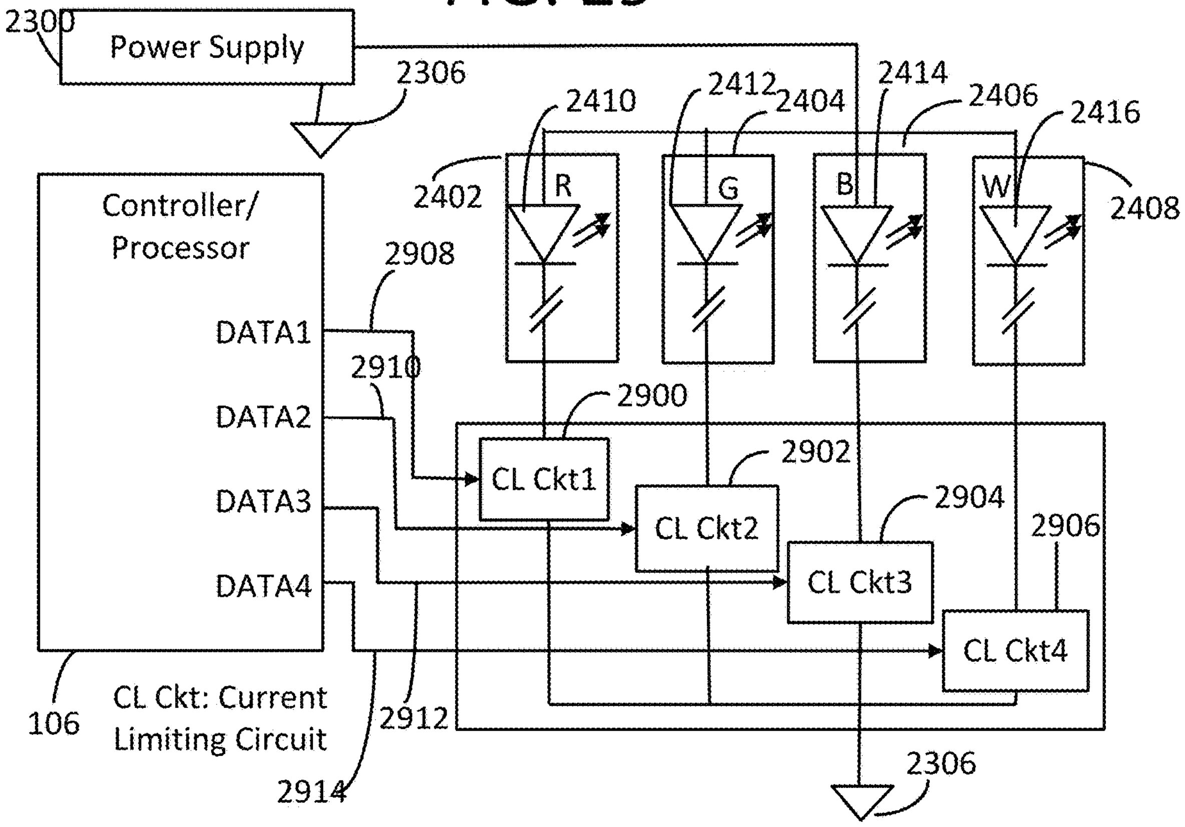
FIG. 29 is a circuit diagram of current limiting circuit scheme in accordance with one embodiment of the present invention.

Now referring to FIG. 29, a circuit diagram of current limiting circuit scheme in accordance with one embodiment of the present invention is shown. In this scheme, current limiting circuits (2900, 2902, 2904, and 2906) control the current passed through to each LED arm (2402, 2404, 2406, and 2408). There would be as many current limiting circuits as LED arms that are required for the specific embodiment of the II Device. The controller/processor 106 sends data to the individual current limiting circuit (2900, 2902, 2904, and 2906) and defines the current to be passed through to the respective LED arm (2402, 2404, 2406, and 2408). A digital potentiometer could be used to form the current limiting circuit (2402, 2404, 2406, and 2408). The resistance of potentiometer is proportional to the data given to it by controller/processor 106.

For example, to produce a yellow light consisting of 50% Red and 50% Green light at 100% possible output luminosity, DATA1 2908 and DATA2 2910 will set the currents through current limiting ckt1 2900 and ckt2 2902 such that the current splits in half through two arms (DATA3 2912 and DATA4 2914 will be zero). For example, if power supply 2300 is able to provide 1 A current, ckt1 2900 and ckt2 2902 will be set at 0.5 A each. Considering the embodiment contains red, green, blue, and white LED arms (2402, 2404, 2406 and 2408 respectively), based on established color mixing principals, the variation in the luminosity of these four colors could produce all color combinations. Setting assigned currents through all circuits (2900, 2902, 2904, and 2906), any color, saturation, and brightness within specified limits could be achieved. In other embodiments, the LEDs (2410, 2412, 2414, 2216) can be replaced or augmented with alternative lighting components and technologies including but not limited to CFLs, Halogen, and Incandescent.

Figure 30:
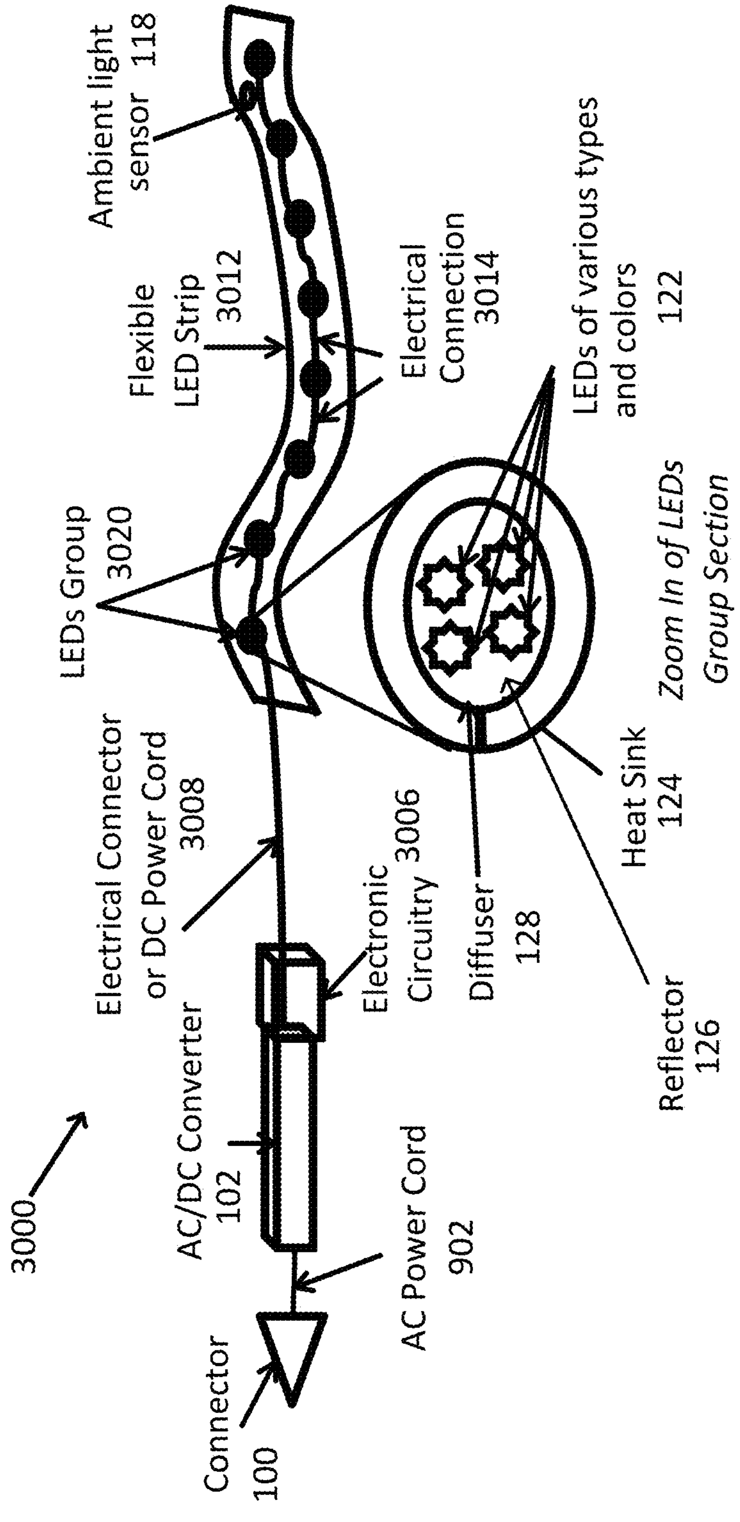
FIG. 30 is a diagram of a mechanical model for a Smartstrip Light in accordance with one embodiment of the present invention.
Figure 31:
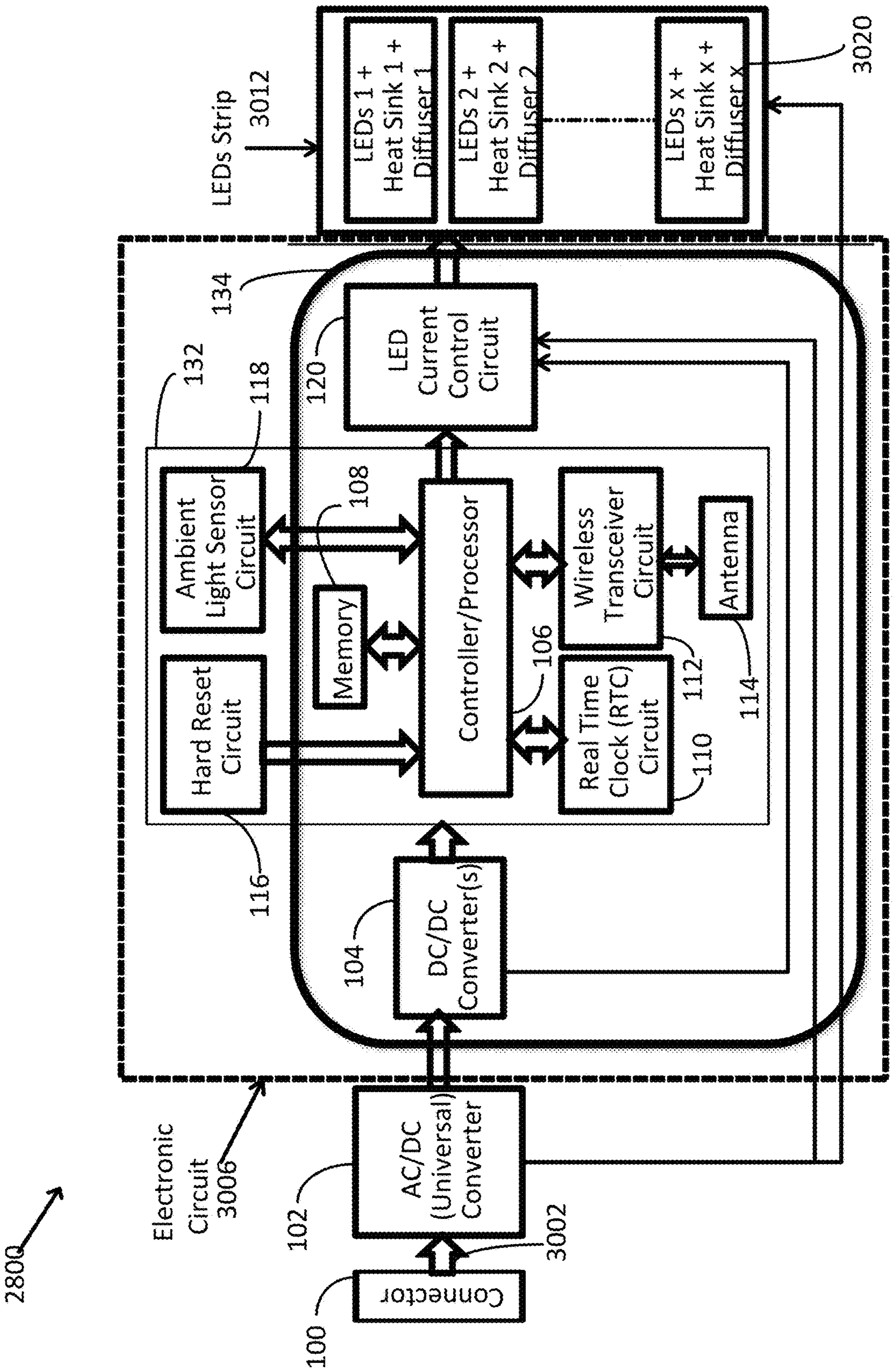
FIG. 31 is a block diagram of a Smartstrip light in accordance with one embodiment of the present invention.

Referring now to FIGS. 30 and 31, a mechanical diagram and a block diagram of a Smartstrip Light 3000 in accordance with one embodiment of the present invention is shown. There could be numerous versions or like embodiments, but the general description will be disclosed herein. The Smartstrip 3000 consists of the same arrangement and inclusion of all the components of an II Device 140 as previously disclosed.

The Smartstrip 3000 includes a flexible strip 3012, an electrical connector 3008 affixed to the flexible strip 3012 and two or more LEDs 122 affixed to the flexible strip 3012 and electrically connected to the electrical connector 3008. LED groups 3020 are placed a flexible material 3012 with some distance between them and connected together in series, parallel or a combination of both with electrical connections 3014. In addition, electrical circuitry 3006 (AC/DC power converter 102, controller/processor 106 and LED current control circuit 120) is remotely located with respect to the flexible strip 3012 and electrically connected to the electrical connector 3008 via a wire, a cable or a connecting strip. The LED current control circuit 120 provides an on/off signal having a cycle time to each LED 122 in response to one or more control signals received from the controller/processor 106 such that the two or more LEDs 122 produce a blended light having a specified color based on how long each LED 122 is turned ON and/or OFF during the cycle time. As shown, the LEDs 122 are formed into LED Groups 3020 that may include a heat sink 124 attached to the flexible strip 3012, a reflector 126 disposed behind or around the two or more LEDs 122, and/or a diffuser or lens 128 disposed above the two or more LEDs 122. The LED Groups 3020 are connected in parallel or series or a combination of both by electrical connections 914.

Other embodiments will include additional components. For example, the additional components may include: a power supply connector/fastener 100; an AC/DC power converter 102 electrically connected to the power supply connector/fastener 100 and the DC/DC power converter 104; a real time clock (RTC) circuit 110 communicably coupled to the controller/processor 106; a memory 108 communicably coupled to the controller/processor 106; a wireless transceiver circuit 112 communicably coupled to the controller/processor 106; an antenna 114 communicably coupled to the wireless transceiver circuit 112; a hard reset circuit 116 communicably coupled to the controller/processor 106; and/or an ambient light sensor circuit 118 communicably coupled to the controller/processor 106. These components were previously described in reference to FIG. 1.

The connector 100 could be one of many connectors that would provide a connection to a power source. This could be an Edison base (multiple sizes), Plug in, Bi-pin, or Battery connected connection. The connector would conduct the electrical current to the AC to DC converter 102 through an AC power cord 3002, which is an electrical wire for carrying standard mains power supply.

The AC to DC converter 102 receives power from the connector 100 and outputs the appropriate DC power to the DC/DC converter(s) 104 and the LED current control circuit 120 and LED strip circuit 3012. The AC to DC converter 102 might be housed within the connector 100 or separate from the connector 100, depending on the specific Smartstrip embodiment.

The DC/DC converter(s) 104 receives a power input from the AC/DC converter 102 and then converts that power to DC power(s) required for driving the internal components/modules of the Smartstrip 3000. These components include the controller/processer 106, memory, the real time clock (RTC) circuit 110, the wireless transceiver circuit 112, antenna 114, and possibly components within the LED current control circuit 120. It might also supply power to components, such as the hard reset circuit 116, the ambient light sensor circuit 118, and other potential added circuitries. There might be multiple converters dependent on the output DC voltages required by different component requirements. Similarly, the power output would very dependent on the exact component requirements, for example the output might be 5 VDC, 3.3 VDC, or 1.3 VDC.

The Controller/processor 106 processes signals received from the memory 108, the real time clock (RTC) circuit 110, and the wireless transceiver circuit 112. It might also process signals from other components, such as the hard reset circuit 116, the ambient light sensor circuit 118, and other potential added circuitries. It also takes action and sends commands to the memory 108, the real time clock (RTC) circuit 110, and the wireless transceiver circuit 112. It might also take action and send signals to other components, such as the ambient light sensor circuit 118 and other potential added circuitries.

The memory 108 stores data from factory defined settings and from user defined settings. The controller/processer 106 will read/write data in memory 108. Data might include factory defined settings such as communication protocols, identification and security protocols, and other data. Data might also include user defined settings such as user profiles, default commands, programs, and other data. The memory 108 could be inside the processor 106 and/or external to the processer 106 as a different IC. The controller/processor 106 and memory 108 circuit might take a number of different technical specifications.

Figure 32:
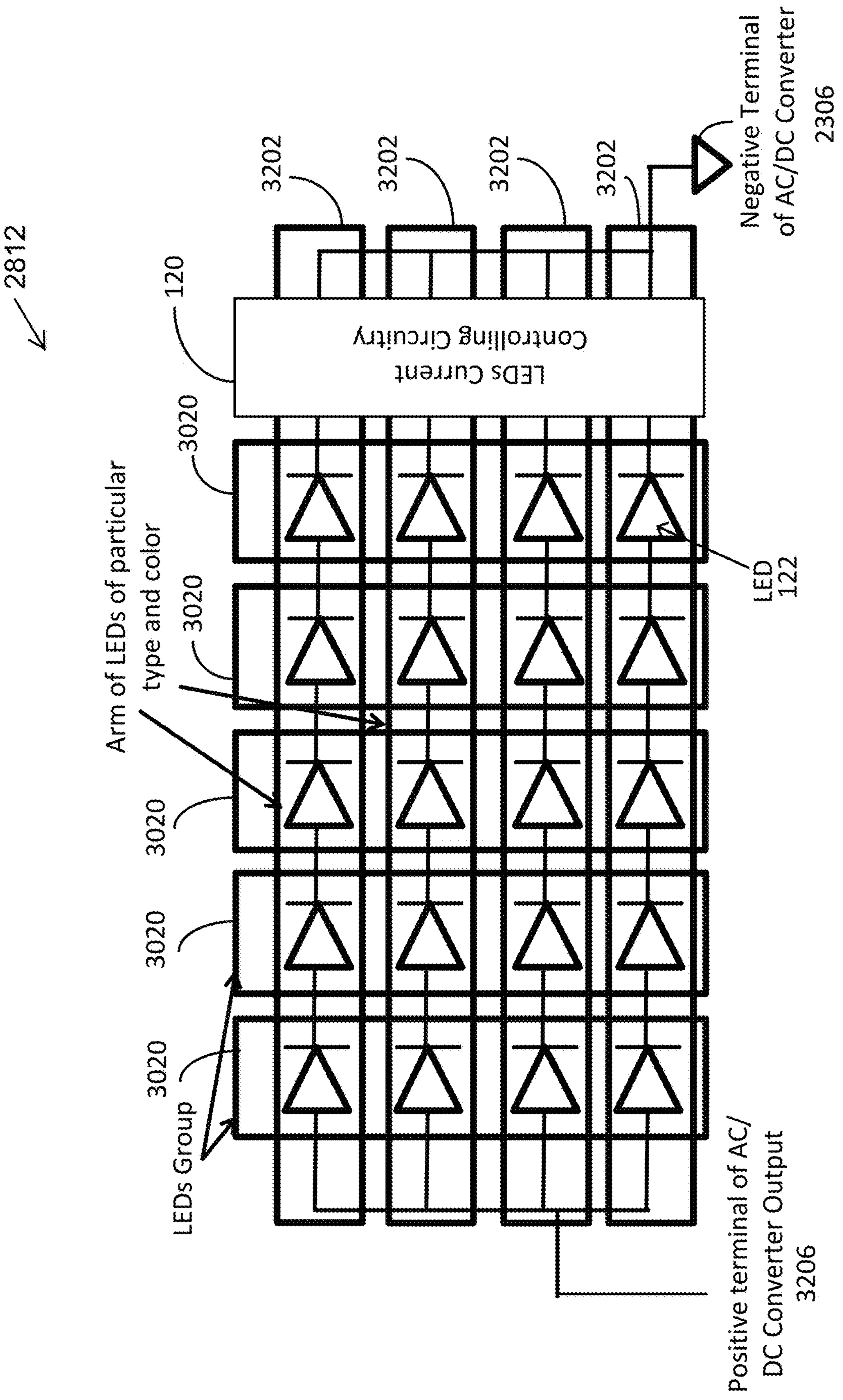
FIG. 32 is a circuit diagram of LED groups on a LED strip in accordance with one embodiment of the present invention.

Referring now to FIG. 32, a circuit diagram of LED groups 3020 on a flexible LED strip 3012 in accordance with one embodiment of the present invention is shown. Here, LEDs 122 are placed group-wise on a flexible strip 3012 with some distance between them. The distance depends upon the requirements of the Smartstrip light requirements. Each LEDs group 3020 might have an individual heat sink and diffuser (to mix colors, in case of different types if colored LEDs in a group). Each LEDs group 3020 has one or many LEDs 122 from each LEDs arm 3202 depending upon the Smartstrip light requirements. These LEDs 122 of a particular arm in each group are electrically connected in a series or parallel combination of LEDs depending upon the requirements of the Smartstrip 3000. The LEDs arms 3202 are connected to the positive terminal 3206 and the negative terminal 2306 of the AC to DC converter 102. In addition, the number of LED groups 3020 would depend upon the requirements of the Smartstrip 3000.

Now referring to FIGS. 33A1-33A2 and 33B1-33B2, block diagrams of a front view and a rear view, respectively of a LED strip 3324 and extendible LED strip 3326 in accordance with one embodiment of the present invention are shown. FIGS. 33A1-33A2 and 33B1-33B2 show that LED groups 3020 are placed a flexible material 3012 with some distance between them and connected together in series, parallel or a combination of both with electrical connections 3014. There could be an ambient light sensor circuit 118 on the front of the LED strip 3324 and extendible LED strip 3326 electrically connected to the electronic circuit 3006. Also, there could be a connector 3300 on both the ends of the LED strip 3324 and 3326 out of which one 3300*a* is used to connect to the electronic circuit 906 and the other 3300*b* could be used to connect to the extendible LED strip 3326. There could be PWM and/or switching signals from the controller/processor 106 that are used to drive current control circuit 120 on the regular LED strip 3324 and are carried to the end connector 3300*b* of the strip which could eventually be used to drive current control circuit 120 on extendible LED strip 3326. In case, of the use of an extendible LED strip 3326 in addition to the regular LED strip 3324, the power requirement to drive total LEDs will increase. That could be taken care by higher power supply ratings, that is, higher ratings of FIGS. 33A1-33A2 and 33B1-33B2 show that the strips 3012 have adhesive(s) or fastener(s) 3322 to fasten the strip on a surface such as ceiling or wall. The strip 3012 is made up of a flexible material so that it could be routed as required during the installation at the site of its use. In addition to the LED groups 3020*x* other potential components as in the regular LED strip (FIGS. 33A1-33A2), the extendible LED strip (FIGS. 33B1-33B2) has its own current control circuit 120 to control average current through LEDs 122 on the strip (FIGS. 33B1-33B2).

Some Smartstrip 3000 embodiments and versions might have an ambient light sensor circuit 118. The ambient light sensor circuit 118 may have one or more ambient light sensors (photosensor or similar light detecting component) and supporting circuitry. The ambient light sensor(s) 118 detects a level of captured ambient light, converts that level into an analog signal, and sends that data to the controller/processor 106 via an analog to digital (A/D) converter. The ambient light sensor circuit 118 would consist of one or more ambient light sensors 118 per one or multiple Smartstrips 3000 and/or II Devices 140. In some embodiments the ambient light sensor 118 could be embedded in the Smartstrip electronic circuit 3006 board or on a LED strip and in others it might be a separate peripheral device to the wireless lighting control system. Additionally, the placement of the sensor(s) 118 and related circuitry need not be exactly collocated, but possibly separated by a wire 3306. In addition, some Smartstrip 3000 embodiments and versions might have a heat sink(s) 124, a reflector 126 and/or a diffuser 128.

Referring now to FIG. 34, a block diagram of the mechanical and electrical connections for the Smartstrip 3000 in accordance with one embodiment of the present invention is shown. The Smartstrip light 3000 has four parts: a connector 100, an AC/DC converter 102, an electronic circuit 3006 and LED strip 3012. Any two parts could be connected by a flexible wire which would provide flexibility of distance between the two parts, routing of the Smartstrip 3000 while placing it on the surface. In addition, any two parts could be connected to each other with mechanically inflexible material; in fact combined parts could look like one part. For example, connector 100, AC/DC converter 102 and electronic circuit 3006 parts could be closely connected to each other and could look like one part.

Now referring to FIG. 35, a block diagram of an extendible LED strip in accordance with one embodiment of the present invention is shown. A LED strip 3012*a* can be extended by connecting two or more LED strips 3012*b* and 3012*c*. LED strip 3012*a* would have a connector 3500 at its ends which would be used to connect another strip 3012*b* to it. As shown in the figure, LED strip 2 3012*b* is connected to LED strip 1 3012*a* and LED strip 3 3012*c* by a flexible electrical extension 3502, such as an electrical wire 3504, with connectors 3500 on the ends of the LED strips 3012*a*, 3012*b* and 3012*c*. These connectors 3500 could be of various types, for example, male connector on the right end of the strip and female connector on the left end of the strip. The connections 3500 include current controlling signals from controller/processor 106 driving lines for LEDs 122 on the strip 3012 and LEDs driver signals. In addition, the strip has LEDs current control circuit 120 to control current through LEDs 122 as explained in the II Device section.

Referring now to FIG. 36, a block diagram of a LED strip 3012 extension through parallel connection in accordance with one embodiment of the present invention is shown. The extendable LED strip 3012 has LED Groups 3604 connected in series with an electrical plug-in connector 3600 via electrical connections 3602 (positive) and 3608 (ground), and an electrical plug-in connector 3606 connected in parallel with the LED Groups 3604 via electrical connections 3602 (positive) and 3608 (ground). Electrical plug-in connectors 3600, 3606 are on the both ends of the extendable LED strip 3012. On one end of the LED strip 3012, there would be an intake connector 3600 and on the opposite end of the LED strip 3012 an outtake 3606 connector. The intake connector 3600 would plug into the outtake connector 3606 of the previous LED strip 3012 (either a regular or extendable LED strip) that would ultimately be connected in sequence to a regular LED strip and the rest of the Smartstrip components and power source.

In addition to FIG. 36, now referring to FIGS. 37 and 38, block diagrams of a LED strip 3012 direct connection in accordance with one embodiment of the present invention is shown. The intake connector 3600 would have multiple electrical connections passing internally to the strip 3012. There would be electrical connections 3602 to extend power through to the LED groups 3604 in series. There would also be electrical connections 3602 that would extend the power through to the other outtake electrical plug-in connector 3606 on the opposite side of the LED strip 3012. When this outtake electrical plug-in connector 3606 is not in turn connected to another intake electrical plug-in connector 3600 of another strip, the connection will terminate in the outtake connector 1506. The electrical connections 3602 would include ground connection 3608 and current controlling signals such as PWM and switching signals from the controller/processor 106 for both the connection to the LEDs current control circuit 120, LED groups 3604 in series, and the connection to the outtake connector 3606. Additional LED strips could be connected in the same fashion. This number of LED strips connecting to each other could be limited by the available power source and required current for each strip 3012.

As shown in the FIG. 37, the outtake connector 3606 on one strip 3012*a* could be connected to the intake connector 3600 on another strip 3012*b* through an electrical wire 3704 with similar mating connectors 3700, 3702 at its end. This type of connection provides additional flexibility and routing while extending the number of strip in the Smartstrip. As shown in the FIG. 37, the connecting wire 3704 might be an affixed part of the connector and Smartstrip or a separate part that could be used as needed.

Figure 39:
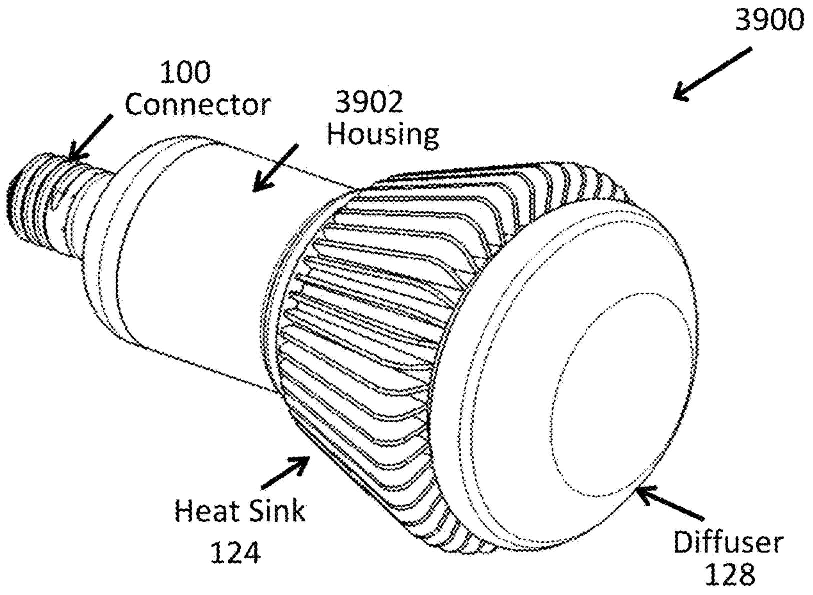
FIG. 39 is a perspective view of an Intelligent Illuminating Bulb in accordance with one embodiment of the present invention.
Figure 40:
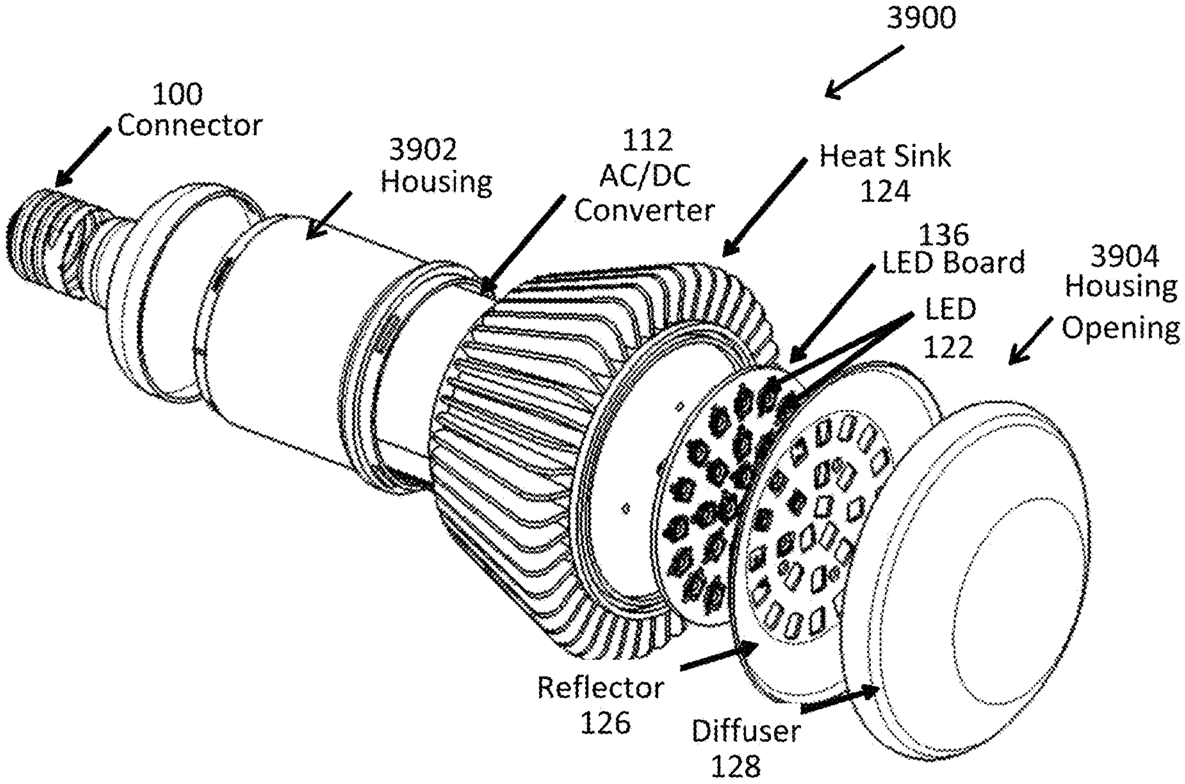
FIG. 40 is an exploded perspective view of an Intelligent Illuminating Bulb in accordance with one embodiment of the present invention.

Now referring to FIGS. 39 and 40, a perspective view and exploded perspective view, respectively, of an Intelligent Illuminating Bulb 3900 also referred as II Bulb in accordance with one embodiment of the present invention are shown. The II Bulb 3900 is a lamp or bulb like structure embodiment of an II Device 140. There could be numerous versions or like embodiments, but the general description will be disclosed herein. The II Bulb 3900 consists of the same arrangement and inclusion of some or all of the elements described above in reference to the II Device of FIG. 1.

The II Bulb 3900 includes a housing 3902, a DC/DC power converter 104, a controller/processor 106 electrically connected to the DC/DC power converter 104, a LED current control circuit 120 communicably coupled to the controller/processor 106 and electrically connected to the DC/DC power converter 104, and two or more LEDs 122 comprising at least a first color LED and a second color LED electrically connected to the LED current control circuit 120. The DC/DC power converter 104, the controller/processor 106 and the LED current control circuit 120 are disposed within the housing 1802, and the two or more LEDs 122 are proximate to or within an aperture 3904 of the housing 3902. A heat sink 124 is disposed within or outside the housing 3902. A reflector 126 is disposed within the aperture 3904 of the housing 3902 and around the two or more LEDs 122. A diffuser or lens 128 seals the aperture 3904 of the housing 3902. The LED current control circuit 120 provides an on/off signal having a cycle time to each LED 122 in response to one or more control signals received from the controller/processor 106 such that the two or more LEDs 122 produce a blended light having a specified color based on how long each LED is turned ON and/or OFF during the cycle time.

Other embodiments will include additional components. For example, the additional components may include: a real time clock (RTC) circuit 110 communicably coupled to the controller/processor 106; a memory 108 communicably coupled to the controller/processor 106; a wireless transceiver circuit 112 communicably coupled to the controller/processor 106; an antenna 114 communicably coupled to the wireless transceiver circuit 112; a hard reset circuit 116 communicably coupled to the controller/processor 106; and/or an ambient light sensor circuit 118 communicably coupled to the controller/processor 106. These components were previously described in reference to FIG. 1.

The connector 100 would be an Edison base or bi-pin for which when the connector is inserted into the appropriate light socket, the connector would provide appropriate contact to extend the power source into the body of the II Bulb 3900. In addition, the connector 100 will provide some structural stability in fastening the II Bulb 1800 into a socket. In some alternate versions of the II Bulb 3900 the connector might also be a plug-in or battery powered connector. The physical location of the antenna 114 and/or wireless transceiver circuit 112 could be placed in multiple physical locations related to the II Bulb 3900. For example, it might be placed outside of the II Bulb 3900 or inside the II Bulb 3900. Placing it outside might increase the range of wireless communication for the II Bulb 3900, especially when installed in locations with poor reception. Alternatively, the antenna 114 might be built into the physical structure of the II Bulb 3900 or be part of the main board inside the II Bulb 3900.

The LED current control circuit 120 executes commands from the controller/processor 106 to control the current passed through the LEDs 122. The LED current control circuit 120 might take different forms dependent on the II Device embodiment 3900 as previously described. Each II Bulb 3900 would have some arrangement of LEDs 122 that could vary in color and type (brightness) depending on different II Bulbs. Various types of LEDs 122 would be placed on a LEDs board 136 in a spaced and arranged fashion and connected electronically to other circuitry as explained earlier. The LEDs board 136 consists of electrically connected LEDs 122 placed on a single surface. The combination of LEDs 122 could be of various types and various colors. For example, the LEDs 122 might vary in color such as red, green, blue, and/or white LEDs. The LEDs 122 might also vary in their maximum output luminosity. The combination of illuminations of these LEDs 122 could produce various levels of brightness and/or color. LEDs 122 on the board would be arranged so that the light from them would mix well forming a uniform color and overall light from the II Bulb 3900 would spread uniformly in at a particular degree around the circumference of the diffuser 128. In addition, the LED board 136 might be combined or surround other circuitry such as the hard reset circuit 116 and/or ambient light sensor 118. For embodiments where this is the case, the LEDs 122 could take a different arrangement to accommodate for the placement of those circuitries.

Figure 41:
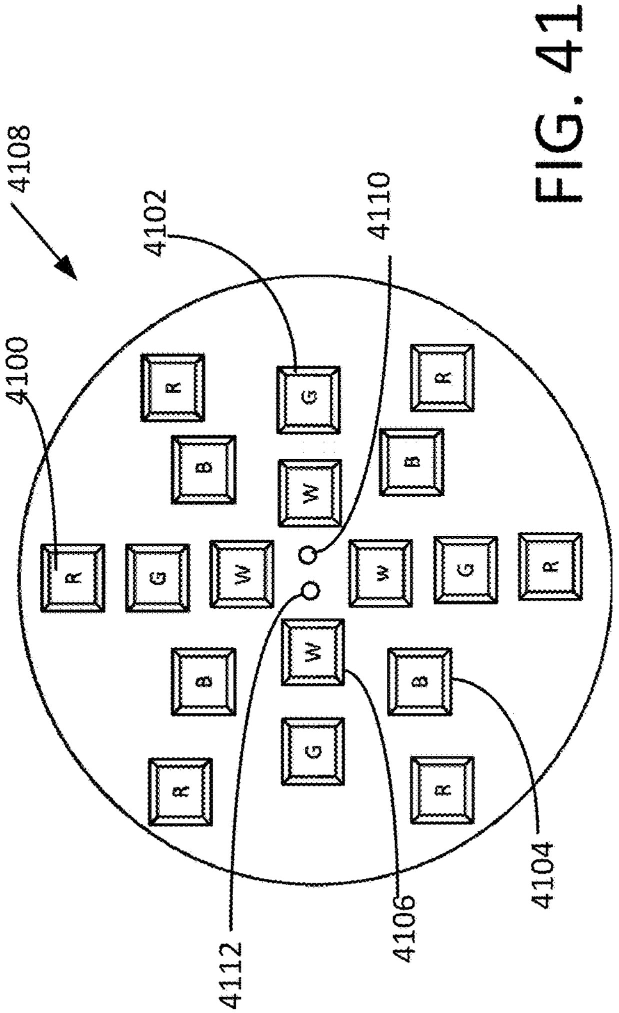
FIG. 41 is a diagram of a LED board in accordance with one embodiment of the present invention.

Referring now to FIG. 41, a diagram of a LEDs Board 4108 in accordance with one embodiment of the present invention is shown. As an example of the LEDs board arrangement, the white LEDs 4106 could be placed at the center of the LEDs board 2008 with red LEDs 4100 on the exterior and blue 4104 and green LEDs 4102 placed in between. In addition, there is an arrangement for electrical contacts 4110, 4112 on the LEDs board 4108 at some place as shown. The arrangement can be used to connect sensors such as ambient light sensor of the ambient light sensor circuit 118 and the rest switch of the hard reset circuit 116 on the on the II Device to their respective circuitry that could be on the main board 134. The arrangement might be on certain planes such as vertical, horizontal, and diagonals. In addition, the proportional relationship in the number of certain color LEDs to other types could vary dependent on the light emitted by the LED and the specific embodiment requirements.

Figure 76:
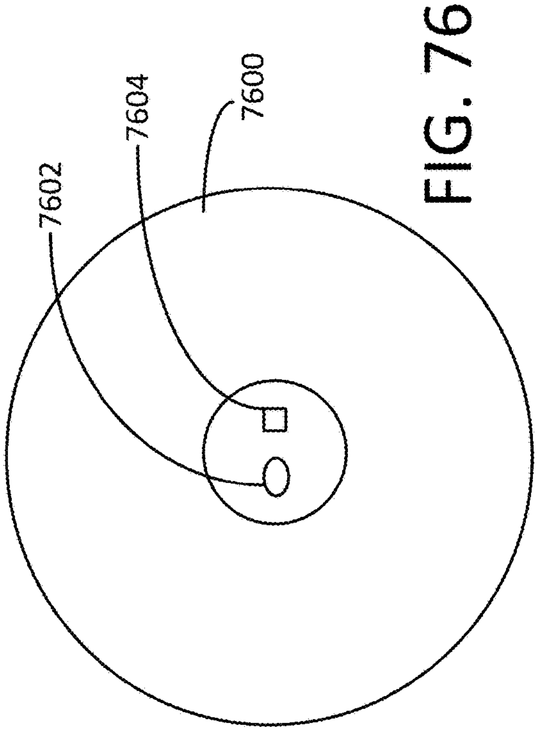
FIG. 76 is a block diagram of showing a potential placement of the photosensor and reset switch on the light mixing cover/diffuser in accordance with one embodiment of the present invention.

II Bulb 3900 may consist of Hard Reset circuit 116 as explained earlier. The location of the hard reset circuit might be co-located with other external components such as the ambient light sensor 118, LEDs 122, diffuser 128, or other II Bulb components or structural parts. In this sense the physical location with respect to the II Bulb 1800 might vary. Now referring to FIG. 76, a potential placement of the photosensor 7602 and reset switch 7604 on the light mixing cover/diffuser 128, 7600 that is on the top of LEDs board 4108 of II Bulb. The heat sink and related components and parts 124 are required in some embodiments of the II Bulb 3900. As explained earlier the heat sink and related components 124 dissipate the heat generated by the LEDs 122 and LED current control circuit 120 and it could take multiple sizes, shapes, and materials dependent on the II Bulb embodiment.

Other 'related components' refers to related parts required for the fitment of heat sink and parts required of the housing and inner or outer structure of the II Bulb 3900. These materials and arrangement might of course differ depending on the particular II Bulb embodiment.

As explained earlier, there would be a diffuser 128 that is a part of the II Bulb 3900 that spreads and/or 'mixes' the illumination produced by the LEDs 122. There could be an ambient sensor, a part of ambient sensor circuit 118 and/or hard reset button, a part of hard reset circuit 116 on the diffuser 128, in which case, the diffuser 128 could be transparent at that place. Also, the diffuser in that case, may have a through-hole arrangement for electrical and mechanical connections of the sensor and button to the II Bulb 3900. In the II Bulb as well, as explained earlier, the light reflector 126 is used to amplify or focus the illumination generated by the LEDs.

Figure 69:
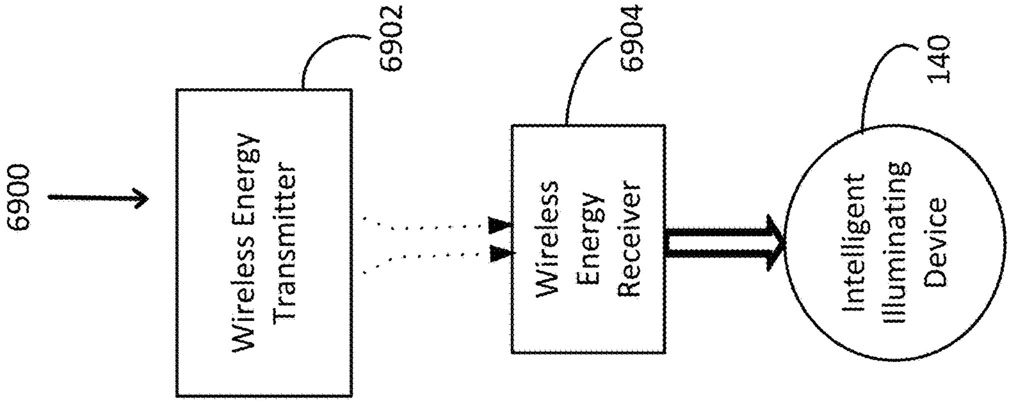
FIG. 69 is a block diagram of another embodiment of II Device system with a wireless energy receiver and transmitter in accordance with one embodiment of the present invention.

Referring now to FIG. 69, another embodiment 6900 of II Device 140 system with the wireless energy receiver 6904 and wireless energy transmitter 6902 is shown. The wireless energy transmitter 6902 transmits the energy wirelessly to the II Device 140 through wireless energy receiver 6904. The wireless energy receiver 6904 that is connected to II Device 140 feeds the energy received to the II Device 140 through its connector 100 or directly to the AC/DC converter 102. In this case, the input ratings of AC/DC converter 102 might be different than the universal ratings as explained earlier (AC power 60V-290V/45-65 Hz). Wireless energy receiver 6904 may have inbuilt AC/DC converter in which case, the DC output generated of wireless energy receiver 6904 is directly given to the DC/DC converter 104.

Figure 77:
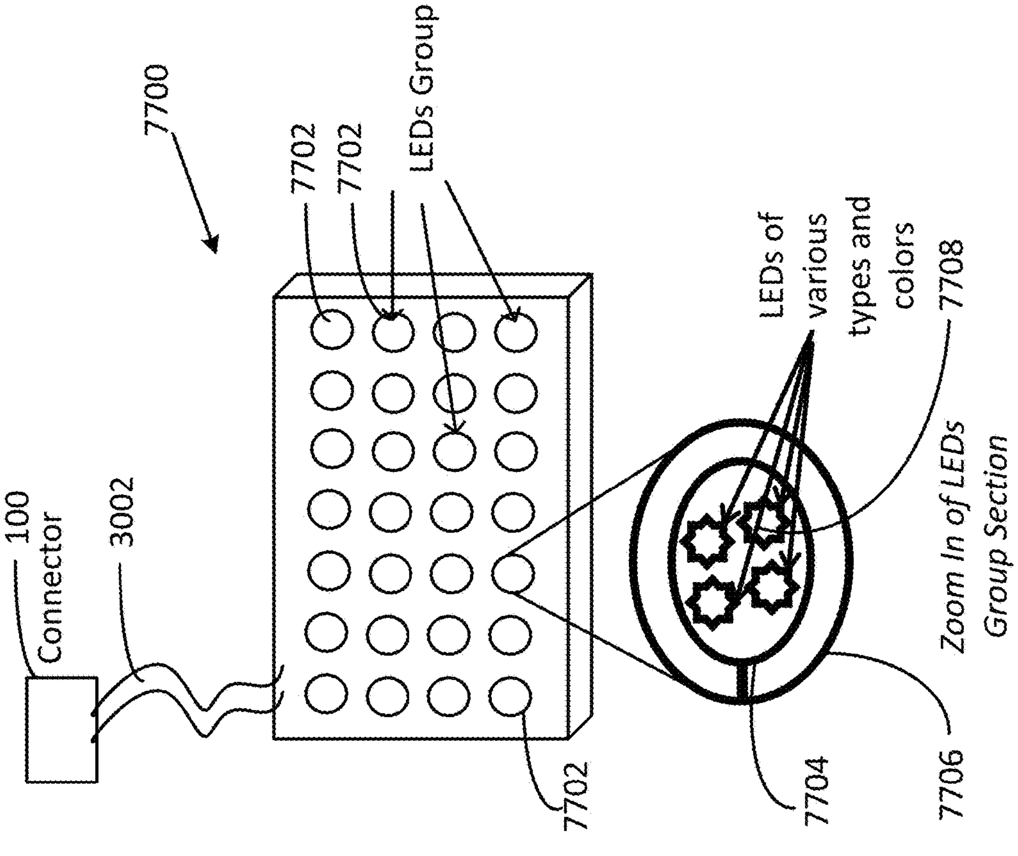
FIG. 77 is a block diagram of an Intelligent Illuminating Device network in accordance with one embodiment of the present invention.

Referring now to FIG. 77, another embodiment of II Device 140 in the form of LED lighting panel 7700 is shown. The panel is mostly used on the ceiling for down lighting. It might consist of number of LED groups 7702 on the front wall of the panel arranged in horizontal and vertical planes on LEDs board as shown in FIG. 77. The panel 7700 might also consist of LED groups 7702 on side walls of the panel 7700. The LED board could be similar to the LEDs board 4108 explained while describing II Bulb. Each LEDs group 7702 might have various types and colors of LEDs 7708, for example—Each LEDs group (e.g., 7706) may consist of Red, Green, Blue and White LEDs 7708, in turn LED lighting panel 7700 to produce light with various colors and brightness.

The LED lighting panel, an embodiment of II Device also consists of other circuitry such as LED Current control circuit 120, Real Time Clock Circuit 110, etc. as explained in FIG. 1. Here, the heat sink either connects to the LEDs through LEDs board or there could be heat transfer adhesive (s) (potentially different adhesives for different LED groups) between the LEDs board and heat sink. There could be a common light mixing cover/diffuser 128 for all LED groups 7702 or multiple light mixing covers/diffusers 7704 for each or multiple LED groups.

All the required electronic circuitry per II Device 140 would be inside the lighting panel 7700, while the positions of the ambient light sensor(s) of ambient light sensor circuitries 118 and the reset switch of the hard reset circuit could vary. They could reside on the top/front wall of the panel 7700, on the side walls of the panel 7700. The ambient light sensor and the wireless transceiver circuit 112 could also take other placements as explained earlier. There could be multiple ambient light sensor circuitries 118 on the LED lighting panel 7700 with light sensor taking the positions on side walls of the panel 7700 as well.

The panel could have single or multiple connectors 100 of various types as explained earlier while describing connector 100 in II Device 140. In addition, theses connectors could be connected to the lighting panel 7700 through an electric cable or AC power cord 3002. There would be a mechanical arrangement to fit the lighting panel 7700 to the ceiling in the form of an adhesive, fastener(s), screw-in mechanism or any other possible arrangement. The panel could also be used for the recessed lighting i.e. inside the ceiling.

Figure 78:
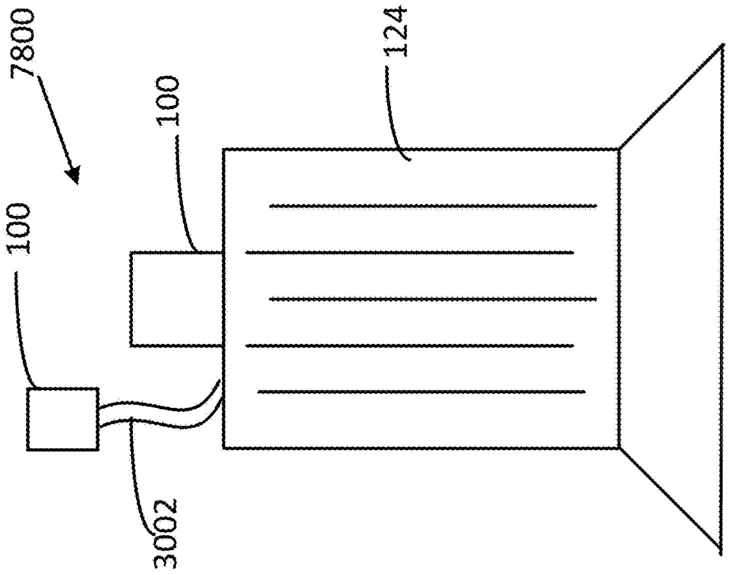
FIG. 78 is a block diagram of an Intelligent Illuminating Can in accordance with one embodiment of the present invention.

Referring now to FIG. 78, another embodiment of II Device 140 in the form of LED Can, a recessed LED downlight Can 7800 that is mostly used in ceilings is shown. It might consist of LEDs board 4108 as explained in II Bulb with LEDs facing downwards while Can is installed into the ceiling. The LED Can 7800, an embodiment of II Device also consists of other circuitry such as LED current control circuit 120, real time clock circuit 110, etc. as explained in FIG. 1. Here, the heat sink 124 is a part of the Can fixture and is connected to the LEDs through LEDs board itself or there could be heat transfer adhesive between the LEDs board and heat sink. There would be a light mixing cover/diffuser 128 for LEDs board 4108 on top of the Can facing downwards.

All the other required electronic circuitry per FIG. 1 of II Device 140 would be inside the lighting Can 7800, while the positions of the ambient light sensor(s) of ambient light sensor circuitries 118 and the reset switch of the hard reset circuit could vary as explained while explaining II Bulb.

The Can 7800 could have single or multiple connectors 100 of any types as explained earlier while describing connector 100 in II Device 140. In addition, the connector could be connected to the lighting Can 7800 through an electric cable or AC power cord 3002. There would be a mechanical arrangement to fit the lighting Can 7800 inside the ceiling through adhesive, fasteners, screw-in mechanisms or any other possible arrangement.

With a wirelessly connected II Device, it will be important for the device application to understand the current status of each II Device within the network. In addition, it would be beneficial for each smart light or an auxiliary wireless device to know the status and signal strength of other Smart lights within its proximity. This would provide a better user experience and a more efficient lighting control system.

Figure 42:
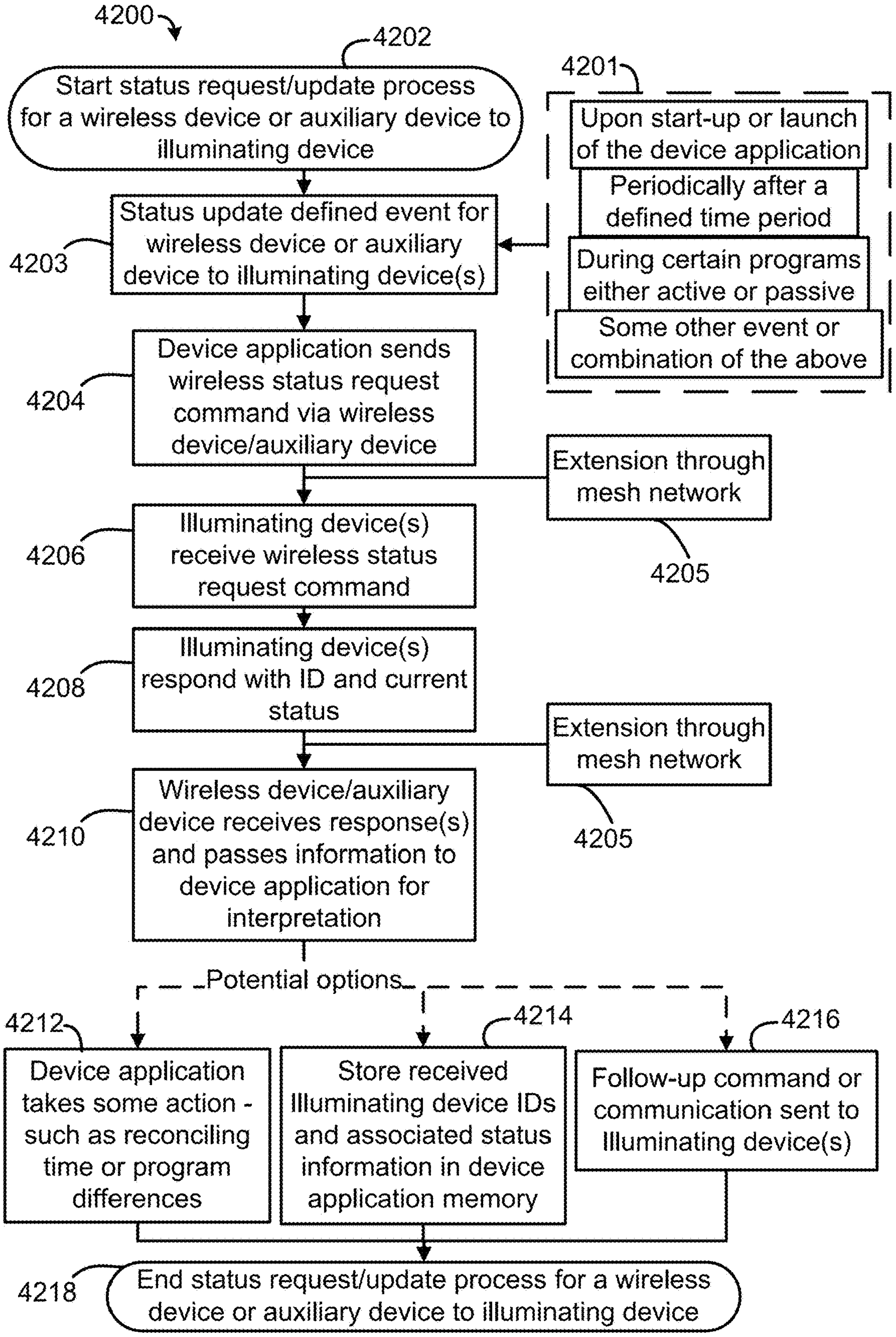
FIG. 42 is a flow chart of a status request/update process for a wireless device or auxiliary device to Intelligent Illuminating Device in accordance with one embodiment of the present invention.

Now referring to FIG. 42, a flow chart of a status request/update process for a wireless device or auxiliary device to II Device in accordance with one embodiment of the present invention is shown. The basic process for a status request from the wireless device or auxiliary device shown by element 4200 would begin with block 4202. Upon a status update defined event 4203, the device application will trigger a command through the wireless device or auxiliary device to send a wireless communication to all II Devices in the vicinity 4204. This command will then get extended through the mesh network 4205 (see communication and mesh network processes for reference in as needed). Upon receipt 4206, each II Device will both respond to the command with the current status of that II Device 4208 and extend the responses of other II Devices via the mesh network 4205. Upon receipt back by the wireless device or auxiliary device, the status information will be interpreted by the device application 4210 and either store the information in the device application memory as an input to execute further commands 4214, trigger a second communication or command to the II Device network 4216, or take some other action 4212. The process completes in block 4218.

Figure 43:
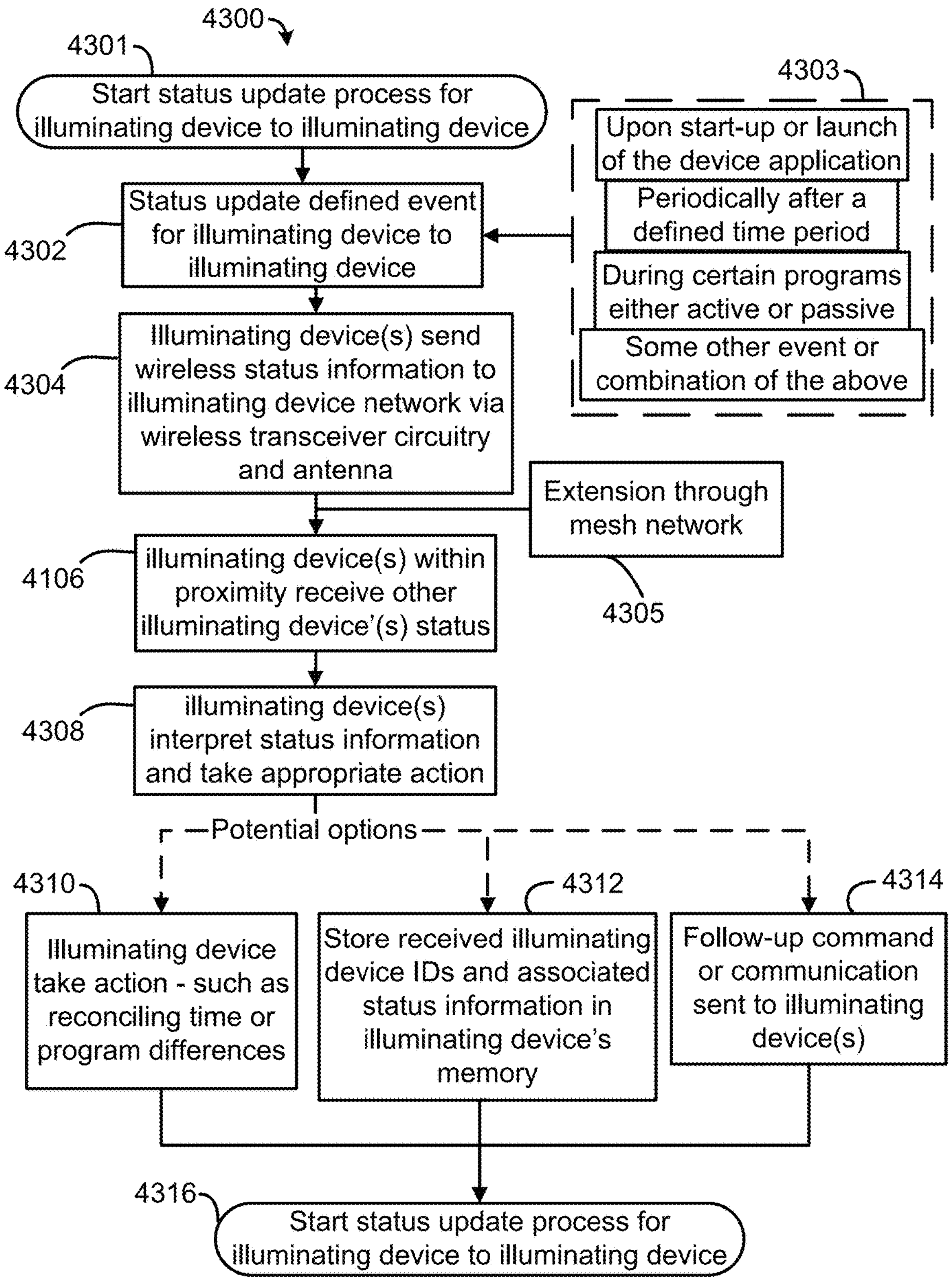
FIG. 43 is a flow chart of a status update process for Intelligent Illuminating Device to Intelligent Illuminating Device in accordance with one embodiment of the present invention.

Referring now to FIG. 43, a flow chart of a status update process for II Device to II Device in accordance with one embodiment of the present invention is shown. The basic process for an internal II Device network status refresh from II Device to II Device shown by element 4300 would begin with block 4301. Upon a status update defined event 4302 and 4303, a command will be triggered in one or many Smart lights to send a wireless communication to all II Devices in the vicinity 4304. This command will then get extended through the mesh network 4305. Upon receiving status updates sent by other II Devices 4306, the status information will be interpreted by the II Device (processor) 4308 and used to either store the II Device ID's received and some associated data of the status in II Device's memory 4312, trigger a second communication or command to the II Device network 4314, or take some other action such as reconciling time or program differences 4310. The process for II Device to II Device completes with block 4316. The processes described in part 4200 and 4300 could be executed in some tandem or integrated fashion dependent on the specific program or task at hand.

Referring now to both FIGS. 42 and 43, the device application, auxiliary device, II Device itself and related II Devices and II Device network could update status information upon different defined events, time periods, or processes signified by 4201. For example, upon start-up or launch of the device application a command could be sent to gather the status information and subsequent layout of each Smart light within the network. As another example, after a defined time period while the device application is open, the wireless device could send a command to gather the status information and subsequent layout of each II Device within the network. As another example, given a different defined time period, each II Device could send a command to gather the status information and subsequent layout of each II Device within the network. As another example, during certain programs either actively runs through the device application or passively in the II Device network, either example b) or c) could be executed at differing times to better suit the program or application. Or it could be any combination of the previously described examples.

The actual status of each II Device may include but not limited to the following information: (a) the ID # and signal strength of other II Device within range; (b) the color and/or brightness at which the II Device is currently illuminated; (c) the status of programs, defaults, and profile information stored in the II Device's memory; and (d) the current time/date as stored in the RTC.

There are a number of different potential processes and programs that would require the current status of the II Devices communicated. For the disclosure of this invention, it will be assumed that the status of the II Devices will already be known if having the status of one or the network of II Devices is generally required to execute the program or process. In many cases the process of obtaining the status of an II Device is included in description and drawings. In other cases, the status need not be required in the program or process.

Figure 44:
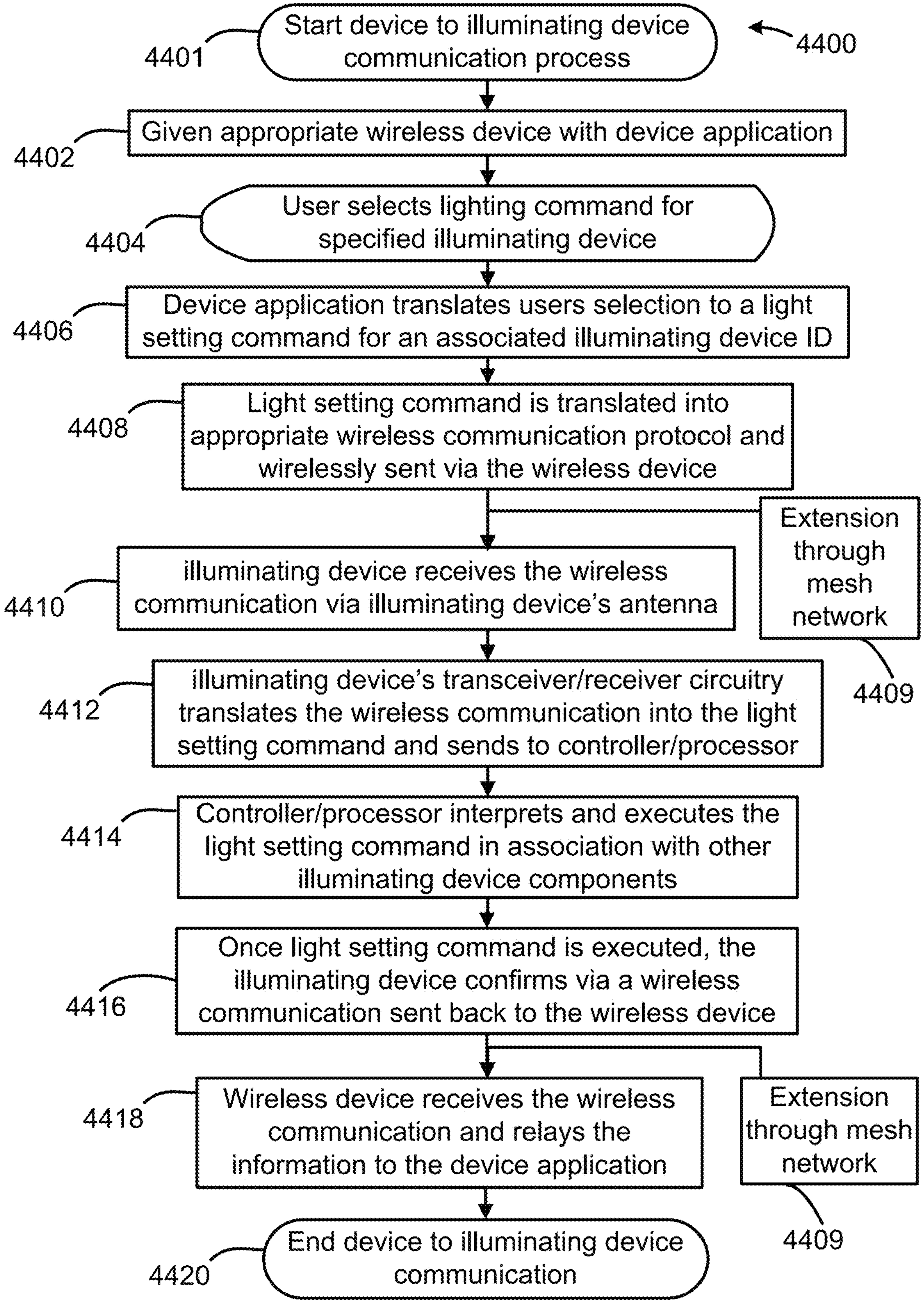
FIG. 44 is a flow chart of a communication process from a device to Intelligent Illuminating Device in accordance with one embodiment of the present invention.

Now referring to FIG. 44, a flow chart of a communication process from a device to II Device in accordance with one embodiment of the present invention is shown through element 4400. The process begins with block 4401. Given a wireless device (WD) is equipped with hardware and systems to execute wireless communication protocols (Bluetooth, Wi-Fi, ZigBee, or any other wireless protocol) as well as an appropriate device application 4402, a user could send a lighting command to an II Device by selecting the command via the device application 4404. Upon the user's selection of a command for a specific II Device, the device application would translate the user's requested command into a light setting command and the specific stored ID for the selected II Device 4406. This light setting command would include instructions for the specified II Device ID to execute such as on/off, color, brightness, or a program. The light setting command would be translated into the appropriate wireless communication protocol and wirelessly sent via the wireless device 4408. The II Device if in range of the wireless communication or mesh network 4409 relay communication would receive the protocol via the II Device's antenna 4410. The transceiver/receiver circuitry would decode the wireless protocol to find the light setting command and send that to the controller/processor 4412. The controller will execute that command with the respective II Device's related components 4414. Upon successful execution, the II Device will respond through the appropriate wireless communication that it has executed the light setting command 4416-4418. The process ends with block 4420.

Figure 45:
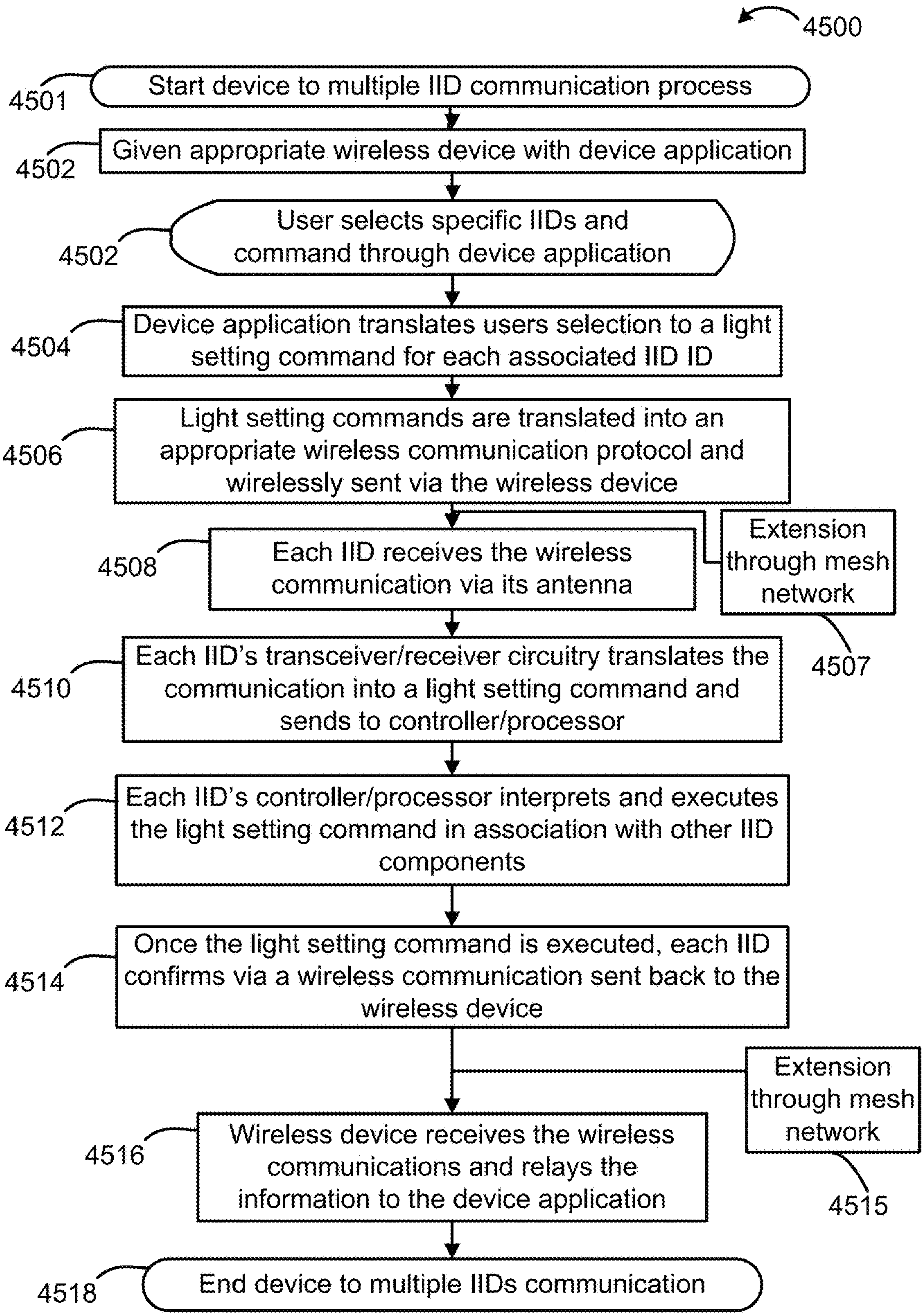
FIG. 45 is a flow chart of a communication process from a device to multiple Intelligent Illuminating Devices in accordance with one embodiment of the present invention.

Referring now to FIG. 45, a flow chart of a communication process from a device to multiple II Devices in accordance with one embodiment of the present invention is shown referred to as element 4500. The process begins with block 4501. Similar to the process of sending a light setting command from a wireless device to an II Device 4400, given an appropriate wireless device and device application 4402, a user could select a command for multiple II Devices via the device application 4502 that would send a wireless communication through the wireless device pertaining to multiple II Devices 4504, 4506, which could be extended through the mesh network 4507. Upon receiving the wireless communications 4508, the II Devices could decode 4510, execute the command 4512, and each respond to verify the command has been executed utilizing the appropriate communication methods shown as 4514-4516. The process would end with block 4518.

Now referring to FIG. 44 as well as FIG. 45, similar to the process of sending a light setting command from a wireless device to an II Device 4400 and the process for sending a light setting command from a wireless device to multiple II Devices 4500, a user could use multiple wireless devices or a combination thereof to send a command to one or multiple II Devices. As long as the wireless devices have the appropriate wireless protocol and associated hardware, has some version of the device application with an authorized profile 4402, and is in range of the II Device (or mesh network), then the wireless devices could send a command in the same way that one wireless device could, to one or multiple II Devices.

Now referring to FIG. 46, an II Device 140 within a mesh network (a lighting system) will be described. The ability for one II Device to receive a wireless communication from a wireless device equipped with the device application, and pass on the communication to another II Device to execute the command within the wireless communication. On a broader scale, having a network of II Devices be able to extend and relay a wireless device's command to extend the signal range or go beyond the limited number of devices it can communicate with directly or one-to-one. Additionally, have the II Devices within the network confirm the execution of the command and possible automated or user guided troubleshooting steps.

Consider a wireless device (WD) (4650, 4652, 4654) is equipped with hardware and systems to execute wireless communication protocols (Bluetooth, Wi-Fi, ZigBee, or any other wireless protocol) as well as the installed device application. Each wireless communication system has some limitation in terms of range (measured in meters or feet). WD1 4650 can communicate with II Device1 4600, II Device2 4602 and II Device3 4604 directly, however, it cannot communicate with other II Devices directly because of range limitation. WD1 4650 can communicate with II Device4 4606 by passing the commands and data through II Device3 4604. Similarly, by passing commands/data through II Device3 4604 and II Device4 4606, WD1 4650 and II Device5 4608 can communicate with each other. In the diagram, WD1 4650 can communicate with each II Device directly or through II Device(s). The diagram is an example of mesh network with which the controlling wireless device (WD in this case) can communicate with all II Device(s) able to communicate with each other. Communication paths are shown as 4616-4644 with obstruction 4646 preventing direct communication with some wireless devices.

In diagram above the II Devices are divided in different network levels as follow: (a) II Devices which are in direct vicinity of WD1 4650 are network level 1 called as NWL1 where II Device1 4600, II Device2 4602, II Device3 4604 are NWL1 II Devices; (b) II Devices which are in the vicinity of NWL1 II Devices, but not in direct vicinity of WD1 4650 are network level 2 called as NWL2 II Devices where II Device4 4606 is NWL2 II Device; (c) II Devices which are in the vicinity of NWL2, but not in the vicinity of WD1 4650 or NWL1 are NWL3 II Devices where II Device5 4608 and II Device1 4612 are NWL3; and (d) similarly, II Device6 4610 is NWL4 II Device.

The process for forming a mesh network will now be described. There are multiple processes that the wireless device and network of II Devices could communicate with each other to set-up a mesh network, dependent on the size of the network (number of II Devices), the dispersion in location of the II Devices (power signal), and other factors. The process would generally involve the wireless device communicating with all II Devices within its signal range, and having each II Device also communicate to other II Devices within its signal range, with an ultimate output sent back to the wireless device including the current status and ID's of all II Devices in signal range for wireless device and each II Device within the network.

WD1 4650 communicates with NWL1 II Devices and stores their ids and statuses in the memory 106 and creates a network among them. Each II Device also communicates with other II Devices and stores their ids and statuses in the memory 106 and creates a network among them. WD1 4650 then sends commands to NWL1 II Devices asking what other II Devices they can communicate with and their ids and statuses. Each NWL1 II Device responds to the commands and provides information on their connections/network with ids and statuses. WD1 4650 then sends commands to NWL2 II Devices through respective NWL1 II Device to get the information on the II Devices in their network and their statuses. NWL2 II Devices responds back to WD1 4650 through respective NWL1 II Device with their network information. WD now has all II Device ids in its memory at NWL1, NWL2 and NWL3 levels. In the same fashion, WD1 4650 continues to build its network map by sending commands to next network level II Devices (in this case, NWL4) through intermediary network level II Devices and gets information on their network. This process would continue until either the wireless device receives information from all lights set-up within the device application or selected for a particular command, or until all II Devices that can be reached through the mesh network have been captured either directly or through the mesh network to the wireless device.

Using the statuses and information from each II Device, the application device run on the wireless device 4650 would then create a map of the entire network, including what II Devices are connected to what II Device and each connection's signal strength, and store it into its memory 106. WD1 4650 can find out the most effective path to communicate with a particular II Device in the mesh network depending upon the signal strengths between WD1 4650 and that particular II Device and signal strengths between WD1 4650 and other II Devices wirelessly connected to other II Devices and that particular II Device. E.g. in diagram above, signal strength 4644 between WD1 4650 and II Device8 4614 is very low. This may cause communication errors between WD1 4650 and II Device8 4614. Therefore, WD1 2550 can chose to communicate with II Device8 4614 through II Device2 4602 as signal strength between WD1 4650 and II Device2 4602 and that between II Device2 4602 and II Device8 4614 is good, leading to less errors in communication. When a command is sent from the wireless device to an II Device through a mesh network, the II Device will respond to confirm the command has been executed in a similar path or along a more effective path given any potential changes in the network based on any changes in terms of movement of wireless device, signal strength, etc. The mesh network could be limited to NWL1 or NWL2 or any other network level based upon the criticality of application and different II Device embodiments.

Considering the fact that some types of communication protocol/methods have a limit to the number of devices that can be connected or have communication among, the device application will intuitively take these as input constraints to the formation of an optimal mesh network and path for the wireless communication of a command. As example, if the wireless communication uses Bluetooth technology, there might be some constraints. Considering a piconet topology (ad-hoc computer network using Bluetooth technology), a master Bluetooth device (Mostly a Wireless Device or II Device in this case) can communicate with a maximum of seven Bluetooth devices at a time. Understanding this constraint, the wireless device(s) and II Devices could execute the mesh network process in such a way to optimize both the total number of II Devices captured by the network and the path to send any specific command through the mesh network. This can be achieved by executing the standard mesh networking process, and the device application considering the resulting map of the network to calculate and decide which specific II Devices to keep connected within the direct connection of the wireless device and which to keep connected through other II Devices.

Considering a case where more than seven II Devices are found within the vicinity of the wireless device, the device application after receiving the initial network mapping would adjust which II Devices to directly connect to and which to connect to through another II Device to attempt to reduce the number of II Devices directly connected to the wireless device. This would open up the ability of the wireless device to search for and connect to additional II Devices within initial proximity that might not have been able to connect before due to the limit of seven devices. This process would be balanced to ensure those lights that could only connect through another II Device are also accounted for and signal strength is at the highest possible levels. Note that this constraint might not be the case for all versions of Bluetooth topology or technology.

The steps for forming a dynamic mesh network will now be described. Similarly to controlling multiple II Devices with multiple devices, multiple wireless devices, in this case, WD1 4650, WD2 4652 and WD3 4654 could control one or many II Devices via the mesh network. Each wireless device, in this case, WD1 4650, WD2 4652 and WD3 4654 would execute the mesh network process in relation to its location as explained earlier with reference to wireless device WD1 4650 and II Devices in its vicinity at different network levels such as NWL1, NWL2 and NWL3.

Along the same lines, a dynamic mesh networking is required as a wireless device (WD) can move from one place to another changing for itself the II Devices in NWL1 and possibly the II Devices in other related network levels such NWL2, NWL3, etc. In the dynamic mesh network process, the wireless device and II Devices follow the same process as explained in the formation of mesh network, but the process is repeated on a continuous basis. Specifically, the wireless device and each related II Device would keep updating their individual network as explained earlier after every defined time interval. Each II Device would also keep providing the ids and statuses of II Devices in its network to the wireless device(s) in a defined time interval. This time interval would vary from a few seconds to hours depending upon the complexity and criticality of the application being run, power consumption, dispersion of II Devices, and total number of wireless devices and II Devices in the network.

Figure 46:
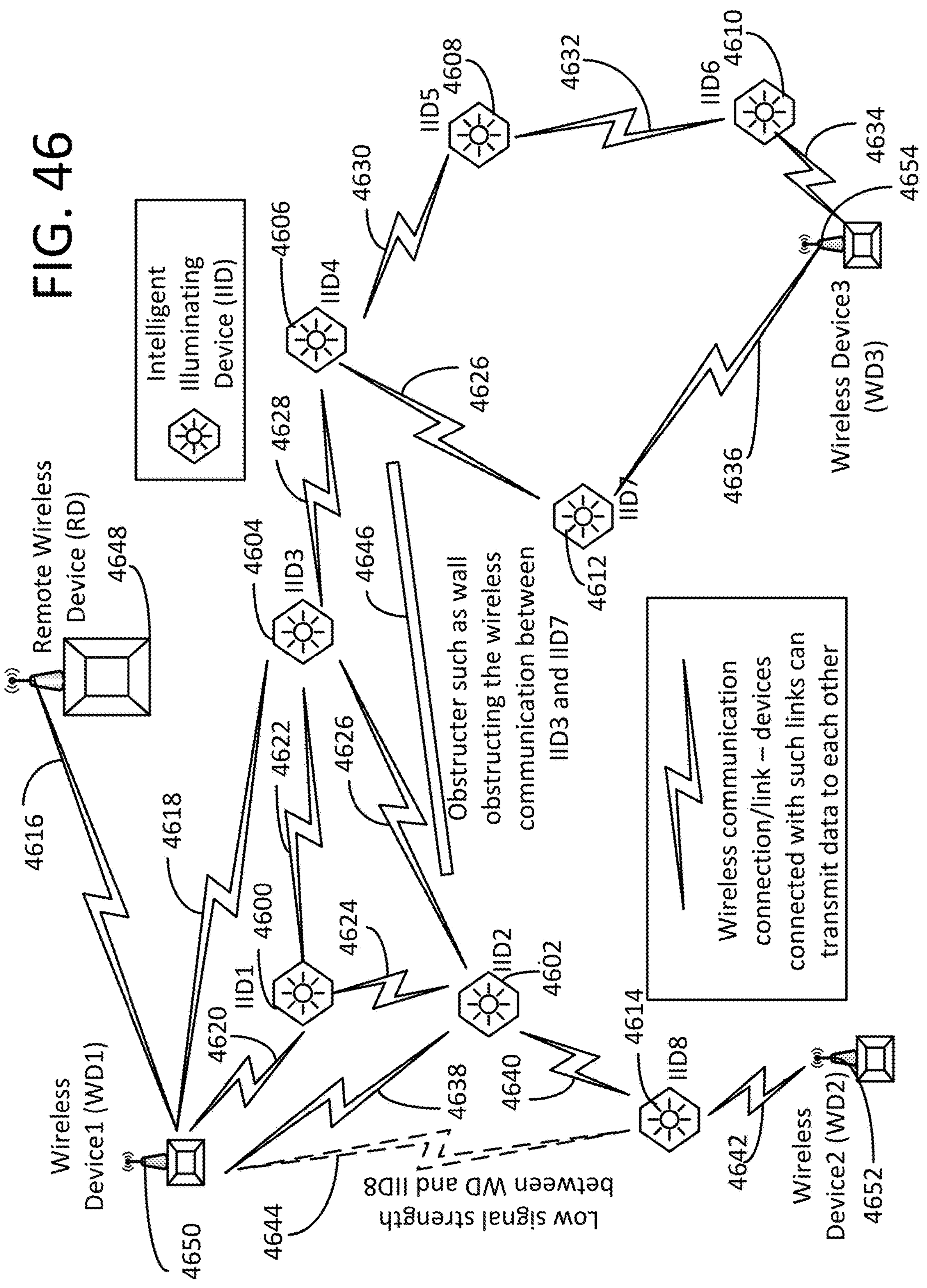
FIG. 46 is a block diagram of accessing an Intelligent Illuminating Device network through various devices in accordance with one embodiment of the present invention.

In FIG. 46, accessing an II Device network through various devices in accordance with one embodiment of the present invention is shown as well. Different types of wireless devices could work together to form, extend, and translate different communication methods to support the mesh network. These different wireless devices could be standard wireless devices such as smartphones, tablets, computers, or other standard controlling wireless devices with the device application loaded. Alternatively, these different wireless devices could be an auxiliary device with some specialized or standardized device application to either perform a specific function or general function in relation to the mesh network.

As example, a wireless device located outside of direct contact with the lighting network, but within range to another wireless device within range of the lighting network, could send commands through the wireless device to the lighting network and subsequent mesh network. In this case, the remote wireless device RD 4648 would originate the commands and then the localized wireless device WD1 4650 would act as the first network level of the mesh network. Note that the communication method between the remote wireless device RD 4648 and the localized wireless device WD1 4650 might be different than the communication method between the localized wireless device WD1 4650 and the II Devices lighting network. As an example, the remote wireless device (RD) 4648 may communicate with the localized wireless device WD1 4650 via an internet based protocol while the localized wireless device WD1 4650 communicates with the lighting network via a Bluetooth protocol. Also, remote wireless device (RD) 4648 could be another embodiment of Intelligent Illuminating Device 140.

Additionally, the remote wireless device RD 4648 might send a communication to the localized wireless device WD1 4650 to send a specific communication to the lighting network upon some defined event. In addition, the remote wireless device RD 4648 need not necessarily be outside of the range of the lighting control system. The wireless device WD1 4650 may also act as a specialized auxiliary wireless device such as an external ambient light sensor and communicate with other wireless devices.

The Real Time Clock inside of each II Device would need to be periodically updated to ensure accuracy. To achieve this, the device application on the wireless device would refer to and share its own current date and time information via the wireless communication and connection process—either as part of the status update process or an alternate process. Additionally, the II Devices themselves can update and reconcile discrepancies within the date/time without the wireless device itself being present in the network. The actual process to update the date/time setting of the RTC in an II Device from the wireless device/device application might be executed in a number of different ways.

Figure 47:
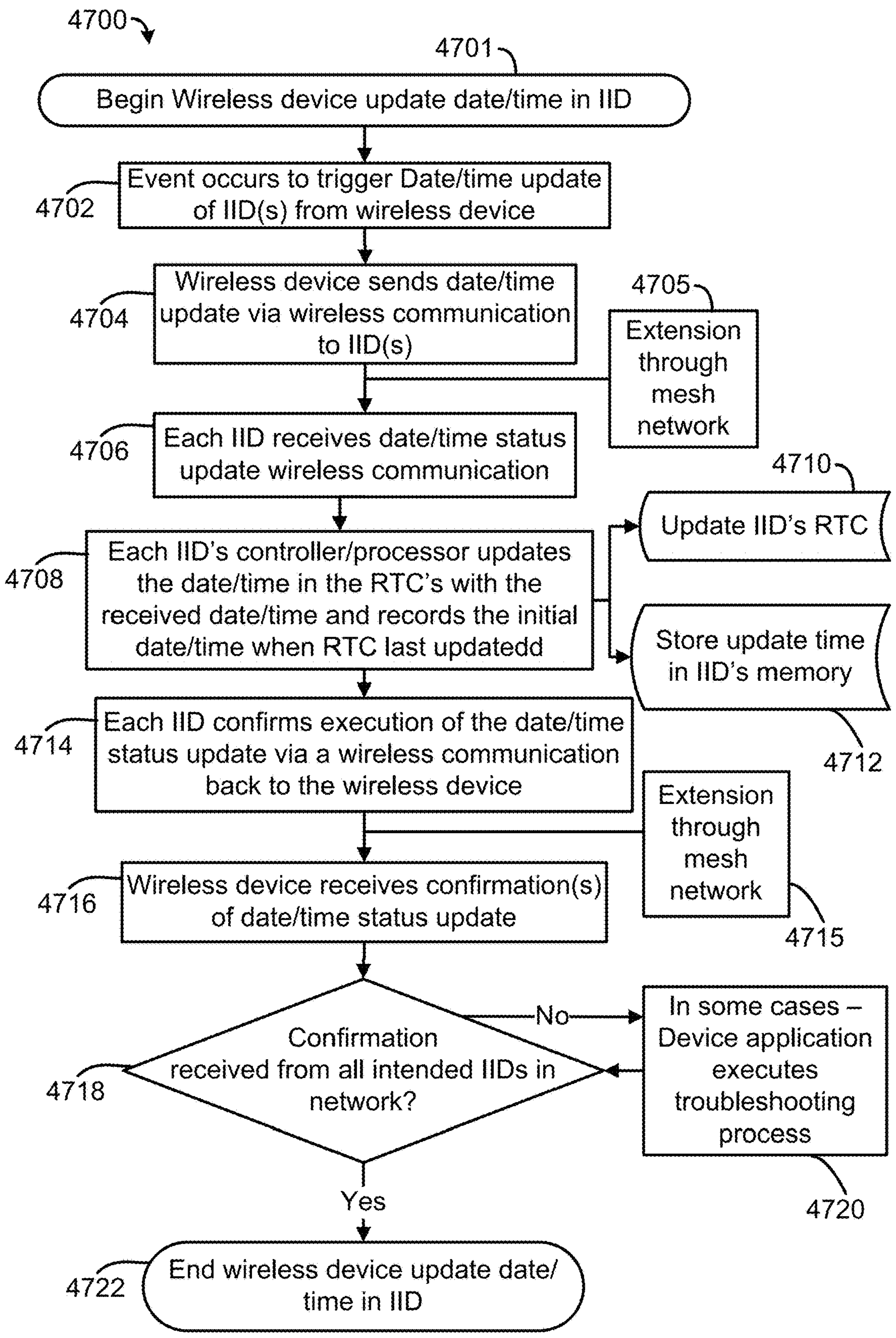
FIG. 47 is a flow chart of a wireless device update date/time process in Intelligent Illuminating Device in accordance with one embodiment of the present invention.

The following are potential but not limited to all examples of how a device to II Device date/time update process would be triggered, generally represented as element 4702 (FIG. 47). The wireless device/device application might send the date/time setting upon every command sent to the II Device network, and when received the II Device(s) would update the current date/time setting in the RTC and store latest update date/time in the II Device's memory. The wireless device/device application might periodically over some time or number of processes send the date/time setting upon every command sent to the II Device network, and when received the II Device(s) would update the current date/time setting in the RTC and store latest update date/time in the II Device's memory. The wireless device/device application might send the date/time setting only when specific programming commands are sent or active that requires information from the RTC and store latest update date/time in the II Device's memory. The wireless device/device application might send the date/time setting after some time setting is changed within the wireless device/device application. Further, any combination of the above might be applicable.

Figure 48:
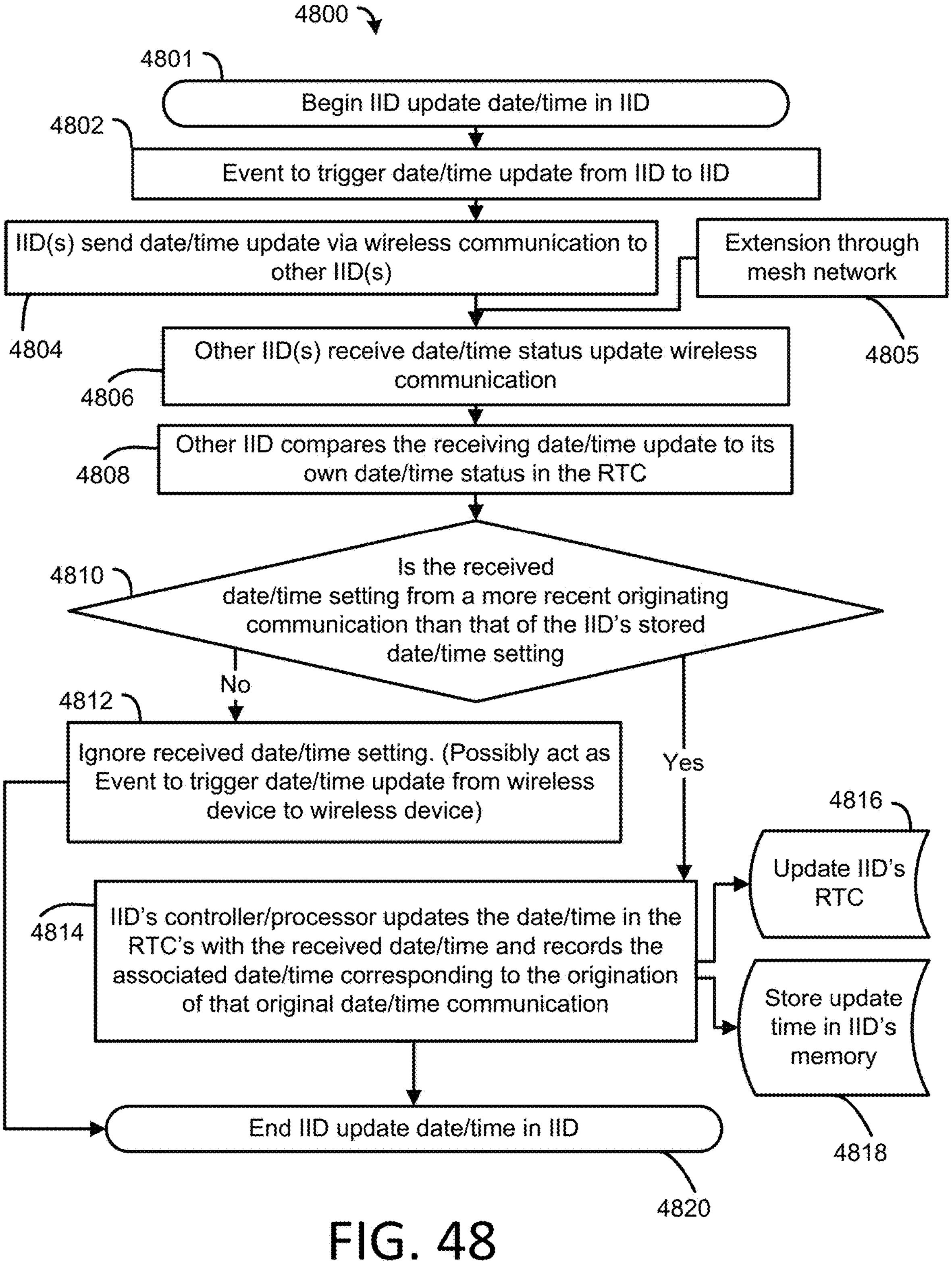
FIG. 48 is a flow chart of an Intelligent Illuminating Device update date/time in Intelligent Illuminating Device in accordance with one embodiment of the present invention.

Similarly, the process where II Devices share and reconcile date/time settings might be executed in a number of different ways. The following are potential but not limited to all examples of how an II Device to II Device date/time update process would be triggered, collectively represented as element 4802 (FIG. 48). The II Devices might share and reconcile their date/time at some multiple of when their status is shared. The II Devices might share and reconcile their date/time only when executing certain commands or processes. The II Devices might share and reconcile their date/time after some defined period of time. The II Devices might share but only reconcile their date/time when they are different. The II Devices might reconcile the date/time based on the most recent update of date/time setting. Further, any combination of the above might be applicable.

Now referring to FIG. 47, a flow chart of a wireless device update date/time process in II Device in accordance with one embodiment of the present invention is shown and referred to as element 4700. The actual reconciliation process and dependency in commands would proceed as follows, beginning with block 4701. When a wireless device update occurs as previously referred to as 4702, the II Device receives the date/time status update 4702, the wireless device sends a date/time update to any number of II Devices within range 4704 or through the mesh network 4705. When the II Device will update and match its internal time via the II Device's RTC and memory 4708, 4710. The II Device's memory will also update the date/time value as the original date/time when the RTC was updated 4708, 4712. The II Device would then confirm the execution of the date/time update back to the wireless device 4714, 4716. In some cases, the wireless device might execute a troubleshooting process if not all II Devices confirm execution of the date/time status update 4718, 4720. The process would conclude with block 4722.

Referring now to FIG. 48, a flow chart of an II Device update date/time in II Device in accordance with one embodiment of the present invention is shown and referred to as element 4800. The process begins with block 4801. When an II Device to II Device event occurs as referred to previously as 4802, either through a status update or solely a date/time communication, the II Device(s) would send a date/time communication out to any II Devices either directly within range 4804 or within range through the mesh network 4805. When an II Device(s) receives the date/time communication from another II Device 4806, the receiving II Device will compare the receiving date/time update to its own date/time status in the RTC 4808. If the received date/time communication was set more recently than that of the II Device's 4810, then the receiving II Device will update and match its internal time via the II Device's RTC and memory 4814, 4816. The II Device's memory will also update the date/time value when the RTC was updated 4814, 4818. If the values are the same or the received date/time was updated later than the receiving II Device's internally stored date/time 4810 to 4812, then the II Device takes no action 4812 and will complete the II Device to II Device date/time communication process 4820. Considering a mesh network system where there are numerous paths and scenarios, broadly the II Device's themselves will only update their date/time when the received date time originated from a more recent date/time update. Originated refers to the specific date/time when a wireless device sends an update to the II Device(s). If an II Device then passes that date/time on to another II Device, the originated date would still refer to the original date/time when the wireless device sent the update to the II Device(s).

Referring now to FIG. 49, a flow chart of basic control areas in accordance with one embodiment of the present invention is shown and represented by element 4900. Using the device application on a number of different wireless devices, a user could communicate and control the wireless lighting system in a number of ways. A user could control a single II Device, a combination of II Devices, a predetermined group of II Devices, multiple groups of II Devices, and the whole set-up of networked II Devices. Control pertains to adjusting brightness, color, running a program, or setting a program to run at a future time or upon some event. All processes begin with block 4901 and continue as follows:

Controlling a single II Device through the application: (a) a user will navigate through screens on the application to select 4902 an individual II Device (e.g., can arrive by 'drilling down' into a group or selecting the unique II Device to control); (b) once the single II Device is selected 4904, the device application will display potential options for control 4906; (c) potential options for control include but are not limited to the following collectively signified by 4908: (i) turning on/off to default, (ii) changing brightness, saturation, and/or color, and (iii) running a program now or upon some condition such as time. Alternate options for user customization include but are not limited to: (i) adding the II Device to an existing or new group, (ii) viewing the II Device's group assignments, (iii) viewing a hierarchy of programs and scenes that the II Device is included in, and (iv) troubleshooting the II Device. Once a user has selected the option for control, the device application will interpret the selection into a light control setting for the selected II Device 4910 and send a wireless communication via the appropriate processes, represented here collectively by element 4912. As such, once the individual II Device receives the communication, it will then interpret the instructions and execute the command, then relay confirmation back to the wireless device per the appropriate communications processes.

Controlling multiple II Devices through the application: (a) a user will navigate through screens on the application and select multiple II Devices 4902 (e.g., can arrive by 'drilling down' into a group or selecting the unique light IDs to control; (b) once the II Device IDs are selected 4914, the user will be given options for control 4916; (c) potential options for control include but are not limited to the following collectively signified by 4918: (i) turning on/off to default, (ii) changing brightness, saturation, and/or color, and (iii) running a program now or upon some condition such as time. Alternate options for user customization include but are not limited to: (i) adding the II Device to an existing or new group, and (ii) troubleshooting the II Device. Once a user has selected the option for control, the device application will interpret the selection into a light control setting for the selected II Devices 4910 and send a wireless communication via the appropriate processes, represented here collectively by element 4912. As such, once the individual II Device receives the communication, it will then interpret the instructions and execute the command, then relay confirmation back to the wireless device per the appropriate communication processes represented by 4912.

Controlling a group or multiple groups of II Devices through the application. A user will navigate through screens on the application and select a group or multiple groups of II Devices 4902. Groups of II Devices will be user configurable combinations of individual II Devices. They will most closely relate to rooms, but can have multiple combinations. Once the group 4920 or groups 4926 are selected, the user will be given options for control 4922, 4928, including but are not limited to the following collectively represented as element 4924 for a group or 4930 for multiple groups: (i) turning on/off to default, (ii) changing brightness and/or color, (iii) running a program now or upon some condition such as time, and (iv) turning on/off a program that is set to run in the future or upon some condition.

Alternate options for user customization include but are not limited to: (i) drilling down into individual II Devices for control, (ii) adding the group to an existing or new group, (iii) viewing a hierarchy saved settings, programs, and scenes that the group is included in, and (iv) troubleshooting the group. Once a user has selected the option for control, the device application will interpret the selection into a light control setting for the each II Device within the selected group or groups 4910 and send a wireless communication via the appropriate processes, represented here collectively by element 4912. As such, once each II Device within the selected group(s) receives the communication, it will then interpret the instructions and execute the command, then relay confirmation back to the wireless device per the appropriate processes discussed in the communication processes represented by 4912.

Controlling a whole network of lights through the application is similar in fashion to controlling multiple groups, represented by a similar sequence of elements 4902, 4932, 4934, 4936, 4910, and 4912. All basic control processes end at block 4938.

Programming is a process by which an II Device, multiple II Devices, a group, or multiple groups can execute a command or sequence of commands given some other event occurs or condition is met. Similarly, an II Device, multiple II Devices, group, or multiple groups could be given a sequence of commands to execute in sequence at some time interval. Unique to the invention disclosed, a user can create programmed commands, send them wirelessly to any number of specified II Devices, and the command would execute given a condition being met. The condition will generally be related to time, but many types of conditions could be interpreted into time-based activities. For example, wireless devices able to access the Internet provide a wealth of potential conditions that could be converted to time passed or the wireless device could passively monitor the condition and send a command when met.

Generally a condition could be executed through these sources: (a) the wireless device sends a command to any number of II Devices to execute a program given a date/time passing or date/time being met (e.g., simulated sunrise, timer, etc.); (b) the wireless device sends a command to any number of II Devices to execute a program given some other conditionally based input directly available to the II Device (e.g., ambient light sensor program); (c) the wireless device sends a command to any number of II Devices to execute a program with the condition being met at that time and the action stored in the II Devices memory (e.g., reset process); (d) the wireless device sends a command to any number of II Devices to execute a program with the condition being met at that time and the action specified through the command (e.g., starry night); (e) the wireless device sends a command to any number of II Devices to execute a program given some other conditionally based input available to the lighting control network is available to said II Devices (e.g., auxiliary ambient light sensor program); (f) the wireless device sends a command to any number of II Devices to execute a program in coordination with wireless communications/commands provided sequentially through the device application (e.g., music sync); (g) the wireless device runs a program to monitor some condition and upon that condition being met sends a command to any number of II Devices to execute a specified command or sequence of commands (e.g., weather alerts); (h) any combination or sequential representation of the above program types.

Creating a program involves similar processes to basic control. A user selects an II Device, multiple II Devices, group, or multiple groups to run a program. The user then selects a program to be run by the selected II Device(s): (a) there could be predefined suggested programs based on the items selected (e.g., stored in device application memory); (b) the user could create their own program; (c) each program will consist of at least one command to be run when one or more conditions are met, or multiple commands to be run sequentially or upon further conditions being met (e.g., user to set/select condition); (d) the program can be run at that time or saved to run at a future time (e.g., the program can be set to repeat on certain dates/times, such as days of the week, every X days, or any time lapse interval). The command or series of commands is then sent via the wireless network to each associated II Device(s). This is done through the appropriate wireless communication process. Each II Device(s) then interprets the command or series of commands, executes the command, or stores the command in memory to be executed when conditions are met. Similarly, each II Device(s) would confirm the program command via the appropriate communication method process.

Now referring to FIG. 50, a flow chart of a programming process in accordance with one embodiment of the present invention is shown and referred to as element 5000. Once a program or programs are saved a user can recall and toggle those programs on/off. The process begins with block 5001. At the main level of the device application 5002, there will be a 'programs' button. When selected 5004 this will display all programs associated with the active profile. Each program will be listed with their current status as active vs. inactive. The programs will be sorted based on active vs. inactive status with active listed first. Secondly, the programs will be sorted based on the proximity of the associated II Devices to each program 5006. When toggled on 5008, the application will send the command or series of commands via the wireless network to each associated II Device(s) 5010 through one or more appropriate communication processes, collectively represented here as 5012. The actual light setting associated with the program might be stored in device application so that the wireless communication is to execute a specific program type command. The actual light setting might also be stored in the II Device itself 5014 so that the device application/wireless device only requests the II Device to run that program. Each II Device(s) then interprets the command or series of commands and their related program conditions, executes the command given a present condition, or stores the command in memory to be executed at a later condition time or event. In the latter case, once the condition is met the II Device(s) will execute the program command 5018. Then if there are further conditional commands within the program 5020, the II Device will continue to monitor for conditions until they are met 5016 and the II Device similarly follows the process to execute the program command 5018. Once no further conditional commands are in the program 5020, the program completes and changes to inactive status 5022 so that the program commands are deleted from the memory of each related II Device, and the program returned to an off status in the device application 5024. Alternately, a program that was set to run can be turned off 5026 so that the wireless device sends a command to the related II Devices to not execute the conditional command prompted by the program 5028. This command would be communicated through one or more appropriate communication processes, collectively represented here as 5012. When received, each II Device would change the program to complete and change it to inactive status 5022 so that the program commands are deleted from the memory of each related II Device, and the program returned to an off status in the device application 5024. The program might still be saved in the device application memory for future use, if a saved program. The program run process ends in block 5030.

In the case where program commands would overlap with each other, the device application will prompt the user to confirm the program selection. In such case, the selected program will overlap any conflicting previously activated program. Alternatively, if the program commands originated from multiple devices or profiles, the II Devices will execute programs in the order of profile hierarchy. Alternatively, the programs might execute in the order of the last received command.

Scenes & suggested scenes will now be described. A scene is a predefined setting or program related to multiple II Devices and/or groups, so that with one user selection any or all II Devices would execute a specified setting or program. This element is useful to support very holistic functional lighting like turning off all II Devices before going to bed, turning on some II Devices to walk to the bathroom, setting a mood for dinner or a movie, or many other personal preferences. A scene is comprised of a defined light setting and/or program for each of any number of individual II Devices and/or any number of groups. When a scene is activated, the device application recalls the defined light setting(s) and/or program and the associated II Device (s)/group(s) and sends a standard wireless command to each.

Figure 51:
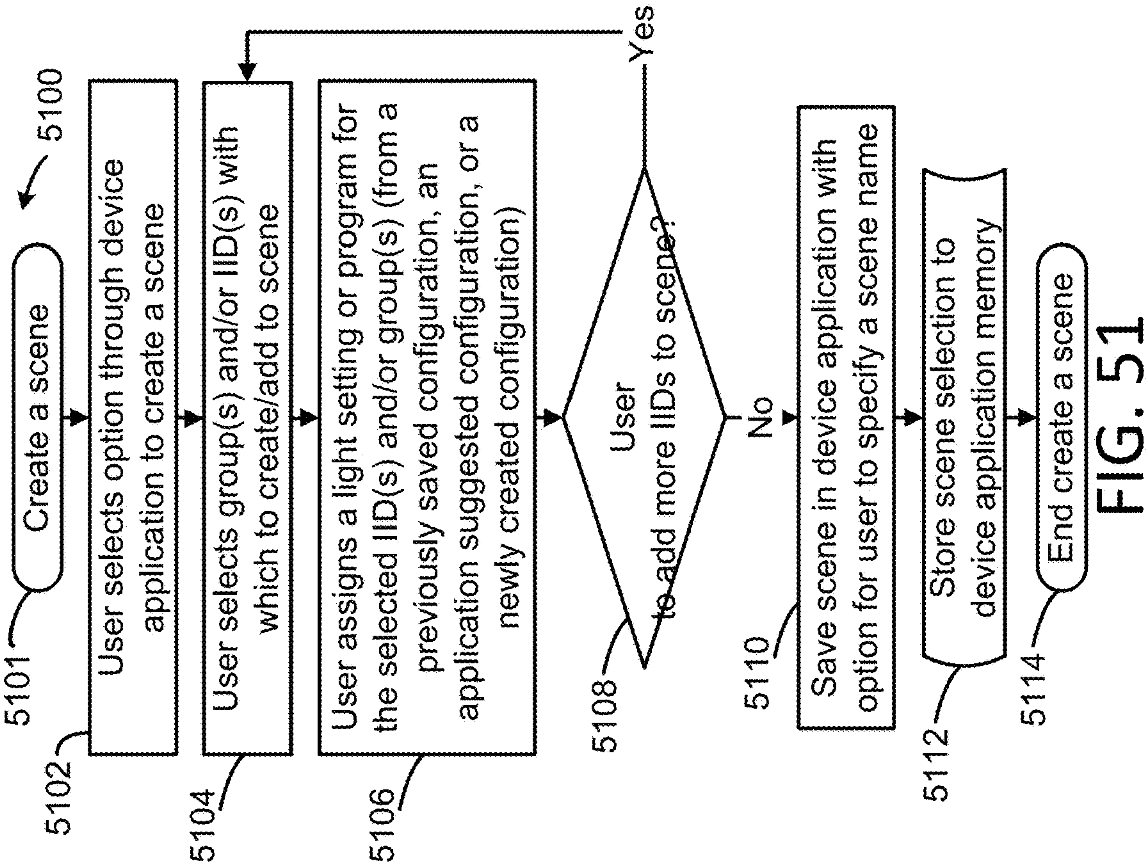
FIG. 51 is a flow chart of a process for creating a scene in accordance with one embodiment of the present invention.

Referring now to FIG. 51, a flow chart of a process for creating a scene in accordance with one embodiment of the present invention is shown. The scene control selection can be both suggestive and user configurable. A user could drill into each established scene to view or edit the states for each II Device, add more II Devices, etc. A user could also select a scene to be run at a previous time such as through an automation program. Scenes might display graphically in the user interface with the most used scenes or the scenes containing the II Devices with the closest signal strength higher in order. Users could also drag and drop the order of scenes displayed to their preference.

Once a network of II Devices is set-up, the application might suggest some pre-configured scenes dependent on the number of II Devices set-up within the network and the names of the groups (most likely rooms) that were assigned. More specifically, the device application would refer to the list of groups configured by the user, and if certain pre-defined keywords or combinations of words were found within those groups, the application would suggest/show a scene related to that group or groups in the scene options. Also, the device application would refer to the number of II Devices, the number of groups, and the number of II Devices within each group to create suggested/predefined scenes. With more II Devices, groups, and II Devices within groups, more complex scenes could be suggested, or more group specific scenes could be suggested. All # of II Devices would include scenes all off and all on related to turning all II Devices off within the addressable network, or turning all II Devices on. As example, for any lighting network containing a group of lights with the word "TV", "Television", "movie", "film", or related word, the application would suggest a lighting scene related to watching a movie, such as a soft blue light emitted from each of the II Devices. The types of suggested scenes could vary dependent on different applications.

Through the device application, the user can create a new scene, referred to as element 5100 and beginning in block 5101, by first selecting the option to create a scene in the device application 5102 and selecting any number of II Device(s) and/or group(s), with which to start creating the scene 5104. The user would then select/create the lighting control setting or program for the selected II Device(s) and/or group(s) II Device. Here, the light setting might be a previously user saved configuration, an automated application suggested configuration, or a newly created configuration 5106. Once selected, the user would then have the option to add additional subsets of II Device(s) and/or groups to the scene 5108, which would revert back to a similar configuration process for that selection 5104, 5106. Once the user has configured all the II Device(s) and/or group(s) that they wish 5108, the scene, comprised of any combination of II Device(s) and/or group(s), each with a specified light setting or program, will be saved and the user could assign a specified name 5110. This information will be stored in the device application memory 5112 and the process will end in block 5114.

Note that each II Device within the scene is able to have a different II Device brightness and/or color. In addition, pre-defined programs for II Device(s) can also be run or activated through a scene in combination with a specific type of lighting to be executed at that time. For example, a 'time to sleep' scene might turn off all the II Devices in the network, except for one II Device on very low blue light in a child's bedroom, and activate the II Device alarms for all bedrooms in the house for a certain time. Once the user has selected the II Devices and lighting output, the user can save that scene for future use as referred to previously in 5110. The scene is saved within the device application memory 3012.

Figure 52:
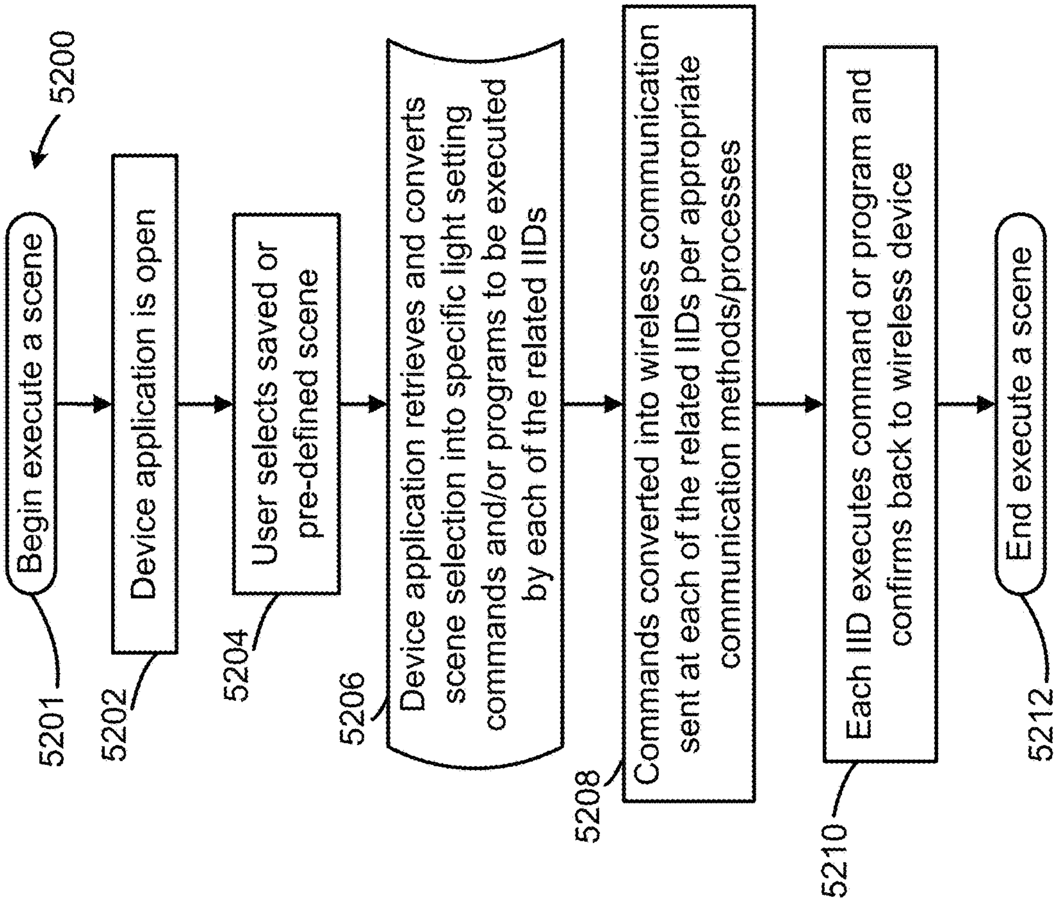
FIG. 52 is a flow chart of a process for executing a scene command in accordance with one embodiment of the present invention.

Now referring to FIG. 52, a flow chart of a process for executing a scene command in accordance with one embodiment of the present invention is shown as element 5200. The process begins in block 5201. To turn a scene on, when the device application is open 5202, the user would select (switch on) the desired saved (or suggested) scene as an option presented in the device application interface 5204. The device application would then retrieve and convert the scene selection into specific light setting commands and/or programs to be executed by each of the related II Devices in the scene 5206. The wireless device would then convert the series of II Device light setting commands or programs into the appropriate wireless communications directed at each of the related II Devices within the group 5208. Upon receipt, each II Device would execute its related light setting command or program and send the appropriate wireless communication back to the wireless device to confirm execution of the scene 5210. The process completes in block 5212.

Changing and adding unique groupings of II Device (Setting up your own groups) allows for user configurable set-up, alteration, and assignment of any number of II Device combinations of the addressable lighting network. Within the device application, each II Device has its own unique ID. Through the application a user can combine any number of II Devices and or existing groups together to form a group of II Devices. This can be done through user gestures (dragging and dropping), selecting an individual and assigning to a group, or through the easy-setup program. Once any number of lights is assigned into a group, a user can select commands to all II Devices within the group by simply selecting the group.

Figure 53:
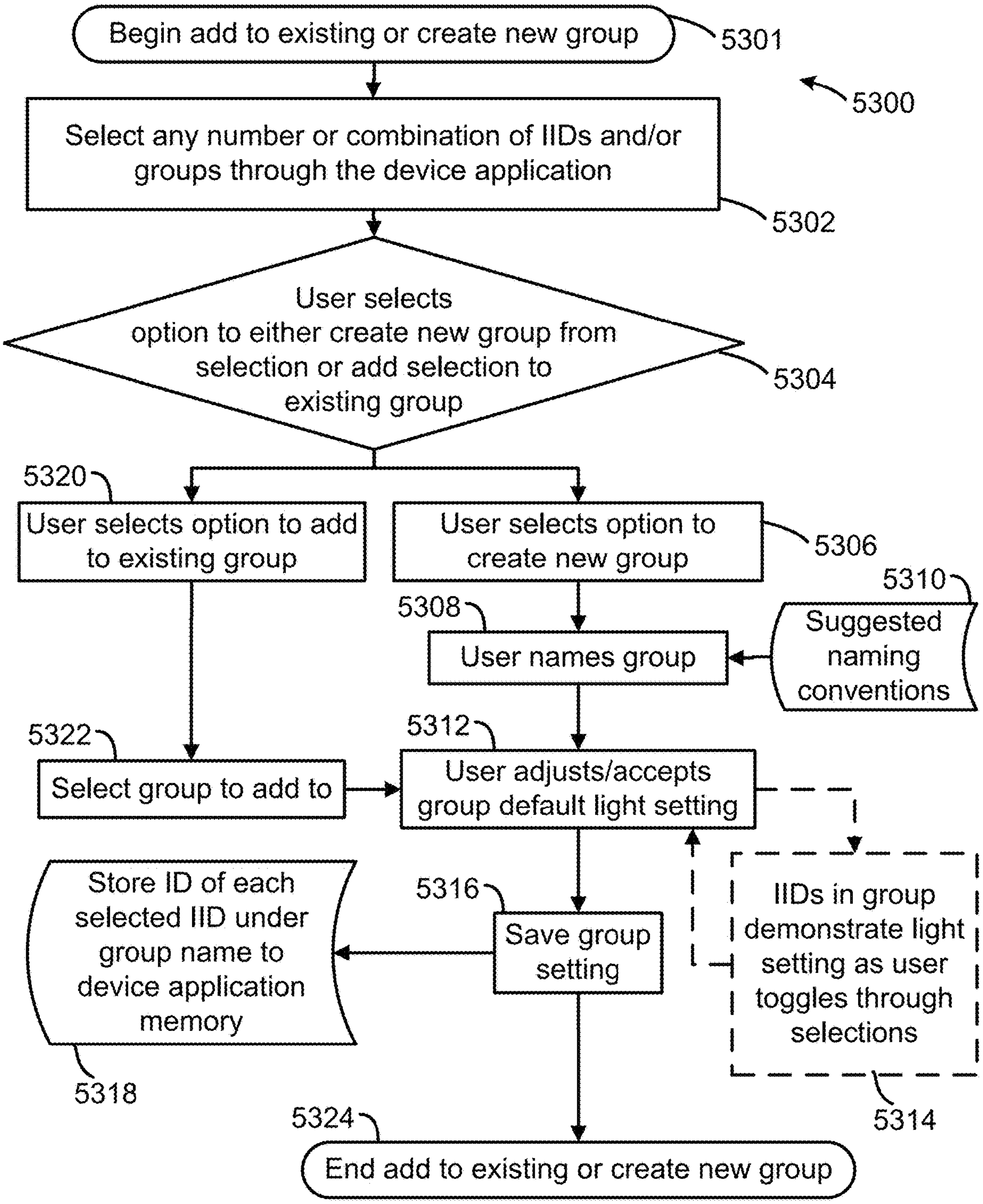
FIG. 53 is a flow chart of a process for creating a new group or adding to a new group in accordance with one embodiment of the present invention.

Referring now to FIG. 53, a flow chart of a process for creating a new group or adding to an existing group in accordance with one embodiment of the present invention is shown as element 5300. The process begins with block 5301. A user selects any number or combination of II Devices and/or groups through the device application 5302. The user then selects the option to either create a new group from the selection or add the selection to an existing group 5304. If creating a new group from selection 5306: (i) then the user will need to name the group 5308 (e.g., the device application might have a list of predefined naming conventions that a user has the option of selecting 5310, or they can type their own); (ii) the user would then be prompted through the device application to set a group default light setting for all II Devices within the group 5312 (e.g., a user could select different unique light settings for each II Device within the group that are all saved under the group light setting (see default process for more details); (iii) as the user is selecting the group default light setting, if in proximity to the actual lighting network the wireless device would adjust the related II Devices to execute the light settings as the user is toggling different options while selecting a default group setting 5314; (iv) once a user selects and sets the group default light setting 5312, then the group setting could be saved 5316 to the device application's memory to be run in the future 5318 with the process ending in block 5324. For adding the selection to an existing group 5320: (i) the user would then select what group to add the selection to via the device application 5322; (ii) the user would then be prompted to confirm extension of the default group setting to the newly selected II Devices/groups or create new light settings for the selected II Devices within the group 5312; (iii) as the user is selecting the group default light setting, if in proximity to the actual lighting network the wireless device could adjust the related II Devices to execute the light settings as the user is toggling different options 5314; and (iv) once a user selects and sets the group default light setting 5312, then the group setting could be saved 5316 to the device application's memory to be run in the future 3218 with the process ending in block 5324.

Figure 54:
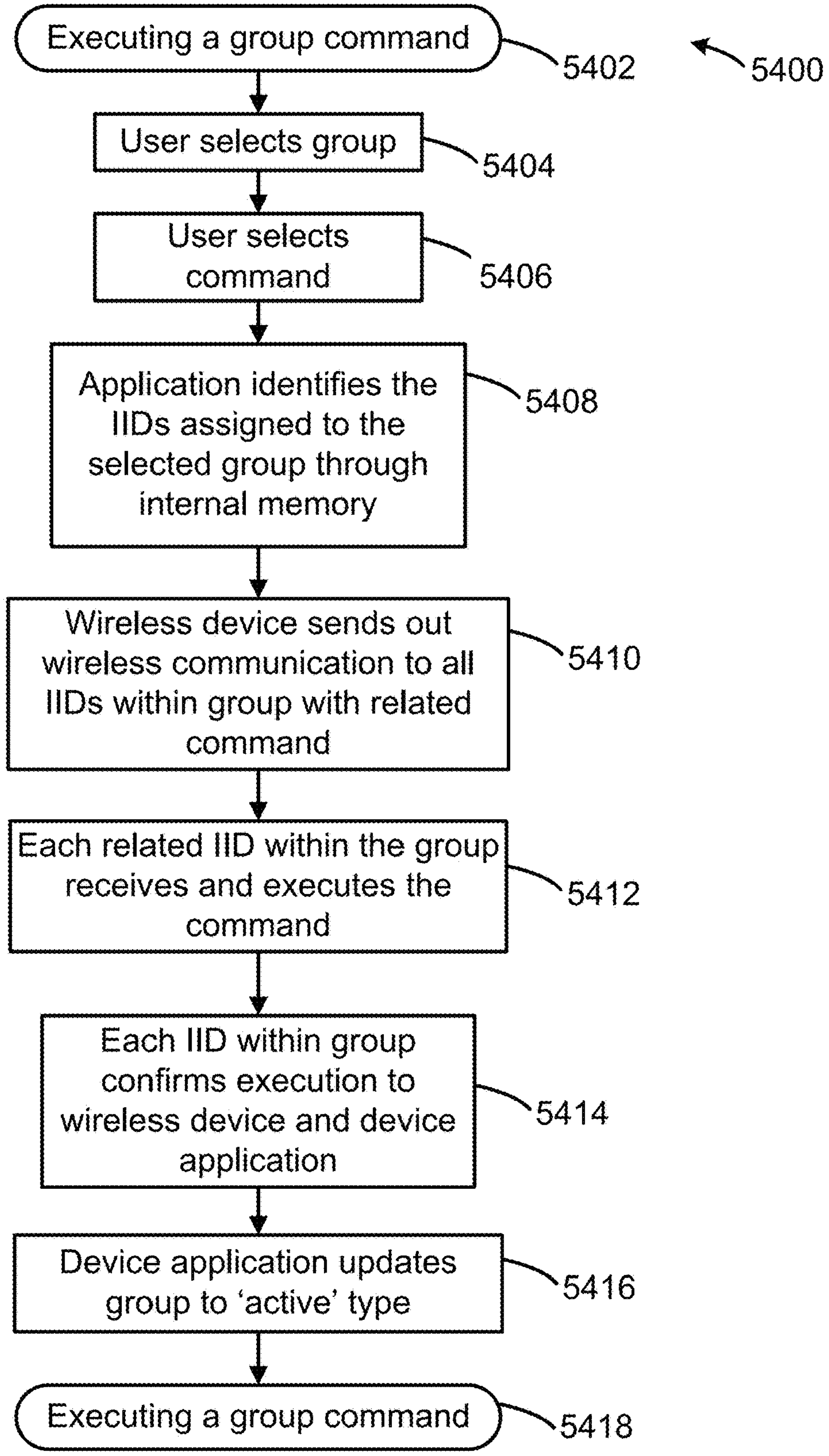
FIG. 54 is a flow chart of a process for sending a group command in accordance with one embodiment of the present invention.

Now referring to FIG. 54, a flow chart of a process 5400 for executing a group command in accordance with one embodiment of the present invention is shown as element 3500. The process 5400 begins in block 5402. User selects group(s) 5404 and related light setting command/program 5406 through the device application user interface. The application then identifies the II Devices assigned to the selected group through internal memory 5408. Wireless device running application sends commands through wireless communication for those specified II Devices in the group 5410 following the appropriate communication methods/processes. Each II Device receives and executes the intended light control setting or program 5412. Each II Device responds to the wireless device to confirm execution of the group command 5414 following the appropriate communication methods/processes. Upon receipt of all confirmations the device application would update the group to 'active' or 'on' in the user interface 5416 with the process ending in block 5418. Note that any individual II Device can be assigned to multiple groups. Multiple groups can be combined, adjusted, or used to create new groups. Also note that in some scenarios not all II Devices assigned to a group could be accessed due to signal range limitations or other problems. In these cases, the user would still have the ability to control those II Devices that are accessible at that time. Similarly, a notation could be made in the user interface signifying a group that is not fully accessible.

A process will now be described for setting, using, and changing default light levels for any number of II Devices (including switching on/off through an external switch, such as a wall switch (see FIG. 81)), so that a user can easily customize, save, and recall their standard lighting preference. Additionally, a process allowing for anyone to turn on the preset default of the II Devices, without using the application will also be described. Each II Device will always have an associated default light level. Each II Device might have multiple related default light levels with the following framework. (i) Manufacturing default—for each II Device the most basic light setting stored in each II Device's internal memory. The manufacturing default light setting will always be stored in the II Device's memory. (ii) Light default—for each II Device, the active default light setting that will be executed when the II Device is turned on directly as in the process steps of 4900 to 4904 to 4938 (not through a group command) or upon power restoration. Each II Device can only have one light default. This default light setting is stored within each II Device's memory until the II Device is reset or the light default is changed. When unassigned, the light default reverts to the manufacturing default. Group default(s)—The light setting that will be executed by each II Device within the selected group when the selected group is turned on through the device application. The group default is stored within the device application related to each group. Each II Device is able to execute multiple group defaults, dependent on which group the user has selected to turn on and their individual commands within the group default. During the set-up process, or any time after installation, a user can change the light default or group default settings through the device application.

The manufacturing default will most likely be a standard high output white type of light. This light setting will be programmed into each II Device during the manufacturing process and stored into the II Device's memory. This default will first be executed when the II Device is powered on for the first time. As such, the manufacturing default is independent of the device application. After a light default is assigned, the light default setting will take precedence over the manufacturing default; however the manufacturing default setting will still stay stored within the II Device's memory. When a light is reset to the manufacturing state, either through the hard or soft reset function, the light default will be erased and the II Device will revert back to the manufacturing default acting as the light default.

Figure 55:
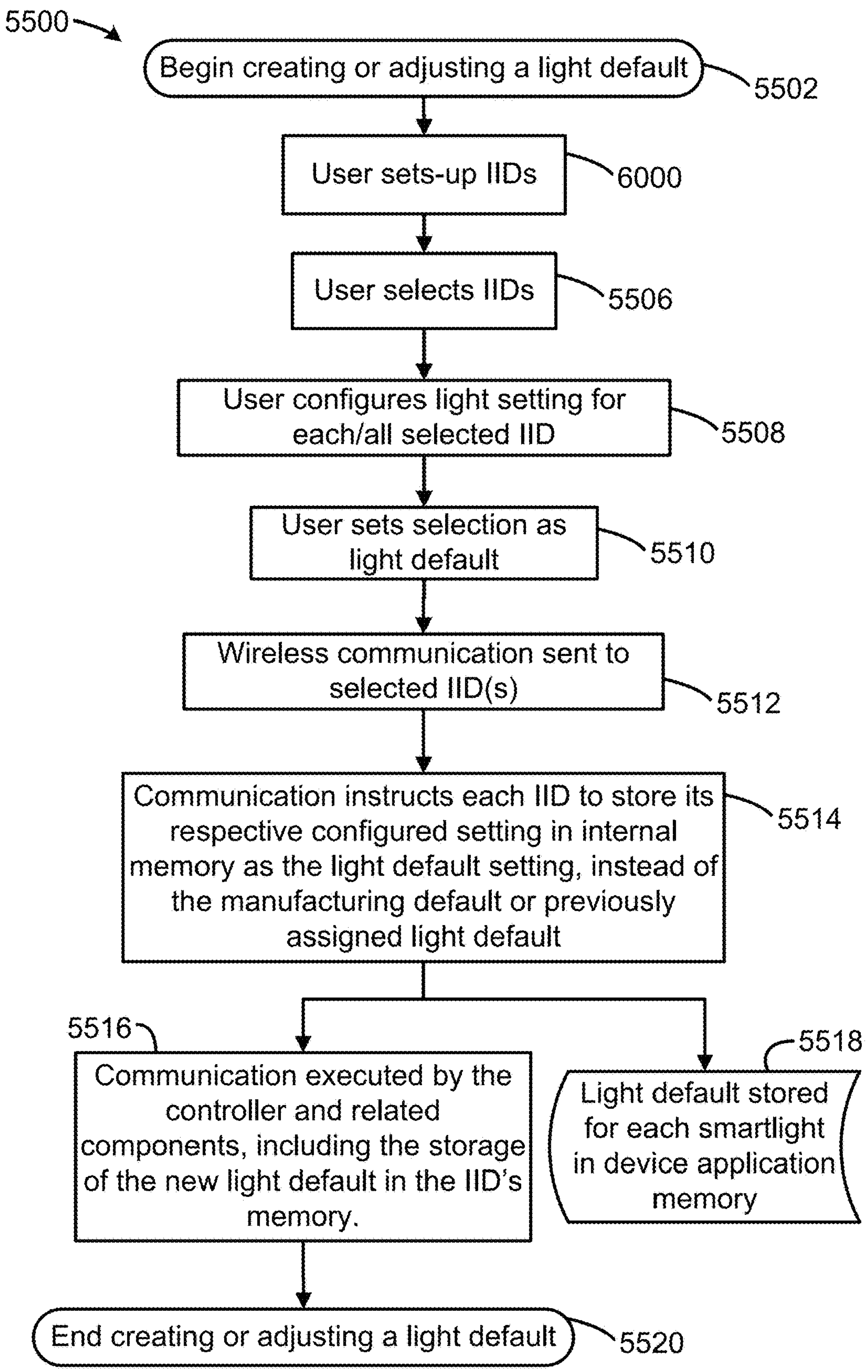
FIG. 55 is a flow chart of a process for creating or adjusting a light default in accordance with one embodiment of the present invention.

Referring now to FIG. 55, a flow chart of a process for creating or adjusting a light default in accordance with one embodiment of the present invention is shown and referred to as 5500. The process begins at block 5502. At any time after setting up an II Device with the device application such as the process described in 6000, a user can select or adjust a personalized light default setting. A user can select one or more II Device(s) through the device application 5506, adjust the color and/or brightness 5508 and set that selection as the light default for the respective II Device(s) 5510. Upon assignment of the light default, the device application via the wireless device will send a wireless communication to the related II Device(s) 5512, through an appropriate communication means. The communication will instruct each II Device to store its respective configured setting in its internal memory as the light default setting, instead of the manufacturing default or previously assigned light default 5514. This communication request will then be executed by the controller and related components, including the storage of the new light default in the II Device's memory 5516. The assigned light default light setting will also be stored in the device application memory 5518. This would end the process for setting a new or changing an existing light default setting 5520. The light default setting can be changed or adjusted at any time and would follow a similar, if not the same, process for creating a new light default as described as element 5500. Each II Device can only have one light default at a time.

Figure 56:
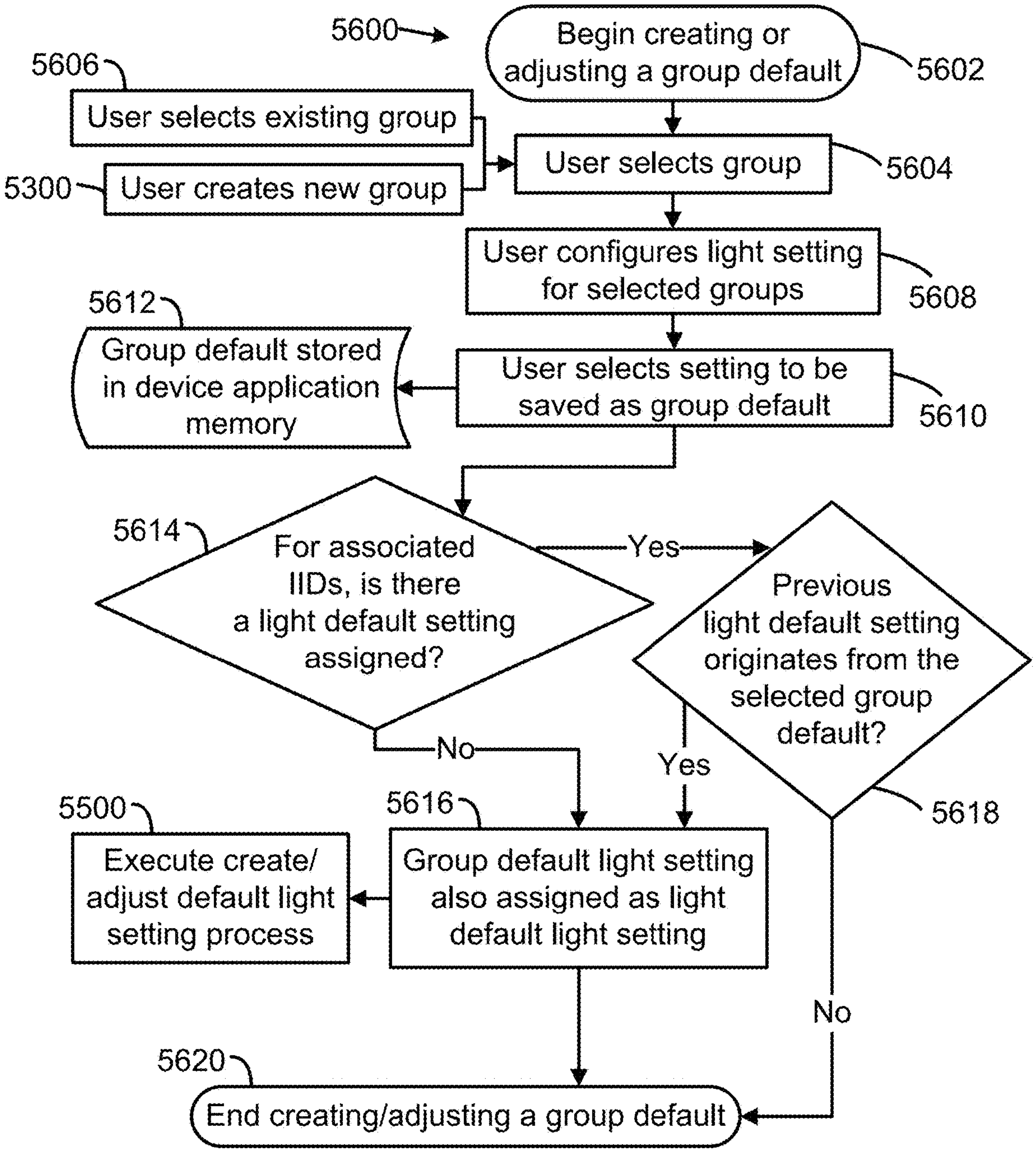
FIG. 56 is a flow chart of a process for creating or adjust a group default in accordance with one embodiment of the present invention.

Now referring to FIG. 56, a flow chart of a process for creating or adjust a group default in accordance with one embodiment of the present invention is shown and referred to as 5600. The process begins with block 5602. First, the user would select the group to assign or adjust a group default 5604. This could happen either through selection of an existing group in the device application 5606 or when a user creates a group as in the process 5300. A selected group might consist of one group or multiple groups together. The user will then need to specify the particular light setting for that selected group(s) to execute when turned on as a group 5608. Once a group default is selected for the group 5610, the associated light setting for each II Device within the group will be stored within the device application 5612, to be executed at that time or in the future. If a group default is set for associated II Devices that do not have a light default 5614, the group default light setting will also be assigned and communicated to each related II Device as the light default light setting 5616. This will most likely happen during the initial set-up and grouping process. In this scenario, the device application and related wireless device will execute the wireless command similar to that in setting a light default 5500, and the group default process will be complete as signified by block 5620. Similarly, if unedited at the light default level, future changes to the group default will similarly change the respective light default setting. When an II Device associated with the group already has an assigned light default 5614, but that light default was originally set by creating that same group default that is being configured 5618, then the light default will be adjusted as the group default it was originated from is adjusted 5616 and each II Device will execute the process to adjust its default light setting with the group default light setting as in the process 5500. The group default process will then be complete as signified by block 5620. If the light default setting did not originate from the group default being configured 5618, then the light default will not be updated and the group default process will be complete as signified by block 5620. When the group default is executed, it follows a similar process as that for executing a group command or 3500.

Figure 57:
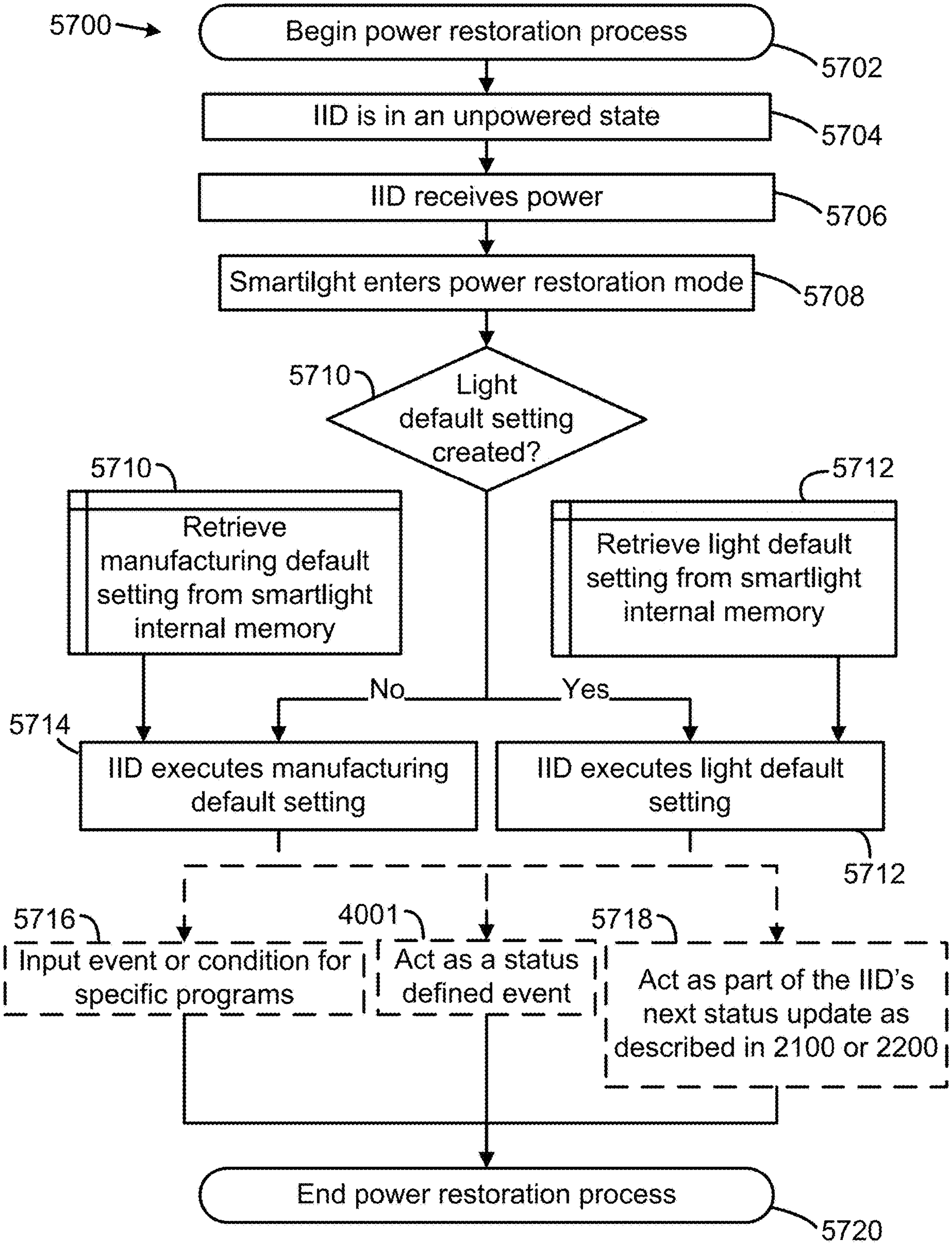
FIG. 57 is a flow chart of a power restoration process in accordance with one embodiment of the present invention.

Referring now to FIG. 57, a flow chart of a power restoration process in accordance with one embodiment of the present invention is shown and referred to as process element 5700. The process begins with block 5702. Anytime an II Device goes from not having an electric current 5704 to having an electric current 5706, for any period of time, the II Device will execute the power restoration mode 5708. If a light default is assigned to the II Device 5710, the power restoration mode will trigger the II Device to recall the light default setting from its internal memory and execute the light default setting 5712. If unassigned 5710, the II Device will recall the manufacturing default setting from its internal memory and execute the manufacturing default setting 5714. In addition, the power restoration event and/or association in executing either the light default setting or manufacturing default setting could act as an input event or condition for specific programs 5716, such as the quick set-up or quick grouping processes, or as a status defined event 4001 or part of the II Device's next status update 5718 as described in 4000 or 4100. The process ends with block 5720. This would commonly occur when a light switch is changed from 'off to on, or from on to off to on. A user would not need to utilize the device application to trigger the light default action in this sense. The power restoration mode, or more simply turning the power source to the II Device off, will cease any currently running (the II Device is executing it at that time) program, scene, or setting, but will not erase any program that is active (set to be run in the future) and its associated setting from the II Device's memory. A user could choose not to utilize the power restoration mode can by turning it off through the user's settings on the device application.

Figure 58:
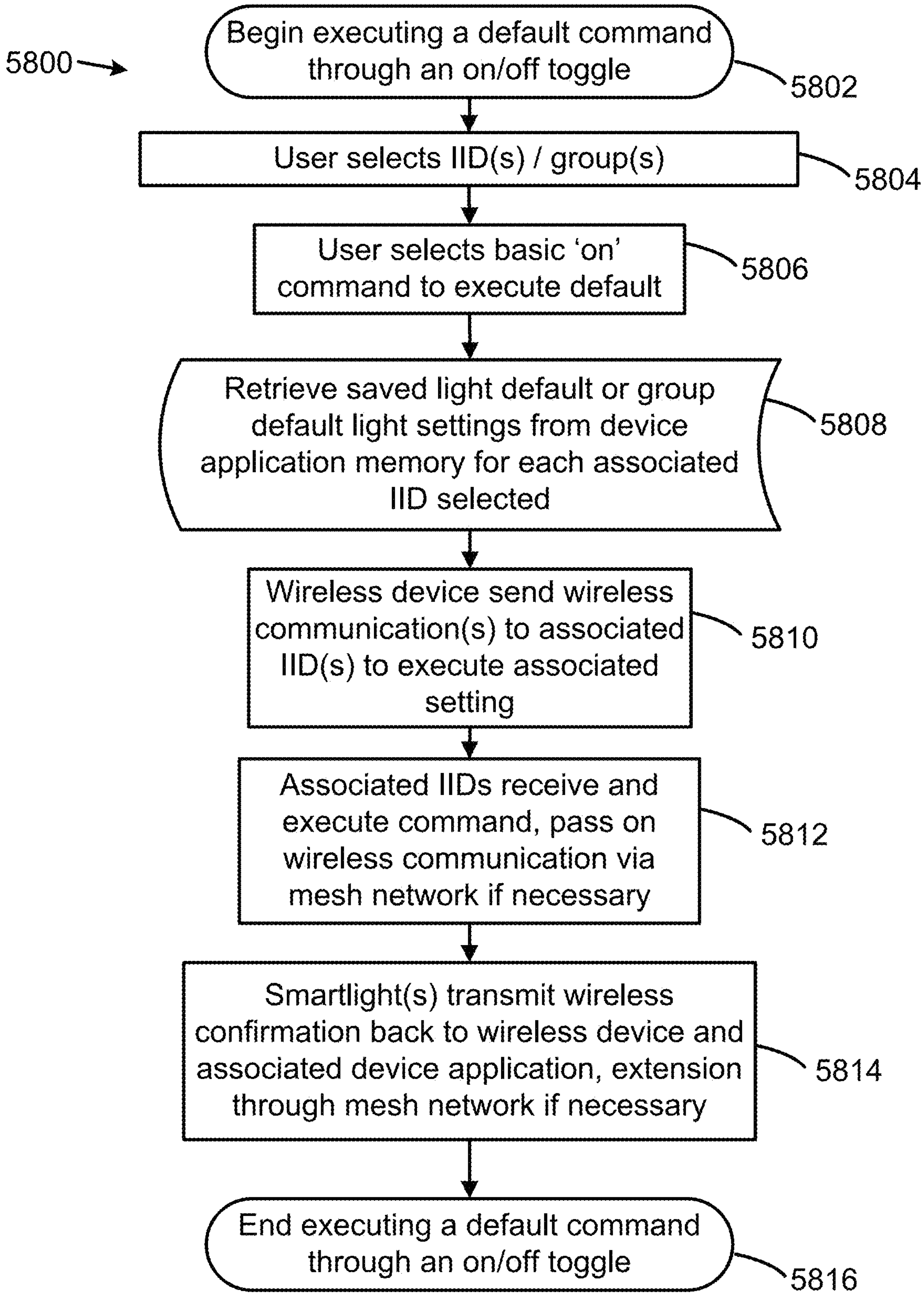
FIG. 58 is a flow chart of a process for executing a default command through an on/off toggle in accordance with one embodiment of the present invention.

Now referring to FIG. 58, a flow chart of a process for executing a default command through an on/off toggle in accordance with one embodiment of the present invention is shown and referred to as 5800. The process begins with block 5802. A user would select the desired II Device(s) and/or group(s) through the device application 5804 and toggles the basic 'on' command related to executing the selection's respective defaults 5806. When toggled 'on' the device application would retrieve the appropriate saved default including the related II Device(s) and their associated light settings 5808. The wireless device would then send an appropriate wireless communication to the II Device (s)/group(s) to execute their respective light setting 5810. Each related II Device would then receive and execute the command 5812, and then it will respond to the wireless device confirming execution of the command 5814 following the appropriate communication methods/processes. The process would end with block 5816. A user could turn off or adjust any running default command through the process outline above, 5800. Referring now to FIGS. 59A-59F, diagrams of various screens on device application in accordance with one embodiment of the present invention are shown. The device application will generally be run on a wireless device such as a smartphone, table, or computer. In these cases, the device application will most likely have the below screens and sections to support user control of the wireless lighting control system. A user could toggle between screens through various human computer interaction methods, dependent on the wireless device, but most commonly will be gestures and/or touch selections.

Figure 59A:
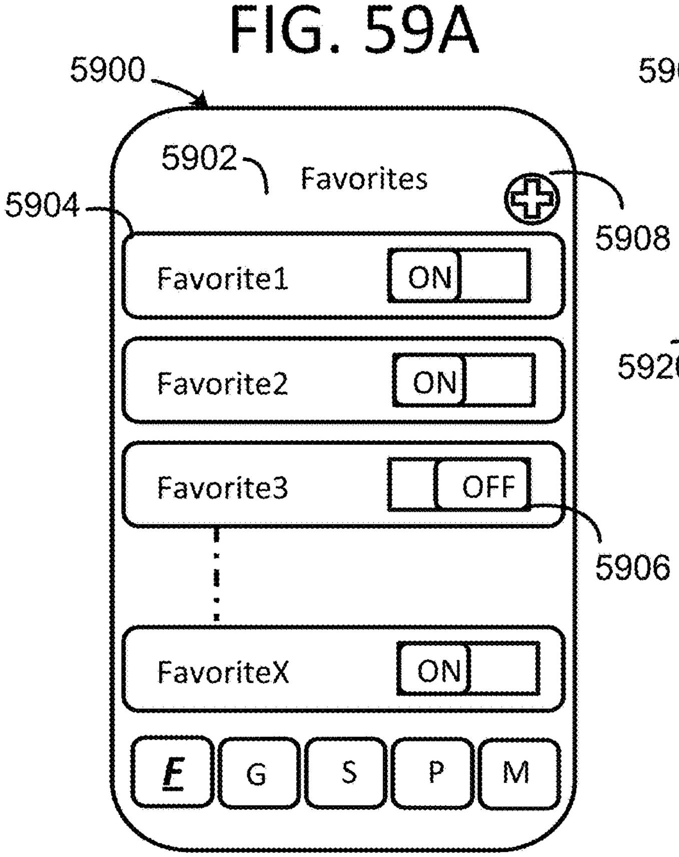
FIG. 59A-59F are diagrams of various screens on device application in accordance with one embodiment of the present invention.

As shown in FIG. 59A, a device 5900 displaying a favorites screen 5902 will display a list of user generated favorite commands relating to II Devices, groups, programs, and scenes. Each item displayed on the screen, as exemplified by 5904 as one item, would be a specific selection of II Devices and an associated action that could be activated through toggling of the on/off button, represented by 5906. When selected, the wireless device and related II Devices will execute the related communication method for that command. A user can also add or delete favorite settings through this screen or various other screens, for example a user could select 5908 in the figure to perform this command.

Figure 59B:
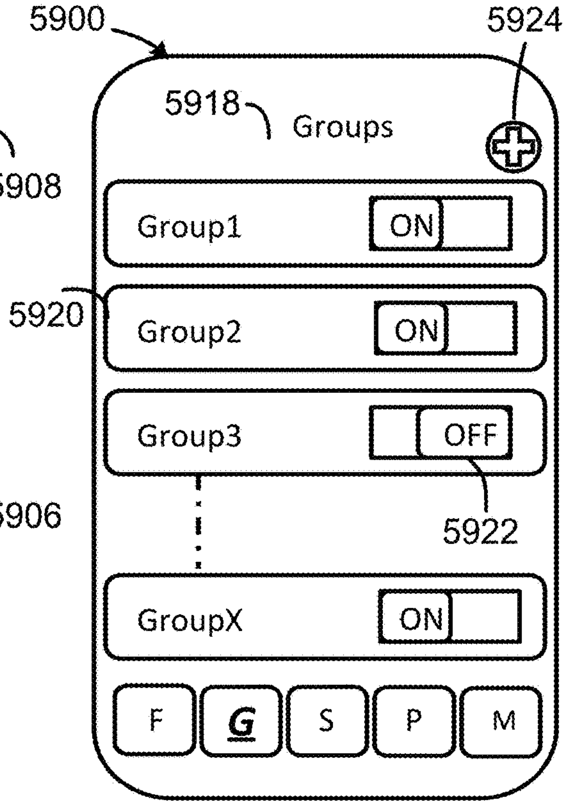

As shown in FIG. 59B, a device 5900 displaying a screen 5918 will display a list of all groups created within the device application's profile. Each or multiple groups, as exemplified by one group as 5920, could be selected to turn on to the group default setting, or off; exemplified by the selection of 5922. Each or multiple groups could also be selected and then given some specific command or other option as outlined in the groups section. When selected, the wireless device and related II Devices in the group (s) will execute the related communication method for that command. A user can also select a group to view the individual II Device screen filtered to just that group. A user can add, edit, and or delete group(s) and default group settings through this screen or various other screens, for example a user could select 5924 in the figure to perform this command.

Figure 59C:
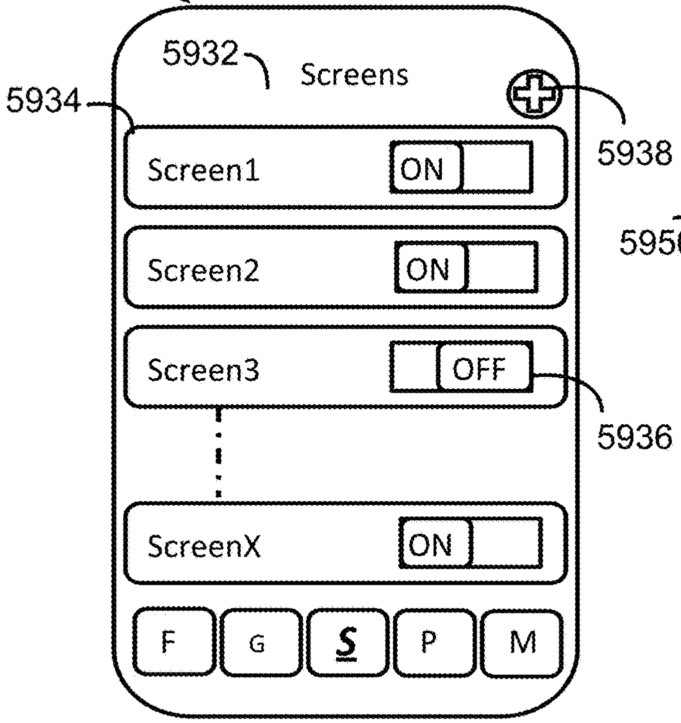

As shown in FIG. 59C, a device 5900 displaying a programs screen 5932 will display a list of all programs created or suggested (manufacturing default programs) within the device application's profile with an on/off status for each program. Each program, as exemplified as one program by 5934, could be selected to turn on or off, a command potentially executed by toggling 5936. Additionally, each program could be selected, edited, or deleted. When a program command is selected, the wireless device and related II Devices to the program will execute the related communication method for that program. A user can add or delete program(s) through this screen or various other screens, for example a user could select 5938 in the figure to perform this command.

Figure 59D:
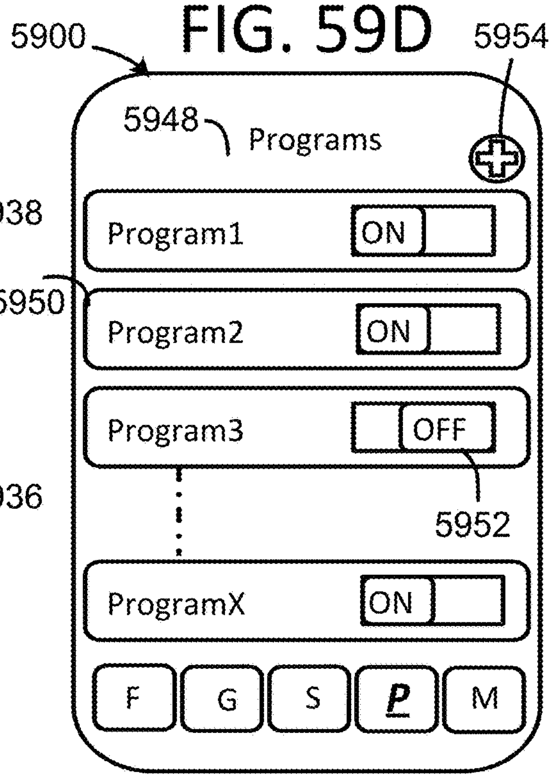

As shown in FIG. 59D, a device 5900 displaying a scene screen 5948 will display a list of all scenes created or suggested (manufacturing default scenes) within the device application's profile with an on/off status for each program. Each scene, as exemplified as one item by 5950, could be selected to turn on or off, a command potentially executed by toggling 5952. Additionally, each scene could be selected, edited, or deleted. When a scene command is selected, the wireless device and related II Devices to the scene will execute the related communication method for that scene. A user can add or delete scene(s) through this screen or various other screens, for example a user could select 5954 in the figure to perform this command.

Figure 59F:
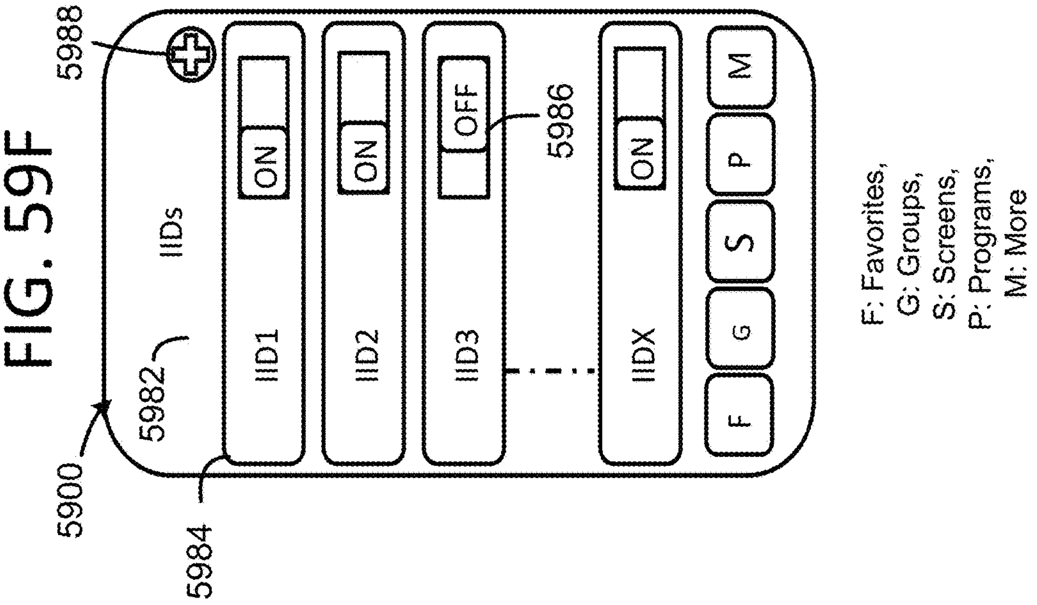
Figure 59E:
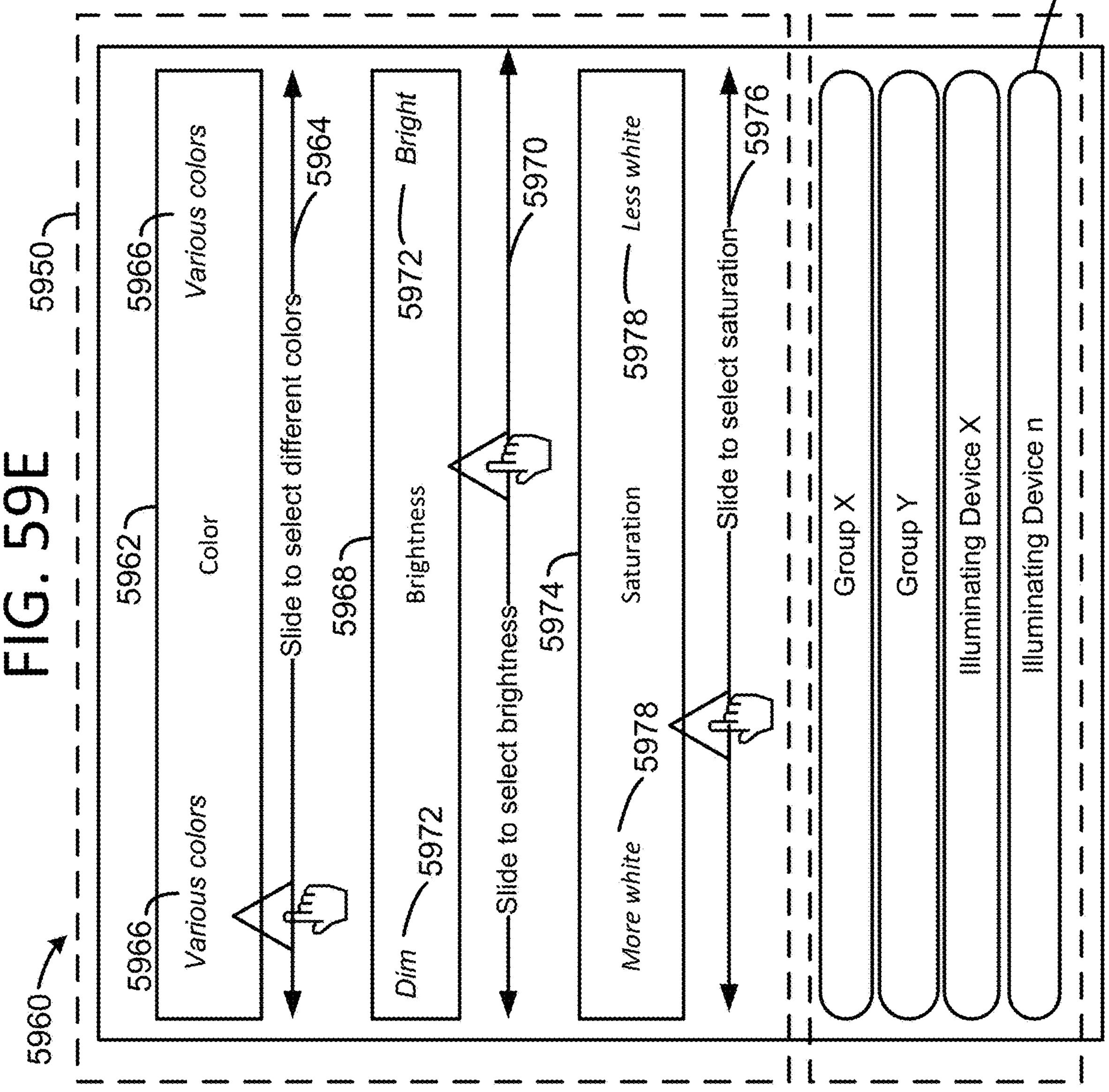

As shown in FIG. 59E, a configure screen 5960 is used to adjust the color 5962, brightness 5968, saturation 5974, and other configuration for selections of II Device(s), group(s), program(s), and/or scene(s). The configure screen 5960 might be different depending on the selection and specific type of configuration. In general, the configuration screen 5960 will consist of the three level lighting control interface 5950 and a list of the selection (II Device(s)/group(s)) 5952. There would most likely be related configuration screens for the selection of program conditions, scene creation/editing, and other more complex configurations.

More specifically, certain II Devices with color and white could be controlled through three levels: color 5962, saturation 5968, and brightness 5974. This functionality is derived by the capabilities of the schemes in the LED controlling circuit and related LEDs and supported device application. Color levels would be derived by combining different variations and combinations in the average luminosity passed through the II Device's LEDs. A color level selection 5962 refers to an input on a user interface that would go to create any number of colors derived from the mixing of the LEDs found in the II Device. The color level could be controlled incrementally or at fixed points, for example a user could select a color level from a color slider 5964. Alternatively, a user could select specific colors from the color level such as blue, green, red, etc. as represented by 5966.

Brightness levels would be derived by either increasing or decreasing the average current passed through the LEDs of the II Device, but in the same proportion as that required for the selected color. The difference in brightness levels would only be apparent in variations in the luminosity of the light emitted from the II Device. The color will stay constant when adjusting the brightness. Similarly, a brightness level selection 5968 could be controlled incrementally or at fixed points, for example a user could select a brightness level from a slider 5970. Alternatively, a user could select specific brightness levels such as 25%, 50%, dim, bright, etc. as represented by 5972.

Saturation levels would be derived by adding or subtracting some proportional amount of average current passed through the white LEDs with respect to the average current combinations of the set color. The overall effect of increasing the saturation level would be reducing the relative amount of white light produced by the II Device in relation to the colored LEDs. The overall effect of decreasing the saturation level would be increasing the relative amount of white light produced by the II Device in relation to the colored LEDs. Similarly, the saturation level selection 5974 could be controlled incrementally or at fixed points, for example a user could select a saturation level from a slider 5976. Alternatively, a user could select specific saturation levels such as 25%, 50%, lighter, darker, etc. as represented by 5978. Note that the change in saturation selected through the device application would not necessarily have a linear relationship to the amount of white light added or reduced, but it could be exponential or through some other calculation. The overall effect and process would manage the saturation levels so that the perceived difference is gradual to the user, while managing for the constraint in the amount of current available to the LEDs.

As shown in FIG. 59F, a device 5900 displaying a II Device screen will display a list of all II Devices either selected or identified within the device application's profile, the screen represented by 5982. Each II Device, as exemplified as one II Device by 5984, could be selected to turn on or off to the light default, a command potentially executed by toggling 5986, or configured in some other fashion. Additionally, each II Device or combination of II Devices could be selected, edited, or given some other command or selection as outline in the basic control section. When an II Device command is selected, the wireless device and related II Device(s) will execute the related communication method, for example a user could select 5988 in the figure to perform these types of commands.

Figure 60:
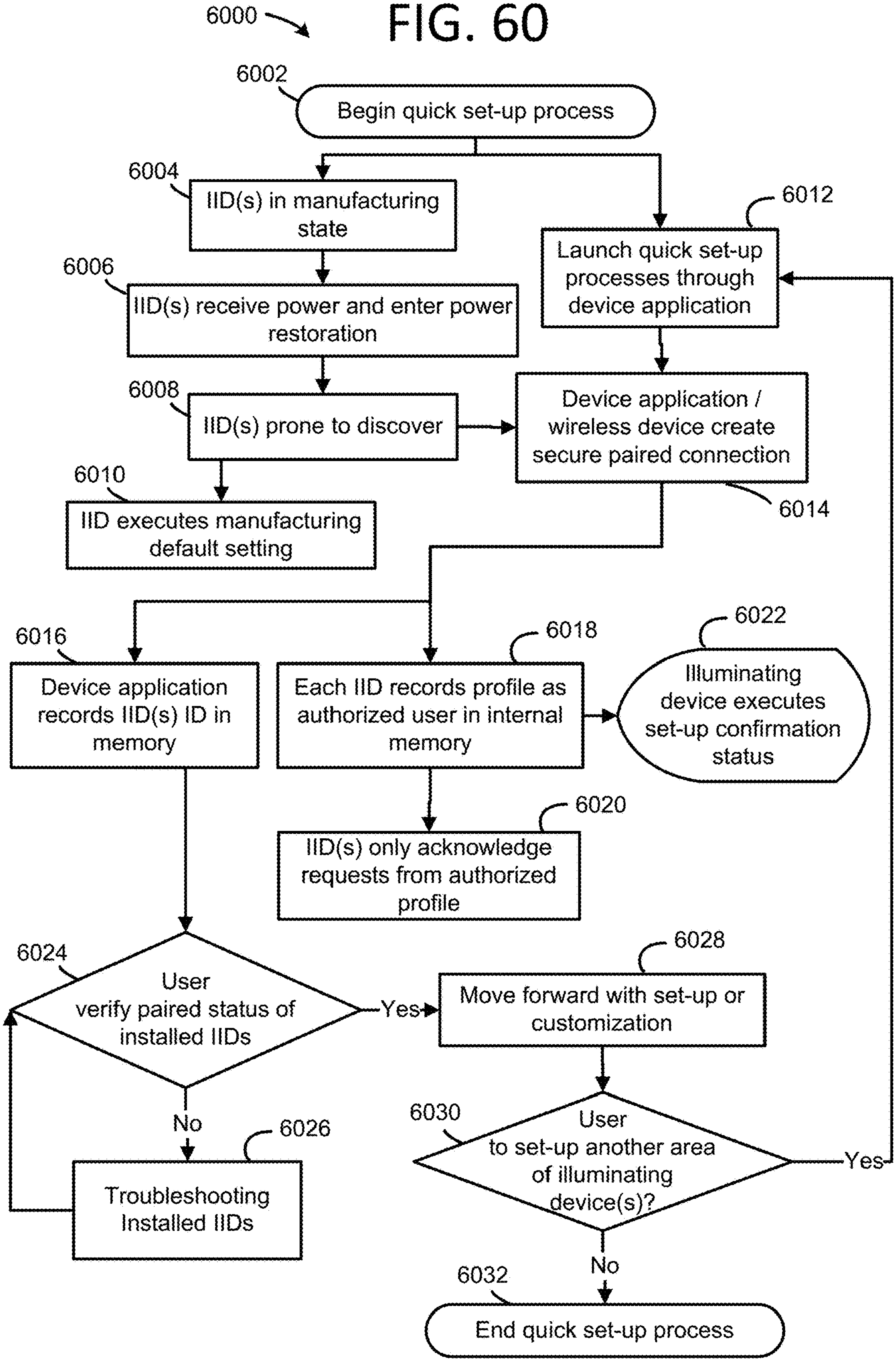
FIG. 60 is a flow chart of a quick set-up process for connected lights in accordance with one embodiment of the present invention.

Now referring to FIG. 60, a flow chart of a quick set-up process for connected lights in accordance with one embodiment of the present invention is shown and referred to as 6000. A process that allows an II Device or multiple II Devices to quickly and securely establish a connection with a wireless device and the associated device application and with other connected II Devices around it. The process begins in block 6002. Each II Device when initially purchased or reset will be in a manufacturing state 6004. When in a manufacturing state, upon receiving initial power (current), the II Device(s) will enter power restoration mode 6006 as described in FIG. 57. The II Device(s) will then be prone to discovery by a wireless device with the associated device application 6008. The II Device(s) would also execute the manufacturing default light setting 6010. Upon launch of the quick set-up process on the device application 6012, the wireless device and II Device (s) in the manufacturing state will then identify and connect to each other if within range or through an extended mesh network in the manufacturing state to create a secure paired connection 6014. The device application on the wireless device will then store each detected II Device's unique ID 6016, so that it can communicate with it in the future. Each II Device would similarly recognize and store a unique ID associated to the user's device/profile 6018, so that only that smartphone/profile ID can send directions to the II Device in the future 6020. Similarly, the II Devices could send commands and communicate with each other.

In some embodiments—the set-up process could use different color light settings as cues in the set-up process. For example, the II Device would display a certain color upon initial power up, signaling to the user that the II Device is not connected to the network. Then upon establishing connection to a profile, the II Device would change colors to signal the connection has been established 6022. Next, a user might confirm that all II Devices are connected and select an option in the device application to move forward with the set-up 6024. If not all connected, then execute troubleshooting steps with user. Identify problem II Device. Execute quick troubleshooting steps 6026—step closer, screw in/secure connection to power source. User can possibly provide confirmation through the device application that all II Devices are a specific color. All II Devices become connected, and user selects option that II Devices are not all connected, then prompt to select color of light. Should be color of unpaired light or no light, if unpaired light, ask user to step closer to the II Device and select OK. Then should connect and user can continue set-up. If no light, ask user to make sure that the II Device is firmly screwed in and the light switch is on. Then proceed through set-up menu. Once user confirms set-up of installed II Devices 6024, they can continue with any further set-up or customization processes 6028, such as adding names, defaults, and favorites. A user can repeat this process to continue setting up other II Devices 6030 until all intended II Devices are set-up and the quick set-up process is complete 6032.

Figure 61:
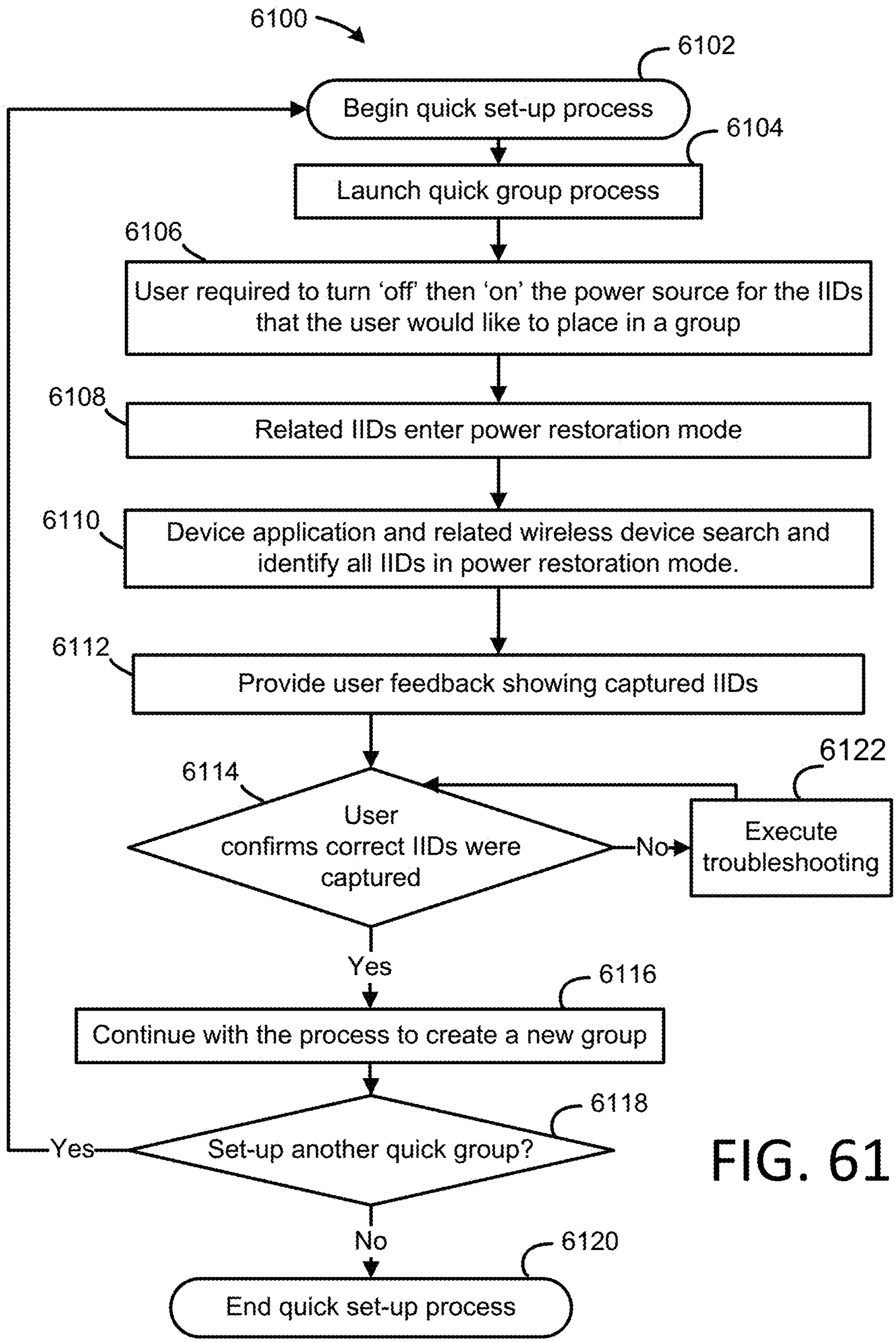
FIG. 61 is a flow chart of a quick group process through power restoration in accordance with one embodiment of the present invention.

Referring now to FIG. 61, a flow chart of a quick group process through power restoration in accordance with one embodiment of the present invention is shown and referred to as process element 6100. A quick group process through power restoration provides a quick way for a user to combine II Devices into a named group through use of the power restoration mode. It could be a guided process within the set-up process of the II Devices network through the device application as described in FIG. 60. It also could be run after the initial set-up of the II Device network. The process begins with block 6102. Upon launch of the quick group process through the device application 6104, though device application instruction, or in the natural course of set-up, the user will turn off the power source to the related II Devices that they would like to group, then turn the power source back on 6106. When done, this will prompt the related II Devices to enter the power restoration mode 6108. This action will most likely be through the use of a wall switch. The II Devices will execute the appropriate default setting as discussed in FIG. 57. The device application and related wireless device will then search for all II Devices that have entered the power restoration mode through various communication methods previously discussed, record their unique IDs 6110, and display the associated II Devices through the user interface on the device application or some other type of user feedback means 6112. The user will then be prompted to confirm that the correct II Devices were captured 6114. Could use color cues to help with the confirmation as discussed in FIG. 70. If user does not confirm, then go to troubleshooting steps 6122. If yes, then continue with the process to create a new group 6116 as outlined in FIG. 51. After setting up a quick group the user might then be asked if they would like to set-up another quick group through the device application 6118. If yes, then repeat the quick group process 6102. If no, then end quick group process 6120.

Upon initial set-up of a lighting network, a user will create a profile. Profile refers to a combination of unique username and password that would be related to one or many user's accounts. The profile would have multiple purposes—1) to provide an authentication method for communication within the wireless lighting system (network of II Devices and wireless devices), 2) to associate and save user preferences and configured settings of the wireless lighting system to the device application and possibly saved elsewhere, and 3) provide a user associated account for billing, support, or other services. Through the initial set-up process, as described in FIG. 60, each II Device within a lighting control system will store the Profile's username and password or some encrypted version of the profile's username/password in its memory. Similarly, the wireless device and device application will store all II Device ID's within the lighting control system (lighting network) to the device application memory.

Now referring to FIG. 62, a flow chart of a profile authentication process in accordance with one embodiment of the present invention is shown and referred to as 6200. See also FIGS. 41-45 for other related process information. The profile authentication process begins in block 6202. Upon any communication from a wireless device or other II Device to one or many II Devices, the wireless communication will include some version, possibly encrypted, of the associated profile 6204. Upon receipt of a wireless communication 6206, each II Device will verify or authenticate the command by referring to the stored profile(s) in the communication. If the profile from the wireless communication, recovered from the II Devices memory 6214, matches that of the stored profile(s) 6208, then the II Device will execute the appropriate response specified by the wireless communication 6210. If not, then the II Device will disregard the communication 6212. The process ends then at block 6214.

Referring now to FIG. 63, a flow chart of a process for saving settings under a profile in accordance with one embodiment of the present invention is shown and referred to as element 6300. The process begins in block 6302. After a user has created a profile 6304, when a user creates any number of settings or information as represented as 6306 (programs, defaults, groups, scenes, favorites or other information), the settings and related information can be saved to the device application memory under the heading of the user's profile 6308. This would allow for replication and/or back-up of user preferences to avoid loss of data and user convenience 6310. In addition, this would allow for sharing, duplication, and restoration of user settings through authentication means by referring to the user profile 6312.

In some cases, a user could save their profile and associated settings to a computer 6314, either through the back-up of the application to application management software or through some light control system specific back-up software. In addition, the profile information and settings could be saved or backed up through a direct connection or through some wireless connection. In addition, the profile information could be saved to a remote data center, or in 'the cloud' 6316.

After a profile is saved or 'backed-up', a user could restore settings and profile information to an existing or new wireless device/device application 6318. A user could share the profile information and authentication as described in FIG. 64 and included here as block 6320. A similar process would be used for adding a new wireless device with device application running the same profile or duplication 6322. Note that there may be multiple profiles assigned to one lighting control system or II Device network. Similarly, the same device application could host multiple user profiles. The same profile could be shared across multiple wireless devices. The timing and exact process of a profile saving event 6324 might differ depending on the device application. It might happen and reoccur at automatically at given time periods or events, or require some input from the user to either specify events/times, or require a user to select a save option. Though the actual process might be ongoing, for the purposes of this description, the process ends in block 6326.

All II Devices(s) will have unique id(s). Ids will depend upon the types of II Device embodiments: (a) there could be different types of II Devices depending upon the application where they will be used (e.g., II Devices made for higher light (luminosity) output and limited color range could be called as type 1 II Device, while II Device with only white light output with controllable brightness could be called as type 2 II Device. Similarly, there would be different types of II Devices based upon different shapes and/or sizes and/or features and/or light outputs in terms of colors and brightness); (b) there could be numerous potential ID structuring of the II Devices, but consider the below as a representative example:

II Device id will have following structure with "aaabbbccc". "aaa" could be any number of characters defining the device as II Device. These characters will be common and at the same place in the ids of all II Device. "bbb" could be any number of characters defining the type of II Device. These characters will be common for a particular type of II Device, but will be different for different types of II Devices. These characters will at the same place in the id of all II Devices. "ccc" could be any number of characters and with that II Devices will get a unique id. For example, consider id "illdev001001012712", "illdev012234010512" for two different II Devices—here, first ten characters "II Device" in both the ids will identify the device as II Device. Next four characters "t001" in first id and "t012" in second id identifies the devices as different types of II Devices. Last 9 characters "001012712" in first id and "234010512" in second id combined with other characters defines a unique id for the two II Devices.

The wireless lighting control system, including both wireless devices and II Devices will be able to differentiate its related commands from other wireless communication system commands through the unique IDs prefix, such as "aaa". Additionally, a wireless communication within the wireless lighting control system would also be associated with a profile id for authentication purposes. When a wireless device then sends a command to an II Device it will send the command directed at the specific ID required to execute that command. Similarly, there could be a command related to a specific ID that is embedded in a command sent to another II Device ID, in this case the second command would communicate to send the command to the second II Device. See mesh network processes for further information.

Profile Sharing. A user's profile including their configured settings can be transferred in a multitude of ways from an authenticated device application/wireless device to other non-authenticated device applications/wireless devices to provide authentication, share profile settings and information, or other profile related information. Utilizing the device application, there is an option to pass on authorization to the lighting control system (II Device network) from one wireless device to another wireless device. Additionally, a user can share or copy their profile (saved settings) with another wireless device. The receiving wireless device would need to have some version of the device application on their device. There are a few different processes one could take to execute profile sharing, but consider the below as an example:

Now referring to FIG. 64, a block diagram of a device to device profile sharing process in accordance with one embodiment of the present invention is shown and referred to as 6400. To execute this process, one would open the authenticated device application on one wireless device as represented by 6402. Then open the device application on the receiving or new wireless device as represented by 6404. A user would then select command on the authenticated wireless device application to share profile. Might in some cases need to select command on the non-authenticated wireless device to receive shared profile. The authenticated wireless device might then be prompted to select what aspect of the settings to share, such as provide access to network, share groupings, share programming, copy full profile settings, or mirror full profile settings. Upon selection of aspects to share, the wireless devices would then connect via a wireless communication 6406 (Bluetooth most likely) and begin transferring the selected information, as represented by 6408, from the authenticated wireless device to the receiving wireless device. Upon receiving the selected information, the user should have access to whatever aspects were selected.

Referring now to FIG. 65, a flow chart of a process for adding an authenticated profile directly through the II Device in accordance with one embodiment of the present invention is shown and referred to as 6500. In this process, the authenticated profile 6502 would send a wireless communication to the wireless control system (II Device network), represented by 6504, with the command 6503 to add the non-authenticated profile 6510 to each II Device's list of authenticated profiles. Each II Device, represented here collectively as 6506, would then execute the command and add the authenticated profile to each II Device's list of authenticated profiles as represented collectively by 6508. Once complete, the non-authenticated profile would then be authenticated and able to communicate and control the lighting control system (II Device network), as represented by 6512. Also, consider that a user could share/transfer a profile to one other device through text. An alternate way to share profile and settings would be to select an option through the application to send a text message to another phone. This method would be useful when both devices are not present and the second device is a mobile device. The text message would include a unique URL to download the application and auto-populate the profile username and possibly the password. In addition, consider that multiple devices could simply refer or log-in to an existing authenticated profile that has been saved to some accessible source. This would allow any wireless device with an associated device application to access, receive, or create and authenticate a new profile by logging in with the authenticated profile's credentials (username password).

Now referring to FIG. 66, a flow chart of a hard reset process in accordance with one embodiment of the present invention is shown. The process begins with block 6602. A hard reset with physical button, and restore to system will now be described. Included in the design of the II Device might be an external button that when pushed resets the II Device back to its original manufacturing state. This will be helpful when moving II Devices from different locations or power sources, for troubleshooting purposes, and for security purposes, especially when a user no longer has access to the application device. The physical description and system composing the hard reset can be found in the 'II Device' section HHHH. The process by which the hard reset occurs will be referred to as 6600 and is described as follows, beginning with block 6602: (a) a user will physically activate the reset button on the outside of an II Device 6604; (b) a signal will then be sent to the internal processor of the II Device with commands to execute the hard reset program that will erase all user added memory and return to the manufactured state 6606; (c) the processor and related components of the II Device will execute the required commands of the hard reset program 6608; (d) all user added memory will be erased from the II Device, not including factory added memory 6610; (e) the II Device will return back to the manufacturing state 6612. The process for set-up would continue with FIG. 67. The hard reset process ends with block 6614.

Referring now to FIG. 67, a flow chart of a soft reset through application in accordance with one embodiment of the present invention is shown and referred to as 6700. Included in the device application is an option that when selected will reset an II Device or multiple II Devices back to their original manufacturing state. This will be helpful when moving II Devices from different locations or power sources, for troubleshooting purposes, and for security purposes. The soft reset process begins with block 6702. Within the application device, a user would select a setting that activates the soft resets command and program 6704. This setting may or may not require authentication through entering of the users profile and password 6706. The user would then select specific the II Device(s) and/or groups, including the entire lighting network, with which to execute the soft reset function 6708. A user might use the 'color coding' process to select individual II Devices.

Upon selection, a wireless communication will be sent from the wireless device/device application to each illuminated device selected, through the appropriate communication methods 6710. When each II Device receives the communication, the processor and related components will execute the soft reset program and commands 6712, and all user added memory will be erased from the II Device 6714. Each II Device will return to the manufacturing state 6716. The process for set-up would continue with FIG. 48. The soft reset process ends with block 6718.

Now referring to FIG. 68, a flow chart of a process for adding a new II Device into an existing II Device network in accordance with one embodiment of the present invention is shown and referred to as 6800. This is the process by which a user can easily introduce into the II Device network.

Introducing a new II Device to an existing II Device network follows a similar process as first setting up an II Device for the first time. Process is similar to quick set-up and easy room set-up processes. There are many potential processes to adding an II Device(s) to an existing network, here is one example. The process begins with block 6802. The intended II Device(s) will be in a manufacturing default, either coming from initial purchase or through a reset process 6804. A user will connect the II Device(s) to a power source (most likely by screwing in and turning on a light switch, and the II Device(s) will receive power and enter the power restoration mode 6806. Upon receiving power, the II Device(s) will enter II Device(s) will be prone to discovery by the device application run on a wireless device and other II Devices within proximity 6808. In addition, the II Device(s) will execute the manufacturing default light setting 6809. Then upon a user input on the device application 6810 or through a status update process where the new II Devices are found 6812, the device application will execute the process for adding an II Device to the application 6814. To elaborate, the status update process, as discussed in FIGS. 40 and 41, might call for the device application to look for all II Devices in proximity. This search will include identifying those II Devices that are not yet assigned to a profile, or in a manufacturing state. Next, the device application and associated wireless device establish a connection with the II Device(s) 6816. The device application might then provide an option for the user to confirm whether they are adding other II Devices to the II Device network 6818. If a user selects no, it will ignore the II Device's request to pair and end the process of adding a new II Device to an existing network 6820. This might happen by rare chance when people in neighboring buildings install II Devices at the same time within range from each other. If a user selects yes to confirm the addition of new II Device(s), the II Device(s) and device application will follow the process outline in FIG. 60, blocks 6016-6026, collectively represented here by block 6822. This includes storing the light ID in the device application memory and storing the profile ID in the device application memory. Then, in place of block 6038 to move forward with the set-up process, a user might then be prompted with other choices on how to set-up and customize the II Devices within the network 6824, including adding the selection to an existing group 6826, creating a new group with new or mirrored settings for the selection 6828, or creating custom settings for each II Device in the selection 6830. Depending on the user's request, the appropriate set-up would continue as described in other various set-up processes 6832, until complete 6820.

FIG. 68 is also representative of a flow chart of a process for reintegration of II Device(s) back into an existing II Device network in accordance with one embodiment of the present invention. Considering that the adding of the II Device(s) has proceeded through until block 6816, where the device application/wireless device and II Device(s) have established a connection. If the device application finds that the II Device ID (or multiple IDs) matches that of an II Device ID stored in the device application 6834, then it should trigger the II Device reintegration sub-process. If there is no match, then the process of adding II Device(s) would continue as normal along block 6818 as described previously. After finding a match to a previous II Device, the device application might confirm that the user would like to reintegrate the detected II Device(s) 6836. If a user selects no, then the process of adding II Device(s) would continue as normal along block 6818. If the user selects yes, then the device application would then reassign or reconnect all stored information, profiles, defaults, and other settings to the associated II Device(s) ID as stored in the device application memory collectively represented as block 6838. This would require the device application/wireless device to then send a command to the II Device(s) to execute/store the following: (a) all related profile IDs (if stored or connected to the active profile ID); (b) all profile settings including light default(s), active programs, and time settings. The newly connected II Device upon receipt will execute/store the commands and respond to confirm receipt. The device application will similarly update its memory with the re-inclusion of the II Device(s), and they will then be re-integrated into the II Device network with all previously stored settings in the device application, and the process will end in block 6820.

Figure 70:
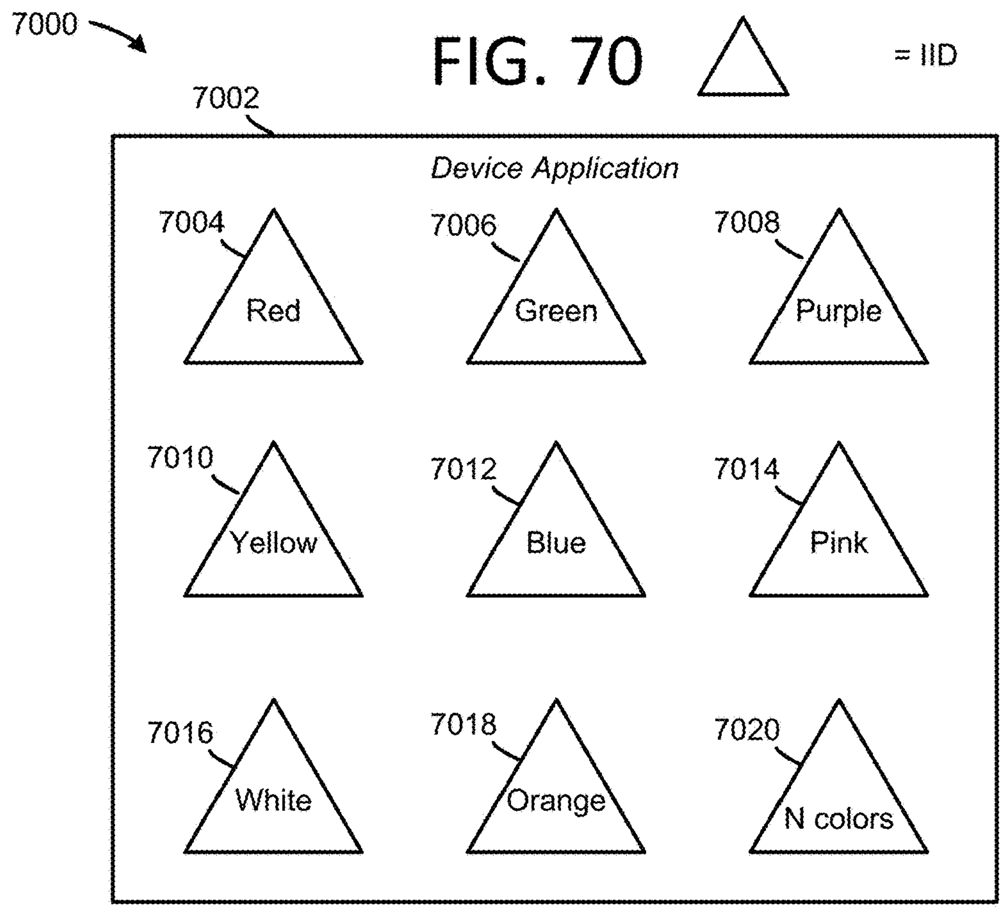
FIG. 70 is a block diagram of a color coding identification process in accordance with one embodiment of the present invention.

Now referring to FIG. 70, a block diagram of a color coding identification process in accordance with one embodiment of the present invention is shown and referred to as 7000. It might be difficult for a user to select a specific II Device(s) for troubleshooting or configuration, especially as the number of II Devices within a network increases. To improve the process of selecting specific II Device(s), described here is a method to temporarily change the color of II Devices in the II Device network and similarly provide a display of different II Devices on the device application that mimic the same colors of their representative II Devices. This process might be executed in relation to a number of different activities or processes. We'll assume for simplicity's sake that any potential processes could trigger the process to color the II Devices and refer to such an event as 'color coding process trigger'.

Upon a color coding process trigger, the device application would assign a different color to each of any number of selected II Devices and/or groups. The device application/wireless device would then send a wireless communication to each of the selected II Devices to execute a light control setting relating to the assigned color for that II Device. The device application as represented by 7002, would then display all of the selected II Devices with a representation of the light that's emitted by that particular II Device each represented as 7004-7020. A user would then be able to visually see which II Device relates to the II Device representations in the device application and easily select the intended II Device(s). For example, the II Device represented by 7004 would be colored red in some fashion, and the actual corresponding II Device would emit the same red color.

Figure 71:
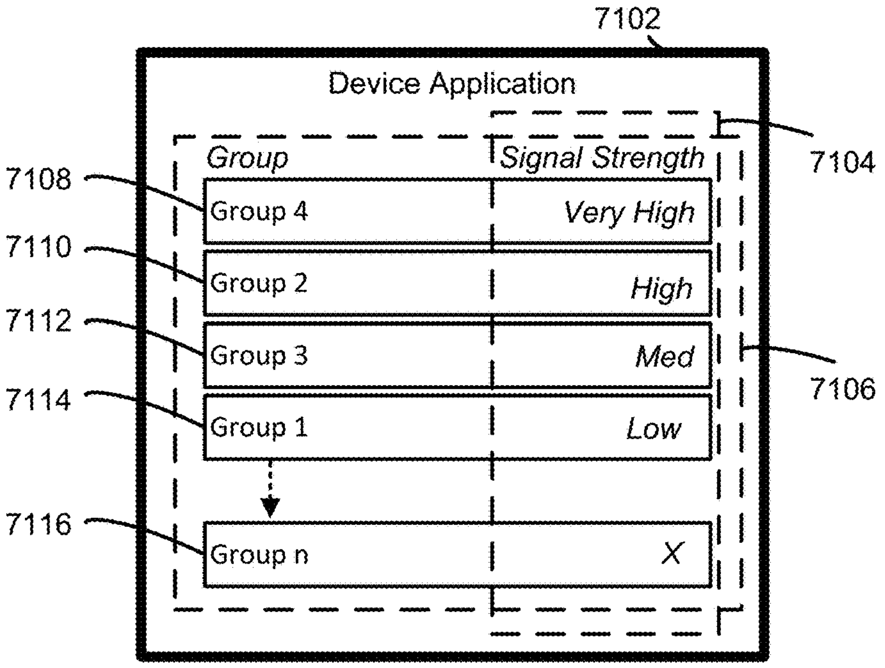
FIG. 71 is a block diagram of sorting based on signal strength in accordance with one embodiment of the present invention.
Figure 72:
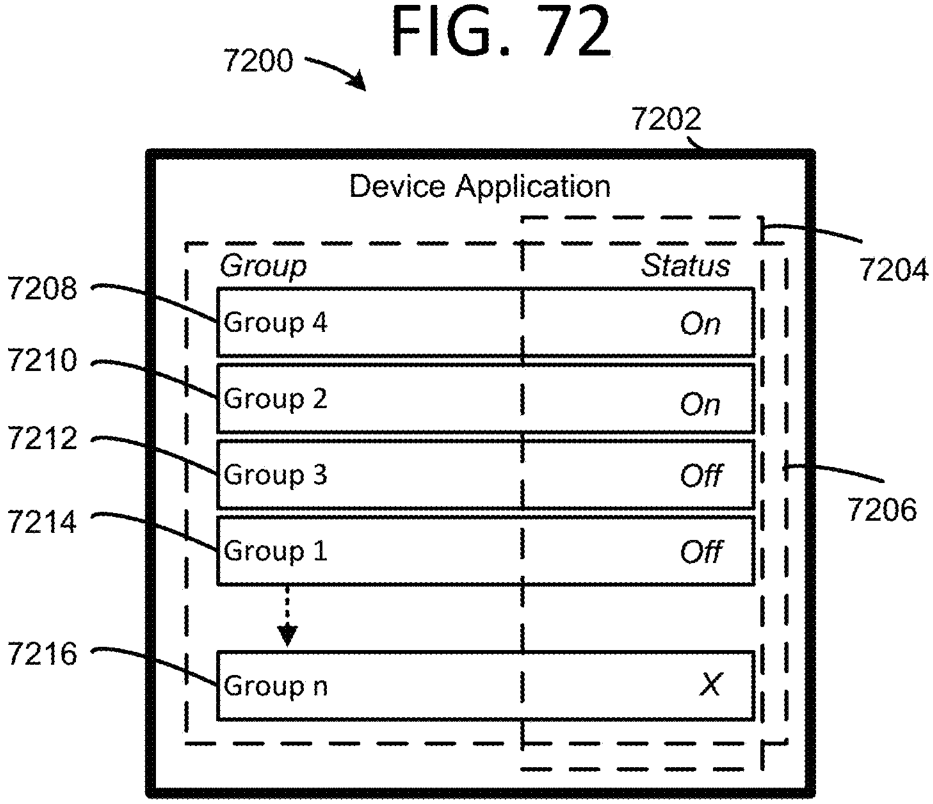
FIG. 72 is a block diagram of sorting based on status in accordance with one embodiment of the present invention.
Figure 73:
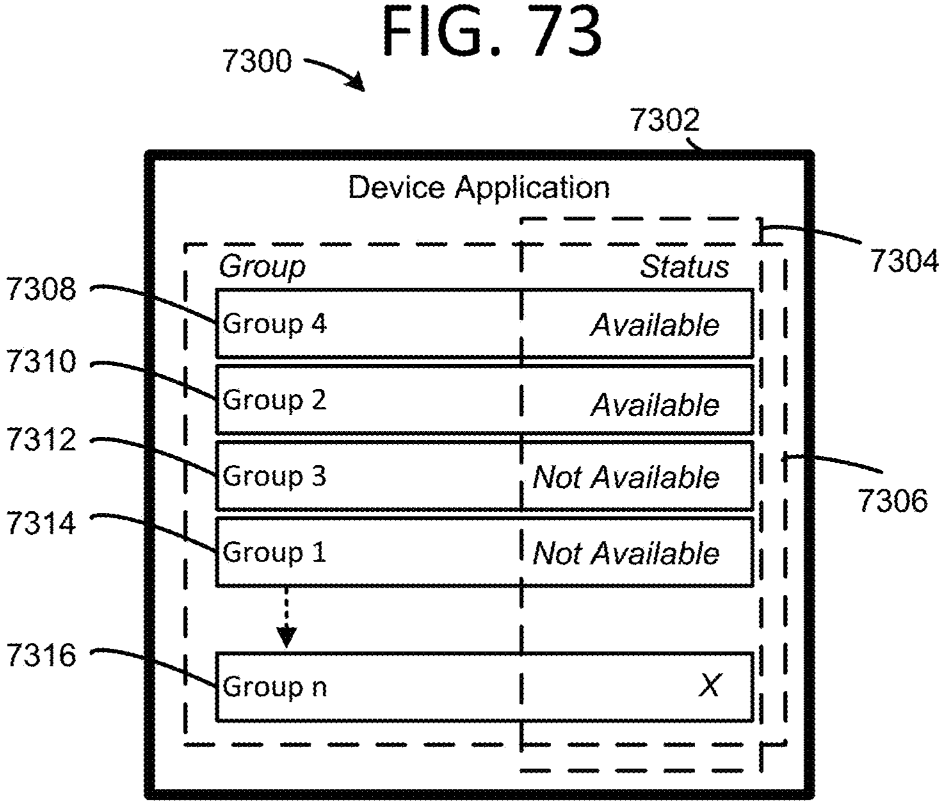
FIG. 73 is a block diagram of sorting based on available Intelligent Illuminating Devices in accordance with one embodiment of the present invention.

Referring now to FIGS. 71-73, various diagrams of sorting screens based on various criterions in accordance with one embodiment of the present invention are shown. For certain screens within the device application, it would be beneficial to sort the list of II Devices and/or groups in some fashion that would be relevant to the user. Disclosed here are some basic sorting methods with which to sort certain lists found within screens of the device application.

As shown in FIG. 71 and represented by 7100, it would often be the case that a user would want to command or control II Devices in closer physical proximity than those in further proximity to the user. To support this scenario, certain lists 7106 in the device application 7102 could be sorted by signal strength with stronger signals displayed first in the device application, represented as example by 7104. This could relate to lists of: (a) II Devices—sorted based on individual signal strength; (b) Groups—sorted based on average signal strength of related II Devices; (c) Programs/scenes—sorted based on average signal strength of related II Devices. The figure represents a list of groups sorted by signal strength, with each group and its associated signal strength represented by 7108-7116.

As shown in FIG. 72 and represented by 7200, it would often be the case that a user would want to command or control II Devices that are currently executing some command. To support this scenario, certain lists 7206 in the device application 7202 could be sorted by their active status with items that are on displayed first, represented as example by 7204. This could relate to lists of: (a) II Devices—II Devices that are on displayed first; (b) Groups—Groups that are on displayed first; (c) Programs/scenes—Programs/scenes that are active displayed first. The figure represents a list of groups sorted by active status, with each group and its associated signal strength represented by 7208-7216.

As shown in FIG. 73 and represented by 7300, considering that at times all II Devices might not be available because their power source is turned off (light switch) or they are out of range, it might be beneficial to sort/filter certain lists of items 7306 in the device application 7302 based on received statuses so that only those II Devices for which statuses are received by the wireless device are displayed or displayed first, represented as example by 7304. This would relate mostly to II Devices and groups, but possibly to programs and scenes where the un-addressable II Devices number is large. The figure represents a list of groups sorted by addressable status, with each group and its associated signal strength represented by 7308-7316.

It would often be the case that a user would want to sort or filter items in the device application based on some personal preferences or settings. This might be flexible and configurable, or permanent, depending on the application. Note that different sorting methods could be combined in different ways, so as to first sort by one method and then another. This would vary depending on the specific screen in the device application.

Figure 74:
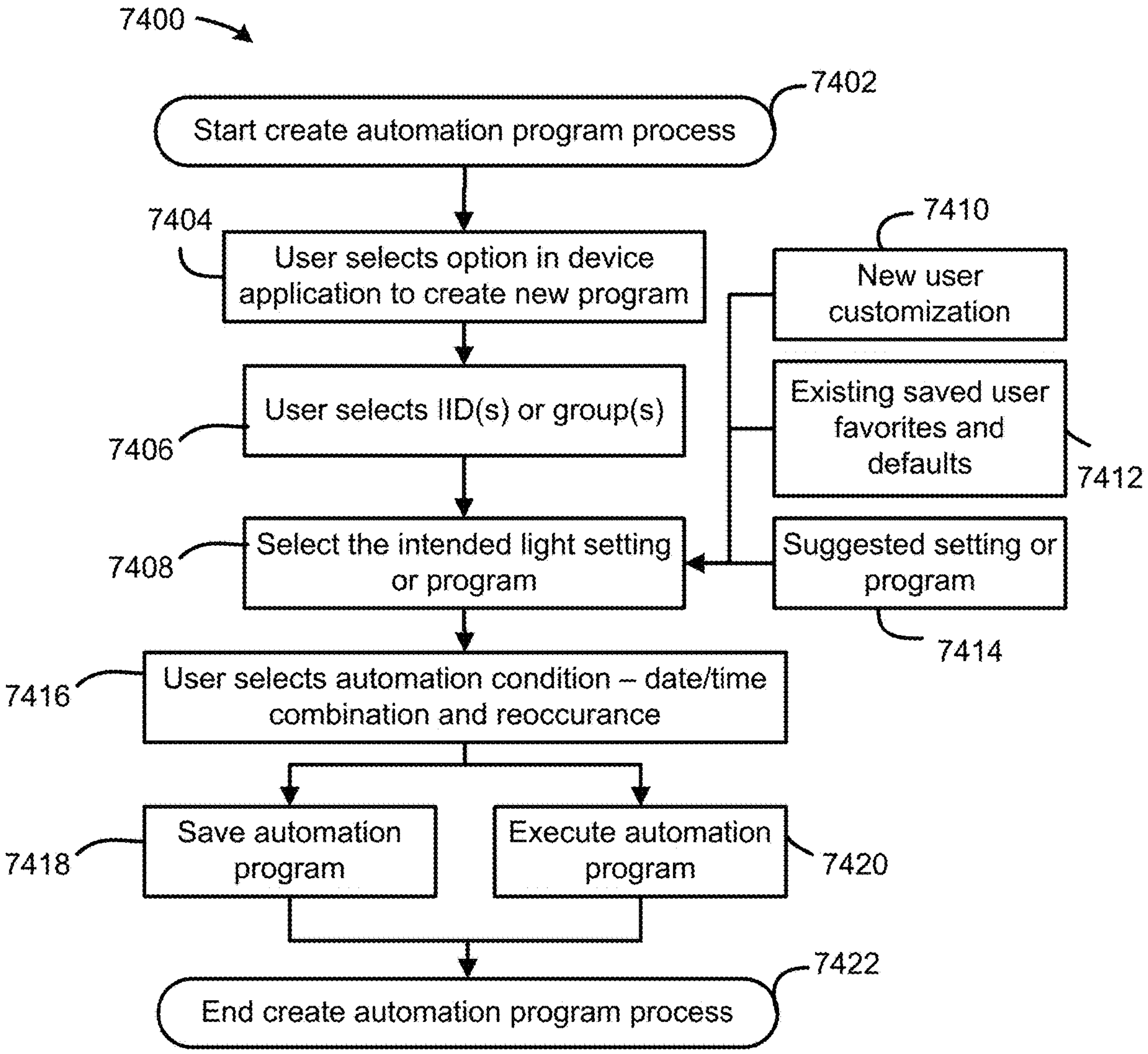
FIG. 74 is a flow chart of an automation programming process in accordance with one embodiment of the present invention.

Now referring to FIG. 74, a flow chart of an automation programming process in accordance with one embodiment of the present invention is shown and referred to as 7400. Automation refers to the program to be activated at user specified conditions pertaining to day(s) of the week, times, and/or dates. The process begins with block 7402. A user will select an option in the device application to create a program, specifically here an automation program 7404. The user will select any combination and number of II Device(s) or group(s) 7406. The user will then select the intended light setting or program to be executed based on the automation condition 7408. This might originate from new user customization 7410, existing saved user favorites and defaults 7412, or as a suggested setting or program 7414. The intended light setting might be a single action or more of a program in itself as multiple actions run successively. For example, a simple automation program would turn the II Device(s) on to a specific setting and color at a defined time. Alternately, another automation program would be to turn II Device(s) on and off successively. The user will then select a specific day(s) of the week, date, and/or time to execute the setting and/or program 7416. The request could be a single event or repeating event selected by the user. For example, start on date/time, stop on date/time. Or, run every third Monday of the month, etc. A user would have the option to save the automation program 7418 and/or execute the automation program at that time 7420. If the user saves the automation program, it can be re-run at another time by following the process described in FIG. 48. If the user chooses to execute the newly created automation program, the device application/wireless device in coordination with the respective II Devices will execute the command as described in FIG. 48 as if the program was activated as beginning with block 4808. After both cases the creation process would conclude as represented by 7422.

Similar to all programs, the user can toggle automation programs on/off via the device application. When the program is off, the II Device(s) will not store the command in memory. When the automation program is toggled on in the future, the command will be resent to the appropriate II Devices. In the case that conflicting programs are active with the user requested II Device(s) and time, the device application might notify the user and ask for the user to select which program they would like to keep active. Alternately, the II Device(s) will internally have a priority level assigned to different profiles and/or types of requests.

An alarm timer relates to a program process by which at a certain user designated time or lapse of time, an action would occur in any number of II Devices or group of II Devices. The alarm timer processes are similar to those described for general programs and automation programs. Through the device application a user would select the program to run the alarm or timer and select the II Devices and/or groups to execute the program. An alarm selection signifies that at a certain selected time, the selected II Devices and/or groups would execute an alarm command to adjust lighting to the user's requested command. The requested command might be of a dynamic nature or a program in itself so as an execution of multiple commands in sequence such as a flashing or changing of color or brightness. When an alarm program is selected, the device application would interpret the time requested by the user and send a command to the lights and/or groups selected to execute the command or series of commands at that specified time. Each II Device would receive the commands through the wireless communication, interpret the commands by the processor, and then store the request in memory to be executed at a later time. Inside each II Device, the processor would monitor the internal real time clock and look for a match in the clock's time to the alarm program request stored in memory. If it matches, then the processor would execute the alarm command(s).

A timer selection signifies that after a certain amount of time passes, an II Device or combination of II Devices would act in some predefined manor. The user would first select the II Device(s) and/or group(s), or multiple to run the program. Then the user selects the amount of time in minutes, hours, etc. via their application. Once selected then the device running the application will send a wireless signal to the designated II Device(s) with the specific amount of time to count down from. At the point when all the II Device(s) confirm receipt of the timer request to the device's application, the timer will begin in unison with all II Device(s) applicable. Each II Device will then countdown using internal real time clock, processor, and other embedded components. If multiple II Devices, they will count down individually, but all in unison. When the timer reaches zero, the II Device(s) will execute the command requested by the user. A user can request to repeat any timer programs to count down and then repeat. The application interface might also present a timer display showing the amount of time counting down. Upon reaching zero, the application might also present some other actions within the application. This time down feature might also be valued for gaming scenarios using the II Devices as signals.

Figure 75:
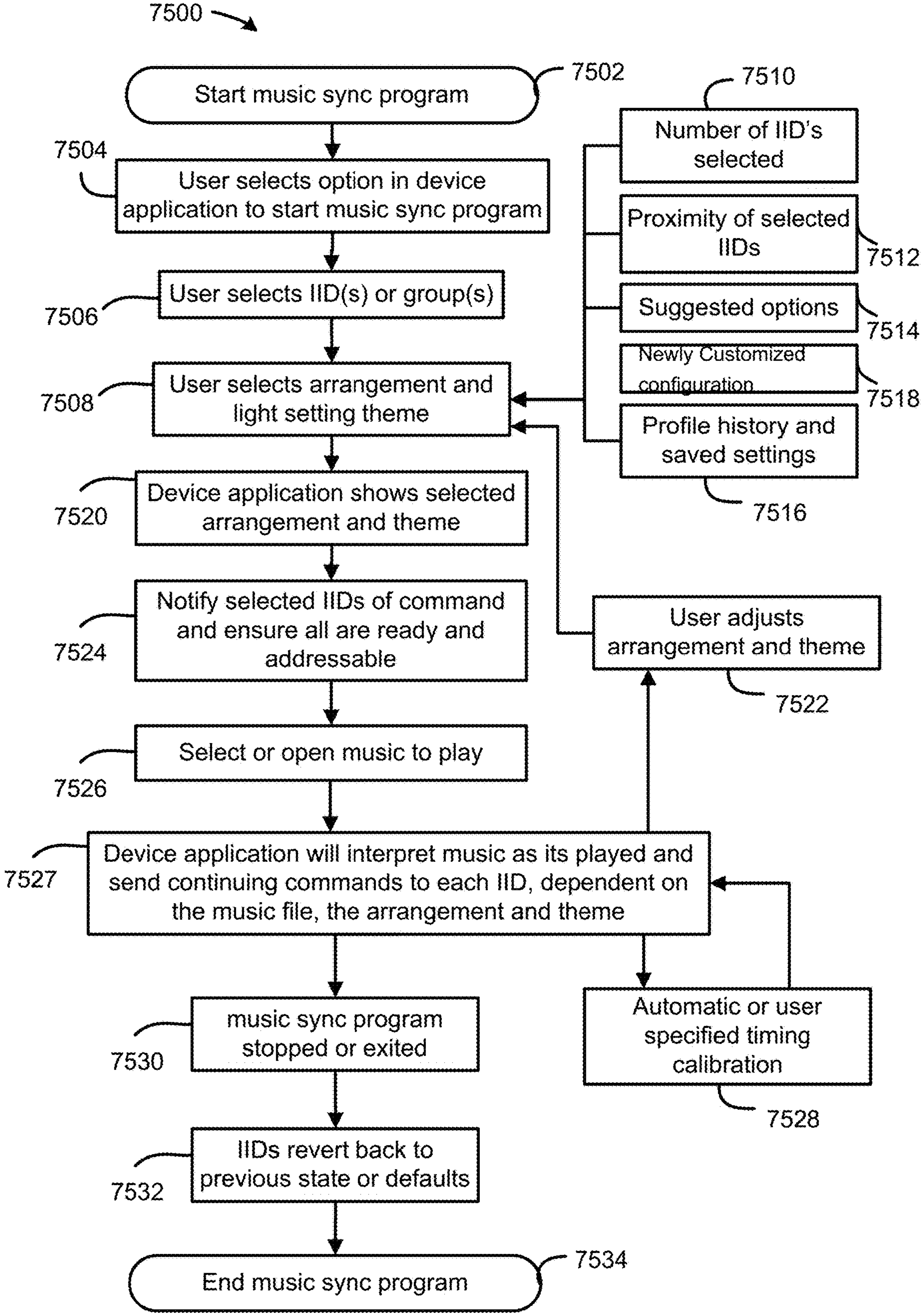
FIG. 75 is a flow chart of a music sync process in accordance with one embodiment of the present invention.

Referring now to FIG. 75, a flow chart of a music sync process in accordance with one embodiment of the present invention is shown and referred to as 7500. This is a type of program specifically for automatically synchronizing the II Device(s) to music played on the same enabled device. The process begins with block 7502. Through the device application or through a specialty device application, the user will access the music sync program 7504. The user would then select the II Device(s) with which to sync the music 7506. The user will then select the type of II Device arrangement and the light setting theme 7508. Options for selection could depend on a number of different factors, such as the number of II Devices selected 7510, the proximity of the selected II Devices 7512, suggested options 7514, user history or saved preferences 7516, or completely new customized configurations 7518. For example, considering the arrangement, if the number of II Devices is 1, then the device application will only sync to a mono type interpretation of the audio. If number of II Devices is 2 or more, then the device application will evenly distribute and assign each II Device to either of the 2 primary (L, R) stereo channels within the music file. The device application will visibly show each II Device and to which channel (L, R) the II Device is assigned to.

Further considering arrangement, if a music file is able to carry multiple channels or if the music file can be broken into multiple channels based on frequency, pitch, or other aspects of sound, an II Device could similarly be assigned or distributed across multiple II Devices. Similarly, considering selection of the light theme, the device application might display potential lighting themes options for the user to select or the user can customize their own preferences. Here, there might be default settings that have a color and/or brightness theme associated with each channel. The settings will be variations of color or themes of color assigned to each channel. For example, one might include all colors available randomly assigned to each II Device. Another option might allow for the channel colors to change over time. Another option might suggest only red hued colors, or any other type of color hue. Once an arrangement and lighting theme is selected, the user will be able to see and verify the selection 7520. At any time, the user will be able to reconfigure the arrangement or light themes, 7522, such as to move or reassign lights to different channels, select between mono or stereo lighting modes, or choose a different theme. Once the configuration is selected, the application device will notify the selected II Devices of the command and ensure all II Devices are ready and addressable 7524. This will be done via the appropriate communication and control processes. The user would then select music file(s) stored on the device (or streaming music) to be played 7526. As the music is played through the device application, the device application will interpret the music file wavelengths to send continuing commands to each II Device previously selected to turn on and off, adjust brightness, and change colors depending on the music construct within that channel at that time and the selected arrangement and theme 7527.

Possibilities for interpreting the music construct is as follows: For each music channel in the music file (L,R), when there some output of sound to be played or amplitude in the music, that would correlate with the light(s) assigned to that channel to turn on (to emit light). For example, if a bass drum is played in the left channel, the audible sound would coordinate to the visible light from that assigned left channel's II Device(s). For each channel (as previously assigned), the brightness of the light emitted by each II Device could brighten or dim dependent on the respective increase or decrease in amplitude of the music within that channel's music file. Such as that louder sounds would coordinate with brighter lights and vice-versa. Respective amplitude would be the dependent variable, not true amplitude. Additionally, different pitch ranges might correlate with different color combinations of light output. Additionally, the bpm (beats per minute) might be interpreted so that after a standard measure of bars (time of playing) the color or channel assignment of the II Devices might change.

A user could also adjust the overall brightness maximum output to their preference through the device application, similarly referred to in the figure as 7522. This information would be taken into context before relaying commands through to the II Devices. The application device would automatically or through user input manage and match the output of audio to the output of lighting commands and delay the audio output to any delay in communication to the II Devices so as the actual sound heard through a speaker would match the same time that the light illuminated from the II Device(s) 7528. The application would continue to run on the device while continuing to interpret/translate the music and channels played into commands to be executed by the assigned II Device(s). When the music sync program application is stopped or exited 7530, the assigned II Devices would revert back to their previous programmed state if applicable or default level 7532. The music sync program/application would complete 7534.

A predefined program so a user can set their II Devices to slowly turn on with certain color displays at specific times to simulate the effect of a sunrise. In many parts of the world, people have to get up before the sun, this process allows for a user to select their II Devices to turn on slowly, mimicking a sunrise, before their alarm or at a certain time to help wake them up. Setting up the program through the device application, a user could select the special program through the predefined program list or through the groups menu. The sunrise program would be a suggested program for those groups containing the word 'bedroom'. The user would be able to adjust the length and type of sunrise if they choose. Type relates to variations in color schemes. The user will be asked to enter a time for the sunrise program to execute, or to create an alarm with the sunrise. If the alarm program is also set, the two could be run simultaneously or within one program. Once set and accepted, the application device will communicate the automation program request to the selected light(s). The light(s) will receive the automation program request and store the program in memory to be executed upon the requested time. The program settings could be saved for future use or set to run at any frequency similar to any automation program.

Executing the program. When the sunrise program is active, the program will be executed similar to any other automation or alarm program. The suggested colors used in the sunrise program will most likely include orange and red colors that would brighten over time until fully lit when the alarm or timer condition is met. Blue LEDs might also be included to provide the short wavelength light mimicking that of the sun.

In some embodiments, a light will be connected or equipped with an ambient light sensor that can detect the light levels present within an area, relay that information to the II Device's controller, which could be interpreted as a program input resulting in a change in the lighting brightness and/or color. Various programs are possible to utilize the II Device sensor's information as an input to causing some output in terms of a change in the brightness and/or color of one or more II Devices. In one program example, a user will select a preferred light level for II Device(s) or group(s) through the device application. Each II Device can have a different setting, giving the user to select any number of unique combinations. Selecting the preferred level might also be done through the user defined defaults for each II Device. When selected, the device application will then send a request through the controlling device to each II Device that the user has selected through the program, asking for each II Device's related ambient light sensor information. The device application upon receiving the light sensor information will store the default settings in the application or device's memory relative to each II Device. Alternatively, the II Device itself will record the sensor information in its own memory. The user can then at any other time activate an automatic adjustment program. Upon activation, the device application will send a communication to each II Device associated with the program. The communication will instruct each II Device to compare the current II Device sensor information against that associated with the preferred lighting level. This information would either stored in the II Device's memory or relayed via the device application's communication.

The II Device would then adjust its brightness and/or color depending on the light sensor data's relationship between the current and preferred lighting level. Simplified, if the current light sensor showed less luminosity than the preferred level, then the II Device would increase its own brightness. Alternately, if the current light sensor showed more luminosity than the preferred level, then the II Device would decrease its own brightness. The relationship between the difference in current and preferred light received will not be an equal or absolute relationship to the change in the brightness of the light. Alternatively, it will be some functional relationship dependent on the absolute and respective levels of light. The program and/or II Devices themselves would repeat this process for the duration that the program is active.

Figure 79:
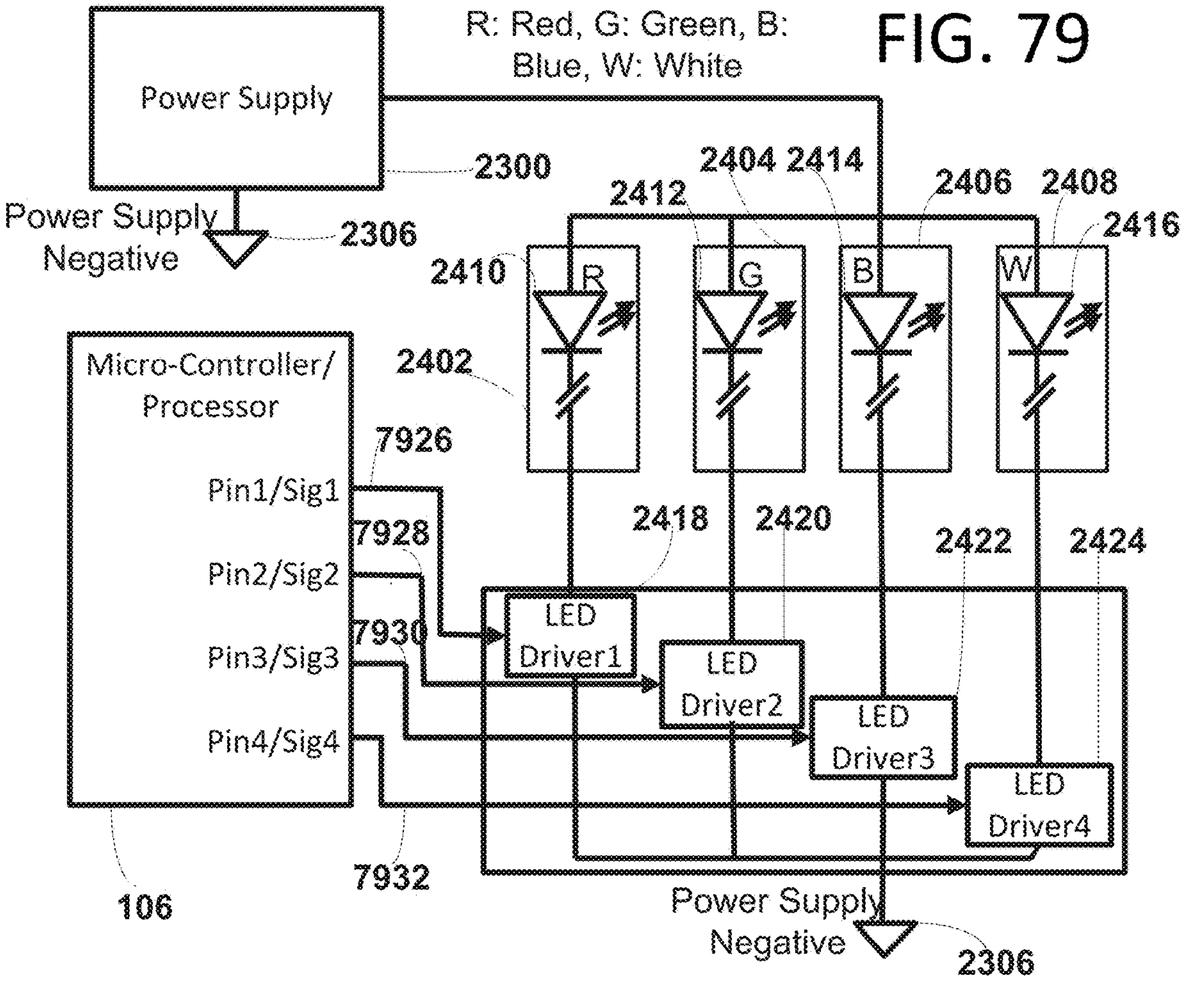
FIG. 79 is a block diagram of a LED driver scheme in accordance with one embodiment of the present invention.

Now referring to FIG. 79, a block diagram of a LED driver scheme in accordance with one embodiment of the present invention is shown. Various LEDs arms (2402, 2404, 2406 and 2408) are driven by the LED drivers (2418, 2420, 2422 and 2424) as shown. The LEDs drivers turn ON or OFF based on the ON or OFF signal provided by the microcontroller/processor 106 as shown. When LED driver is ON, current passes through its LEDs arm, and LEDs in that arm produces light. LEDs arms (LEDs1 2202, LEDs2 2404, LEDs3 2406, and LEDs4 2408) can have different types of LEDs including different colors and different electronic ratings. Each LEDs arm may have one or multiple LEDs in a series or parallel or combinations of those. With the driver scheme as per FIG. 79, color mixing can be achieved by controlling the signals to the LED Drivers (Sig1 7926, Sig2 7928, Sig3 7930 and Sig4 7932) which in turn control the ON/OFF times of the LED drivers individually i.e. by toggling the pins individually to ON or OFF states at a frequency that could be above 85 Hz. To limit the sum of the currents going through different LED drivers at a time, one could make sure not to have multiple pins controlling signals Sig1 7926, Sig2 7928, Sig3 7930 and Sig4 7932) of the LED drivers ON at a time. This could be achieved by a program running in the processor that controls the pins' ON/OFF states. In this way one need not have a PWM control of the LEDs drivers, which also helps to optimize the frequency required to run the LED drivers taking into the consideration their maximum and minimum frequency of operation and flickering issues associated with the LEDs being driven by their respective drivers.

An example of how this circuitry and program controlling the pins work will now be described with a specific case having these assumptions: (1) The high level (ON) signal if passing through each of the Pins, Pin1, Pin2, Pin3 and Pin4 in FIG. 79 passes at every 10 ms of a time period; (2) The ON signals through each of the pins are not overlapping; (3) LED drivers are designed for 1 A output current, i.e. when any Pin is set high (ON), it makes the respective driver ON allowing up to 1 A current pass through its LED arm; (4) The user wants a yellow light output at the maximum luminosity possible, for which LEDs1 302 and LEDs2 304 should be illuminated equally by sending same amount of average current through them; (5) LEDs1 2402, LEDs2 2404, LEDs3 2406, and LEDs4 2408 arms have multiple RED, Green, Blue and White LEDs in series respectively; (6) For full luminosity of yellow light that can be produced through this scheme, the average current passing through RED LEDs and Green LEDs should be half the maximum average current possible through them, which can be achieved by turning LEDs drivers ON/OFF as per the timing diagram in FIG. 81A. For 40% of the maximum luminosity of yellow light, RED LEDs should be ON for 20% time and Green LEDs should be ON for 20% time as shown with the signals SIG1 and SIG2 in FIG. 81B. Similarly, to produce a type of orange light consisting of 40% of Red, 20% Green and 10% of White could be achieved as per FIG. 82.

Figure 80:
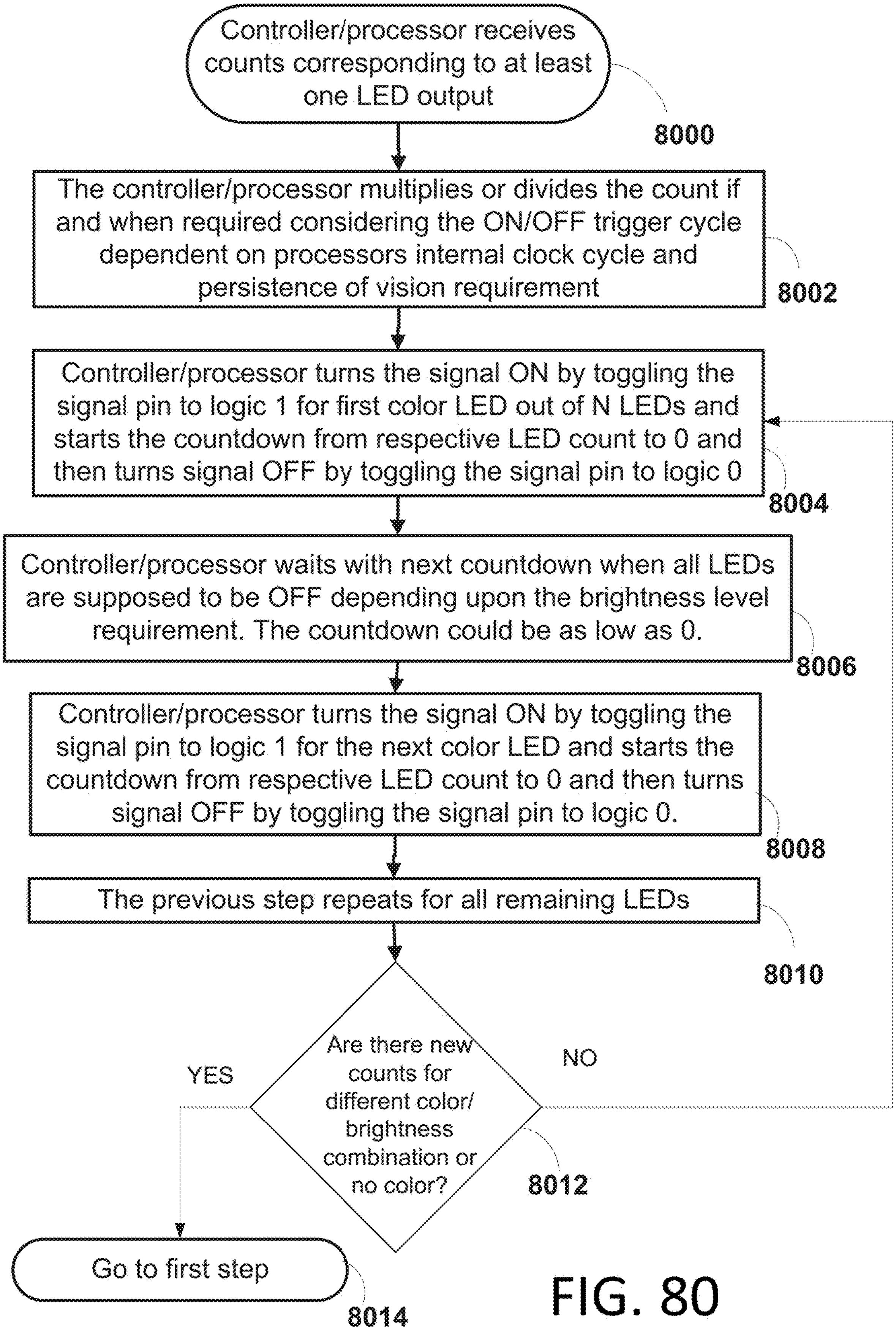
FIG. 80 is a flow chart of a controller/processor and LED driver scheme in accordance with one embodiment of the present invention.
Figure 81A:
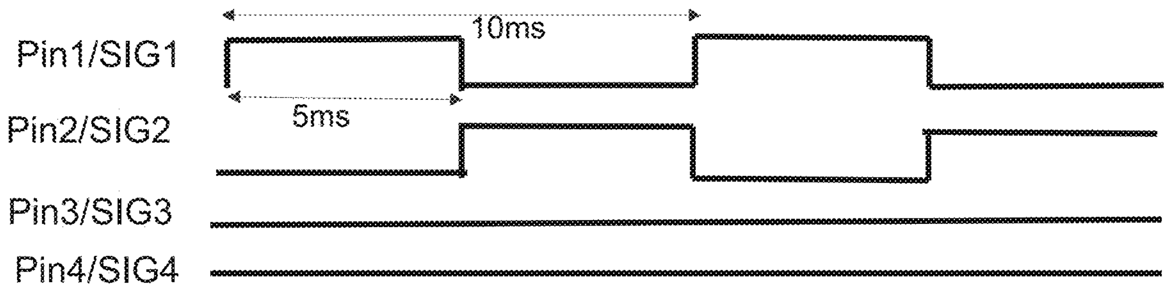
FIGS. 81A-81B and 82 are timing diagrams in accordance with various embodiments of the present invention.
Figure 81B:
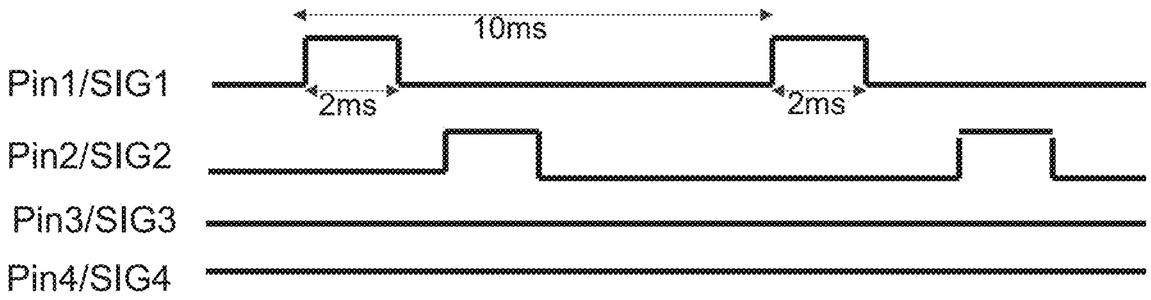
Figure 82:
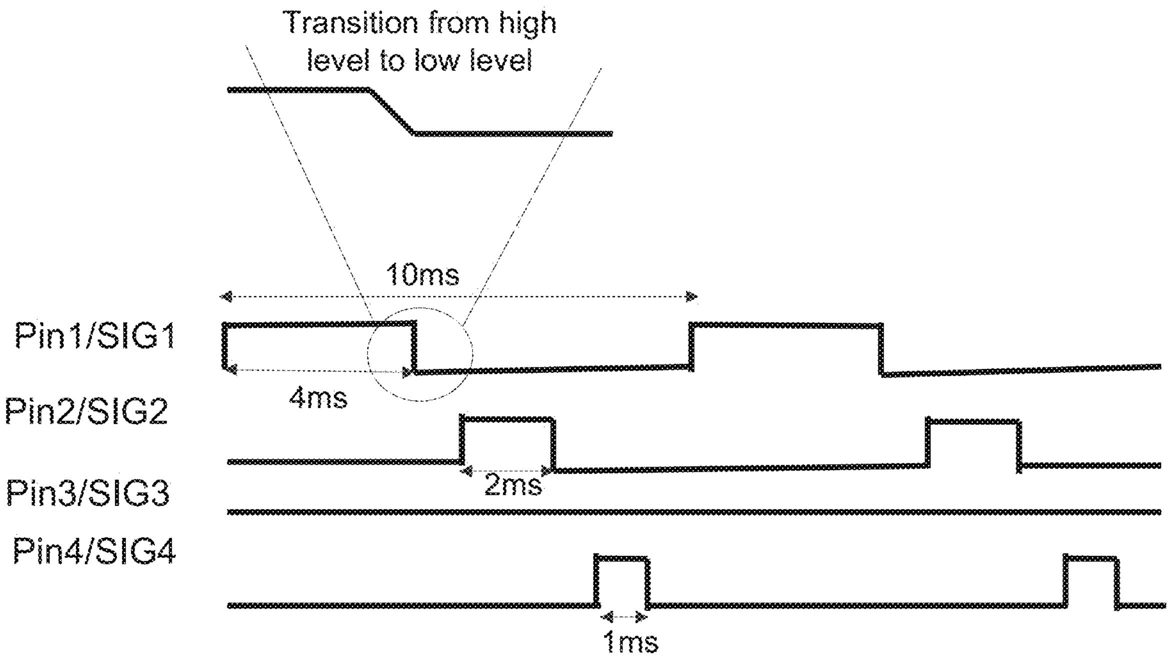

The 10 ms time period in the timing diagrams in FIGS. 81A, 81B and 82 are divided based on the count set into the controller/processor, which may come from another device communicating through various means such as Smartphone, computer, etc. connected through wires or wirelessly. Consider that the 10 ms time period is just an example. Referring to FIG. 80, this time period can vary based on the counts for respective LEDs with which the ON or OFF times for a particular LED signal are calculated. For example, consider that the RGB or equivalent counts to control the II Device are such that the Red is required to be ON for 20% of the overall time, Green is required to be ON for 30% of time and White required to be ON for 50%. Here Red (SIG1) turns ON for 2 ms and then turns OFF; as soon as Red turns OFF Green (SIG2) turns ON for 3 ms and then turns OFF; and as soon as Green turns OFF, White (SIG4) turns ON for 5 ms and then turns OFF and this cycle repeats. Here the total ON/OFF time cycle for any LED is 10 ms. Now consider a second scenario, where the RGB or equivalent counts are such that the Red is required to be ON for 50% and Green is required to be ON for 50%. Here Red (SIG1) turns ON for 2 ms then turns OFF; as soon as Red turns OFF, Green (SIG2) will turn ON for 2 ms and then turns OFF and cycle repeats. Here the total ON/OFF cycle time for LED is 4 ms which is different than the previous scenario. In addition, consider a third scenario where Red is required to be ON for 25% and Green is required to be ON for 25%. Here Red (SIG1) turns ON for 1 ms then turns OFF; as soon as Red turns OFF, Green (SIG2) will turn ON after 1 ms for ams and then turns OFF and cycle repeats. In this scenario the time cycle is still 4 ms, but the total time Red and Green are ON is 50% as compared to previous scenario giving 50% less brightness out of the Red and White LEDs in the same time cycle of 4 ms. Having flexibility in the time cycle as for different color and/or brightness combinations helps in reducing the overheads for the processor in calculating the cycle time and ON and OFF times for each LED. To further explain with an example, consider that the Red, Green, Blue and White counts for a particular color are Red equal to 255, Green equal to 127 and Blue and White equal to 0. Also consider that the processor's 106 internal clock generates the overall time period and triggers ON and OFF signals for LEDs. In this situation, the processor can count down from 255 to 0 (or count-up from 0 to 255) forming a time period, let's assume that turns out to be 2.55 ms for which Red (SIG1) will be ON. While immediately after Red turns OFF, Green (SIG2) will be triggered with the turn ON signal and will remain ON until the countdown is from 127 to 0 which making Green turned ON for 1.27 ms. Similarly, if the counts are 255 for RED, 100 for Green and 200 for Blue LED, the countdown for each of these LEDs will directly generate the time cycle where Red (SIG1) is now ON for 2.55 ms then OFF turning Green (SIG2) immediately ON for 1.00 ms and when Green (SIG2) turns OFF after 1.00 ms, Blue (SIG3) turns ON for 2.00 ms and then Turns OFF immediately turning ON Red (SIG1) and repeating the cycle. In these two scenarios as explained, the ON/OFF time cycle for LED is 3.82 ms (2.55 ms+1.27 ms) for first scenario, while ON/OFF time cycle is for LED in second situation is 5.55 ms (2.55 ms+1.00 ms+2.00 ms). In these scenarios the 100 counts countdown is equivalent to 1.00 ms, however then it could be different depending upon the processor 106 type, clock it is running ON, the clock division/multiplication being taken place inside the processor 106 and division/multiplication defined for Red, Green, Blue and White counts to ensure they are proportional to each other. For example, even if in one scenario the count for Red is 255, for Green is 100 and for Blue and White is 0, the processor may multiply or divide the count by certain number such as multiply 2 making them 510, 200, 0 and 0 for Red Green, Blue and White respectively to address any limitations of the LED driver's minimum turn ON and OFF time requirements and to ensure minimum cycle requirement for maintaining the persistence of vision requirement (which many times considered as minimum of 85 Hz cycle). This way the overheads of complex calculations for calculating the time cycle, ON/OFF time for each LED are minimized saving processor's 106 processing power for other required calculations and giving better response. In addition, there is no need of using complex PWM (Pulse Width Modulation) of the signal and calculations required to calculate parameters of PWM every time to control the light output. With this configuration a processor that is cost effective and has low processing power can be used.

In FIG. 80, the process is explained in general. Controller/processor 106 receives counts corresponding to at least one LED output in Block 8000. The controller/processor 106 multiplies or divides the count if and when required considering the ON/OFF trigger cycle that is dependent on processors internal clock cycle and persistence of vision requirement in block 8002. After the counts for LEDs are calculated, in block 8004, the controller/processor 106 turns the signal ON by toggling the signal pin to logic 1 for first color LED out of given N LEDs and starts the countdown from respective calculated LED count to 0 and then turns the signal OFF by toggling the signal pin to logic 0. In block 8006, controller/processor 106 waits with next countdown when all LEDs are supposed to be OFF depending upon the brightness level requirement. The countdown could be as low as 0. For example, the LED counts calculated for full intensity of color with Red, Blue, Green and White are 252, 100, 0 and 0 respectively, then the counts for Blue, Green and White for 75% intensity would be 189, 75, 0 and 0. For full intensity the Red signal will become high i.e. Red LED ON for countdown from 254 to 0 and then it will become low i.e. Red LED OFF. Immediately after that the Green signal will become high i.e. Green LED ON for countdown from 100 to 0 then it will turn OFF. As Blue and White counts are 0, they will not Turn ON but remain OFF. Thereafter, the cycle with RED turning ON immediately continues. However, for 50% intensity, the Red signal will turn high i.e. Red LED ON for countdown from 189 to 0 and then it will turn OFF and will remain OFF for countdown from 63 (calculated as 252−189) to 0. Immediately after that Green will turn ON for countdown from 75 to 0 and then it will turn OFF and will remain OFF for countdown from 25 (calculated as 100−75) to 0. With Blue and White counts 0, Blue and White LED will always remain OFF. The cycle repeats until new counts are available. This countdown method could be different, however, it will be intended to keep percentage of Signal of a particular LED ON out of entire time cycle same as calculated in above example. Blocks 8004, 8006, 8008 and 8010 explain the process in general. The cycle repeats until the new counts for LEDs for new color and brightness combination are provided or calculated as shown in general in blocks 8012 and 8014.

With such control of LED drivers (318, 320, 322 and 324) which include non-overlapping ON signals for two or more LED drivers, one gets the ability to get the brightest light possible from the LEDs in respective arm in the scheme with the limited power available from the power supply. One is able to design the LED drivers for the maximum possible current possible through LED arm irrespective of how many additional LED arms are required from the given power supply. For example, one can keep one LED driver ON continuously and pass maximum current possible through its LED arm and get highest possible output. Similarly, if one could pass ON signal for first half of the cycle through one LED arm by keeping its LED driver ON for that time and ON signal for the second half of the cycle through other LED arm getting maximum light output for the color formed by mixing the lights from the LED arms in the proportion of their ON times.

This also allows optimizing the frequency of the ON/OFF signal to LED drivers reducing the dependency upon limitation of the time required for drivers to change their state, i.e. from ON to OFF and vice versa as compared to the sequential non-overlapping PWM signals. It also reduces the overhead on the controller/processor as it need not create many numbers of PWM signals for controlling various drivers which in turn controls current through respective LED arms of LEDs. It is now achievable by toggling the pins from high (ON) state to low (OFF) state only. In addition, the controller can be programmed to keep OFF time between the two non-overlapping ON signals as shown in FIG. 82. This helps drivers to start earlier making sure that the current through it reaches to the required peak level i.e. turns ON fully by the time it is supposed to do so.

FIG. 83 is a block diagram of a lighting system in accordance with one embodiment of the present invention. II Device 140 or 8302 may have various defaults such as: (1) Manufacturing Default, which could be the basic light setting executed when one resets the controller/processor 106 of II Device 140 or 8302; (2) Active Light Default, the active default light setting that could be executed when the II Device 140 or 8302 is turned ON; and (3) many Passive Light Defaults, the light settings those could be executed when specific triggers are provided to the controller/processor 106. These defaults could be stored in its internal memory or memory on board 108 or memory of an external peripherals or controlling devices such as remote controlling device 8304 with which II Device 140 or 8302 is communicating.

All these defaults could be executed with various ON/OFF cycles provided by an external electronic switch controlling the power of the II Device 8302 such as wall switch 8300 in this case. For example, the Manufacturing Default could be executed when the wall switch 8300 associated with the II Device 8302 is turned ON and OFF two times in a specific time period such as four seconds. A particular Passive Light Default could be achieved by turning II Device 8302 ON and OFF four times in five seconds through a light switch 8300. Similarly, other light defaults can be executed with other switch ON/OFF combination cycles. The ON/OFF combinations here are type of a trigger for the II Device 140 or 8302, and various such combinations form different triggers. These triggers through a switch are particular ON and OFF times those are stored during the process by controller/processor 106 in its internal memory or memory on board 108 or memory of an external peripherals or controlling devices such as that of a remote controlling device 8304 with which II Device 14 or 8302 is communicating wirelessly. Then these stored ON/OFF times are compared to check if any defined trigger in the similar memory has been generated, based on which II Device 140 or 8302 execute particular light default or light settings.

One way to achieve this is by defining various ON/OFF times defining triggers into the II Device's memory 108. When II Devices 140 or 8302 is switched ON/OFF at a particular cycle, this cycle is stored and compared by the controller/processor 104 or remote controlling device 8304 to execute the required default. The II Device's RTC 110 or clock of remote controlling device 8304 could be used to monitor and store the ON/OFF switching times the into a specific memory.

In addition, the user can provide triggers not only though a switch controlling power to II Devices, but other external devices connected through wire(s) electrically or wirelessly to the II Device 140 or 8302. Furthermore, Light Defaults could be a specific light setting with a specific color and brightness or a light program that changes the light output as a function of time or other events.

Referring FIG. 84, II Device 8404 could be controlled signals 8402 through remote controlling device 8400 that has at least one or combination of built in sensor(s) in following categories:

- Motion and navigation sensors including but not limited to accelerometer, gyroscopic, proximity sensor, digital compass, Global Positioning System Sensor;
- Acoustic, sound and vibration sensors including but not limited to microphone, Lace sensor (guitar sensor), etc.;
- Automotive and transportation sensors including but not limited to speedometer, speed sensor, torque sensor, etc.;
- Chemical Sensors including but not limited to Smoke detector, Breathalyzer, Electronic Nose, Potentiometric sensor;
- Electric and Magnetic sensors including but not limited to current sensor, electroscope, magnetometer, metal detector, voltage detector, etc.;
- Environment, weather, moisture, humidity sensors including but not limited to dew sensor, rain gauge, rain sensor snow gauge, humidity sensor, humistor, gas detector, leaf sensor, etc.;
- Flow and fluid velocity sensors including but not limited to air flow meter, water meter, Anemometer, flow sensor, gas meter, etc.;
- Position, angle, displacement, distance, speed, acceleration sensors including but not limited to tachometer, accelerometer, rate sensor, etc.;
- Optical, light, imaging, photon including but not limited to flame detector, ambient light sensor, photo resistor, phototransistor, infra-red sensor, fiber optic sensor, photodiodes, etc.;
- Force, density, level sensors including but not limited to force gauge, load cell, piezoelectric sensor, strain gauge, etc.;
- Thermal, heat, temperature sensors including but not limited to temperature gauge, thermometer, thermistor, thermocouple, infrared thermometer, etc.;
- Presence sensors including but not limited to occupancy sensor, touch switch, motion detector, etc.; and
- Pressure sensors including but not limited to barometer, piezometer, pressure gauge, etc.

Figure 85:
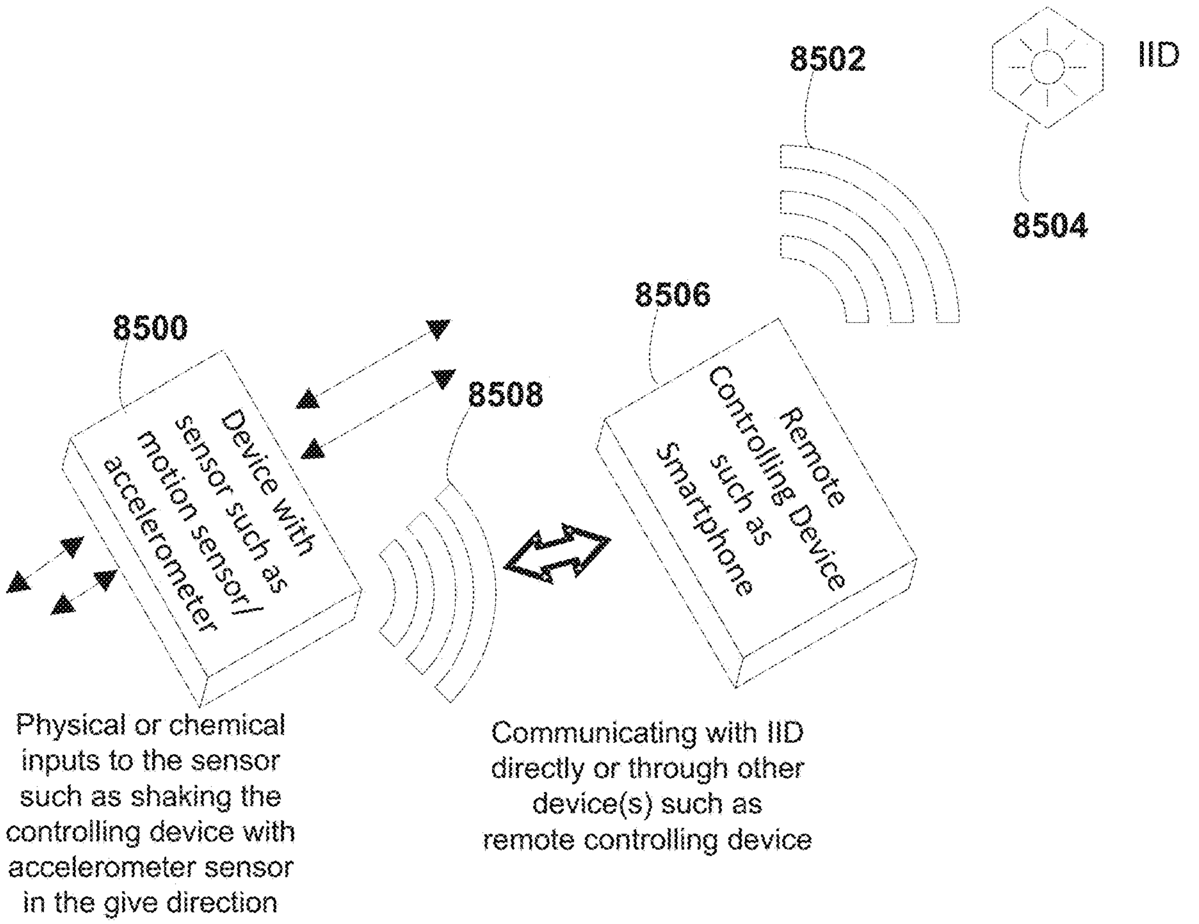
FIG. 85 is a block diagram of a remote controlling device and a sensor capable of communicating with and controlling the IID(s) to control IID in accordance with another embodiment of the present invention.

Referring FIG. 84, the above mentioned sensor could be a part of a remote controlling device 8400 capable of communicating with and controlling the II Device(s) 8404. In addition, referring to FIG. 85, above mentioned sensors could be a part of other peripheral device 8500 that could communicate with II Device(s) 8504 through other intermediate remote controlling device(s) 8506. In the FIG. 84, an example is shown where a remote controlling device 8400 with motion sensor or accelerometer is shaken or moved or rotated in a particular direction at least once to produce a predefined signal that in turn makes remote controlling device to send a command or data 8402 to the II Device 8504 to execute a particular light setting or function. Similarly, in FIG. 85, device with sensor 8500 sends command or data 8508 for such predefined signal to II Device 8504 directly or through intermediate remote controlling device 8506 to execute a particular light setting or function 8502.

Figure 86:
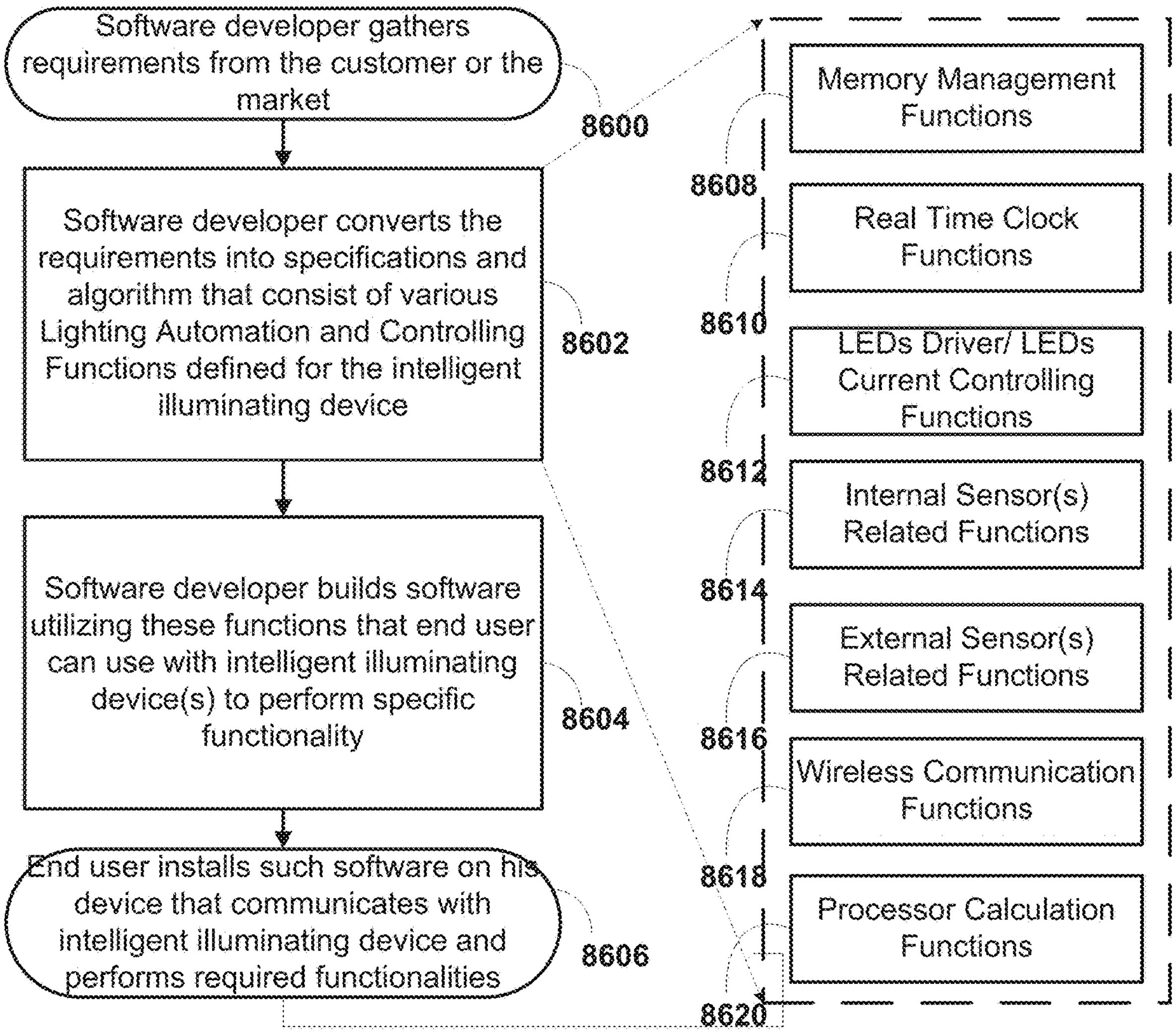
FIG. 86 is a flow chart of functions to implement different applications or features in accordance with one embodiment of the present invention.

The II Device system will have a specific Software Development Kit (SDK) and/or Application Program Interface (API) for developer(s) to build various programs and features for the II Devices(s). Referring to FIG. 86, the software developer gathers requirements from the customer or the market 8600, and converts the requirements into specifications and algorithms that consist of various Lighting Automation and Controlling Functions (see 8608-8620) defined for the intelligent illumination device 8602. II Device will contain unique functions which could be used by a software/application developer to implement different applications or feature. For example, the functions may include:

a) Functions for connecting and disconnecting remote controlling device(s) to II Devices(s) 140 individually or in group. The function includes the protocol to connect to the lighting device where lighting device's identification number is integral part of it.

b) Function 8612 to send commands to II Devices(s) 140 to change the color and brightness, the command will consist of values proportional to the luminosity output of each LED arms driven by LEDs current controlling circuitry 120. These values will be read and decoded by controller/processor 106 and it will control the flow of average current through LEDs accordingly to illuminate LEDs to desired level of brightness. One of the functions will include values for defining the color and the brightness in terms of Red (R), Green (G), and Blue (B) values ranging from 0 to 255 representing standard RGB color space. Another function will include values of Cx and Cy ranging from 0 to 1 representing standard CIE color space.

c) Functions 8610 to send command to II Device(s) 140 to set date and time of RTC (Real Time Clock) 110 or read date and time values from RTC which can be used to automate the lighting output such as to turn ON/OFF at a particular color and brightness at a particular day and time.

d) Function 8608 to send command to read and write controller/processor's 106 memory or the other on board memory 108 of the II Device(s) 140.

e) Functions 8614 and 8616 to send commands to access the controller/process or programs such as reading sensor data such as that of ambient light sensor 118 or any other internal or external.

f) Function 8618 to communicate with external wireless devices such as Remote controlling Device(s) through II Device's 140.

g) Function 8620 to perform various processor calculations.

The software developer builds the software using these functions that the end user can use with intelligent illuminating device(s) to perform specific functionality 8604, and the end user installs such software on his device that communicates with intelligent illuminating device and performs the required functionalities 8606.

Figure 87:
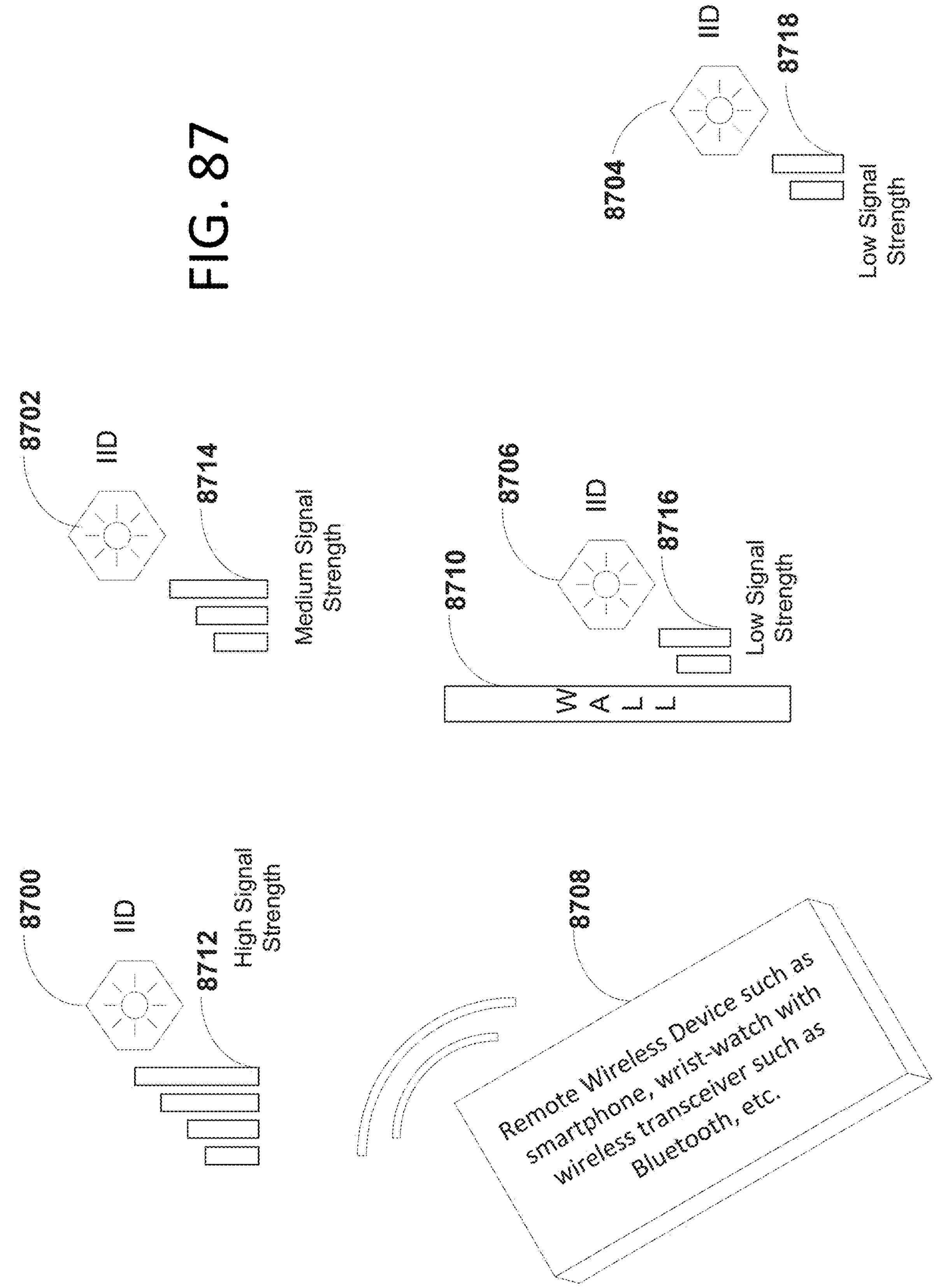
FIG. 87 is a block diagram illustrating how the signal strength can vary based on location and proximity in accordance with one embodiment of the present invention.

Referring to FIG. 87, depending on location and proximity, the wireless signal strength between an II Device 140 and a controlling device can vary. In addition, any impediments, such as a wall, can also have an effect reducing the wireless signal strength between an II Device(s) 140, (8700, 8702, 8706 and 8704) and a Remote Wireless Device 8708 capable of communicating with II Device(s) 140 (8700, 8702, 8706 and 8704). The remote wireless device 8708 and II Device(s) 140 (8700, 8702, 8706 and 8704) can then be put in a state where when signal strengths (8712, 8714, 8716 and 8718) are detected beyond a certain threshold then the II Device 140 should execute a command.

The exact threshold and the command could be user adjusted or preset. In this scenario, a user with the remote wireless device 8708 which could be remote controlling device for II Device(s) 140 (8700, 8702, 8706 and 8704) could move around an area where the II Device(s) are stationary, and while moving around the signal strengths (8712, 8714, 8716 and 8718) would vary and only those II Device(s) with a signal strength (8712, 8714, 8716 and 8718) above the certain threshold would be activated. Similarly, when the remote wireless device 8708 continues to move and the signal strength diminishes past the threshold then the II Device(s) 140 (8700, 8702, 8706 and 8704) can have a separate command such as turning off.

The II Device(s) 140 (8700, 8702, 8706 and 8704) and the remote wireless device 8708 might be set by a user in a state to monitor signal strength (8712, 8714, 8716 and 8718) and thus execute the proximity program. It might also be scheduled by a user to be executed at set times. In some scenarios the controlling device will search for II Devices, assess their signal strength (8712, 8714, 8716 and 8718), and send commands to the II Devices that have signal strengths (8712, 8714, 8716 and 8718) above the threshold. In other scenarios, the II Devices will search for the remote wireless or controlling device to come into direct range, assess the signal strength (8712, 8714, 8716 and 8718), and take action accordingly. Or it can be some combination of the two. The search between the II Devices and the remote wireless or controlling device can be continuous or intermittent at some defined time, e.g., every second.

In some cases, variations or some effect on signal strength (8712, 8714, 8716 and 8718) can be interpreted as some barrier, such as a wall 8710, between the II Device 8706 and the remote wireless or controlling device 8708. If the signal strength (8712, 8714, 8716 and 8718) is interpreted as having a barrier, such as a wall, between the II Device and the controlling device, then the command to turn on might be disregarded even if the signal strength (8712, 8714, 8716 and 8718) is above the threshold for activation. In addition, the controlling device or II Devices might have information related to the general layout of the II Devices and barriers in between. This can come from user generated information, historical use patterns, or II Devices relative signal strengths (8712, 8714, 8716 and 8718) from each other. The remote wireless or controlling device might use this information to similarly make assumptions on whether an II Device is intended to be controlled within proximity. For example, assume II Device 1 and 2 are in room A, and II Device 3 and 4 are within room B. If in Room A then the true signal strength for II Device 1 and 2 would be beyond the proximity threshold, but consider II Device 3 is also beyond the proximity threshold but II Device 4 is not beyond the proximity threshold. Here, the controlling device could interpret this as the user being in room A and only send a proximity command to II Device 1 and 2, ignoring II Device 3.

Various application interfaces will now be described. On the controlling device for II Device 140 the user interface for the application can be made to be intuitive and representative of the lighting environment. There are multiple potential facets that could be combined to create an intuitive user interface not limited to a real-time representation of some or all lights, their status, and any active programs.

Figure 88:
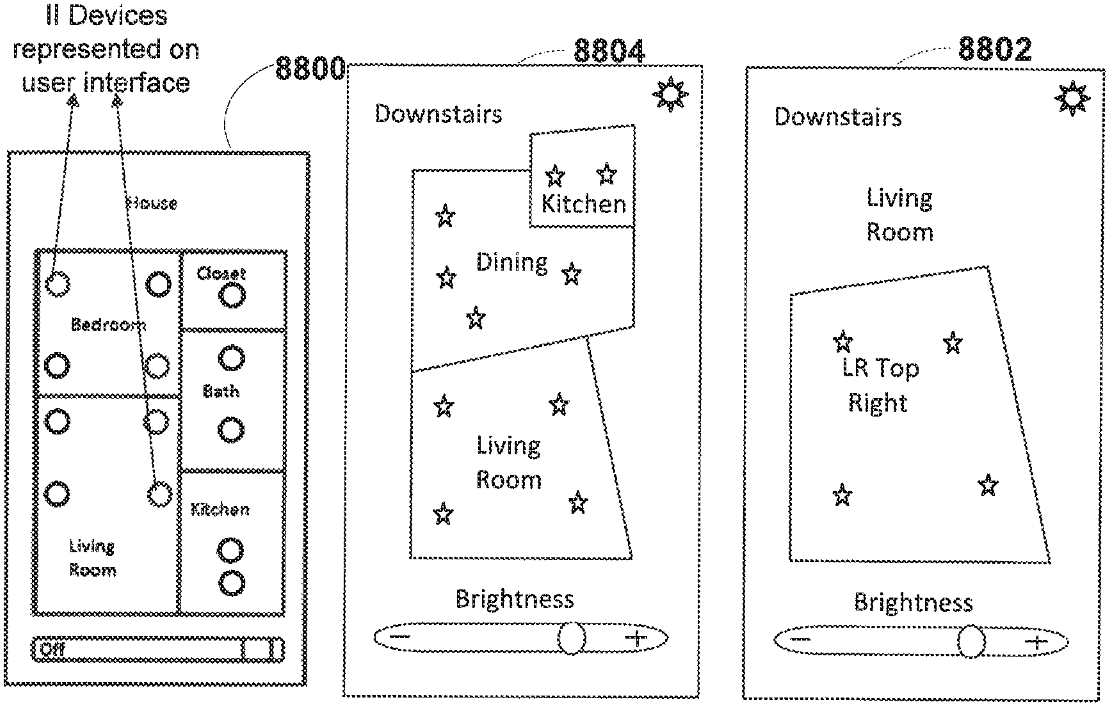
FIG. 88 shows examples of an application interface for controlling one or more lights in accordance with various embodiments of the present invention.

Referring to FIG. 88, in terms of representation, the II Devices 140 can be set-up in a representation 8800 similar to that of an overhead view of the space in which the II Devices are installed (i.e., a visual or virtual representation). In this case there can be a user led or automated process to place II Devices in respective locations on the screen. In addition, there might be a user generated or automated process where a user set's up their II Devices within the framework of rooms such as living room 8802 in the figure. Here a user would be prompted to create an approximate representation of the walls of a room then drag or input where the II Devices are related to the room layout 8804. The creation of the walls can be done in multiple ways using direct user input (dragging, using corners, or using predefined shapes) as well as camera functionality and estimation tools. Once a room is defined and II Devices within a room are defined a user can select the room as a whole or drill into individual lights within the room.

Further, a user can add II Devices to an existing room or create new rooms as representations and add other II Devices into that room. Here multiple rooms could be joined together to create a full overhead layout with walls or spaces in between as per representation 8800 in the figure. Multiple rooms can be joined together to create different floors, so that a user can select between overhead representations of different floors. Further, multiple II Devices can be combined together to create smaller clusters or groups of II Devices. Here the cluster would be editable but treated at the layer in the general user interface as one II Device.

This provides a scalable user interface depending on the number of II Devices and the number of rooms configured by the user, but also provides an easy representation of all lights at any time. A user can select a whole house, a floor, a room, or individual lights within the selection area by zooming in or zooming out. In addition, a user can select any combination of floors, rooms, or lights to select or create a quick grouping at any time. The overhead representation would include whether each individual II Device is on or off, the brightness, and potentially any active or scheduled programs or lighting effects. In addition to working as a representation of multiple II Devices, the overhead representation can be utilized for other intelligent devices or sensors related to the environment.

Figure 89:
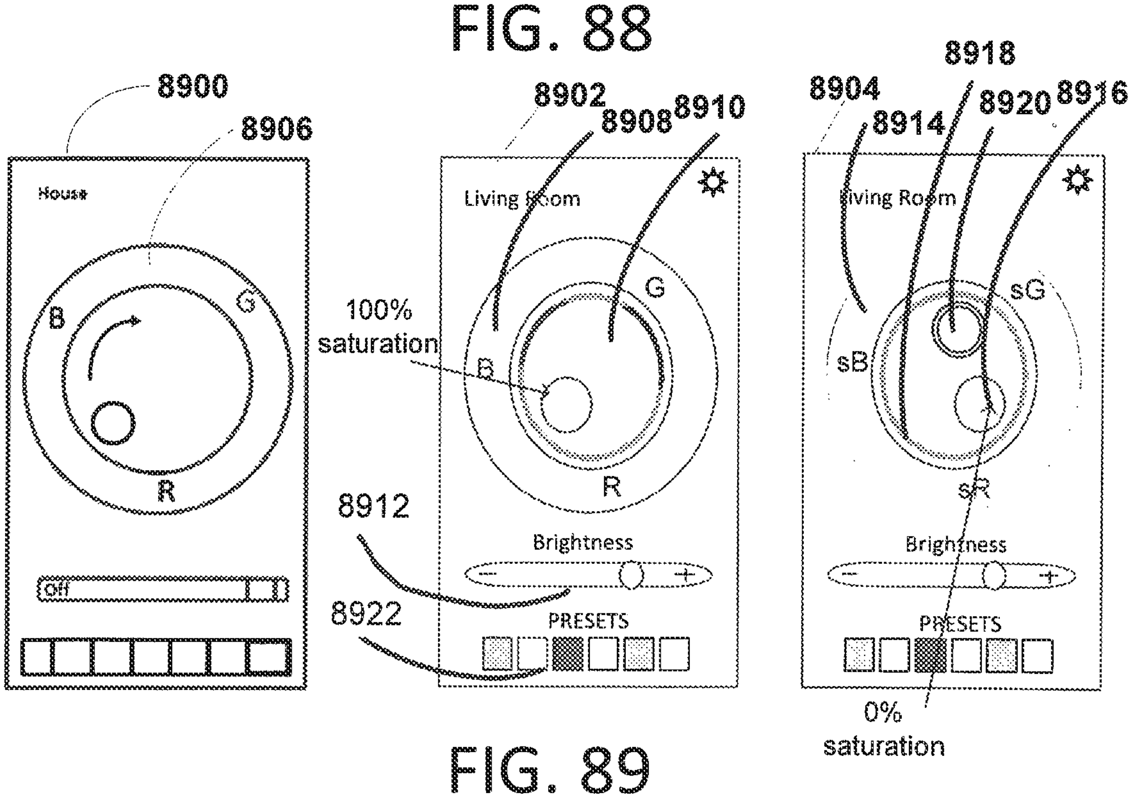
FIG. 89 shows examples of an application interface for color wheel control in accordance with various embodiments of the present invention.

As the II Devices can represent colors as well as variations of white with different saturation levels, the application representation in the controlling device needs to have a similar representation. Referring to FIG. 89, in the application interface (8900, 8902, 8904), this can be represented by having a color area 8906, 8908, a white light amplitude/saturation area 8910 and brightness area 8912. The color area could be a color wheel 8906, 8908 or box representative of the available color combinations, the white area could be a rotating or directional level 8910. When the white light area is at the lowest level 8914, the color area would be fully saturated with bright colors shown as R, G and B. When the white light area is at its highest level 8916, the color area would be almost completely white. In between, incremental increases in the white light level 8920 would have an effect to add less saturation to the color area, looking like a white gradient overlaid on the color area 8918 shown with sB, sG and sR (stands for less saturation of R, G and B). Here if multiple II Devices with differing ranges in color saturation are present, the controlling device will note this and only allow the white light level to reduce to the appropriate level representative of the less flexible II Devices range.

Any selection could also be saved by the user to a default area on the screen for quick selection such as presets 8922 i.e. when user presses defined preset the selected II Device would emit the color, brightness and saturation of the selected preset. In addition brightness could also be adjusted independently as a proportional amount of brightness emitted by the II Devices by controlling the brightness area 8912. All these representation areas could be given different intuition, however, the concept of controlling the color, saturation and brightness of II Device(s) through user interface would remain the same.

As an alternative to wireless control through a controlling device, some embodiments might rather or also have a manual hue adjustment option with some mechanical input, such as a button, a knob, or the like. A user can adjust the hue, color, or brightness of the II Device. One example of a button would be a rotating ring around the edge of the II Device that in different positions would relate to different hues or colors. With torque a user could turn the ring to create different ring effects. Another example would be a very low voltage conductive area on the outside of the light that when touched would change the color or hue. Again another version might be a button or switch somewhere on the embodiment that when turned would create a different hue, brightness, or color.

Figure 90:
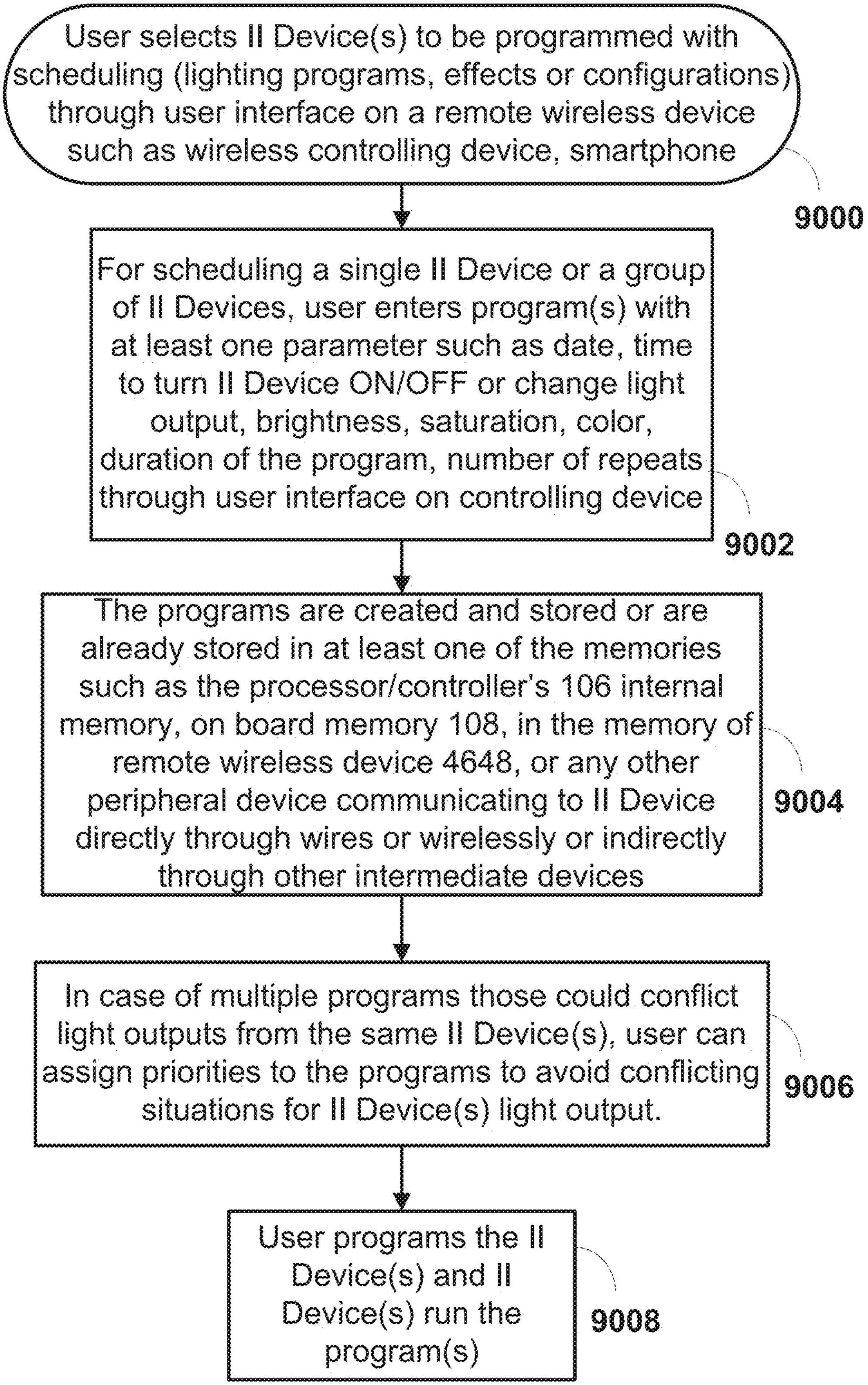
FIG. 90 is a flow chart of scheduling programs for operating a lighting device in accordance with one embodiment of the present invention.

Now referring to FIG. 90, a flow chart of scheduling programs for operating a lighting device in accordance with one embodiment of the present invention is shown. The user selects II Device(s) to be programmed with scheduling (lighting programs, effects or configurations) through user interface on a remote wireless device such as wireless controlling device or smartphone in block 9000. For scheduling a single II Device or a group of II Devices, the user enters program(s) with at least one parameter such as date, time to turn II Device ON/OFF or change light output, brightness, saturation, color, duration of the program, number of repeats through user interface on controlling device in block 9002. The programs are created and stored or are already stored in at least one of the memories such as the processor/controller's 106 internal memory, on board memory 108, in the memory of remote wireless device 4648, or any other peripheral device communicating to II Device directly through wires or wirelessly or indirectly through other intermediate devices in block 9004. In case of multiple programs those could conflict light outputs from the same II Device(s), the user can assign priorities to the programs to avoid conflicting situations for II Device(s) light output in block 9006. The user programs the II Device(s) and II Device(s) run the program(s) in block 9008.

Figure 91:
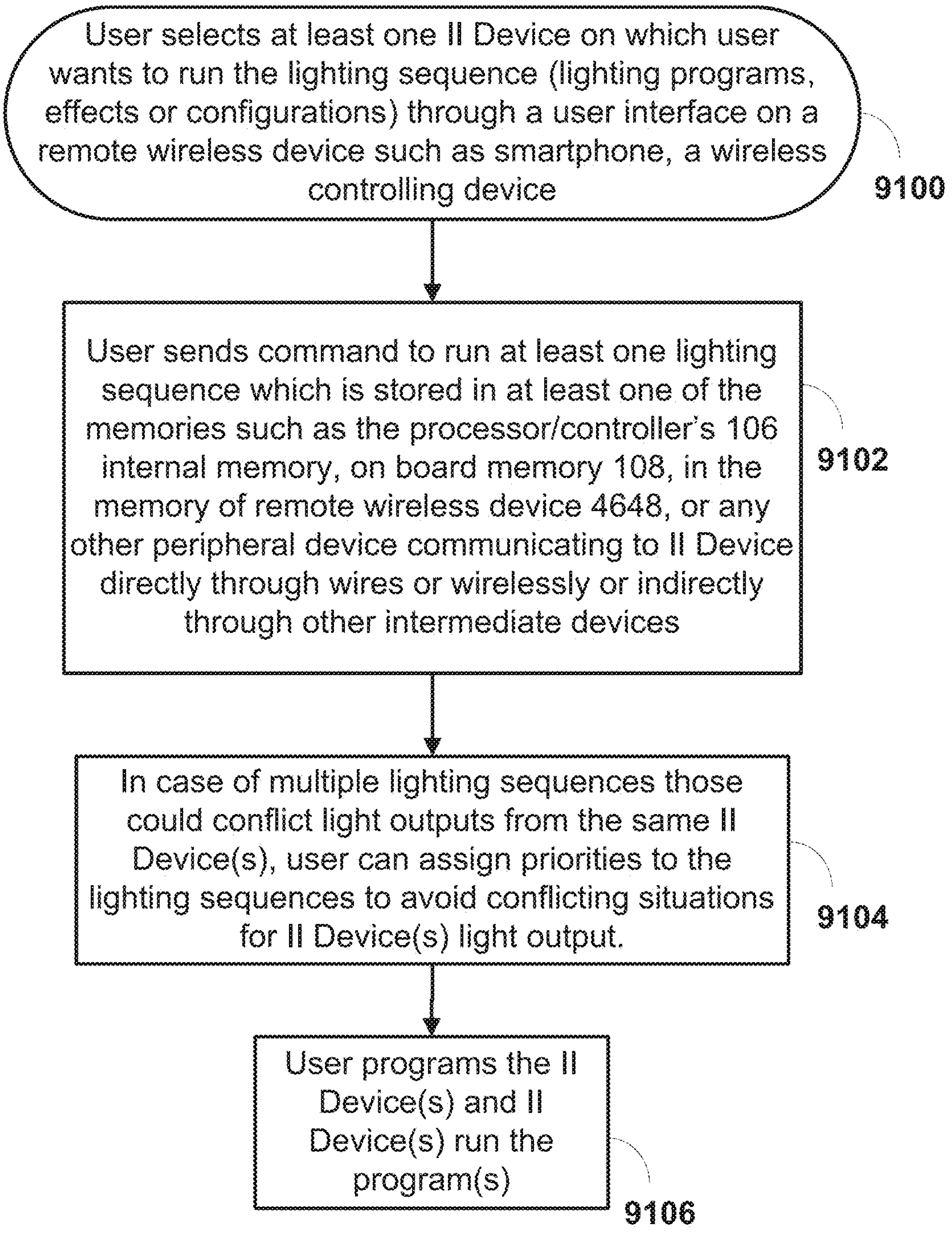
FIG. 91 is a flow chart of selecting a lighting sequence of a lighting device in accordance with one embodiment of the present invention.

Referring now to FIG. 91, a flow chart of selecting a lighting sequence of a lighting device in accordance with one embodiment of the present invention is shown. The user selects at least one II Device on which user wants to run the lighting sequence (lighting programs, effects or configurations) through a user interface on a remote wireless device such as smartphone or a wireless controlling device in block 9100. The user sends command to run at least one lighting sequence which is stored in at least one of the memories such as the processor/controller's 106 internal memory, on board memory 108, in the memory of remote wireless device 4648, or any other peripheral device communicating to II Device directly through wires or wirelessly or indirectly through other intermediate devices in block 9102. In case of multiple lighting sequences those could conflict light outputs from the same II Device(s), the user can assign priorities to the lighting sequences to avoid conflicting situations for II Device(s) light output in block 9104. Thereafter, the user programs the II Device(s) and II Device(s) run the program(s) in block 9106.

Figure 92:
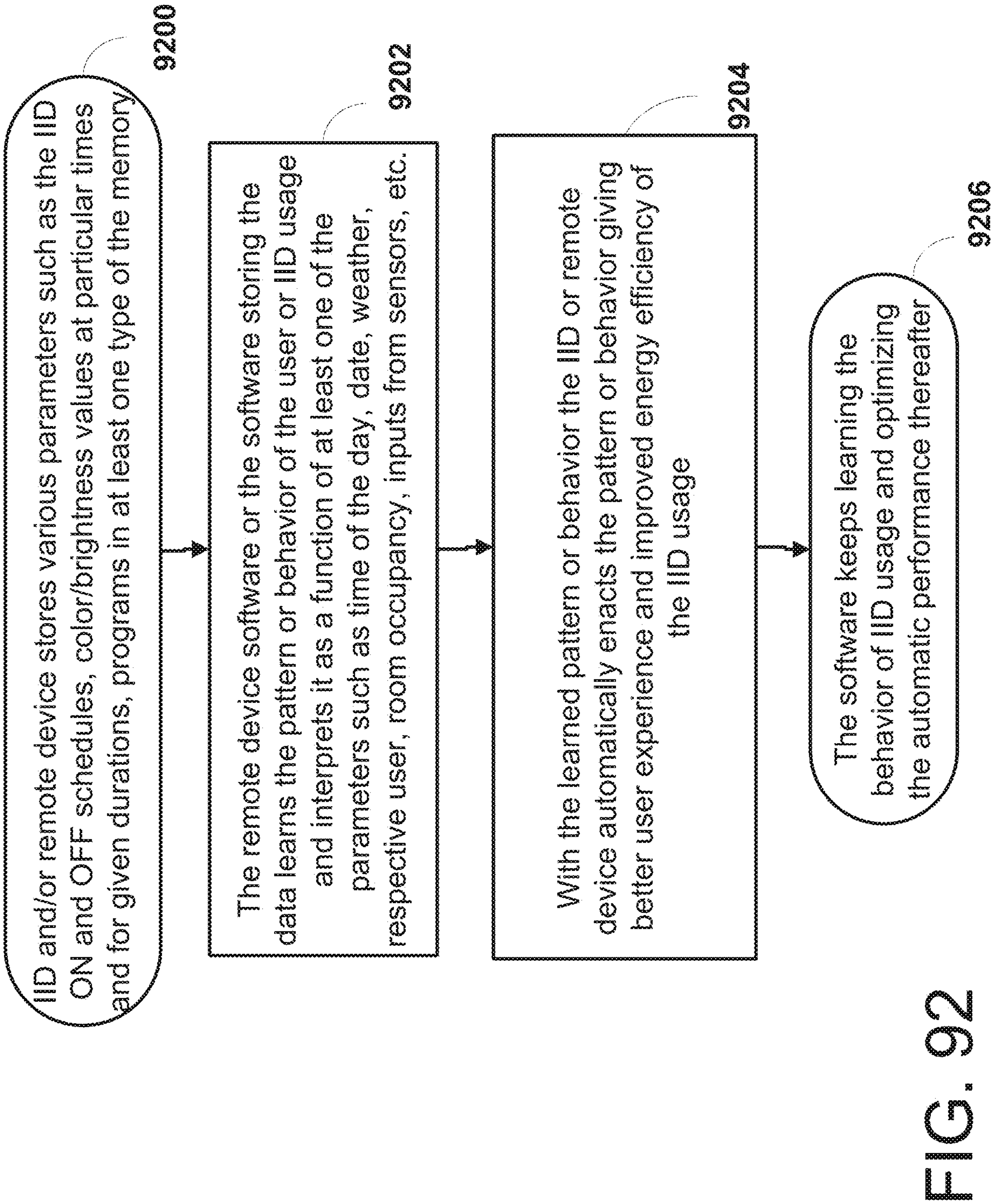
FIG. 92 is a flow chart of storing various parameters for a lighting device in accordance with the present invention.

Now referring to FIG. 92, a flow chart of storing various parameters for a lighting device in accordance with the present invention is shown. The II Device and/or remote device stores various parameters such as the II Device ON and OFF schedules, color/brightness values at particular times and for given durations, programs in at least one type of the memory beginning in block 9200. The remote device software or the software storing the data learns the pattern or behavior of the user or II Device usage and interprets it as a function of at least one of the parameters such as time of the day, date, weather, respective user, room occupancy, inputs from sensors, etc. in block 9202. With the learned pattern or behavior the II Device or remote device automatically enacts the pattern or behavior giving better user experience and improved energy efficiency of the II Device usage in block 9204. The software keeps learning the behavior of II Device usage and optimizing the automatic performance thereafter in block 9206.

Figure 93:
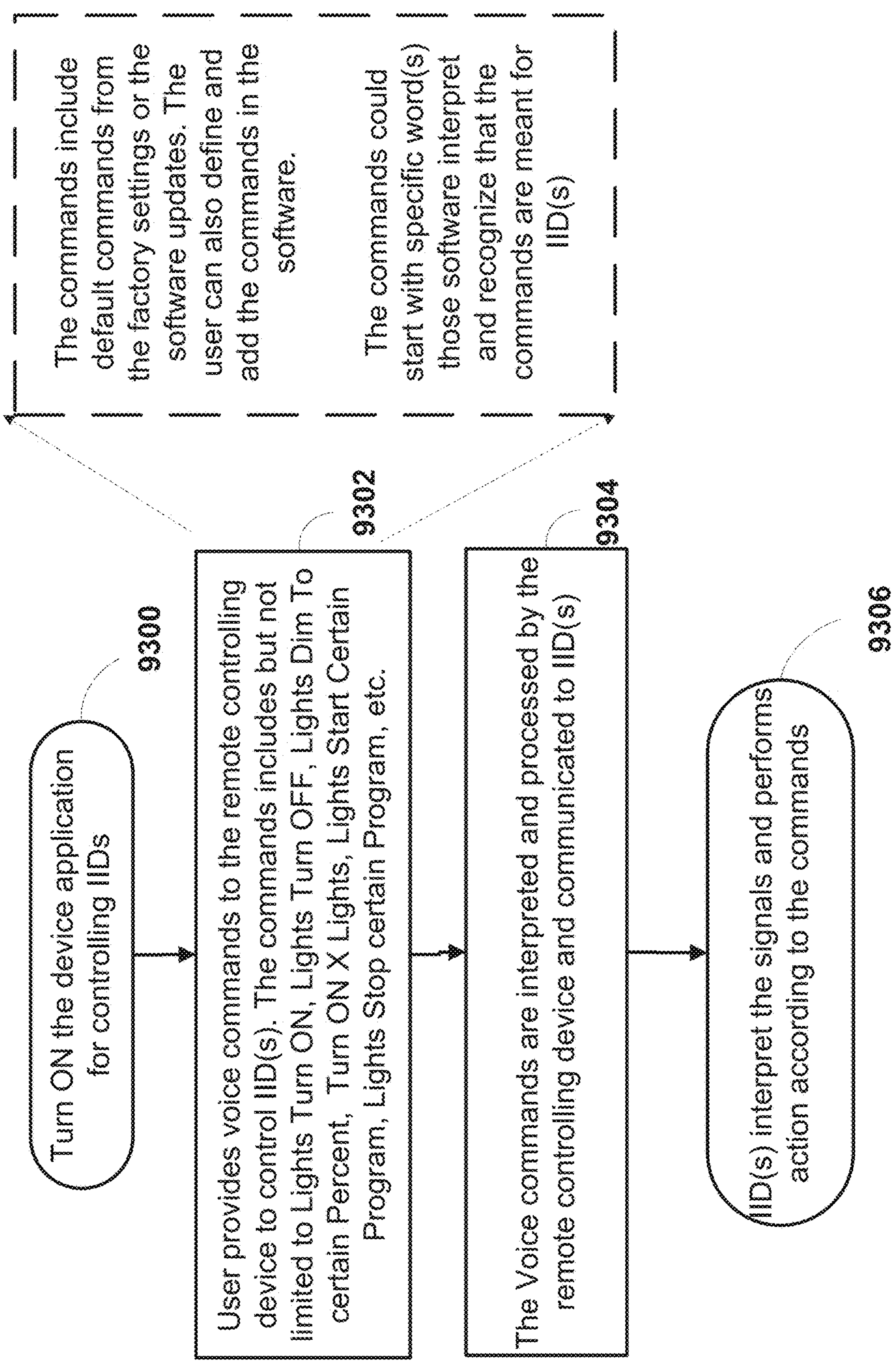
FIG. 93 is a flow chart illustrating using voice commands to control a lighting device in accordance with the present invention.

Referring to FIG. 93, instead of a user interacting directly via touch with the application on the controlling device, alternatively a user could use voice commands to execute and control one or many II Devices. The user turns ON the device application for controlling II Device(s) in block 9300, and provides voice commands to the remote controlling device to control II Device(s) in block 9302. Example voice commands can include, but are not limited to, Lights Turn ON, Lights Turn OFF, Lights Dim To certain Percent, Turn ON X Lights, Lights Start Certain Program, Lights Stop certain Program, etc. The voice command can also act as general setting and configurations, executing a program, executing a scene, or setting a schedule those could be default commands with factory settings or user created commands.

The voice service could be integrated into the device application or use the controlling device's own voice service. Popular voice commands such as 'Turn on X light' could be added to the reference database. The X in this consideration could be related to the level of control the user is selecting. For example, 'Turn on All lights' would turn on all II Devices. 'Turn on Bedroom lights' would turn on those II Devices in the room named 'bedroom'. The step 9304 includes that software interprets and recognizes the voice commands and convert those to specific electrical signals if the commands are meant for IID(s). Another step 9306 includes the remote device sending the commands to the II Device(s) and II Device(s) acting according to the commands. The commands can also always start with specific word or set of words so that the software recognizes the voice commands are for controlling the II Device(s) that also helps it ignore other unrelated voice inputs.

Figure 94:
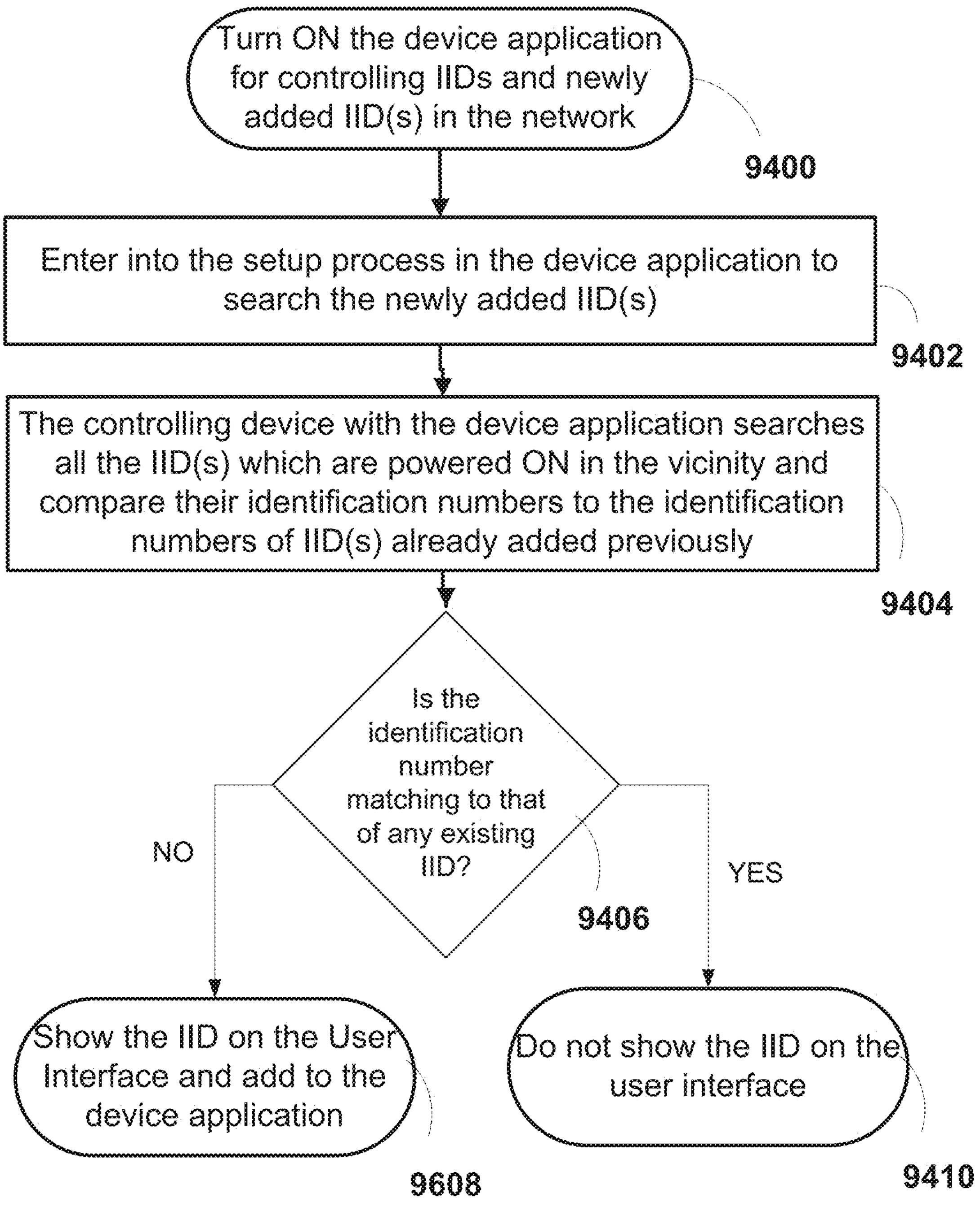
FIG. 94 is a flow chart illustrating setting up a network of lighting devices in accordance with one embodiment of the present invention.

Forming a network of II Devices with its controlling device(s) and adding II Device(s) in the existing network of its wireless controlling devices(s) such as Smartphone will now be described. Referring to FIG. 94, the setup process 9400 may include the wireless controlling device that is able to control the II Devices 140 in which wireless controlling device searches for powered II Devices 140 and adds them into its network. When a user wants to add new II Device(s) 140 to the existing network, the controlling device searches for all the II Devices 140 in the vicinity but shows only ones that are not part of the existing network, and user can add these new ones to the network. User can specifically ask device to search for new II Devices in the vicinity by going into the setup mode onto the device application 9402. This way it is convenient for the user to look and add only the new II Device(s) 140 instead of looking at the entire list of the devices and finding the right ones to add into the network. This is achieved by comparing the identification numbers of the existing II Devices into the network with II Devices to be added into the network 9404, 9406, 9408, 9410.

Figure 95:
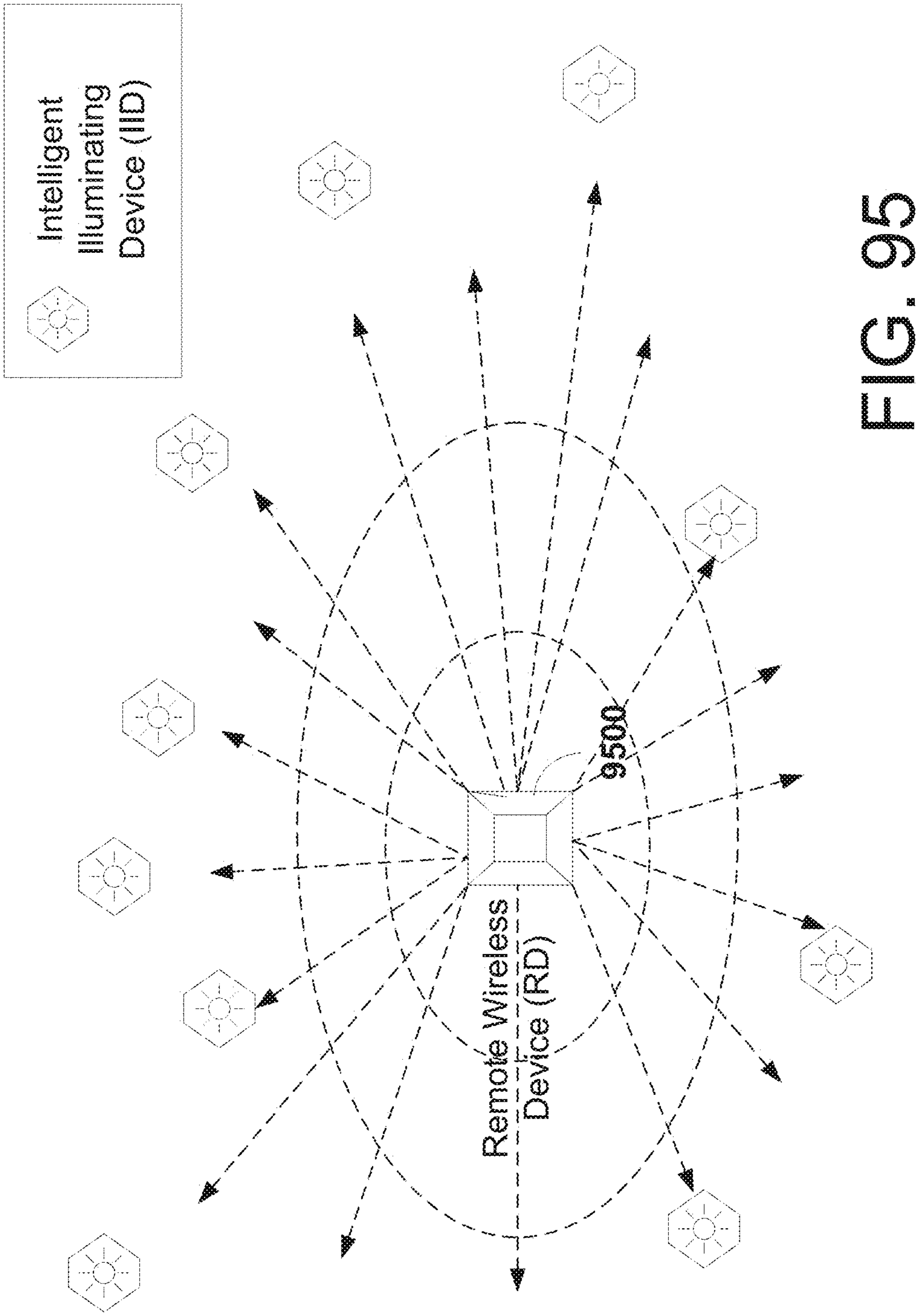
FIGS. 95 and 96 are a block diagram and flow chart for broadcasting commands in accordance with one embodiment of the present invention.
Figure 96:
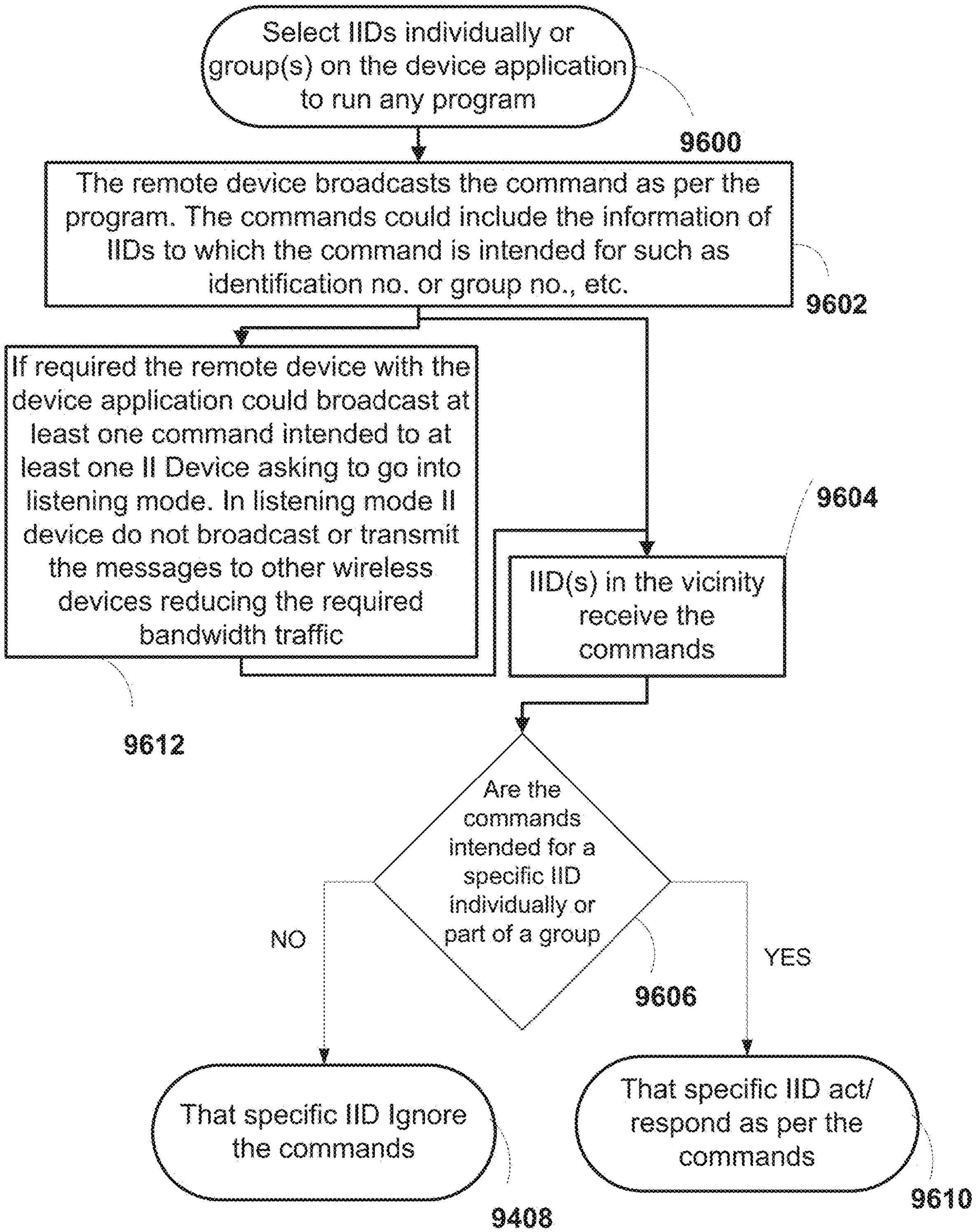

In some scenarios such entertainment stage where multiple lights are part of the system on the stage, very precise synchronization of the light effects may be required, i.e. no or very minimal delay in the light output changes of various lights is required. There are two ways where the remote wireless device (RD) controls or communicate with various II Devices 140. First, RD is connected to all II Devices in the vicinity and send commands or communicates with one by one in a serial fashion. Second, RD communicates with one or few of the II Devices in the vicinity and asks connected II Devices to communicate with other devices such as by forming a mesh network. In both the cases all II Devices 140 may not get commands simultaneously or in parallel because of which II Devices actions might not look synchronized even for the same command. More the number of II Devices, more the time required to send command to each II Device in the vicinity and worse the synchronization will be. This could be solved with wireless protocols such as Bluetooth Low Energy or BLE4.0 which support broadcasting. With this technique the Remote Wireless Device will broadcast the commands and all the II Devices in the vicinity within the range would get the commands simultaneously and act as per the commands. Referring to FIGS. 95 and 96, the II Device(s) are selected individually or by group(s) on the device application to run any program 9600, and the Remote Controlling Device (RD) 9500 broadcasts the data or commands 9602 and all II Devices within the range receive it and act accordingly at the same time. In broadcast method here, II Devices 140 could be only in listening mode and need not send any acknowledgement to any other device or need not connect to any other device including RD 9500. With this there is less traffic of the wireless data flow providing better control over limited bandwidth availability, less communication error and less lost packets of data transmitted. In addition, there could be various individual or groups of II Devices that RD 9500 want to send commands at a time using broadcast method 9602. With broadcast all II Devices within the range receive the data/command 9604 from RD. The II Devices would check if the commands are intended for them as individually or part of a group 9606. And only those II DEVICE(s) would act/respond as per the commands to whom the command is intended for 9608, 9610. This is possible by having an identification number such as for individual II DEVICE(s) or group of II DEVICE(s) in the broadcast commands from RD 9500. In addition, if required the remote device with the device application could broadcast at least one command intended to at least one II Device asking to go into listening mode 9612. In listening mode II Device do not broadcast or transmit the messages to other wireless devices reducing the required bandwidth traffic. This may be required especially if II Devices are broadcasting any information or communicating to other devices causing increase in traffic in the available communication bandwidth. With II Devices going into the listening mode, the traffic will reduce helping reliability of the message transfer from remote wireless device to II Devices.

Figure 97:
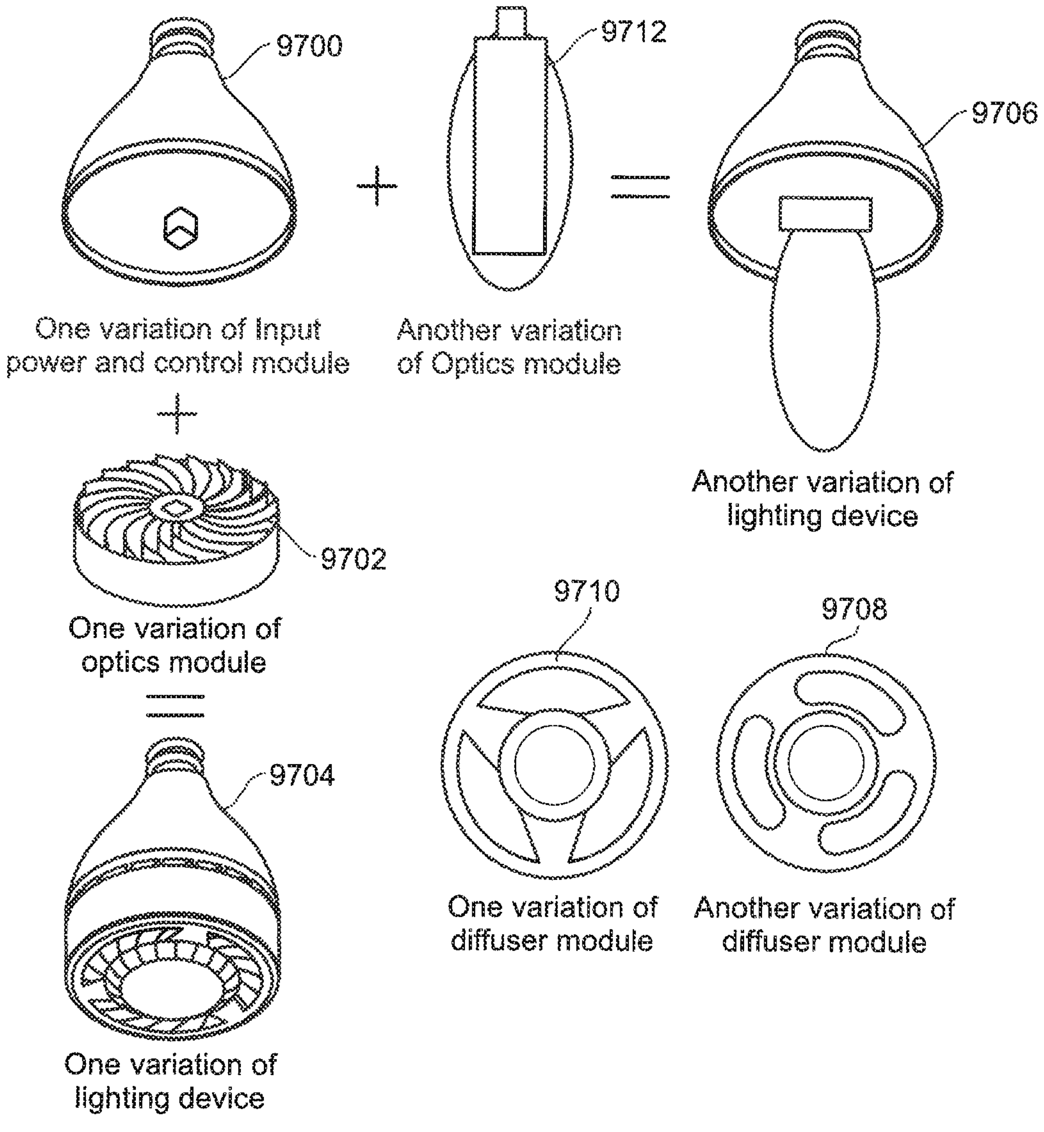
FIG. 97 illustrates an example of forming lighting devices from various parts in accordance with one embodiment of the present invention.

The modularity so that one can build his/her own lighting fixture will now be described. The lighting industry has been dependent on the existing form factors of lighting devices such as bulb, specific fixture, strip light, panels, etc. which are manufactured by the lighting companies and specified to designers. There is no easy tool where form factors of lights can be designed and produced at a unit level and can be installed in the infrastructure as required. With this there are limitations at the lighting installations level because of dependencies on the available form factors which also define the light output in terms of beam angle, lumens, color temperature, number of colors that can be produced, input socket, size and other dimensions, etc. Access to chose and use various parts of any light system in various capabilities and forms would give any individual or designer to design a specific light required for a specific area or room of an infrastructure. For example, with various forms having different specifications of different parts of any light such as input power module, optics module, control module, diffuser, lens, types of LEDs, form factors of LEDs such as on strip, on different shape of printed circuit boards meant for bulb, fixtures, panels, etc. designer would be able to design his own lighting devices as per his requirements. Various parts of a lighting device with different specifications where each part with at least one function such as providing input power trough mains input, controlling device, etc. could be made compatible to at least one other part performing different function so that when these parts come together they can form different variations of lighting device with permutations and combinations. Referring to FIG. 97 an example is shown of forming lighting devices from various parts. An input power and control module 9700 when combined with one variation of optics module 9702 gives one variation of lighting device 9704. Similarly, when one variation of input power and control module 9700 combined with another variation of optics module 9712 gives another variation of lighting device 9706. Furthermore, the optic module 9702 could be of different parts with one diffuser lens 9710 or another diffuser lens 9708 part of it giving variations in optics module, here in terms of light output.

Figure 98:
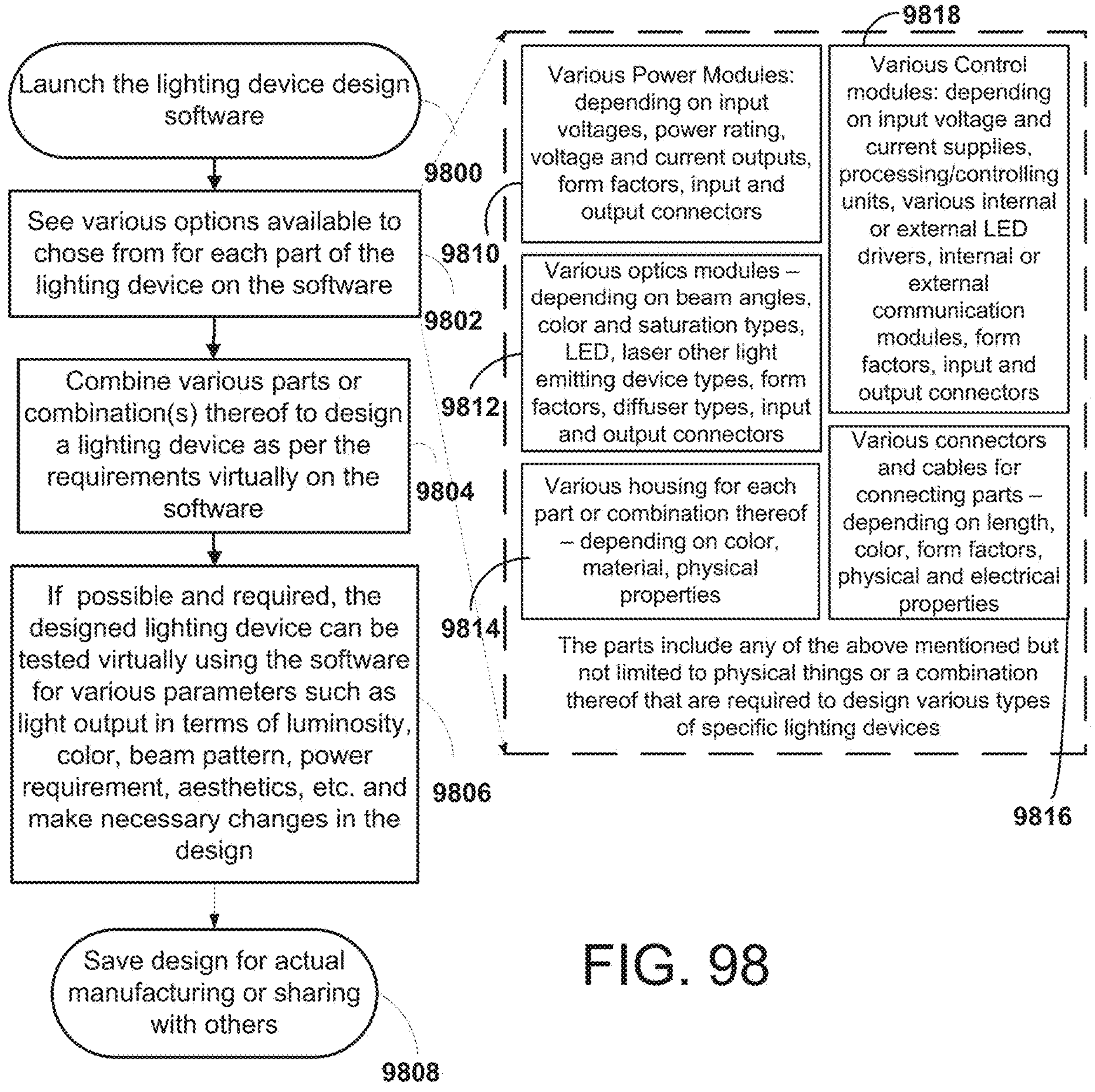
FIG. 98 is a flow chart illustrating a program for designing a lighting device in accordance with one embodiment of the present invention.

A software tool can provide a user or designer with all variations of all parts/modules that can be used to virtually form or design or create multiple different lighting devices through permutations and combinations. The user is able to select the various parts/modules required to design the lighting device using the software and potentially able to test the design for various parameters. Referring to FIG. 98, the user or designer can launch the software 9800 for designing the lighting device. On the software tool, the user can see various available parts/modules or combinations thereof 9802 which can be chosen and combined with different permutations and combinations 9804 to form at least one lighting device. The parts include but not limited to:

1. Various power modules 9810—Various Power Modules are formed based on different input voltages, power rating, voltage and current outputs, form factors, input and output connectors, etc.
2. Various control modules 9818—Various Control modules are formed based on different input voltage and current supplies, processing/controlling units, various internal or external LED drivers, internal or external communication modules, form factors, input and output connectors, etc.
3. Various optics modules 9812—Various optics modules are formed based on different beam angles, color and saturation types, LED, laser other light emitting device types, form factors, diffuser types, input and output connectors, etc.
4. Various housing modules 9814—Various housing for each part or combination thereof based on color, material, physical properties, entire housing in terms of various fixtures, panels, etc.
5. Various modular connectors and cables for connecting parts or combination(s) thereof 9816—Various connectors and cables for connecting parts based on length, color, form factors, physical and electrical properties, etc.

Once the lighting device is designed virtually on the software, user could test it for at least one parameter 9806 and make necessary changes in the design. The parameters include but not limited to light output in terms of luminosity, color and beam pattern, power requirement, aesthetics, etc. The user can also save the design for actual manufacturing or sharing with others 9808.

Figure 99:
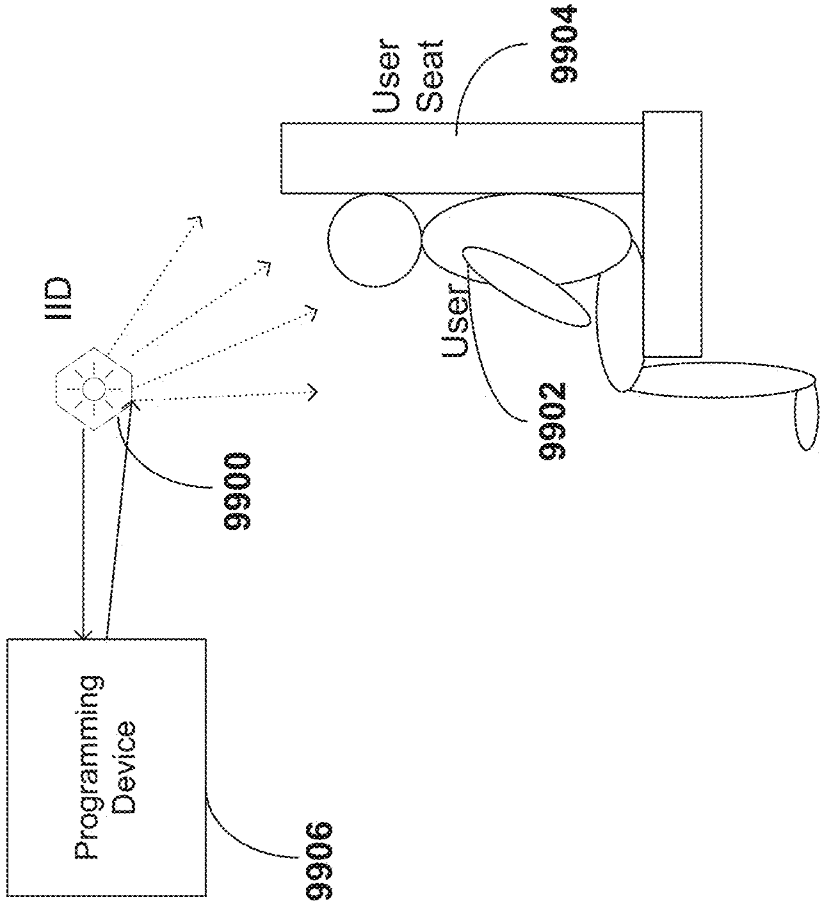
FIG. 99 is a block diagram showing a lighting device for geographical or space travel in accordance with one embodiment of the present invention.

Now referring to FIG. 99, a block diagram showing a lighting device for geographical travel, especially from one time zone to the other or space travel. The overhead light 9900 on a passenger seat 9904 could be made intelligent such as II Device 140 which can be programmed to provide simulated cycle of the sunlight throughout the day which could help reduce the effect of jet lag or other travel fatigue especially when the geographical locations of travel are far affecting the circadian clock of the user 9902. The user 9902 can program the II Device 9900 to provide the simulated light based on his travel locations and day and times of the travel. Or user 9902 can input the information such as travel destinations and travel timings so that software controlling the II device calculates and provide required simulated light output. The II Device here need not be wireless, but could be wired directly to the controlling or programming device 9906 which provides the user interface for providing the inputs or directly programming the II Device 9900. There are numerous applications of such system such as in airplanes where user with simulated lighting could have better sleep pattern and minimize the jet lag effect.

Figure 100:
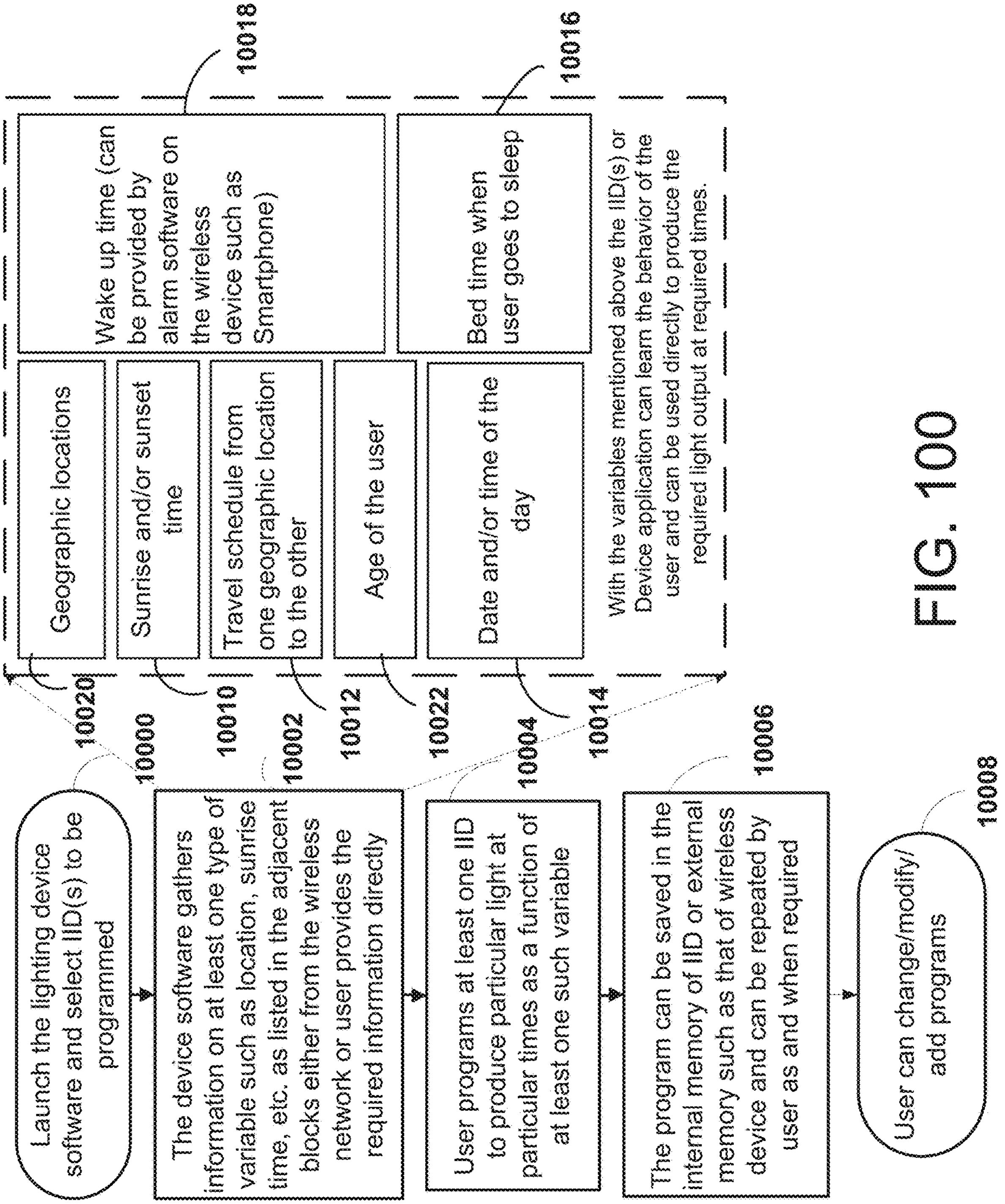
FIG. 100 is a flow chart illustrating how a user might want to program a lighting device to produce light as a function of at least one variable in accordance with one embodiment of the present invention.

Referring to FIG. 100, a flow chart illustrating how a user might want to program at least one II DEVICE 140 to produce light as a function of at least one variable is shown. The variables are such that when changed could affect user's daily activities and may include, but are not limited to:

1. Geographic location 10020;
2. Sunrise time 10010;
3. Sunset time 10010;
4. Date 10014;
5. Time of the day 10014;
6. Wake up time (can be provided by alarm software on the wireless device such as Smartphone) 10018;
7. Bed time when user goes to sleep 10016;
8. Travel schedule from one geographic location to the other 10012;
9. Age of the user 10022; and/or
10. Light with warm and cool color temperature light.

There are multiple steps to create such programs for II DEVICE 140. First step involves launching the lighting device software on a wireless device 10000, while in the next step 10002 the device software gathers information on at least one type of variables mentioned above either from the wireless network or user provides the required information directly. Another step 10004 involves user programming at least one II DEVICE 140 to produce particular light at particular times as a function of at least one such variable mentioned above. The program(s) can be saved in the internal memory 108 of II DEVICE 140 or external memory such as that of wireless device and can be repeated by user as and when required as shown in step 10006. The user can change/modify/add programs in block 10008.

The user can also program the II DEVICE as a function of at least one variable mentioned above and at least one variable as below:

1. Maximum warmness in terms of color temperature, such as light with 2300K color temperature is considered as a warm light;
2. Maximum coolness in terms of color temperature, such as light with 6000K color temperature is considered as a cool light; and/or
3. Sensor input such as that from temperature information from a temperature sensor in a particular room.

Figure 101:
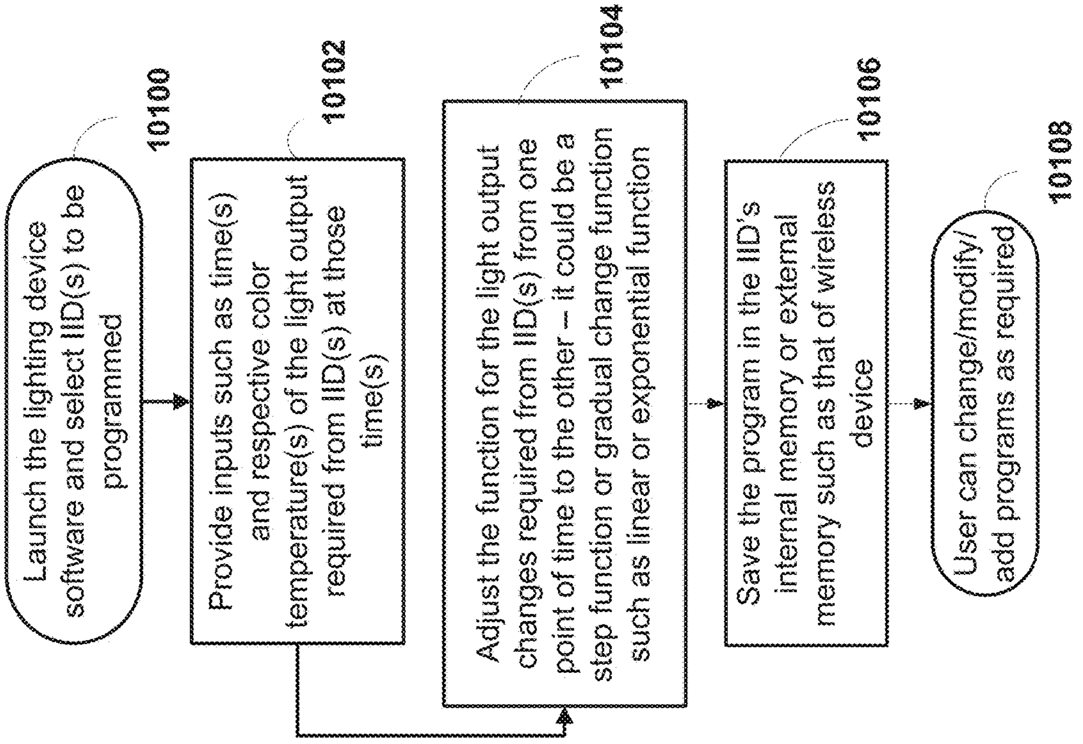
FIG. 101 is a flow chart illustrating how a user can define the color temperature of the light output as a function of time in accordance with one embodiment of the present invention.

Referring to FIG. 101, the lighting device software is launched and the II Device(s) to be programmed are selected 10100. The user can define the color temperature of the light output as a function of time 10102. For example, the user can define the cool color temperature light output from the morning wake up time till the afternoon and later on day light color temperature light output till the evening and then warm temperature until the user goes to sleep. The function could be step function as described or could also be defined to gradually change the color temperature light output from one point of time to the other 10104. For example, the cooler temperature to the warmer temperature change could be with some function such as linear or exponential 10104. In addition, with the variables mentioned above the II Device (s) 140 or Device application can learn the behavior of the user that can be used directly to create program(s) to produce the required light output at required times. This program can be a default program and user could customize it with the inputs of various times, color temperature changes at those times and function for gradual change in the color temperature from the one color temperature to the other. The user interface on the wireless device communicating with the II Device(s) 140 would provide the ability to the user to provide the time, color temperature and function inputs. The programs created could be stored in the internal memory 108 or external memory such as that of the wireless device 10106. In addition, the programs could be modified or more programs could be added as and when required through the user interface on the wireless device 10108.

Figure 102:
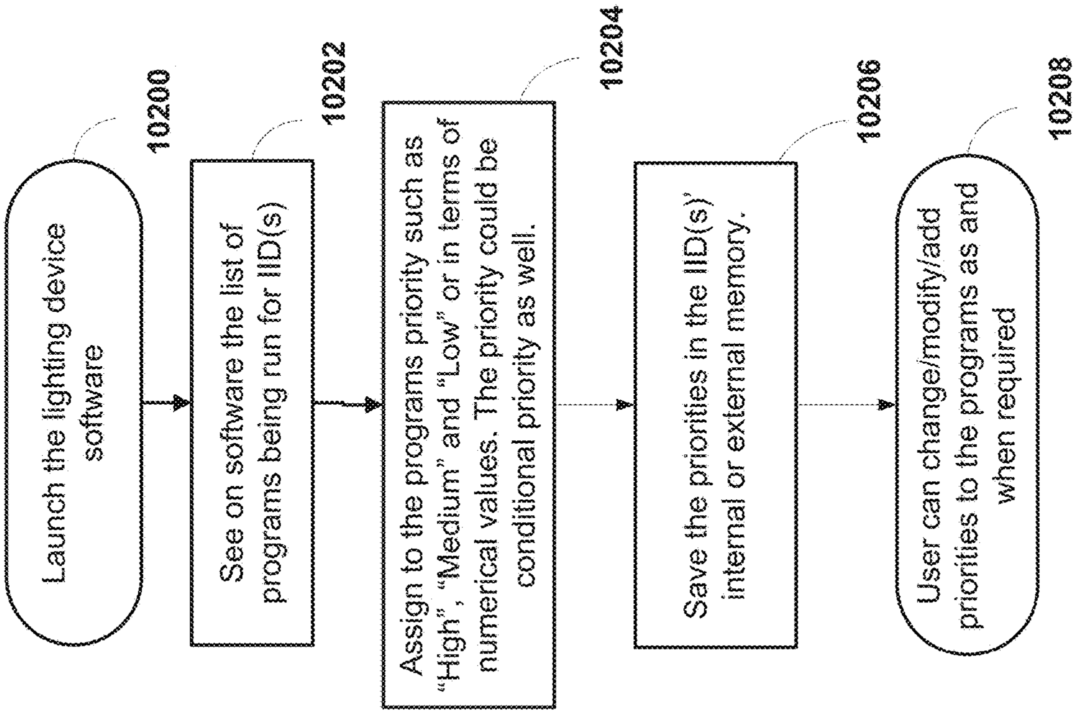
FIG. 102 is a flow chart illustrating how a user assigns the priority for various programs through the user interface software running on the wireless device for controlling a lighting device in accordance with one embodiment of the present invention.

There could be multiple programs running for at least one II DEVICE 140 either internally in II DEVICE 140 itself or in external wireless devices such as Smartphone running application for II DEVICE 140. These programs could be function of time with which there may be conflicts while running various programs. The priority needs to be assigned to ensure the important programs override the less important programs for II DEVICE(s) 140. Referring to FIG. 102, the lighting device software is launched 10200. This can be achieved by having user assign the priority for various programs through the user interface software running on the wireless device for controlling II DEVICE(s) 10204. The priority can be assigned in terms of numerical values or level such as “High”, “Medium”, “Less” 10204. There could be pre-defined or default programs with assigned priority which cannot be changed. On the user interface, the user can see all programs running for single or multiple II Devices in a list or grid or any other format and can assign the priority as required 10202. The priority can be stored in the internal memory of II Device or the external memory such as memory communicable coupled to the wireless device communicating with the II Device 10206. Different programs can have different priorities as a function of day or sensor input or any other condition 10204. For example, the program of light output in terms of color temperature change as a function of time of the day can have higher priority over the program for light output from II Device as a function of weather changes unless the weather condition becomes very harsh crossing the defined limit and warning has to be given to the user with certain color light output from the II Device(s). The user can change/modify/add priorities to the programs as and when required 10208.

Figure 103:
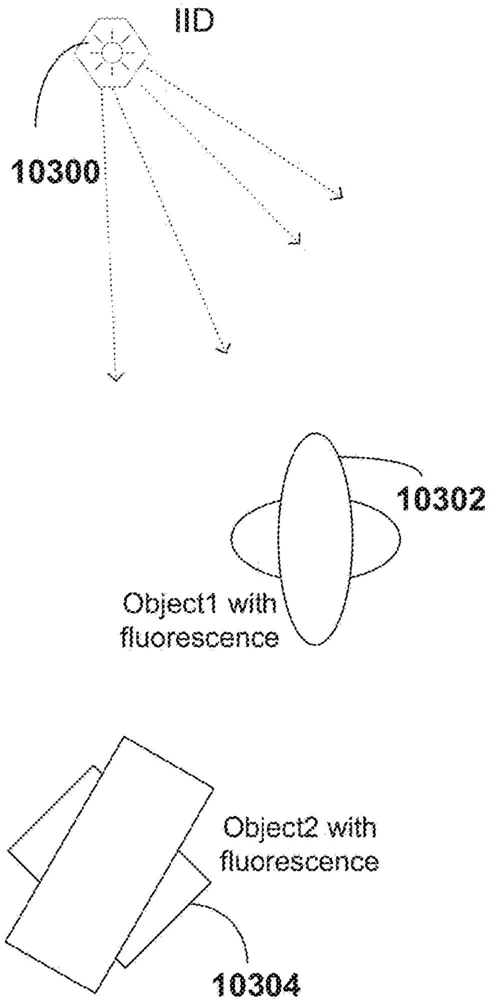
FIG. 103 is a block diagram illustrating how a lighting device can be used with fluorescent objects in accordance with one embodiment of the present invention.
Figure 104:
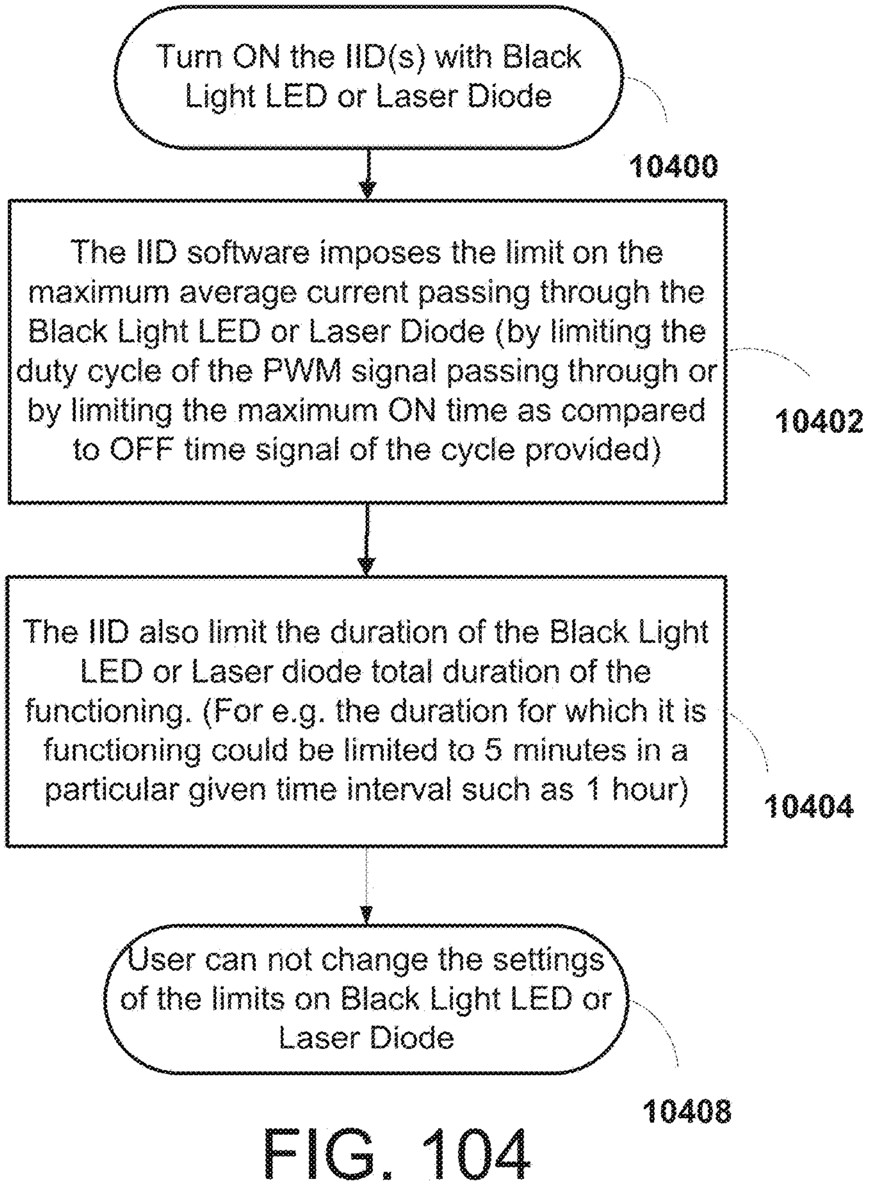
FIG. 104 is a flow chart illustrating how a lighting device can be used with fluorescent objects or laser diodes in accordance with one embodiment of the present invention.

FIG. 103 is a block diagram illustrating how a lighting device can be used with fluorescent objects (10302, 10304). Black light also known as ultraviolet light can be part of the II Device 140 or 10300 as at least one type of LED. Black lights are employed for decorative and artistic lighting effects particularly in observing fluorescence, in which illuminating certain materials with UV radiation causes the emission of visible light, causing these substances to glow with various colors. The II Device 140 or 10300 can have the black light LEDs controlled in a similar fashion as other color LEDs are controlled. However, considering the potential health hazards of the UV light an important provision can be made to limit the duration and average current flowing through the black LED. As shown in FIG. 104, the II Device software 10400 could impose the limit on the maximum average current passing through the Black Light LED 10402, by limiting the duty cycle of the PWM signal passing through the Black Light LED or by limiting the maximum ON time as compared to OFF time of the signal for Black Light LED 10402. In addition, the IID also limit the duration of the Black Light LED total duration of the functioning 10404. For example, the duration for which it is functioning could be limited to 5 minutes in a particular given time interval such as 1 hour. This could be achieved by using the internal clock of the processor 106 or real time clock 110 of the II Device 140. With black LED one user could provide artistic lighting effect by illuminating various objects with fluorescence abilities. The user can change the settings of the limits 10408.

Laser diode can be a part of the II Device 140 as at least one type of LED. Laser diodes are employed for entertainment lighting effects. The II Device 140 can have the laser diode of one or multiple colors light output controlled in a similar fashion as other color LEDs are controlled. However, considering the potential health hazards of the laser diode output light an important provision can be made to limit the duration and average current flowing through the laser diode. The II Device software could impose the limit on the maximum average current passing through the Laser Diode 10402, by limiting the duty cycle of the PWM signal passing through the Laser Diode or by limiting the maximum ON time as compared to OFF time of the signal for Laser Diode 10402. In addition, the II Device can also limit the duration of the Laser Diode total duration of the functioning 10404. For example, the duration for which it is functioning could be limited to 5 minutes in a particular given time interval such as 1 hour. This could be achieved by using the internal clock of the processor 106 or real time clock 110 of the II Device 140. With Laser Diode a user could provide entertaining lighting effect by emitting the laser beams at various places in the room. The user can change the settings of the limits 10408.

Figure 105:
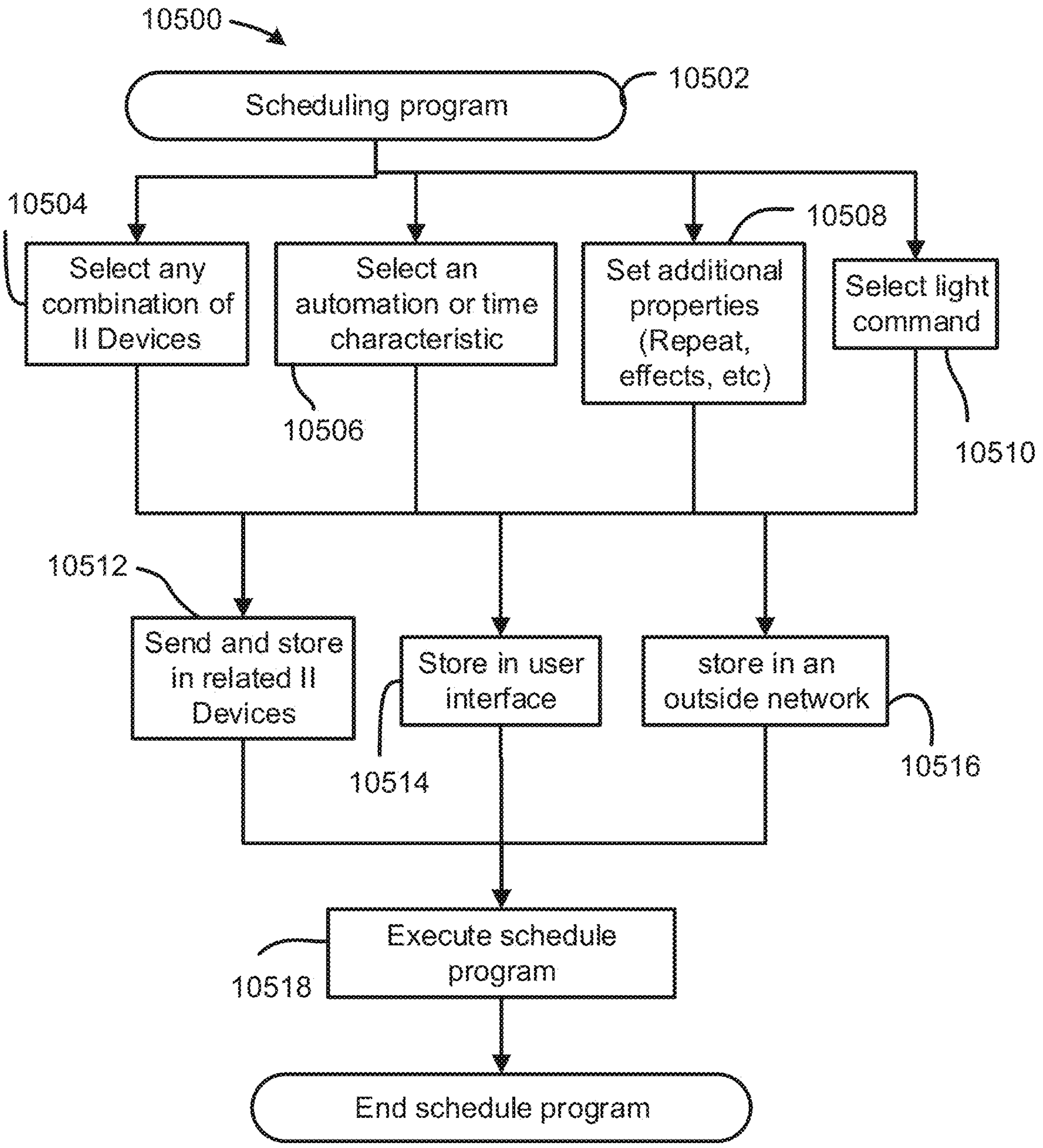
FIG. 105 is a flow chart of a scheduling program for a lighting device in accordance with one embodiment of the present invention.

Any selection level of a system, level, room, group, or individual II Device 140 can be set in combination with a command (configuration, program, or effect) to execute at a designated future time as represented in FIG. 105. Similar to a program, here an extension of program is to interpret that a user can schedule any number of II Devices 140 to do certain things at different times outlined in flow chart 10500. Including but not necessarily in this order, the scheduling program 10502 a user would select any combination of II Devices 10504. Then a user would select an automation or time characteristic 10506, including but not limited to time start/end, day start/end, day of the week start/end, or duration. The schedule could then be set to have additional properties 10508 such as repeatability (repeating on some schedule), effect commands such as fade-in or fade-out commands, or the like. Also, the user may specify the light command associated with the schedule select a pre-defined light command 10510. One II Device can have multiple future schedules. Similarly, any selection level, such as a room, can have multiple schedules.

The selected schedule may then be stored in the related II Devices 10512, within the user interface 10514, or stored in an outside network like cloud storage 10516. At the appropriate scheduled condition, the II Devices in coordination with the related components of the lighting network would execute the set command in accordance with the additional properties 10518. The schedule may be presented to the user in a variety of ways (a user can see the set future scheduled events for any selection level of II Devices. These scheduled events could be organized and sorted based on the soonest to occur showing first. In addition, the scheduled events could have representations on what the command is, including color, brightness, program, effect or the like. Moreover, the II Device could show inherited schedules from higher levels of hierarchy, such that a single II Device could show a schedule set for a group that it is associated with. Furthermore, the schedule could be associated to a user.

Referring to FIG. 106, an option could be made in the user interface to enact an eco mode for any level of control 10600. The eco mode would be geared towards optimizing efficiency with regards to energy usage. For example, the selected lights would be dimmer using less energy. In addition, other applications like proximity, sunset/sunrise monitoring, ambient light sensing, and other information could be used to create an eco footprint.

For example, when a user selects the eco mode option, it can set a reduced energy usage 10602 for the related II Devices that would be lower than the overall maximum energy usage 10603. The lowered energy usage here could be attributed and associated with a reduction in light output, wireless strength, or light qualities such as CRI or color temperature. In addition, the lowered maximum energy usage might be variable over time 10604 with respect to the general maximum energy usage 10603. This variable energy usage 10604 could be related to an additional condition such as time of day, seasonality, available sunlight, as a proportion of the general energy usage, or with respect to other conditions 10606. For example, the Eco mode might be triggered or controlled with respect to overall power grid demand. Here, a signal could be sent to the WD or directly to the II Devices indicating a high-demand period of energy use as a condition 10606. In response a variable eco-mode maximum energy usage could be set 10604 so that the power consumption of the II Devices is reduced. The Eco mode could be a general selection mode on top of any other command limiting the overall brightness produced by the II Devices. Or, the eco mode could be limited to a set number of II Devices and any other configuration would be in replacement to the Eco configuration.

As shown in FIG. 107 in a monitoring program 10700, each II Device or the controlling device has the ability to monitor when and for how long and at what setting the related II Device is active or inactive 10702, and the II Device can associate that with an approximate energy usage required 10704 and relay that information back to the controlling device. The controlling device can then summarize and display that information in a user interface screen 10706 to summarize the energy usage of one or many II Devices. The energy usage might be translated to alternative metrics such as $'s or carbon dioxide offset. This information could be tracked under multiple parameters such as year to date (YTD), past week, lifetime, and the like. This information could be stored locally in the app, saved to an associated cloud location, or sent to an alternate source such as a utility monitoring program or the like.

As the connected device has access to the web either through a local area network or a wireless network, the application could access various data feeds via the connected device on the web that can be used as programming inputs to one or more II Devices as referenced in FIG. 108 10800. The data feed 10801 would be accessed by the IID or connected device 10802. Alternatively, there could be a bridge or secondary connected device within the lighting network that is connected to the web and has access to the web service data feeds 10803. The data would then be mapped and interpreted into one or more light settings for the one or more IIDs 10804. The mapping and interpretation could be through a combination of predefined or user defined methods.

The data feeds could be accessed with one or more data access settings 10806 including but not limited to a one-time access, continuously accessed, accessed upon a condition or event, or upon user input. Example conditions for the data programming could be defined from a time of day, calendar day, day of week, additional data condition, additional program, or any combination thereof. For example, various local weather data feeds could be accessed through various web services on the connected device. This information could then be used to create different lighting configurations or settings, such as a light being bluer or redder based on the temperature. In addition, the weather information could be used to assume the overall overcast conditions and level of brightness and similarly adjust any number of II Devices accordingly.

A user could schedule the data programming functions for a set time or reoccurring dates/times associated to any number of II Devices. For example, a user could set a weather program to have an II Device to reflect the weather outside on weekdays from 7 am to 8 am. Only at that time would the II Device and the controlling devices look for the data information, send it to the associated II Device and the associated command.

Other forms of data include but are not limited to, stock or commodity trading or market information, incoming phone calls or messages, application or web alerts such as those from social media applications, sunset/sunrise times, or any other data feed indicators.

There can be a program as shown in FIG. 109 where the application device can be set to record a series of actions executed by the II Devices and played back at a later time 10900. Initially, a setting would be selected within the controlling device to begin the recording 10902. The controlling device and/or II Devices would then monitor any interaction and/or actions taken by one or more II Devices 10904. The user's interaction and actions could come from an outside program or through direct user interaction through the controlling device to one or many II Devices over a time period. The intended one or more series of interactions and actions can then be recorded and committed to memory 10906. Afterwards the recording of the sequence of one or more commands can be replayed upon a user request or through some other program 10908. This would allow someone to set-up favorite effect or program sequences and recall the sequence of settings at any time. The sequence could be a function of a general step-by-step sequence or it may be a function of time between each step of the sequence. A user could have the ability after recording to edit the recording in various ways 10910, cropping, cutting, adjusting the time, or changing any number of different aspects of the recorded lighting sequence as required.

Within the device application a user can create or have access to predefined lighting effects. These effects can simulate certain environments, ambiances, or functional aspects. A user can select an effect, select any number of II Devices (either through groups/rooms, or individual control), then execute that effect at that time or upon a further schedule. These effects range from simulating certain environments, such as a moving blue ocean, flickering orange candlelight, a strobe, or other effects, to other lighting effects beneficial for film or general use such as, fire, television, lightning, headlights, flashes of light from explosions/gun fire. Further, the effect might be linked to some other event such as taking a photo and having a flash effect.

Figure 110:
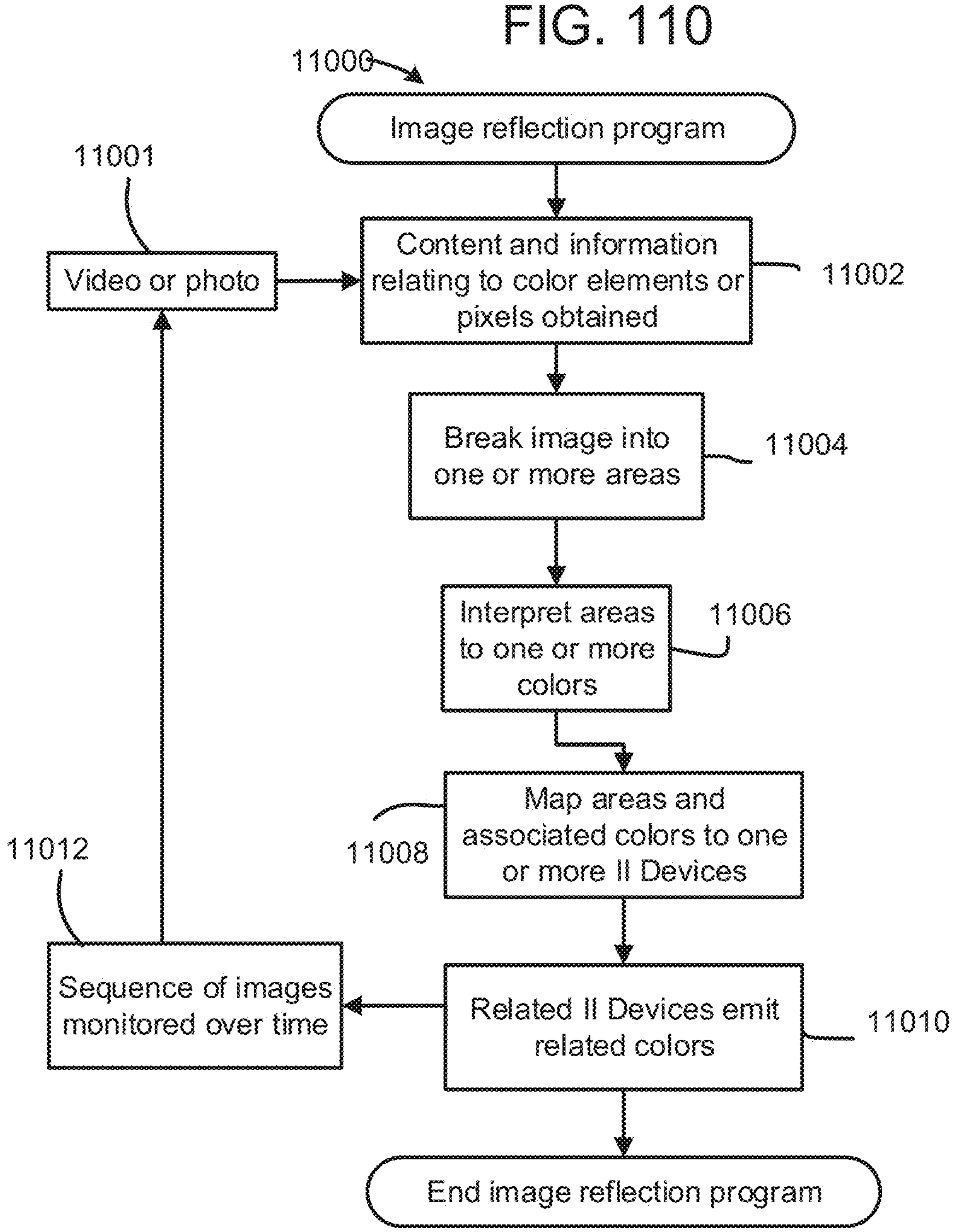
FIG. 110 is a flow chart of image reflection program for a lighting device in accordance with one embodiment of the present invention.

A photo or video is composed of a series of pixels that have an associated color. In this sense, these pixels can be extracted to relate to a command given to one or many II Devices in an image reflection program 11000 as referenced in FIG. 110. The associated commands could be similar all relating to a general type of pixel or each different with different selected pixels associated to different II Devices. From photo or video 11001, an image including content and information relating to color elements or pixels within that photo or video will be obtained either through the controlling device, the application interface, a display signal, or an outside means 11002. The image and associated color element could be broken out into one or more different areas of the picture 11004. Additionally, the image could be compressed, converted, or modified as needed. This break-up could be done based on contrasting dominant color schemes, x & y coordinates or quadrants within the image, a user selection, a random sampling of the image, or some combination of the previous. These various broken out areas can then be interpreted either via an average, modal, or other approach into one or more colors 11006. These colors can then be mapped to one or more II Devices 11008. In addition, the assignment of pixels to one or many II Devices can be user generated or automated. If automated, the device application could use information on the layout of the II Devices in the proximity location to help identify spatial relationships where the II Devices are related to a frame. The related II Devices would then emit a light associated with the interpreted colors 11010.

A sequence of pictures or video could similarly be monitored as a sequence of images or frames over time 11012. This could be done based on every frame or a defined number of frames to optimize the performance. The photo or video could be viewed directly on the connected device or a separate display, such as a television. If in a separate display, the connected device could be an intermediary between the display and the II Devices. Alternatively, the display can be directly connected to the II Devices or have a connected router or bridge that can monitor the display and send a command directly to the II Devices. The overall effect would provide a light setting or sequence that extends the visual display of an image to the ambient environment. This would immerse a user within an image or video and create the potential for a surround effect with lighting.

Referring to FIG. 111, a process for creating a scene in a quick and convenient fashion is described 11100. Through general use, a user will go through the effort of personalizing and creating a combination of light settings in relation to one or more II Devices, or scenes. It would therefore be convenient to the user to easily save and replay these scenes without going through the process of retuning each individual II Device. Instead, the wireless device working with the device application can at any time capture the scene as the current state of the one or more II Devices and their respective light setting 11102. The capture can either be through a manual user interaction with the device application 11103 or upon some other event such as through an automated timeframe or as part of a program 11104. Additionally, the capture of the scene could be taken from a static lighting setting or as a single frame from within a dynamic light setting. The one or more II Devices could be captured in an individual or a group form.

After capturing the scene, the one or more II Devices and their related light settings could be saved to the device or application memory as a new scene 11105. The process of saving could be automatic or require manual input or interaction to save. The saved new scene could then be viewed or edited 11106 to adjust any metadata or settings related to the one or more II Devices and their related light settings. The scene could also be replayed or executed at a later time either through a user interaction within the device application or through some user or pre-defined program 11108. At which point, the one or more II Devices will then emit the saved light settings as originally captured and stored within the scene 11110.

As lighting is fairly well and universally distributed, the function of the II Devices 140 might be used to provide various location services and interactions 11200 as represented in FIG. 112. Here, one or more II Devices 140 could be placed in an area 11202. The II Devices defined at a minimum of requiring a wireless transceiver/receiver and one or more LEDs. The II Devices would be set to send out a periodic message that includes an identifier for each specific II Device 11204. The identifier could be user defined or predefined. Similarly, the II Devices could monitor or listen for the presence of other wirelessly addressable devices within range 11206, as example if the II Device uses Bluetooth then the II Device 140 would look for all available Bluetooth devices within range. Also, the II Devices could alternate between a sending and listening mode 11208.

The II Device could then find one or more compatible wirelessly addressable device within range or the wirelessly addressable device could find one or more II Devices within range 11210. After the one or more II Devices and the one or more wirelessly addressable devices find each other, a predefined or user defined action may result 11212. One example action includes prompting the wirelessly addressable device with a message or advertisement 11214. Another example action includes matching the II Device identifier with some other information stored within the wirelessly addressable device or a related device application 11216. Here, the II Device identifier could be associated to a specific location key within the space. Another example action includes the wirelessly addressable device sending a command to the one or more II Device to change to a different light setting 11218. At the same time, a sequence within a device application on the wirelessly addressable device could be triggered that changes the view of the device application to bring up location specific content 11220. Similarly, the one or more II Devices could change to draw attention to that space, perhaps changing color, brightness, or executing a lighting effect.

There might also be a sequence of actions taken as a combination or result of any of the predefined actions between the one or more II Devices and the wirelessly addressable devices 11222. As example, after a first action between an II Device and the wirelessly addressable device where the II Device identifier is recorded by the wirelessly addressable device, the wirelessly addressable device could send a message through the web to a separate database that records the interaction taking place along with other metadata including the time of the interaction, the length of the interaction, the signal strength of the interaction, or other information.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A wireless device comprising:

a wireless transceiver circuit;

an antenna communicably coupled to the wireless transceiver circuit;

a memory;

a firmware stored in the memory, wherein the firmware includes a firmware version;

a controller/processor communicably coupled to the wireless transceiver circuit and memory, wherein the controller/processor is configured to send a message containing the firmware version to a local wireless device, receive the firmware update from the local wireless device, update the firmware by executing the firmware update automatically without any user interference, and add or change a parameter in the memory indicating a point within the firmware update that is complete;

the controller/processor is configured to execute commands to control current passed through the local wireless device and execute mesh network process in relation to location of the local wireless device and the commands are executed when conditions are met;

wherein the firmware update was previously installed or downloaded on the local wireless device and the local wireless device is-a phone, a local computer, a tablet, a smartTV, a remote controlling device, a local gateway, or a wireless lighting device; and wherein whenever an installation of the firmware update is unsuccessful, the parameter in the memory is read, and the firmware update is resumed from the point.

2. The wireless device of claim 1, wherein the message comprises a broadcast message sent to multiple local wireless devices.

3. The wireless device of claim 1, wherein the controller/processor is further configured to change the firmware version only after a successful installation of the firmware update.

4. The wireless device of claim 1, wherein the controller/processor is further configured to restart the firmware update until the firmware update is successful.

5. The wireless device of claim 1, wherein:

the controller/processor is further configured to restart or resume the firmware update with the local wireless device, another wireless device, or a controlling device.

6. The wireless device of claim 1, wherein the local wireless device confirms whether the wireless device needs to be updated based on the firmware version of the wireless device.

7. The wireless device of claim 1, wherein:

the wireless device comprises a first device type, the local wireless device comprises a second device type, and the first device type is different than the second device type;

the wireless device further comprises a first hardware, the local wireless device further comprises a second hardware, and the first hardware is different than the second hardware; or the wireless device further comprises a first application identifier stored in the memory, the local wireless device further comprises a second application identifier, and the first application identifier and the second application identifier are different.

8. The wireless device of claim 1, further comprising a hardware configuration parameter stored with the memory.

9. The wireless device of claim 1, wherein the wireless device is not directly or indirectly connected to the Internet during the firmware update process.

10. The wireless device of claim 1, further comprising:

a first memory communicably coupled to the controller/processor, wherein the memory comprises a second memory, and the firmware is running on the controller/processor; and the firmware update is copied to the second memory, and the controller/processor replaces the firmware with the firmware update, or the firmware update comprises an application firmware and a bootloader, the application firmware is deleted from the second memory, the bootloader is kept the same, and the bootloader updates the second memory with a new application firmware.

11. The wireless device of claim 1, wherein the wireless device is a lighting device.

12. A computerized method for updating a firmware on a wireless device, the method comprising:

automatically sending a message without any user interference, via a wireless transceiver circuit, containing a firmware version to a local wireless device using the wireless transceiver circuit communicably coupled to an antenna and a controller/processor, wherein a firmware is stored in a memory communicably coupled to the controller/processor and the firmware includes the firmware version;

automatically receiving without any user interference, via the wireless transceiver circuit, a firmware update from the local wireless device, wherein the firmware update was previously installed or downloaded on the local wireless device and the local wireless device is a phone, a local computer, a tablet, a smartTV, a remote controlling device, a local gateway, or a wireless lighting device; and automatically updating without any user interference, via the controller/processor, the firmware on the wireless device by executing the firmware update;

adding or changing via the controller/processor, a parameter in the memory indicating a point within the firmware update that is complete;

execute commands from the controller/processor to control current passed through the local wireless device and execute mesh network process in relation to location of the local wireless device and the commands are executed when conditions are met; and whenever an installation of the firmware update is unsuccessful, reading the parameter in the memory, and resuming the firmware update from the point.

13. The method of claim 12, wherein the message comprises a broadcast message sent to multiple local wireless devices.

14. The method of claim 12, further comprising changing the firmware version only after a successful installation of the firmware update.

15. The method of claim 12, wherein the controller/processor is further configured to restart the firmware update until the firmware update is successful.

16. The method of claim 12, further comprising restarting or resuming the firmware update with the local wireless device, another wireless device, or a controlling device.

17. The method of claim 12, further comprising confirming, by the local wireless device, whether the wireless device needs to be updated based on the firmware version of the wireless device.

18. The method of claim 12, wherein:

the wireless device comprises a first device type, the local wireless device comprises a second device type, and the first device type is different than the second device type;

the wireless device further comprises a first hardware, the local wireless device further comprises a second hardware, and the first hardware is different than the second hardware; or the wireless device further comprises a first application identifier stored in the memory, the local wireless device further comprises a second application identifier, and the first application identifier and the second application identifier are different.

19. The method of claim 12, further comprising a hardware configuration parameter stored with the memory.

20. The method of claim 12, wherein the wireless device is not directly or indirectly connected to the Internet during the firmware update process.

21. The method of claim 12, further comprising:

a first memory communicably coupled to the controller/processor, wherein the memory comprises a second memory, and the firmware is running on the controller/processor; and the firmware update is copied to the second memory, and the controller/processor replaces the firmware with the firmware update, or the firmware update comprise an application firmware and a bootloader, the application firmware is deleted from the second memory, the bootloader is kept the same, and the bootloader updates the second memory with a new application firmware.

22. A system comprising:

a wireless device comprising a wireless transceiver circuit, an antenna communicably coupled to the wireless transceiver circuit, a memory, a firmware stored in the memory, wherein the firmware includes a firmware version, and a controller/processor communicably coupled to the wireless transceiver circuit and memory;

a local wireless device communicably coupled to the wireless device, wherein a firmware update was previously installed or downloaded on the local wireless device and the local wireless device is a phone, a local computer, a tablet, a smartTV, a remote controlling device, a local gateway, or a wireless lighting device;

the controller/processor of the wireless device is configured to send a message containing the firmware version to the local wireless device without any user interference;

the local wireless device is configured to send the firmware update to the wireless device without any user interference;

the controller/processor of the wireless device is configured to update the firmware by executing the firmware update without any user interference, and add or change a parameter in the memory indicating a point within the firmware update that is complete;

the controller/processor is configured to execute commands to control current passed through the local wireless device and execute mesh network process in relation to location of the local wireless device and the commands are executed when conditions are met; and wherein whenever an installation of the firmware update is unsuccessful, the parameter in the memory is read, and the firmware update is resumed from the point.

* * * * *